(12) United States Patent
Setya

(10) Patent No.: US 7,729,924 B2
(45) Date of Patent: Jun. 1, 2010

(54) VIRTUAL KNOWLEDGE MANAGEMENT SYSTEM

(75) Inventor: Hemant Setya, San Francisco, CA (US)

(73) Assignee: Knowledge IT Corporation, San Francisco, CA (US)

( * ) Notice: Subject to any disclaimer, the term of this patent is extended or adjusted under 35 U.S.C. 154(b) by 1437 days.

(21) Appl. No.: 10/529,077

(22) PCT Filed: Oct. 16, 2003

(86) PCT No.: PCT/IB03/06494

§ 371 (c)(1),
(2), (4) Date: Apr. 25, 2005

(87) PCT Pub. No.: WO2004/053624

PCT Pub. Date: Jun. 24, 2004

(65) Prior Publication Data

US 2006/0111953 A1 May 25, 2006

(30) Foreign Application Priority Data

Oct. 17, 2002 (JP) .............................. 2002-302584
Nov. 19, 2002 (JP) .............................. 2002-334717

(51) Int. Cl.
*G06Q 99/00* (2006.01)
(52) U.S. Cl. ...................................... 705/1.1; 705/345
(58) Field of Classification Search ................ 705/1, 705/1.1, 345
See application file for complete search history.

(56) References Cited

U.S. PATENT DOCUMENTS 5,878,398 A 3/1999 Tokuda et al.
5,991,877 A * 11/1999 Luckenbaugh .................. 726/1
6,067,548 A * 5/2000 Cheng ..................... 707/103 R
6,167,395 A 12/2000 Beck et al.

(Continued)

FOREIGN PATENT DOCUMENTS

JP 08-263481 10/1996

(Continued)

OTHER PUBLICATIONS

Int'l Search Rep., Jun. 14, 2005, John Weiss, all 6 pages.

(Continued)

*Primary Examiner*—Jonathan Ouellette
(74) *Attorney, Agent, or Firm*—Lau & Associates, LLC.

(57) ABSTRACT

It is an object of the present invention to provide a virtual knowledge management system which controls the flow of information relating to the performance of business in an enterprise. The flow of information that is intensively administered by a virtual knowledge base 20 is automatically controlled on the basis of information flow control data 40 including document utilization authorization data, mail communications control data, workflow model data, project data and the like. The utilization of document objects by users is controlled in accordance with the document utilization authorization data. The forwarding of and reply to email messages among users is controlled in accordance with the mail communications control data. The order of work among a plurality of users involved in a certain business process is controlled in accordance with the workflow model data. The flow of information among a plurality of users involved in a certain project is controlled in accordance with the project data. The information flow control data 40 is configurable.

18 Claims, 71 Drawing Sheets

U.S. PATENT DOCUMENTS

| | | |
|---|---|---|
| 6,345,278 B1 | 2/2002 | Hitchcock et al. |
| 6,442,592 B1 | 8/2002 | Alumbaugh et al. |
| RE38,633 E * | 10/2004 | Srinivasan .................. 707/10 |
| 2002/0073056 A1* | 6/2002 | Broster et al. .................. 707/1 |
| 2002/0169723 A1 | 11/2002 | Lin |
| 2002/0184250 A1* | 12/2002 | Kern et al. .................. 707/204 |
| 2003/0009536 A1 | 1/2003 | Henderson et al. |
| 2003/0233439 A1 | 12/2003 | Stone et al. |
| 2004/0088313 A1 | 5/2004 | Torres |
| 2004/0102990 A1* | 5/2004 | Jones ........................... 705/1 |
| 2004/0243458 A1* | 12/2004 | Barkan ......................... 705/9 |

FOREIGN PATENT DOCUMENTS

| | | |
|---|---|---|
| JP | 9-283935 | 10/1997 |
| JP | 1997-512377 | 12/1997 |
| JP | 11-143895 | 5/1999 |
| JP | 2000-504131 | 4/2000 |
| JP | 2000-331083 | 11/2000 |
| JP | 2001-005680 | 1/2001 |
| JP | 2001-05833 | 1/2001 |
| JP | 2002-251508 | 12/2001 |
| JP | 2002-073934 | 3/2002 |
| JP | 2002-517823 | 6/2002 |
| JP | 2002-245396 | 8/2002 |
| JP | 2002-259651 | 9/2002 |
| WO | WO99/63454 | 12/1999 |
| WO | WO 00/14618 | 3/2000 |
| WO | WO 00/51021 | 8/2000 |
| WO | WO 01/67291 | 9/2001 |
| WO | WO 02/26014 A2 | 4/2002 |

OTHER PUBLICATIONS

Supplementary Eur. Search Report, Sep. 6, 2006, Rachkov, V.

* cited by examiner ized within an enterprise or between enterprises, the processing deadlines and document forms that are used are administered for individual work projects, and reports indicating that processing deadlines are growing near, instructions to begin work, document forms that are to be used in the work and the like are transmitted to the party that is responsible for the work. Furthermore, in this system, in cases where a series of work projects are successively performed by a plurality of persons, and there is a delay in the performance of preceding work projects, the parties responsible for the following work projects are notified of this.

VIRTUAL KNOWLEDGE MANAGEMENT SYSTEM

TECHNICAL FIELD

The present invention relates to a virtual knowledge management system which utilizes a computer in order to support the business of an enterprise.

BACKGROUND ART

In a certain universally known business administration system (for example, see Japanese Patent Application Laid-Open No. 2002-251508), in order to accomplish efficient management of business that is systematically conducted within an enterprise or between enterprises, the processing deadlines and document forms that are used are administered for individual work projects, and reports indicating that processing deadlines are growing near, instructions to begin work, document forms that are to be used in the work and the like are transmitted to the party that is responsible for the work. Furthermore, in this system, in cases where a series of work projects are successively performed by a plurality of persons, and there is a delay in the performance of preceding work projects, the parties responsible for the following work projects are notified of this.

Furthermore, another universally known business management system (for example, see Japanese Patent Application Laid-Open No. 2000-331083) has a program module called a workflow definition module. This workflow definition module stores workflow definitions that indicate combinations of business processing modules corresponding to the series of processing procedures and contents of various business projects from the beginning to end of all business projects; a plurality of business processing modules are combined according to these workflow definitions, and instructions for the processing that is to be performed next are sent to individual input-output devices and terminals. The object of this system is to allow the completely automated performance of business projects with absolutely no need for work performed by human beings.

Business conducted by one enterprise or by a plurality of enterprises working in cooperation is performed by the mutual cooperation or association of a plurality of organizations and numerous employees included in the enterprises. Accordingly, in order to conduct business more efficiently and increase the productivity of the enterprises, it is important to make the mutual cooperation and association of a plurality of organizations and employees easier and more efficient. For this purpose, the appropriate control of business-related information, and especially business-related documents (for example, plans, specifications, circulating documents, accounting documents, design drawings, photographic images, recorded sound data, movie data, instructions and responses, reports and approvals, various other types of messages and the like), between organizations or between employees is essential. For example, if information with an appropriate content is provided at an appropriate time and by an appropriate method from appropriate organizations or persons to other appropriate organizations or persons, the association of these organizations or persons is facilitated and made more efficient, so that productivity is increased.

Furthermore, the scale, organization, environment and the like of enterprises are constantly changing, and with such changes, the business of enterprises also changes. In order to maintain a high productivity at all times, the manner of business support such as the above-mentioned information flow control must vary in a flexible manner in accordance with changes in business. Furthermore, business configurations also vary according to the enterprise involved. If a common business supporting system can be applied to different enterprises, the cost of introducing such a business supporting system can be kept low. In view of such facts, a configurable business supporting system is desired.

From such standpoints, Patent Reference 1 merely provides one improvement relating to only some information among business-related information, i.e., work project deadlines and document forms. The system described in Patent Reference 2 is a system in which specified business is performed in a completely automated manner; this system does not improve the cooperation or association of a plurality of organizations or persons. Furthermore, neither Patent Reference 1 nor Patent Reference 2 provides a configurable business supporting system.

DISCLOSURE OF THE INVENTION

It is one object of the present invention to provide a virtual knowledge management system which is used to control the flow of information between a plurality of organizations or persons participating in a business projects, thus facilitating the cooperation and association of these organizations or persons.

It is another object of the present invention to provide a configurable business supporting system which can handle changes in the business of enterprises or differences in the business of different enterprises.

The virtual knowledge management system using a computer according to one aspect of the present invention comprises a virtual knowledge base which stores a plurality of objects that are data entities for respective utilization by a plurality of users, and that belong to different object types, and control data that is provided corresponding to each of the abovementioned object types, and that relates to the control of object operations performed by the abovementioned users, and a manager which has a plurality of types of functions for respectively performing a plurality of types of object operations including the display and preparation of the abovementioned objects belonging to each object type in accordance with requests from the abovementioned users. The respective functions of the abovementioned manager control the respective operations for the abovementioned objects belonging to the respective object types in accordance with the control data of the corresponding object types.

In a preferred embodiment, the abovementioned manager further has functions for preparing or altering the abovementioned control data corresponding to the respective object types in accordance with requests from the abovementioned users.

In a preferred embodiment, the abovementioned control data corresponding to the respective object types includes class definition data which defines one or more classes possessed by the abovementioned objects belonging to the respective object types, and class security setting data which defines the classes that can be accessed or that cannot be accessed by the respective users among the abovementioned one or more classes. The abovementioned objects belonging to the respective object types have values of the abovementioned one or more classes defined by the abovementioned class definition data corresponding to the respective object types. The function used to display the abovementioned objects inside the abovementioned manager is arranged so that the values of classes that can be accessed by the respective users are selected from the values of the abovementioned one or more classes possessed by the abovementioned objects belonging to the respective object types, and are displayed to the respective users, on the basis of the abovementioned class security setting data corresponding to the respective object types.

In a preferred embodiment, the abovementioned control data corresponding to the respective object types includes folder definition data which defines one or more folders in which the abovementioned objects belonging to the respective object types are stored, and folder security setting data which defines the folders that can be accessed or that cannot be accessed by the respective users among the abovementioned one or more folders. The above-mentioned manager further has a folder operating function which is used to operate the abovementioned one or more folders defined by the abovementioned folder definition data corresponding to the respective object types in accordance with requests from the respective users. The abovementioned folder display function is arranged so that folders are displayed with a distinction being made between folders that can be accessed and folders that cannot be accessed by the respective users on the basis of the abovementioned folder security setting data corresponding to the respective object types, and so that only folders that can be accessed by the respective users among the abovementioned one or more folders that are displayed are opened in accordance with requests from the respective users.

In a preferred embodiment, the abovementioned control data corresponding to the respective object types includes function security setting data which defines functions that can be accessed or that cannot be accessed by the respective users among the abovementioned plurality of types of functions inside the abovementioned manager. The system is arranged so that only the functions that are defined by the abovementioned function security setting data corresponding to the respective object types as being accessible by the respective users (among the abovementioned plurality of types of functions for the respective object types inside the abovementioned manager) can be operated in accordance with requests from the respective users.

In a preferred embodiment, the abovementioned objects belonging to one of the abovementioned object types are document objects which can be associated with document files. The respective document objects have type data which indicates one type selected from a plurality of specified types differing in the numbers or types of associated document files. Furthermore, the respective document objects have association data which indicates the association with one or more document files in cases where the document objects are associated with the abovementioned one or more document files. The function used to display the abovementioned document objects inside the abovementioned manager displays the types of the respective document objects on the basis of the abovementioned type data of the respective document objects, and displays the document files associated with the respective document objects on the basis of the abovementioned association data of the respective document objects; furthermore, this function opens the abovementioned associated document files in accordance with requests from the abovementioned users.

In a preferred embodiment, the abovementioned objects belonging to one of the abovementioned object types are email messages. The respective email messages have type data which indicates one type selected from a plurality of specified types that differ in terms of the presence or absence of a reply deadline; furthermore, these email messages have deadline data which indicates the abovementioned reply deadline and status data which indicates the status relating to whether or not the abovementioned reply deadline has passed in cases where the email messages have the abovementioned reply deadline. The function used to display the abovementioned email messages inside the abovementioned manager is arranged so that this function displays the abovementioned type data of the respective email messages, and so that this function also displays the abovementioned reply deadline and status in cases where the respective email messages have the abovementioned reply deadline data and status data.

In a preferred embodiment, the abovementioned objects belonging to one of the abovementioned object types are email messages. The respective email messages have reply/forwarding control data which relates to the reply to, or forwarding of, the respective email messages. The abovementioned manager has a reply/forwarding function which is used to reply to the abovementioned email messages, or to forward these email messages, in accordance with requests from the abovementioned users. The abovementioned reply/forwarding function is arranged so that this function controls the reply to or forwarding of the respective email messages on the basis of the abovementioned reply/forwarding control data possessed by the respective email messages.

In a preferred embodiment, the abovementioned objects belonging to one of the abovementioned object types are business processes which respectively have one or more sets of workflow model data that respectively define the flow of work among a plurality of users. Furthermore, the abovementioned objects belonging to another one of the abovementioned object types are tasks which have task data that defines the work that can be performed by the abovementioned users. Furthermore, the abovementioned objects belonging to another one of the abovementioned object types are projects; these respective projects are associated with one or more of the abovementioned business processes, and with one or more of the abovementioned tasks respectively assigned to one or more of the above-mentioned users as defined by the workflow data of the respective business processes. The abovementioned manager further has a project control function which is used to control the progress of the respective projects in accordance with requests from the abovementioned users. The abovementioned project control function is arranged so that this function prepares and displays a task list that lists the tasks assigned to the respective users on the basis of the abovementioned one or more business processes and the abovementioned one or more tasks associated with the respective projects, and so that this function updates the abovementioned task list for the respective users in accordance with input indicating the initiation or completion of tasks from the respective users.

The virtual knowledge management system according to another aspect of the present invention comprises intensive data management means for the intensive management of various types of documents or data that exist in an enterprise, a control data editing part which prepares and alters information flow control data involved in the control of the information flow among a plurality of users, and which registers the abovementioned prepared or altered information flow control data in a memory device, and an information flow control part which uses the abovementioned information flow control data registered in the abovementioned memory device to control the flow of the abovementioned various types of documents or data among a plurality of user terminals used by the abovementioned plurality of users.

In a preferred embodiment, the abovementioned control data editing part can prepare and alter utilization authorization data which indicates the authorization of respective users to utilize the abovementioned various types of documents or data as one type of the above-mentioned information flow control data, and can register the prepared or altered utilization authorization data for each user in the abovementioned memory device, in accordance with requests from specified users. Furthermore, the abovementioned information flow control part can control the utilization or operation of the respective users with respect to various types of documents or data in the abovementioned data base on the basis of the utilization authorization data for the respective users registered in the abovementioned memory device.

In a preferred embodiment, the abovementioned control data editing part can prepare and alter mail communications control data which indicates desired limitations regarding the forwarding of, or reply to, email messages transmitted from the respective users as one type of the abovementioned information flow control data, and can associate the prepared or altered mail communications control data with email messages transmitted from the respective users, in response to requests from the abovementioned respective users. Furthermore, the abovementioned information flow control part can control the forwarding or reply operations of the receivers of the respective email messages on the basis of the communications control data associated with the respective email messages.

In a preferred embodiment, the abovementioned control data editing part can prepare and alter workflow models relating to desired business processes as one type of the abovementioned information flow control data, and can register the prepared or altered workflow models in the abovementioned memory device, in response to requests from specified users. Furthermore, the above-mentioned information flow control part can control the information flow among a plurality of users involved in the respective business processes on the basis of the workflow models of the respective business processes.

In a preferred embodiment, data relating to the order of work or document flow among a plurality of users involved in respective business processes may be included in the abovementioned workflow models relating to respective business processes. Furthermore, the abovementioned process control part can control the order of work or flow of documents among a plurality of users involved in the respective business processes on the basis of the abovementioned data relating to the order of work or document flow that is contained in the workflow models of the respective business processes.

In a preferred embodiment, a display part may be further provided which graphically displays a hierarchical structure that indicates the mutual logical relationship between the business processes and one or more users involved in each of the business processes on the basis of the data of the abovementioned workflow models of one or more business processes registered in the memory device.

In a preferred embodiment, the abovementioned control data editing part can prepare and alter project data relating to projects that include one or more business processes and one or more tasks as one type of the abovementioned information flow control data, and can register the prepared or altered project data in the abovementioned memory device, in response to requests from specified users. Furthermore, the abovementioned information control flow part can control the flow of information among a plurality of users involved in the respective projects on the basis of the project data for the respective projects.

In a preferred embodiment, a display part may be further provided which graphically displays a hierarchical structure that indicates the mutual logical relationships of the projects, one or more business processes or tasks included in each of the projects and one or more users involved in each of these business processes or tasks on the basis of project data for the abovementioned one or more projects registered in the abovementioned memory device.

Other objects and advantages of the present invention will become clear from the following description.

BEST MODE FOR CARRYING OUT THE INVENTION

Figure 1:
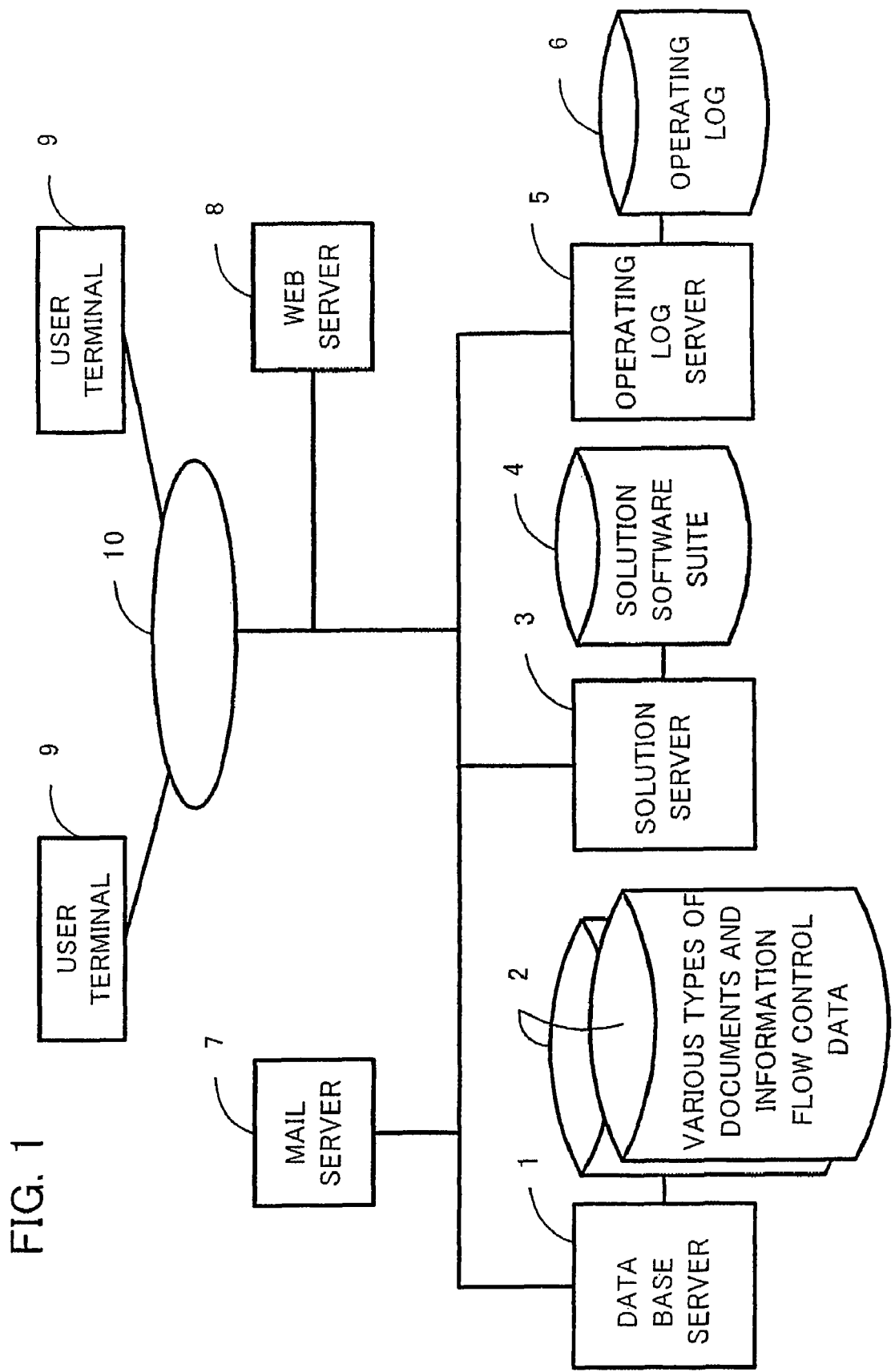
FIG. 1 is a block diagram which shows an example of the overall hardware construction of a configurable virtual knowledge management system constituting one embodiment of the present invention.

FIG. 1 shows an example of the overall hardware construction of a configurable virtual knowledge management system for supporting the business of one or a plurality of enterprises, constituting one embodiment of the present invention. This virtual knowledge management system may be used within a single enterprise, or may be used in common by a plurality of collaborating enterprises. Below, a case in which the system is used within a single enterprise will be taken as an example in order to simplify the description.

As is shown in FIG. 1, this virtual knowledge management system comprises at least one data base server 1, at least one solution server 3, at least one operating log server 5, at least one mail server 7, and at least one web (WWW) server 8, and these servers, 1, 3, 5, 7 and 8 are connected via a communications network 10 so that mutual communication is possible. Furthermore, a plurality of user terminals 9 are connected to the communications network 10, so that these user terminals 9 can access the web server 8 and mail server 7. Each of the user terminals 9 has a web browser and an email program (not shown in the figures), and can access the web server 8 and mail server 7. The users are typically various types of sections (e.g., business section, marketing section, development section, accounting section and the like) or individual firm members (including employers as well as employees) within the enterprise; however, organizations and persons outside the enterprise may also be included among the users. The user terminals 9 are typically communications information processing devices such as personal computers, mobile telephones, PDA or the like used by the users.

The data base server 1 administers one or a plurality of data bases 2 that exist within the enterprise. Various types of documents that relate to the business of the enterprise (for example, plans, specifications, circulating documents, accounting documents, design drawings, photographic images, recorded sound data, movie data, instructions and responses, reports and approvals, various other types of messages and the like) are recorded in each data base 2. Furthermore, data that is used to control the flow of information within this enterprise (hereafter referred to collectively as "information flow control data") is also recorded in each data base 2. Such information flow control data includes various types of data, such as (for example) document utilization authorization data, workflow model data, project data and the like.

Document utilization authorization data is data that defines the rights of respective users to utilize documents (e.g., rights specifying which operations are possible (among various types of utilization operations such as searching, reading, writing, inputting of annotations, outputting, storage, approval and the like) with respect to which documents and the like). Furthermore, workflow model data is data that defines, for each individual business process, work models (e.g., the order of processing and flow of documents among users in cases where the work is performed by a plurality of users acting in association) indicating which work items (business processes) are to be performed by which users (e.g., which sections or which employees) using which procedures. Furthermore, project data is data that defines the construction of certain projects (e.g., the types of business processes or workflow models that are incorporated into these projects, the assignment of respective business processes or workflow models to sections, the tasks of the respective sections in performing the assigned business processes, the assignment of respective tasks to employees, the roles of respective employees in performing the assigned tasks and the like).

Such information flow control data is prepared and administered, and (if necessary) corrected or deleted, by the solution server 3. Furthermore, the solution server 3 controls the flow of information within this enterprise on the basis of such information flow control data.

The solution server 3 is the central part of this virtual knowledge management system; a set of computer programs 4 used for business support, which called the "solution software suite" in this description, is installed in this solution server 3. For example, five manager programs which are respectively called the object manager (OM), review manager (RM), workflow manager (WM), project manager (PM) and management manager (AM), as well as several other manager programs not shown in the figures, are included in the solution software suite 4. By executing these managers, the solution server 3 not only administers various types of documents or information existing within this enterprise as in a conventional data base management system, but also controls the flow of various types of documents or information among users so that the cooperation and association of users is facilitated and made more efficient. Furthermore, the solution server intensively administers various types of documents or information within the enterprise on the overall scale of the enterprise, and controls the flow of these documents or information on the overall scale of the enterprise. Accordingly, even if a plurality of different data bases 2 exist within the enterprise, the users can utilize the information in these data bases 2 exactly as if this information were information in a single data base.

The operating log server 5 administers an operating log 6 comprising log information used for the operation of this virtual knowledge management system. The mail server 7 relays the exchange of email messages among the users. As will be described later, the exchange of email messages among the users is controlled by the review manager (RM) within the solution suite 4.

The web server 8 is used to provide a graphical user interface (GUI) of the solution server 3 (solution software suite 4) to the user terminals 9. This GUI is a hypertext format GUI (hereafter referred to as a "web base GUI") which can perform displays and operations using the web browsers inside the user terminals 9. Accordingly, the users can utilize the solution server 3 (solution software suite 4) via this web base GUI.

Figure 2:
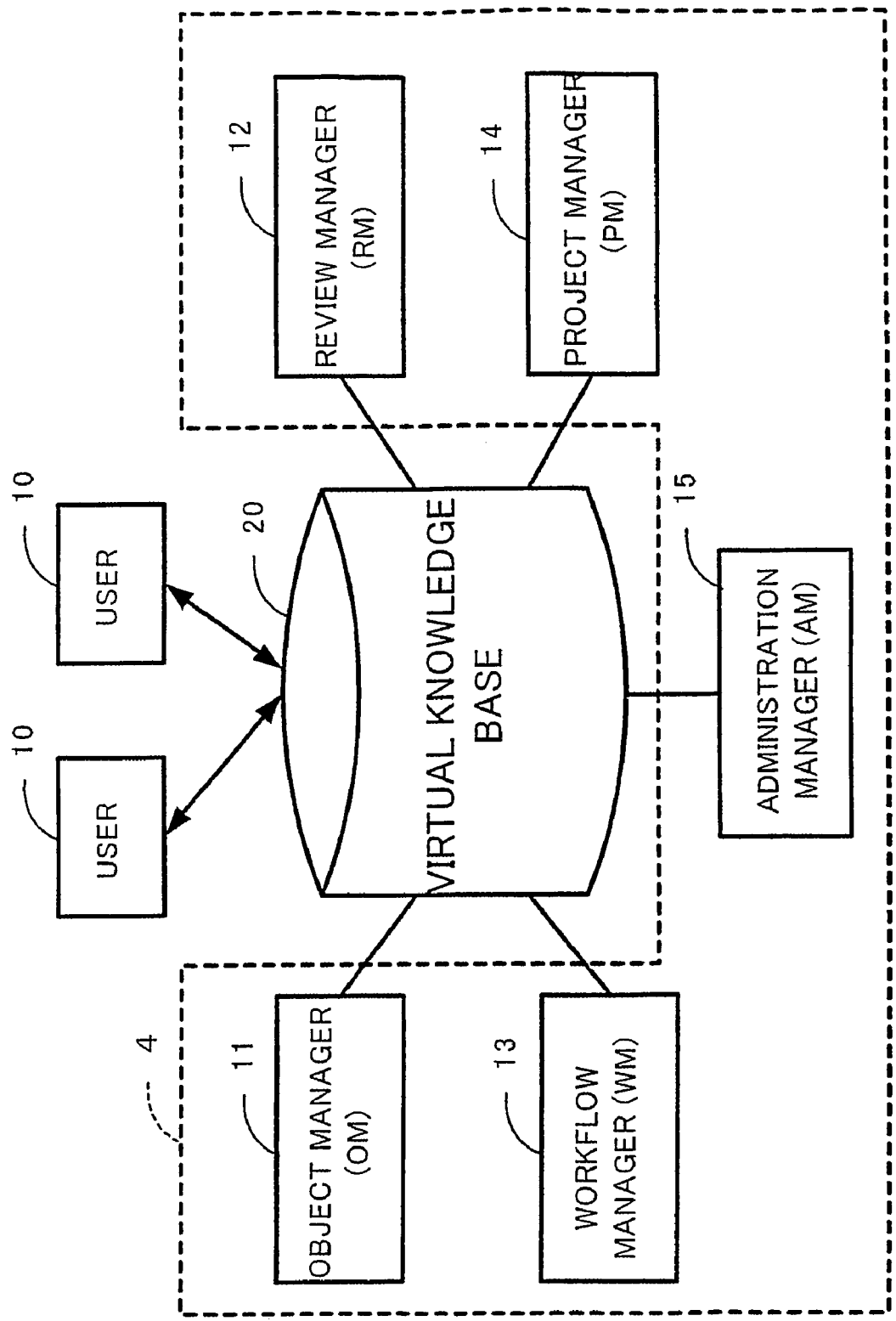
FIG. 2 is a block diagram which shows the construction of the solution software suite.

FIG. 2 shows an example of the construction of the above-mentioned solution server 4.

As is shown in FIG. 2, the solution software suite 4 has (for example) five manager programs, i.e., an object manager (OM) 11, review manager (RM) 12, workflow manager (WM) 13, project manager (PM) 14 and management manager (AM) 15. Examples of respective typical functions of these five managers 11 through 15 may be described as follows:

The object manager (OM) 11 intensively manages documents of various formats and types existing within the enterprise throughout the enterprise as a whole. As a result, various types of documents within the enterprise can be effectively utilized by various sections or employees within the enterprise. Furthermore, the OM 11 can not only administer individual documents in file units, but can also administer a plurality of documents combined as single unit objects; furthermore, there are a plurality of different types of document objects that differ in terms of the types of documents that are combined. Furthermore, the OM 11 also controls the manner in which various sections or employees within the enterprise utilize various types of documents within the enterprise (e.g., searching, reading, writing, inputting of annotations, approval, outputting, distribution, storage or the like) in accordance with the document utilization rights possesses by the respective sections or employees. As a result, documents that are necessary or useful to the abovementioned sections or employees (among the vast number of documents existing within the enterprise) are automatically selected and provided for the utilization of the sections or employees. Furthermore, in cooperation with a project manager (PM) 14 to be described later, the OM 11 also has the function of notifying sections or employees participating in various types of projects within the enterprise of the tasks that are to be performed by these sections or employees in accordance with the state of progress of these projects.

The review manager (RM) 12 controls the distribution of email messages among various sections or employees within the enterprise. For example, various types of control are possible, such as classification of email messages into a plurality of types and control of the flow of email by different methods according to each type, management of reply deadlines for respective email messages, and control as to whether or not the forwarding of respective email messages and distribution of copies is possible. Furthermore, the RM 12 also performs control operations relating to communications and the exchange of documents between various sections or employees within the enterprise and the document printing room and document storage room. Moreover, the RM 12 also performs comprehensive tracking of the utilization status of documents within the enterprise.

The workflow manager (WM) 13 has the functions of preparing workflow models that express the manner of pursuing various types of work (business processes) within the enterprise, and registering the data of the workflow models of the respective business processes in the data base 2. The workflow model data for the respective business processes includes information indicating which sections or which employees are responsible for the business processes, what types of documents are used in the business processes, and the order in which work is performed or documents are forwarded by the responsible sections or employees. The addition of new workflow models, upgrading of the versions of existing workflow models and the deletion of existing workflow models can be performed by a simple method. The workflow models prepared for various business processes by the WM 13 are incorporated into various projects and used to control the progress of these respective projects by the project manager (PM) 14 described next.

The project manager (PM) 14 has the functions of preparing projects in which various types of business processes are combined, and registering this project data in the data base 2. The respective sets of project data include detailed information indicating which business programs are included in the projects, what kinds of tasks are assigned to the sections or employees involved in the business processes, and what roles are played by respective employees (for example, analysts, designers, system engineers or the like) in the respective tasks. Furthermore, the PM 14 also notifies the sections or employees involved in such projects of the detailed information relating to these projects. Moreover, the PM 14 monitors the progress of business processes included in the projects, and provides appropriate documents or reports corresponding to this progress to the sections or employees involved in the business processes. In this way, the progress of the projects is controlled. By using the PM 14, the creation of new projects, the upgrading of the versions of existing projects and the deletion of business projects can be accomplished in a simple manner.

The administration manager (AM) 15 has the function of registering various types of data (hereafter referred to as "operating data") used for the overall operation or control of this virtual knowledge management system. For example, the registration of users, the setting of document utilization authorization for users, the setting of various types of document forms, the setting of various types of search forms, the setting of GUI forms and the like can be performed using the AM 15. The preparation of new operating data, the modification of existing operating data, the deletion of existing operating data and the like can be accomplished in a simple manner.

As a result of the functions of the abovementioned managers 11 through 15, not only are various types of documents and information within the enterprise simply managed in the data base 2, but the flow of various types of documents or information between sections or between employees is also controlled so that the performance of business is supported. Furthermore, even if a plurality of data bases 2 exist within the enterprise, the documents or information in such a plurality of data bases 2 can be handled in an intensive manner. Moreover, the manner in which the flow of information is controlled can be flexibly varied in accordance with the circumstances of the enterprise. Thus, the function of the data base 2 of the enterprise is strengthened or improved by the functions of the managers 11 through 15 so that this data base 2 can contribute much more efficiently to the performance of business. The virtual knowledge base 20 shown in FIG. 2 indicates a data base that has thus been strengthened or improved. Furthermore, the construction and functions of this virtual knowledge base 20 can be flexibly arranged in accordance with variations in the business content of the enterprise or the environment in which the enterprise is placed, or in accordance with circumstances that vary for each enterprise. In other words, this virtual knowledge base is configurable. All types of users (sections or employees) 10 within the enterprise can perform various types of work using this configurable virtual knowledge base 20.

Figure 3:
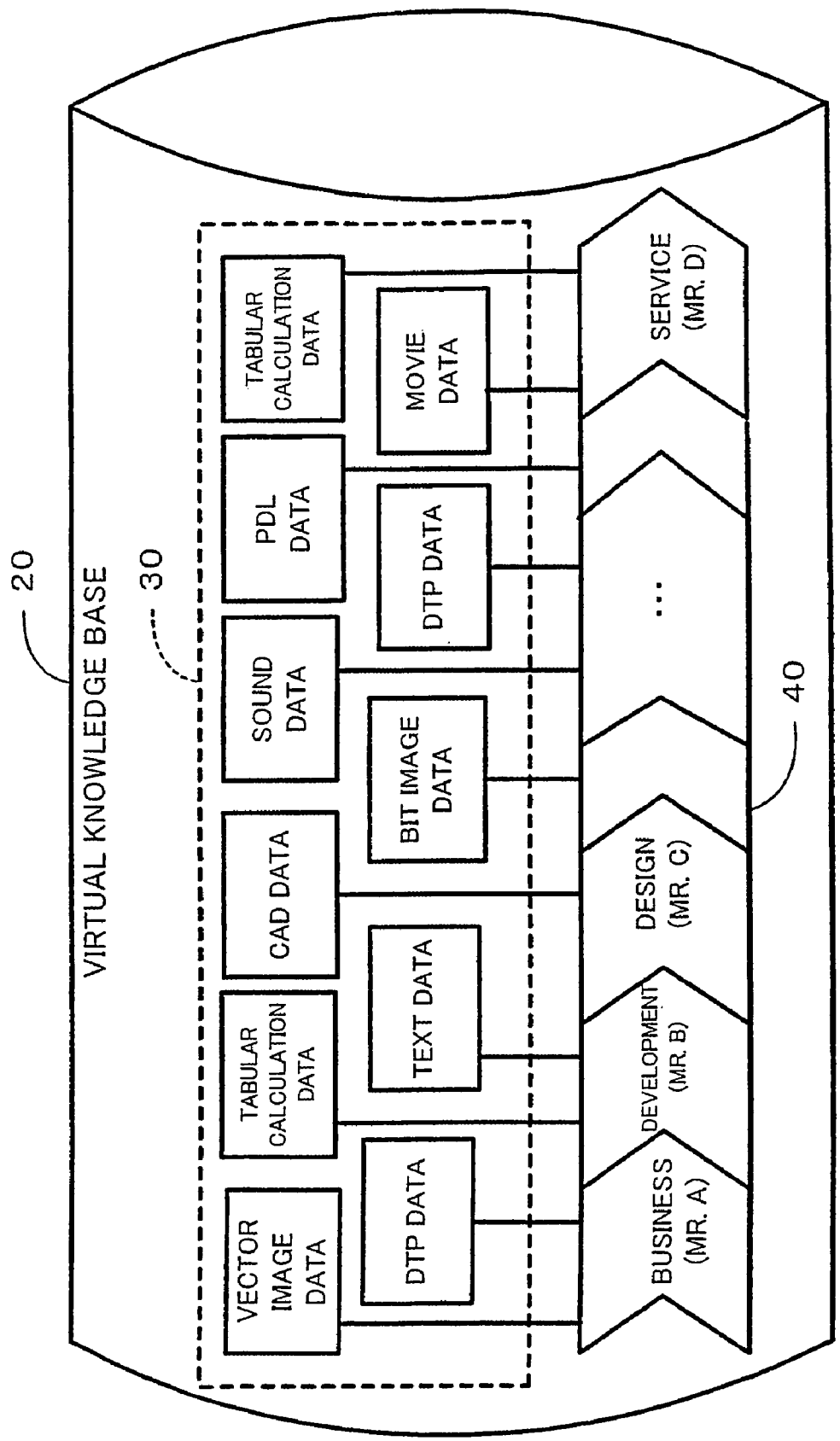
FIG. 3 is a block diagram which shows in model form an example of the strengthened or improved functions possessed by the virtual knowledge base 20.

FIG. 3 shows (in model form) an example of the strengthened or improved functions of the virtual knowledge base 20.

As is shown in FIG. 3, various types of documents 30 prepared or edited by various sections (e.g., business section, development section, design section, service section and the like) or various employees (e.g., Mr. A, Mr. B, Mr. C, Mr. D and the like) within the enterprise are intensively administered by the virtual knowledge base 20. Furthermore, the flow of these various types of documents 30 among sections or among employees is automatically controlled on the basis of the abovementioned various types of information flow control data (e.g., document utilization authorization, workflow models, project data and the like) 40. As a result, shared use and effective utilization of the documents are promoted on the scale of the enterprise.

Several concrete examples of such information flow control will be described below.

Figure 4:
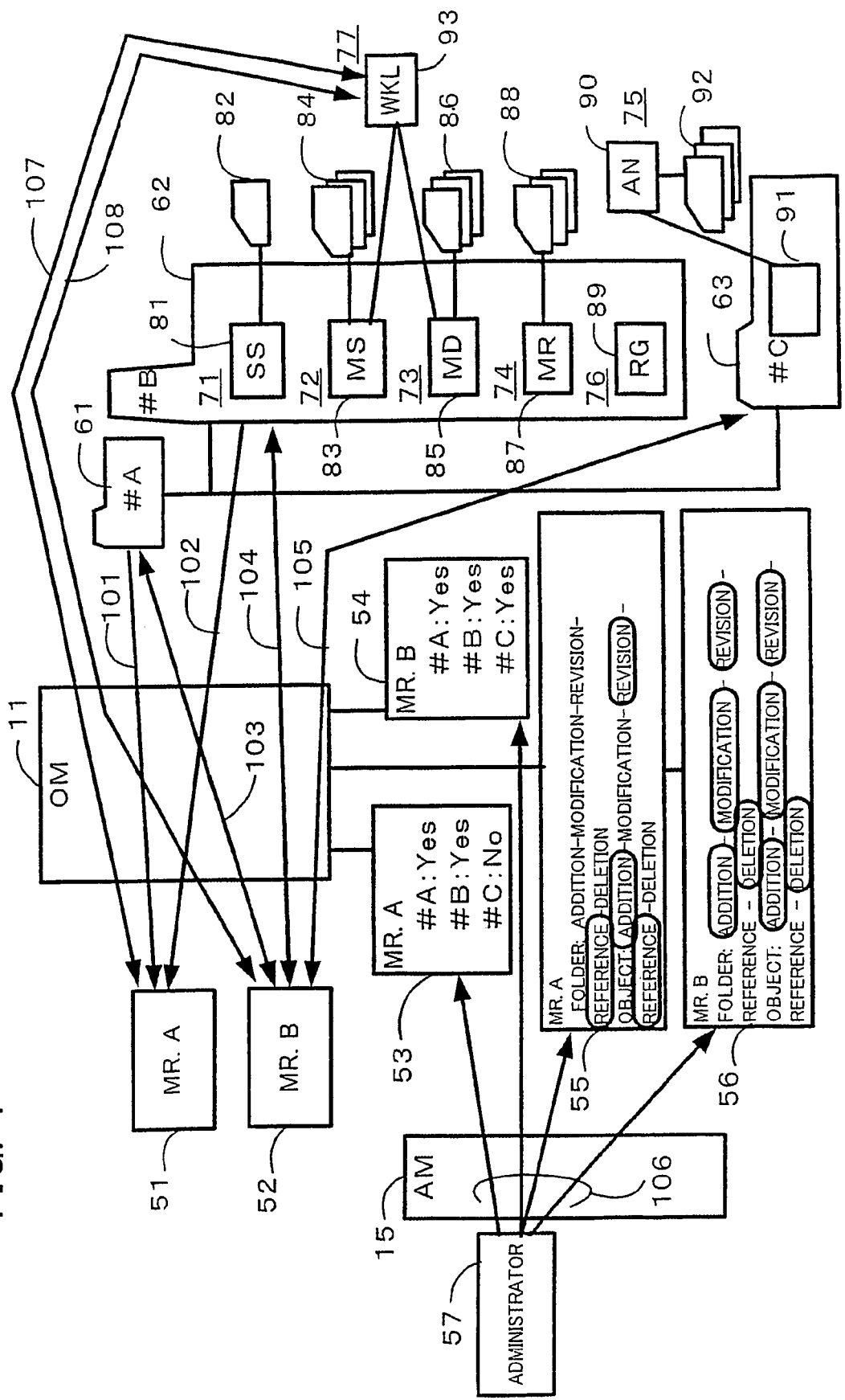
FIG. 4 shows a concrete example of information email flow control based on document utilization authorization data.

FIG. 4 shows one example of information flow control based on document utilization authorization.

As is shown in FIG. 4, a plurality of employees, e.g., "Mr. A" 51 and "Mr. B" 52 and the like, are present in the enterprise in question. As is indicated by the arrows 106, the system administrator 57 of the enterprise can appropriately create document utilization authorization data for each of the employees such as "Mr. A" 51, "Mr. B" 52 and the like (e.g., folder security setting data 53 and 54 relating to limitations on the utilization of folders, function security setting data 55 and 56 relating to types of utilization behavior and the like) using the administration manager (AM) 15, and can register this data in the data base. Furthermore, using the administration manager (AM) 15, the administrator 57 can also perform editing such as modification, correction, addition, deletion or the like of document utilization authorization data as necessary.

In the example shown in the figures, it is defined in the folder security setting data 53 for "Mr. A" which folders can be utilized by "Mr. A" 51 (e.g., "#A" and "#B") and which folders cannot be utilized by "Mr. A" 51 (e.g., "#C") among the folders contained in the data base (e.g., "#A", "#B" and "#C"). Furthermore, it is defined in the folder security setting data 54 for "Mr. B" which folders can be utilized by "Mr. B" 52 (e.g., "#A", "#B" and "#C") and which folders cannot be utilized by "Mr. B" 52 (e.g., none) among the folders contained in the data base (e.g., "#A", "#B" and "#C").

In the example shown in the figures, furthermore, it is defined in the function security setting data 55 for "Mr. A" which types of utilization behavior can be performed by "Mr. A" 51 with respect to the folders (e.g., reference) and which types of utilization behavior cannot be performed (e.g., addition, modification, revision and deletion), as well as which types of utilization behavior can be performed by "Mr. A" 51 with respect to the document objects (for example, documents or sets of documents) (e.g., addition, revision and reference) and which types of utilization behavior cannot be performed (e.g., modification and deletion). Furthermore, it is defined in the function security setting data 56 for "Mr. B" which types of utilization behavior can be performed by "Mr. B" 51 with respect to the folders (e.g., addition, modification, revision, reference and deletion) and which types of utilization behavior cannot be performed (e.g., none), as well as which types of utilization behavior can be performed by "Mr. B" 52 with respect to the document objects (for example, documents or sets of documents) (e.g., addition, modification, revision, reference and deletion) and which types of utilization behavior cannot be performed (e.g., none).

The object manager (OM) 11 can allow various document objects within the data base to be utilized by each of the employees such as "Mr. A" 51, "Mr. B" 52 and the like. In this case, the OM 11 controls the utilization behavior of the respective employees with respect to the document objects in accordance with the document utilization authorization data 53, 54, 55 and 56 for the respective employees that has been registered beforehand by the administrator 57. For example, the OM 11 limits the document folders that can be utilized by the employees on the basis of the folder security setting data for the respective employees. Furthermore, for example, the OM 11 limits the types of utilization behavior of the employees with respect to folders or objects on the basis of the function security setting data for the respective employees.

In the example shown in the figures, the document folders "#A" 61, "#B" 62 and "#C" 63 are present in the data base. As is indicated by the arrows 101 and 102, the OM 11 allows only the utilization of the document folders "#A" and "#B", and prohibits the utilization of the document folder "#C", in the case of "Mr. A" 51 in accordance with the folder security setting data 53 for "Mr. A". On the other hand, as is shown by the arrows 103, 104 an 105, the OM 11 allows the utilization of all of the document folders "#A", "#B" and "#C" in the case of "Mr. B" 52, in accordance with the folder security setting data 54 for "Mr. B".

In this case, the system can be arranged so that (for example) the document folders that can be utilized and the document folders that cannot be utilized by each employee are displayed in different colors or configurations on the screen of the user terminal of each employee, or so that only the folders that can be utilized are displayed. Alternatively, the system can be arranged so that among the document folders that are displayed on the screen of the user terminal of each employee, the document folders that can be utilized by the employee can be opened, while the document folders that cannot be utilized cannot be opened.

Furthermore, in the example shown in the figures, the OM 11 allows "Mr. A" 51 only to make reference to the utilizable document folders "#A" and "#B", and prohibits any additions, modifications, revisions or deletions with respect to these document folders, in accordance with the function security setting data 55 for "Mr. A". Furthermore, the OM 11 allows "Mr. A" 51 to make only additions, revisions or references to the objects within the utilizable document folders "#A" and "#B", and prohibits any modifications or deletions with respect to these document folders, in accordance with the function security setting data 55 for "Mr. A". On the other hand, in accordance with the function security setting data 56 for "Mr. B", the OM 11 allows "Mr. B" 52 to make additions, modifications, revisions, references and deletions with respect to the utilizable document folders "#A", "#B" and "#C", and also allows additions, modifications, revisions and deletions to be made with respect to the objects within these document folders.

Such control relating to the utilization of information within the enterprise by the respective employees is performed throughout the entire enterprise. Instead of such control, or in combination with such control, it would also be possible to control the utilization of information by sections (i.e., by respective groups) using a similar method. As a result of such control of the flow of information being performed on the scale of the enterprise, appropriate documents or information can be selected from the vast quantities of various types of documents or information existing within the firm, and can be supplied for the utilization of appropriate sections or employees.

Furthermore, the OM 11 administers various types of documents within the data base using logical entities of document data called document objects. There are a plurality of types of document objects; different types of document objects are indicated for example as document objects 71 through 76 inside the document folder "#B" 62 in FIG. 4. Specifically, for example, there are document objects of different types such as single sheet (SS) objects 71, multi-sheet (MS) objects 72, multi-document (MD) objects 73, multi-representation (MR) objects 74, annotation (AN) objects 75, registered (RG) objects 76 and the like. Furthermore, the OM 11 can also handle objects called work lists (WKL) 77, which are sets of other pluralities of document objects. In FIG. 4, for convenience of graphic illustration, only one of each type of document object is shown; however, it goes without saying that pluralities of document objects of any of the abovementioned types may be present.

The single-sheet (SS) objects 71 have object definition data 81; this object definition data 81 is associated with a single document file 82 that expresses a single sheet. The multi-sheet (MS) objects 72 have object definition data 83; this object definition data 83 is associated with a single document file or a set 84 of a plurality of document files expressing a plurality of sheets. For example, a document file such as a single independent design drawing is suitable for handling as an SS object 71. On the other hand, for example, a document file comprising a plurality of sheets that are more conveniently managed as a unified entity, such as a plurality of partial drawings obtained by splitting a single large drawing, is suitable for handling as a single MS object. In the case of document files 82 and 84 which are handled as a single sheet (SS) object 71 or multi-sheet (MS) object 72, it is not necessary that the document file 82 or 84 be present in the same folder as the single sheet (SS) object 71 or multi-sheet (MS) object 72 itself; these document files may be present in any location within the virtual knowledge base 20, including the personal computers used by the users.

Multi-document (MD) objects 73 have object definition data 85; this object definition data is associated with a set 86 comprising a plurality of document files with different information. For example, document files with different information more conveniently managed as a unified entity, such as image files, tabular calculation files and DTP files that respectively express a photograph, parts and description of a single product, are suitable for handling as a single MD object. Such a document file 86 that is handled as a multi-document (MD) object 73 need not be present in the same folder as the multi-document (MD) object 73 itself; this document file 86 may be present in any location within the virtual knowledge base 20, including the personal computers used by the users.

Multi-representation (MR) objects 74 have object definition data 87; this object definition data 87 is associated with a set 88 comprising a plurality of document files of different formats. For example, documents of different formats with the same information that can be more conveniently managed as a unified entity, such as CAD files, raster image files and page description language files of the same design drawings, are suitable for handling as a single MR object. Such a document file 88 that is handled as a multi-representation object (MR) 74 need not be present in the same folder as the multi-representation (MR) object 74 itself; this document file 88 may be present in any location within the virtual knowledge base 20, including the personal computers used by the users.

Annotation (AN) objects 75 have object definition data 90; this object definition data 90 accompanies some other document object 91, and is associated with a document file or document file set 92 that expresses the content of the annotation. For example, a sound data file that records a certain meeting is suitable for handling as an AN object that accompanies a document object describing the minutes of this meeting. Such a document file 92 that is handled as an annotation (AN) object 75 need not be present in the same folder as the document object 91 itself that is accompanied by the annotation (AN) object 75; this document file 92 may be present in any location within the virtual knowledge base 20, including the personal computers used by the users.

Registered (RG) objects 76 have only object fixed definition data 89; these are document objects that do not yet have an actual document file associated with this data, but that are formally recorded in the data base for the time being. Subsequently, RG objects 76 can be converted into one of the object types described above by being associated with a certain document file.

Work lists (WKL) 77 have object definition data 93, and this object definition data 93 is associated with one or a plurality (ordinarily a plurality) of other document objects (e.g., the document objects 72 and 73 in the example shown in the figures). For example, a plurality of document objects used to perform a certain work project are suitable for handling as a single work list (WKL). The plurality of document objects 83 and 85 handled as the work list (WKL) 93 need not be present in the same folder; these document objects may be present in any location within the virtual knowledge base 20.

As is shown for example in FIG. 4, all of the document objects 71, 72, 73, 74, 75, 76 and 77 have object definition data 81, 83, 85, 87 89, 90 or 93 including type discriminators that indicate the type of the document object. The OM 11 discriminates the types of the document objects 71, 72, 73, 74, 75, 76 and 77 on the basis of the type discriminators within the object definition data 81, 83, 85, 87, 89, 90 and 93. Furthermore, when the OM 11 displays symbols (e.g., icons) of the document objects 71, 72, 73, 74, 75, 76 and 77 on the screens of the user terminals of the employees, the OM 11 can use symbols with designs that are peculiar to the respective types of these document objects. Furthermore, when the OM 11 displays the contents of objects that combine a plurality of document files or a plurality of document objects as in the case of MS, MD, MR, AN or WKL, the OM 11 can simultaneously or successively display the contents of the plurality of document files or document objects that are associated with these objects.

Figure 5:
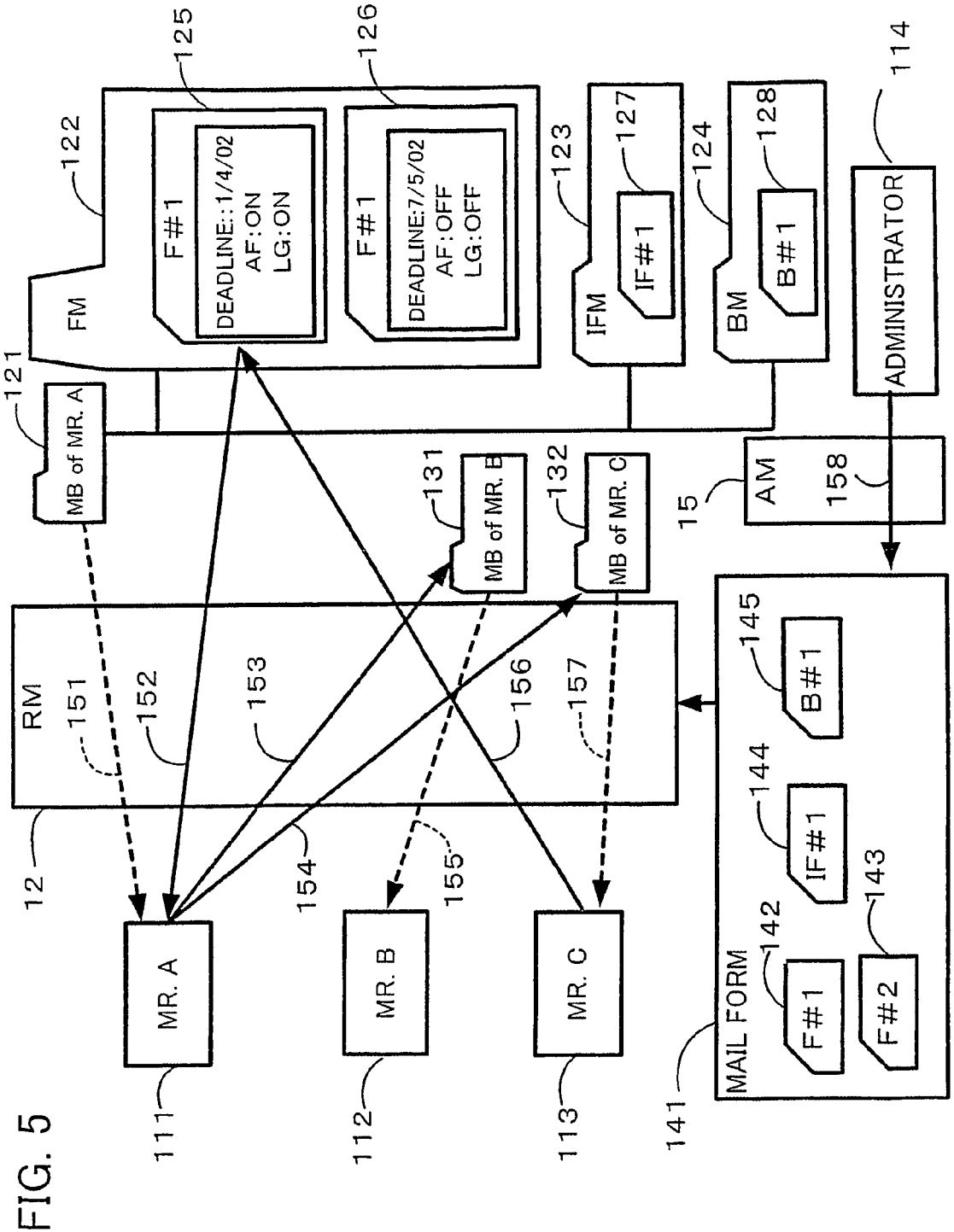
FIG. 5 is a block diagram which shows a concrete example of email flow control.

FIG. 5 shows a concrete example of email flow control.

As is shown in FIG. 5, a plurality of employees such as (for example) "Mr. A" 111, "Mr. B" 112 and "Mr. C" 113 are present in the enterprise. The email messages that are exchanged by these employees include a plurality of different types of email messages. For example, there are three types of mail, i.e., formal mail (FM), informal mail (IFM) and bulletin mail (BM). In the case of FM, various types of communications control settings (e.g., settings relating to reply deadlines, permission for forwarding, communication group limitations and the like) can be set in a detailed manner. In the case of IFM, communications control settings cannot be set as finely as in the case of FM. BM is mail which only transmits information (i.e., mail to which no reply can be made); for example, such mail is used in applications such as the distribution of company reports or the like.

As is indicated by the arrow 158, the system administrator 114 of the enterprise can use the administration manager (AM) 15 to create suitable forms for respective types of email in accordance with the circumstances of the enterprise, and to register these forms in the data base. Here, the term "email forms" refers to the written forms of indexes that are used when sets of information items that are selected from various information items contained in the email beforehand (and that are displayed in the display of email information) are displayed, i.e., when email information is displayed. The types of communications control settings that can be made depend on this form. In the example shown in the figures, two types of forms "F#1" and "F#2" have been created for FM use, one type of form "IF#1" has been created for IFM use, and one type of form "B#1" has been created for BM use. Furthermore, using the administration manager (AM) 15, the administrator 114 can perform editing of mail forms, such as modifications, corrections, deletions and the like, as required.

Mail boxes (MB) 121, 131 and 132 are provided for respective employees such as "Mr. A" 111, "Mr. B" 112, "Mr. C" 113 and the like. Separate mail folders for the abovementioned mail types (i.e., FM, IFM and BM) are provided in association with the mail boxes of the respective persons, as is indicated in the figures by the FM folder 122, IFM folder 123 and BM folder 124 shown in association with the MB 121 of "Mr. A".

The review manager (RM) 12 provides a function that creates email messages of arbitrary types using arbitrary mail forms for the respective employees, and transmits these email messages to arbitrary addresses. Furthermore, the review manager (RM) 12 provides a function that stores email messages that have been addressed and transmitted to the employees in the mail boxes of these employees, and that displays the received mail in these mail boxes to the employees (arrows 151, 155 and 157). In this case, the review manager (RM) 12 distinguishes the types of the received mail, and stores the received mail in the mail folders corresponding to these types. Furthermore, for each employee, the review manager (RM) 12 provides the function of controlling the forwarding of and reply to received mail on the basis of communications control settings assigned to the received mail.

For example, let us assume that "Mr. C" 113 creates formal mail (FM) 125 using the FM form "FM#1" 142, and transmits this mail to "Mr. A" 111, as indicated by the arrow 158 in FIG. 5. In this case, let us assume that in the FM 125, "Mr. C" 113 has set the reply deadline as "Apr. 1, 2002", and has set the forwarding approval (AF) as "ON", and the communication group limitation (LM) as "ON". In this case, when the RM 12 displays the FM 125 to "Mr. A" 111, who is the receiver of the FM 125, the RM 12 displays the reply deadline of "Apr. 1, 2002", and indicates whether or not "Mr. A" 111 has replied to this FM 125. Moreover, in cases where "Mr. A" 111 has not yet replied, the RM 12 monitors whether or not the deadline of "Apr. 1, 2002" has passed, and displays the results of this monitoring using (for example) a colored symbol or the like.

Furthermore, in the case of the abovementioned example, since the setting for forwarding approval (AF) of the FM 125 is "ON", the RM 12 controls the system so that "Mr. A" 111 cannot forward the FM 125 to other addresses (for example, the system is set so that the menu item of "forward" on the display screen of the FM 125 cannot be operated).

Furthermore, in the case of the abovementioned example, since the setting of the communication group limitation (LM) of the FM 125 is "ON", the RM 12 limits the addresses of the reply mail only to "Mr. C" 111, who was the transmitter of the FM 125, and to the address that was the destination of the FM 125, in cases where "Mr. A" 111 attempts to transmit a reply mail for the FM 125. For example, if "Mr. C" 111 transmitted the FM 125 to only two persons, i.e., "Mr. A" 111 and "Mr. B" 112, then the possible addresses for the reply mail to FM 125 is limited to a group of three persons, i.e., "Mr. C" 111, "Mr. A" 111 and "Mr. B" 112 (accordingly, only replies indicated by the arrows 153 and 154 are possible), and reply mails cannot be sent to other addresses.

Meanwhile, in the case of the other FM 126 shown as an example in FIG. 5, since the setting of the forwarding approval (AF) is "OFF", "Mr. A" 111 can forward the FM 126 to other addresses. Furthermore, in the FM 126, since the setting of the communication group limitation (LM) is "OFF", "Mr. A" 111 can send reply mails to the FM 126 to arbitrary addresses.

As a result of the abovementioned email communications control, important confidential email messages can be prevented from being erroneously sent to inappropriate addresses.

Figure 6:
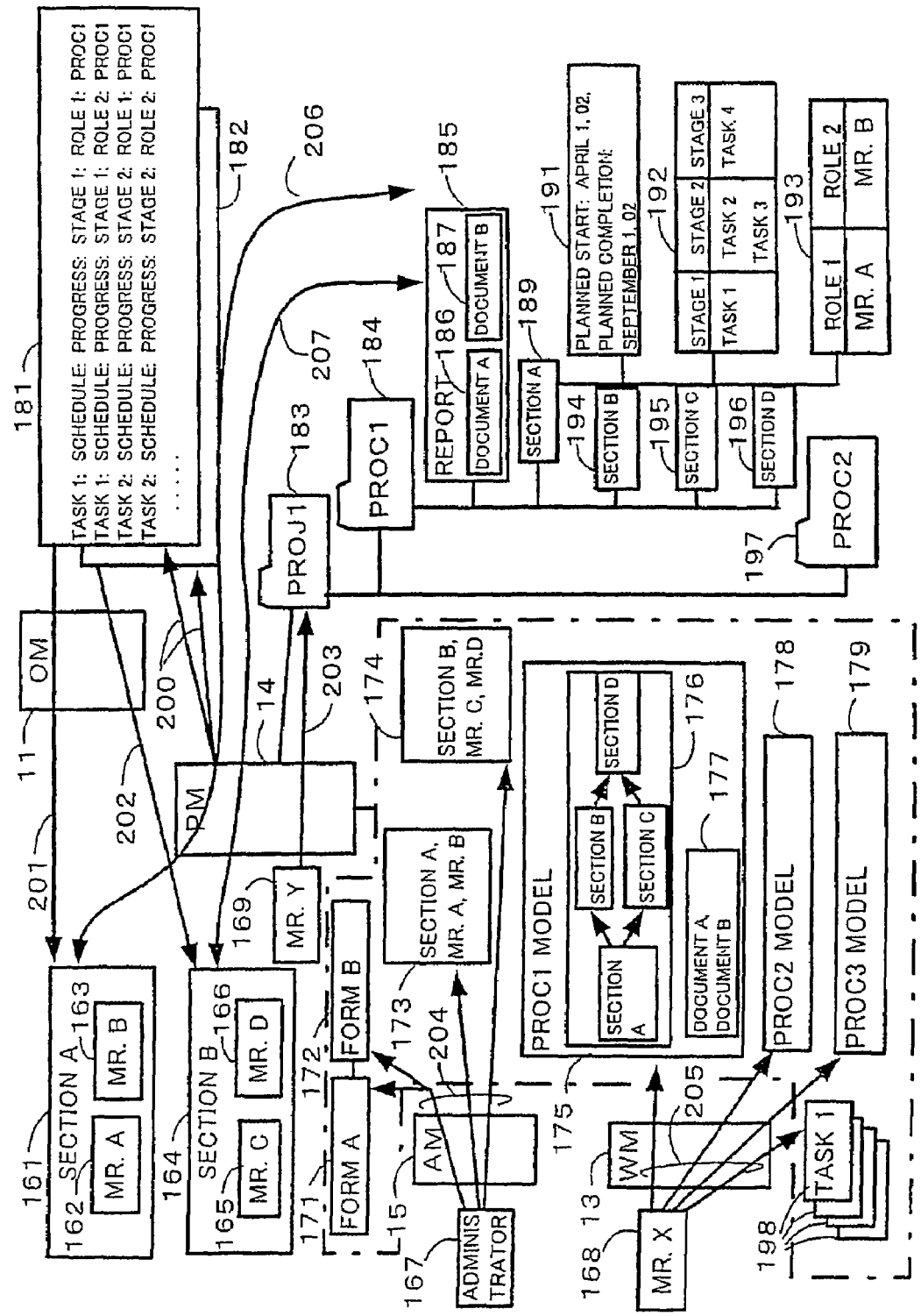
FIG. 6 is a block diagram which shows a concrete example of information flow control based on workflow models and project data.

FIG. 6 shows a concrete example of information flow control based on workflow model data and project data.

As is shown in FIG. 6, there are a plurality of sections such as "Section A" 161, "Section B" 164, "Section C" and "Section D" in the enterprise in question. For example, a plurality of employees such as "Mr. A" 162, "Mr. B" 163 and the like belong to "Section A" 161; furthermore, for example, a plurality of employees such as "Mr. C" 165, "Mr. D" 166 and the like belong to "Section B" 164. In addition, there are also employees such as the system administrator 167, a "Mr. X" 168 who has the authority to create workflows, and a "Mr. Y" 169 who has the authority to create projects.

Using the administration manager (AM) 15, the system administrator 167 can register information for sections and employees present in the enterprise, forms of various types of documents used in this enterprise and the like in the data base as indicated by the arrows 204. Here, the term "forms of documents" refers to the written forms of indexes that are used when sets of information items that are selected from various information items contained in document objects beforehand (and that are displayed in the display of document objects) are displayed, i.e., when the information of document objects is displayed. In the example shown in the figures, information relating to "Section A" 161 and "Mr. A" 162 and "Mr. B" 161 who belong to this section is registered as "Section A" employee data 173; furthermore, information relating to "Section B" 164 and "Mr. C" 165 and "Mr. D" 166 who belong to this section is registered as "Section B" employee data 174. Furthermore, the forms 171 and 172 of various types of documents such as "form A", "form B" and the like are also registered. Using the AM 15, the system administrator 167 can perform (as required) editing such as modifications, corrections, deletions or the like with respect to arbitrary section and employee information, the forms of various types of documents and the like that have been registered.

Using the workflow manager (WM) 13, "Mr. X" 168, who has the authority to create workflows, can create workflow models for various arbitrary business processes, and can register these workflow models in the data base, as indicated by the arrows 205. In the example shown in the figures, workflow models 175, 178 and 179 for a plurality of business processes such as "PROC1", "PROC2", "PROC3" and the like are registered. Here, as is indicated for example with respect to the workflow model 175 for "PROC1", a flow of work or documents between sections in the business process, as created by "Mr. X" 168 (hereafter referred to as the "process information flow") 176, and a designation of the documents used in reports between sections, as designated by "Mr. X" 168 (hereafter referred to as the "report document designation") 177, are included in the workflow model for each business process. For example, in the "PROC1" workflow model 175, the process information flow 176 defines a flow of work or documents which starts with "Section A", is then transferred to "Section B" and "Section C", and finally converges and ends in "Section D", is defined. Furthermore, the report document designation 177 of the "PROC1" workflow model defines the fact that two types of documents, i.e., "documents A" and "documents B", are used in the reports among the sections. If necessary, "Mr. X" 168 can use the WM 13 to perform editing such as modifications, corrections, deletions and the like with respect to the workflow models of the registered arbitrary business processes.

Furthermore, using the workflow manager (WM) 13, "Mr. X" 168 can create various arbitrary tasks (tasks are more detailed work entities that are constituent elements of business processes) 198, and can register these tasks 198 in the data base, as indicate by the arrows 205. Furthermore, although this is not shown in the figures, "Mr. X" 168 can also create various sub-tasks (sub-tasks are even more detailed work entities that are constituent elements of tasks) under the respective tasks registered beforehand, and can register these sub-tasks in the data base. Other even more detailed sub-tasks can also be created under the respective tasks, and can be registered in the data base. Thus, the data of respective tasks can be created as tree-form hierarchical structures of the data of various sub-tasks, and can be registered in the data base. If necessary, "Mr. X" 168 can use the WM 13 to perform editing such as modifications, corrections, deletions and the like with respect to the registered arbitrary tasks or sub-tasks. The creation, registration and editing of arbitrary tasks and sub-tasks can also be accomplished using the project manager (PM) 14 instead of the WM 13.

Using the project manager (PM) 14, "Mr. Y" 169, who has the authorization to create projects, can create data of various arbitrary projects, and can register these projects in the data base, as shown by the arrow 203. In the example shown in the figures, the project data 183 of a single project called "PROJ1" is registered. Here, as is shown for example with respect to the project data 183 for "PROJ1", one or a plurality of business process designations 184 and 197 constituting the projects designated by "Mr. Y" 169 are included in the project data of the respective projects. For example, designations 184 an 197 for the two business processes "PROC1" and "PRPC2" are included in the project data 183 for "PROJ1".

On the basis of the business process designations 184 and 197 from "Mr. Y" 169, the PM 14 associates the work flow models 175 and 178 of the designated business processes "PROC1" and "PROC2" with the project data 183 of this project "PROJ1". Furthermore, utilizing the abovementioned association, the PM 14 automatically prepares report document forms 105 and section data 189, 194, 195 and 196 for each of the designated business processes "PROC1" and "PROC2" with the project data for this project "PROJ1". For example, in the case of the business process "PROC1", a report document form 185 which includes the "document A" form 186 (a copy of the "document A" form 171) and the "document B" form 187 (a copy of the "document B" form 172), and section data 189, 194, 195 and 196 for the four sections "Section A", "Section B", "Section C" and "Section D" that are involved in the business process "PROC1", are automatically prepared by the PM 14 on the basis of workflow model 175 for "PROC1".

Furthermore, when the project "PROJ1" is created, "Mr. Y" 169 can set the work schedules 191 for the sections, the assignment 192 of tasks for each stage of the work to the sections (arbitrary tasks can be selected from the various tasks 198 registered by the WM 13, and can be assigned to the sections), and the assignment 193 of roles to the employees within the sections, as the concrete contents of each set of section data 189, 194, 195 and 196 relating to the respective business processes within the project data 183. In the example shown in the figures, for example, the planned starting date of "Apr. 1, 2002" and the planned completion data of "Sep. 1, 2002" are set in the work schedule 191 as the concrete content of the section data 189 of "Section A" for the business process "PROC1". Furthermore, in the task assignments 192, for example, "task 1" (e.g., analysis of demand) is assigned to "stage 1" (e. g., the initial stage within the overall work period), "task 2" (e.g., overall design) and "task 3" (e.g., part design) are assigned to "stage 2" (e.g., the intermediate stage within the overall work period), and "task 4" (e.g., prototype testing) is assigned to "stage 3" (e.g., the final stage within the overall work period). Moreover, in the role assignments 193, for example, "Mr. A" is assigned to "role 1" (e.g., analyst), and "Mr. B" is assigned to "role 2" (e.g., system engineer). When "Mr. Y" 169 sets the role assignments 193, the PM 14 automatically displays a list of the employees belonging to the respective sections on the basis of the employee registration data 173 and 174; accordingly, the setting work of "Mr. Y" 169 is facilitated. If necessary, "Mr. Y" 169 can use the PM 14 to perform editing such as modifications, corrections, deletions and the like with respect to the registered project data 183.

On the basis of the registered project data 183, the PM 14 creates task lists 181 and 182 which list various jobs that are to be processed for each of the sections 161 and 164, as indicated by the arrows 200. For example, as is shown in the figures, task lists for all of the sections involved in the registered project, such as a task list 181 for "Section A", a task list 182 for "Section B" and the like, are created. For example, various jobs that have been assigned to "Section A" 161 on the basis of the registered project data 183 are listed in the task list 181 for "Section A". For instance, the first line expresses the job that is to be performed by the employee of "role 1" in "task 1", the second line expresses the job that is to be performed by the employee of "role 2" in "task 1", the third line expresses the job that is to be performed by the employee of "role 1" in "task 2", and the fourth line expresses the job that is to be performed by the employee of "role 2" in "task 2". Although this is omitted from the figures, jobs relating to other tasks such as "task 3", "task 4" and the like are also similarly listed in this list 181. Schedules (planned starting data and planned completion date), progress (whether or not the actual starting date or completion date is behind schedule or the like), names of stages, names of business processes and the like are also displayed in the task lists 181 and 182.

The PM 14 can list all of the jobs assigned to the sections in the task lists 181 and 182 for the respective sections; instead, however, it would also be possible to arrange the system so that jobs that have not yet been started by the sections are not listed (in accordance with the progress of the business processes). For example, in the case of the business process "PROC1" of the project "PROJ1", the work of "Section B" is performed after the work of "Section A", as defined in the workflow model 175 for "PROC1". Accordingly, the job in "Section B" cannot be started until the job in "Section A" is completed. As will be described later, the PM 14 monitors the progress of the respective jobs in the respective sections, and records which jobs have been started or completed. For example, the system can be arranged so that the OM 11 does not show the jobs in "Section B" that follow the jobs in "Section A" in the task list 182 for "Section B" while these jobs in "Section A" have not yet been completed, and shows these following jobs in the task list 182 for "Section B" at the point in time at which the jobs in "Section A" have been completed, on the basis of the job progress monitoring results obtained by this PM 14.

The OM 11 can provide the task lists for the respective sections crated by the PM 14 as described above to the employees of these sections. For example, as is shown by the arrow 201, the OM 11 can display the task list 181 for "Section A" on the screens of the user terminals of the employees 162 and 163 of "Section A" 161; furthermore, as is shown by the arrow 202, the OM 11 can display the task list 182 for "Section B" on the screens of the user terminals of the employees 165 and 166 of "Section B" 164.

Each employee can select the jobs that are to be performed by this employee himself from the task list that is displayed on the screen of his own user terminal. When a given employee selects a given job from the task list, the PM 14 judges that the performance of this job has been begun by this employee, and sets the date at this time as the actual starting date of the job. Furthermore, using the PM 14, each employee can open the report form 185 regarding the job selected by the employee himself (i.e., the job performed by the employee himself), and can create a work report for employees responsible for following jobs by entering arbitrary comments into this report form 185. When the creation by this employee of a work report relating to this job is completed, the PM 14 judges that the job has been completed, and stores the work report that has been created by this employee (i.e., the report form 165 in which the comments of the employee have been inserted). As was already described above, the OM 11 shows the jobs that follow the complete job in the task lists for the other sections to which these following jobs have been assigned. When a given employee selected such as following job from such a task list for another section, the PM 14 judges that this following job has been started. Furthermore, using the PM 14, the employee who has selected this following job can open the report form 185 in which comments of preceding employees concerning this job have already been entered, and can read these comments of preceding employees, or can create a report to employees responsible for further following jobs by additionally entering his optical waveguides comments. For example, when "Mr. A" 162 an "Mr. B" 163 of "Section A" 161 have completed their own respective jobs, these employees open the report form 185, and enter their own respective comments as indicated by the arrow 206. Subsequently, when "Mr. C" 165 and "Mr. D" 166 of "Section B" 164 perform following jobs, these employees open the report form 185, read the comments of "Mr. A" 162 and "Mr. B" 163, and then enter their own comments, as indicated by the arrow 207. Thus, the report form 185 containing comments from persons in "Section A" 161 and "Section B" 164 constitutes a report to persons in "Section D" who are responsible for further following jobs.

In the information flow control described above, section-to-section workflow models are utilized; however, information flow control among shift groups or among employees can also be accomplished by using workflow models among shift groups in shift work, workflow models among individual employees or the like.

As a result of information flow control based on such workflow models or project data, the association of a plurality of sections or employees performing work by a cooperative effort is facilitated.

Below, typical functions and operations of the solution software suite 4 will be concretely described with reference to various GUI windows (shown as examples in FIG. 7 and subsequent figures) that are provided to the user terminals 9 by the solution server 3 (solution software suite 4) via the web server 8. In all of the GUI windows shown as examples below, underlines character sequences have embedded links to objects or items that correspond to these character sequences, and the system is devised so that when a user operates (e.g., clicks on) these character sequences, the user can view the corresponding objects or items that are thus linked.

FIGS. 7 through 23 show examples of various GUI windows that are provided by the workflow manager (WM) 13. The functions and operations of the WM 13 will be described below with reference to these GUI windows.

Figure 7:
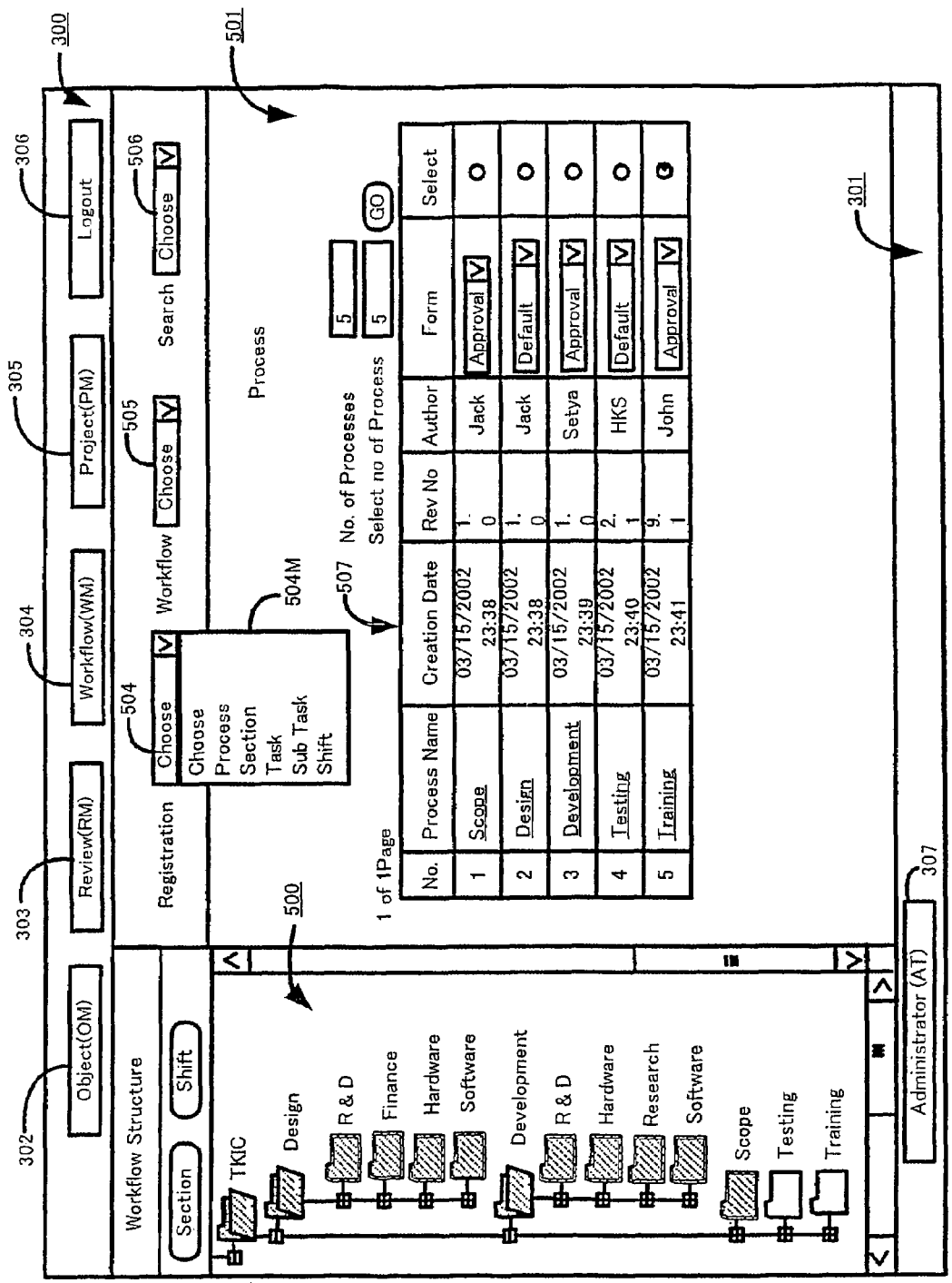
FIG. 7 is a diagram which shows an example of the GUI window provided by the workflow manager.

When a user opens the WM 13, a GUI window such as that shown in FIG. 7 (for example) is displayed on the display screen of the user terminal.

The GUI window shown in FIG. 7 is constructed from a plurality of sub-windows 300, 301, 500 and 501. An object button 302, review button 303, workflow button 304, project button 305 and administrator button 307 are provided in the upper and lower sub-windows 300 and 301. The user can selectively open the abovementioned five types of managers 11 through 15 that are contained in the solution software suite 4 by pressing the respective buttons (e.g., by clicking on the buttons with a mouse). Furthermore, the user can log out from the solution server 3 (solution software suite 4) by pressing the logout button 306 in the upper sub-window 300. The upper and lower sub-windows 300 and 301 are displayed in common when any of the managers 11 through 15 is opened.

The two central sub-windows 500 and 501 provide specific GUI to the WM 13.

The sub-window 500 on the left side in the center is called a workflow structure window. Here, tree-form hierarchical logical structures (workflow structures) of workflow models for various business processes that are currently registered in the data base are graphically displayed using folder icons that express various data items of work models. Specifically, the workflow models of various business processes created by the user are managed in the data base by means of the WM 13 using logical hierarchical data structures such as those shown in the workflow structure window 500.

In the example shown in FIG. 7, a folder named "TKIC" is displayed inside the workflow structure window 500. This folder "TKIC" expresses a specified business category that has the name of "TKIC" (e.g., an individual organization such as an enterprise group, individual enterprise, working section within an enterprise, factory, supporting firm or the like, or a category such as year of work, scope of work, object of work or the like; these categories can be freely set in accordance with the convenience of the enterprise by a specified person authorized to make such settings, such as a system administrator or the like). When this folder "TKIC" is opened, process folders that respectively express business processes with the names of "design", "development", "scope", "testing" and "training" are displayed beneath the folder. This means that business processes called "design", "development", "scope", "testing" and "training" are registered under the business category called "TKIC" (e.g., an enterprise with the name of "TKIC").

When the process folders expressing respective business processes are opened, section folders respectively expressing one or a plurality of sections responsible for the business processes in question are displayed beneath the process folders. For example, section folders respectively expressing the sections "R & D", "Finance", "Hardware" and "Software", which are responsible for the business process "design", are displayed beneath the process folder for the business process "design".

Figure 8:
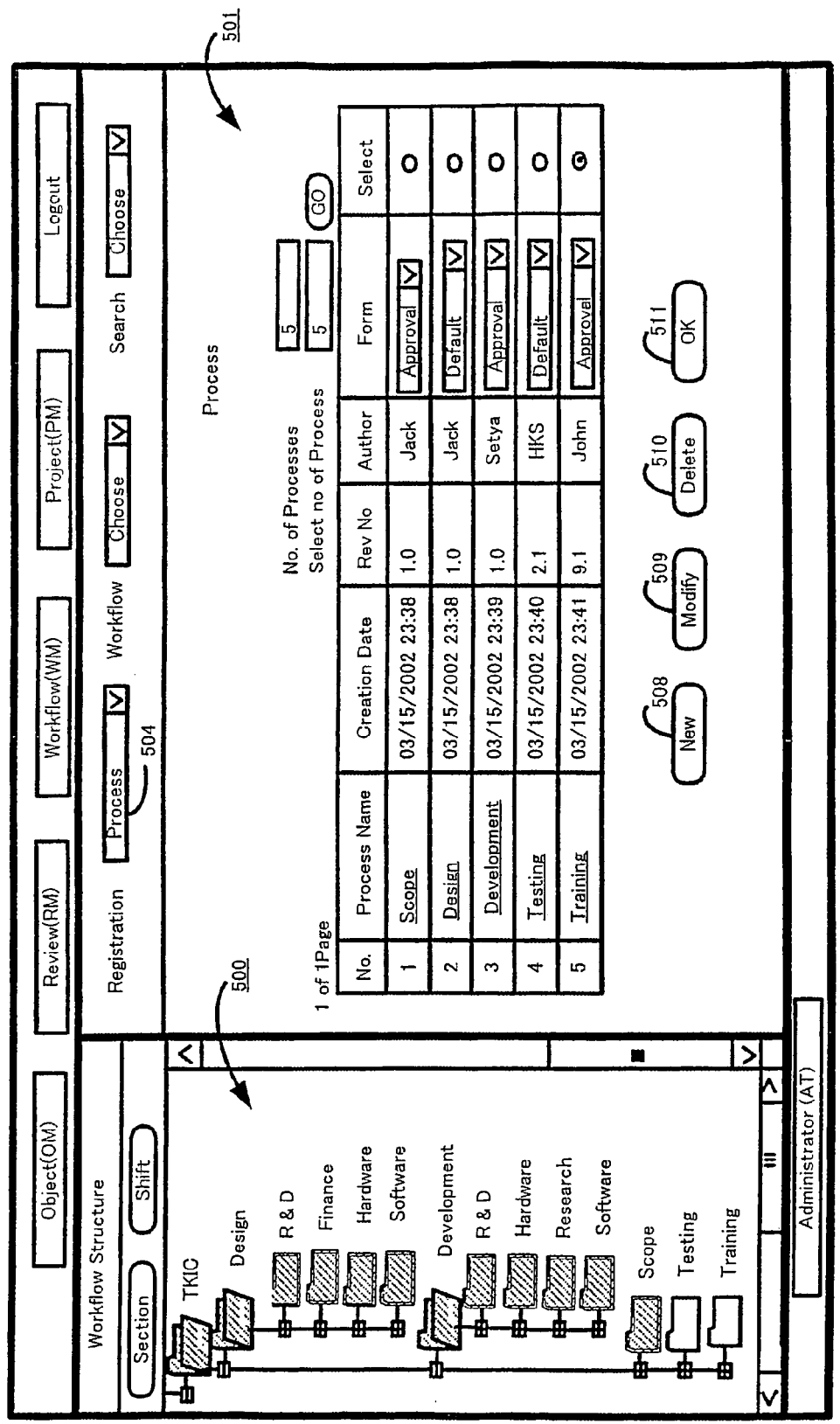
FIG. 8 is a diagram which shows an example of the GUI window provided by the workflow manager.

Furthermore, as is shown for example in FIG. 8, when the section folders for the respective sections are opened, employee folders respectively expressing one or a plurality of employees belonging to these sections (or employees who belong to the sections and have the authorization to handle the business processes in question) are displayed. For example, employee folders respective expressing the employees "Jack", "Fred", "Hemant" and "Yukio" who belong to the section "R & D" (or who belong to the section "R & D" and have the authorization to handle the business process "design") are displayed beneath the section folder for the section "R & D", which is located beneath the process folder for the business process "design".

Figure 9:
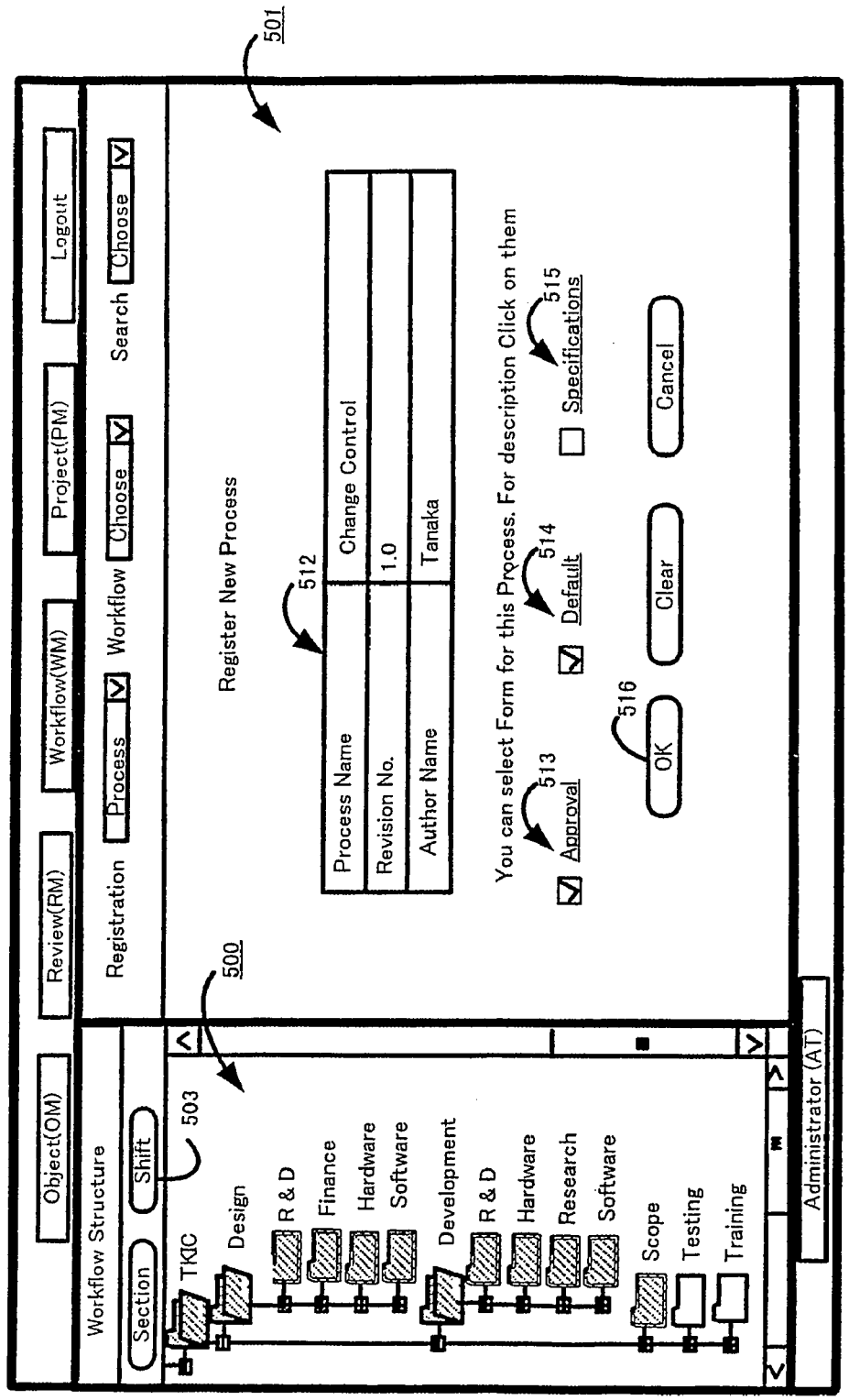
FIG. 9 is a diagram which shows an example of the GUI window provided by the workflow manager.

Referring again to FIG. 7, a section button 502 and a shift button 503 are provided in the workflow structure window 500. When the section button 502 is pressed, only section-wise business processes are selected or displayed with emphasis inside the workflow structure window 500, and when the shift button 503 is pressed, only shift-wise business processes are selected or displayed with emphasis inside the workflow structure window 500. The example shown in FIG. 7 illustrates a case in which the section button 502 has been pressed; here, only the section-wise business processes, e.g., "design", "development" and "scope", are displayed with emphasis. On the other hand, the example shown in FIG. 9 illustrates a case in which the shift button 503 has been pressed; here, only the shift-wise business processes, e.g., "testing" and "training", are displayed with emphasis. Here, the term "section-wise business process" refers to a business process that is performed by one section or by the cooperation of a plurality of sections, while the term "shift-wise business process" refers to a business process that is performed by the alternation of a plurality of shifts. As will be described later, the WM 13 provides different workflow model creation tools to the user terminal when the workflow model of a section-wise business process is created or edited, and when the workflow model of a shift-wise business process is created or edited.

Furthermore, when the WM 13 registers a created or edited business process workflow model in the data base, the WM 13 can register this workflow model in the data base after associating information that indicates the type of the business process (section-wise or shift-wise) with the workflow model. Furthermore, the WM 13 can distinguish the types of these business processes from the abovementioned information that is associated with the workflow models of the various business processes in the data base.

Furthermore, in the environment settings performed by the system administrator using the administration manager (AM) 15, an arbitrary setting can be made as to which of the types of business processes (among section-wise and shift-wise business processes) is made impossible to create. In cases where only one type of business process (among section-wise and shift-wise business processes) is set as impossible to create in these environment settings, the WM 13 can disable the creation function for the type of business process that is set as impossible to create, and disables the abovementioned function that alters the processing such as the display and creation of workflow models and the like in accordance with the type of business process.

Referring to FIG. 7, the sub-window 501 on the right side in the center is called the workflow manager (WM) main window; a process list 507 which lists all of the business processes that are registered under a selected business category (e.g., "TKIC") is displayed in this main window. Information for items such as the name of the process (process name), date and time of creation (creation date), revision No.

(rev. No.), author (author), one or more business forms that will be used (form), select (select) button and the like is displayed for each business process in this business process list 507. When the process names of the respective business processes in the process list 507 are opened (e.g., double-clicked on with the mouse), the WM 13 displays the details of the workflow model of the business process in question in the main window 501.

Furthermore, a registration combo box 504, a workflow combo box 505 and a search combo box 506 are provided in the upper part of the WM main window 501. The registration combo box 504 is used to select the type of item for which registration is desired in cases where the user desires to register various types of items relating to business processes. As is shown in FIG. 7, menu items for various item types such as process, section, task, sub-task, shift and the like are provided in a pull-down menu 504M. The workflow combo box 505 is used to select the type of workflow model that the user desires to create or edit in cases where the user desires to create or edit a business process workflow model; a concrete description of this combo box 505 will be given later. The search combo box 506 is used to select the type of item for which a search is to be made in cases where the user searches for items relating to business processes.

In cases where the user desired to register a new business process, or desires to alter or delete a registered business process, the user can open the pull-down menu 504M of the registration combo box 504, and can select the "process" menu item from the pull-down menu 504M, as shown in FIG. 7. When this is done, as shown in FIG. 8, the WM 13 displays a new button 508, alter button 509, delete button 510, OK button 511 and the like beneath the process list 507 inside the main window 501. The new button 508 is used to register new business processes. The alter button 509 and delete button 510 are respectively used to alter and delete one registered business process (the business process "training" in the example shown in FIG. 8) that is selected by the select button within the process list 507.

Figure 10:
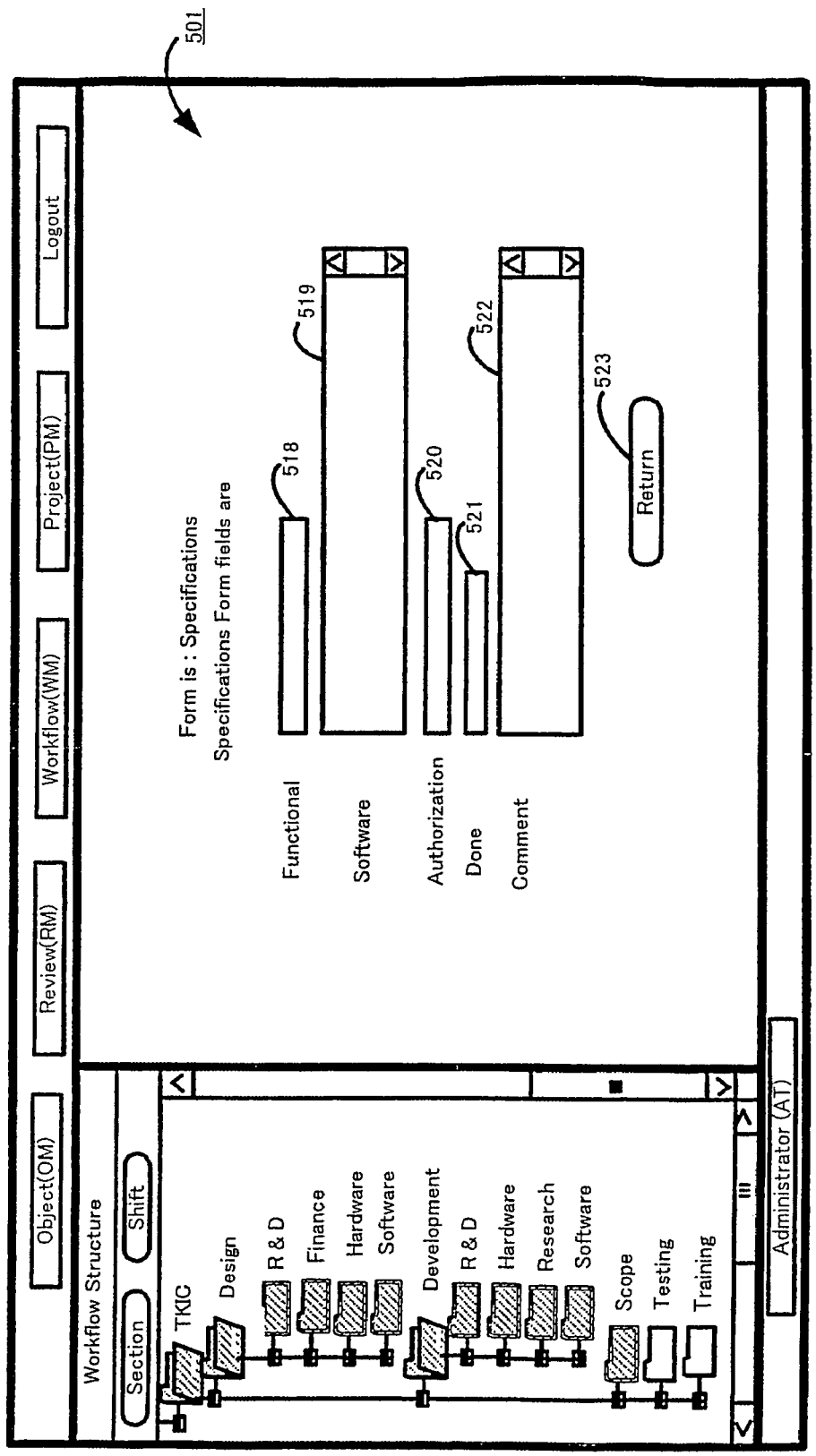
FIG. 10 is a diagram which shows an example of the GUI window provided by the workflow manager.

In the main window 501 shown in FIG. 8, when the user presses the new button 508, the WM 13 displays new process registration tools in the main window 501 as shown in FIG. 9. These new process registration tools include a process basic information table 512, form selection tools 513 and 514, and an OK button 516. The user can enter the process name, revision No. and author name of the new business process in the process basic information table 512. The form selection tools 513 and 514 include display and selection boxes for various types of forms that have been registered beforehand by the system administrator using the administration manager 15; this allows the user to select one or more forms used in this business process from the forms that have been registered beforehand. In the example shown in FIG. 9, two types of forms, i.e., "approval" and "default", have been selected as the forms used in the new business process "change control" from the three types of forms "approval", "default" and "specifications" that have been registered beforehand. When the respective form names of the form selection tools 513 and 514 are operated (e.g., double-clicked), the WM 13 displays the forms in the main window 501 as shown in FIG. 10. The example shown in FIG. 10 shows the form "specifications"; this form includes various entry boxes 518 through 522 that have been set beforehand by the system administrator using the administration manager 15. When the return button displayed beneath the form in the main window 501 shown in FIG. 10 is pressed, the display of the main window 501 returns to the new process registration tools shown in FIG. 9.

In the new process registration tools in the main window 501 shown in FIG. 9, specified items are entered in the process basic information table 512, and the forms that are to be used are selected using the form selection tools 513 and 514. Then, when the OK button 516 is pressed, the WM 13 registers the process name, revision No., author, types of forms used and the like (relating to the new business process set by the new process registration tools) in the data base as a part of the hierarchical data structure (already described) of the workflow model of this new business process. Then, the WM 13 again displays the process list 507 in the main window 501 as shown in FIG. 11; in this case, however, a display of the new business process just registered, e.g., "change control", is added.

Figure 11:
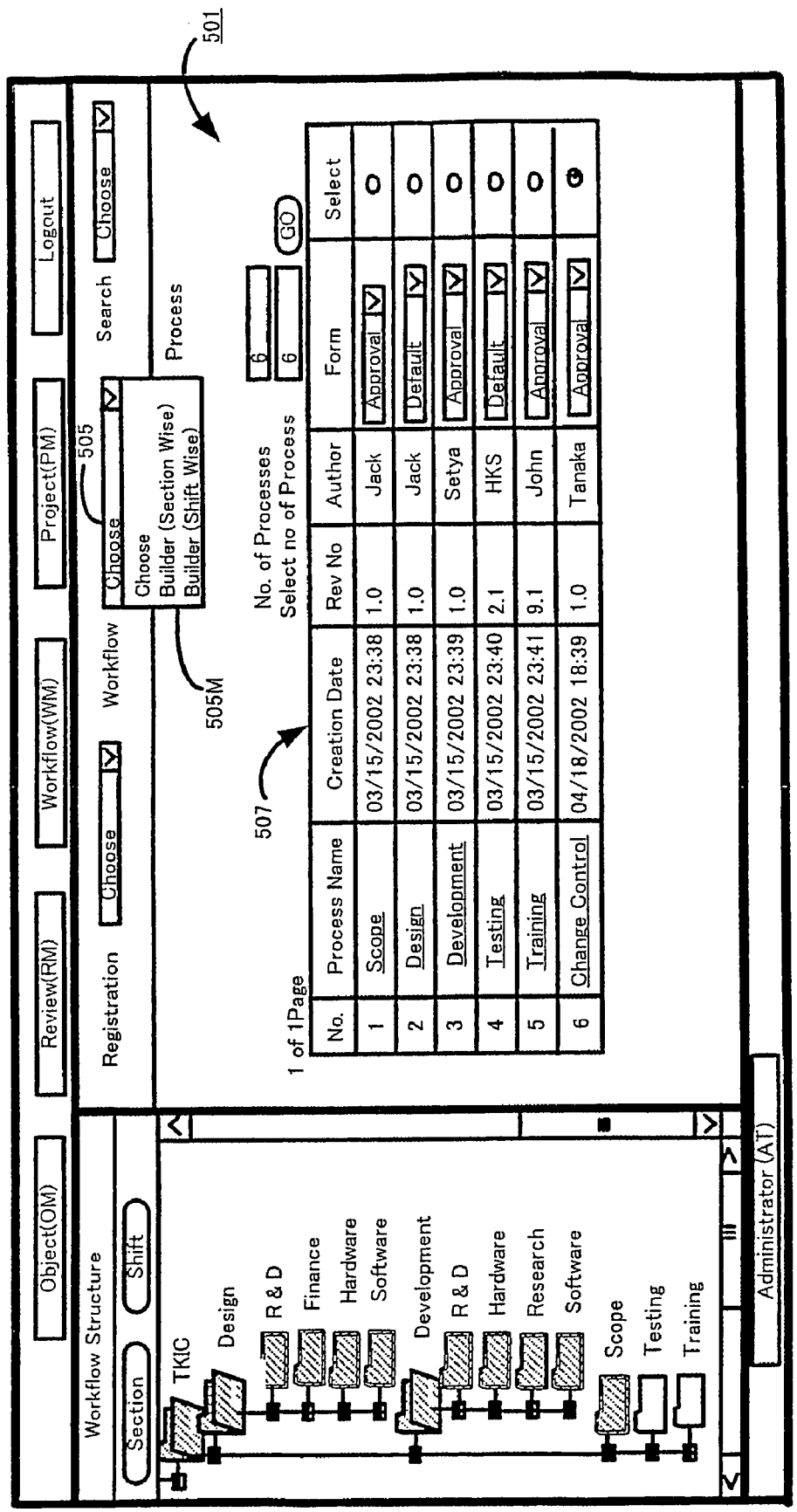
FIG. 11 is a diagram which shows an example of the GUI window provided by the workflow manager.

In cases where the user desires to create or edit an arbitrary business process workflow, the user can open the pull-down menu 505M of the workflow combo box 505, and select the section-wise workflow builder (builder (section-wise)) or shift-wise workflow builder (builder (shift-wise)) from this pull-down menu 505M, as shown in FIG. 11.

Figure 12:
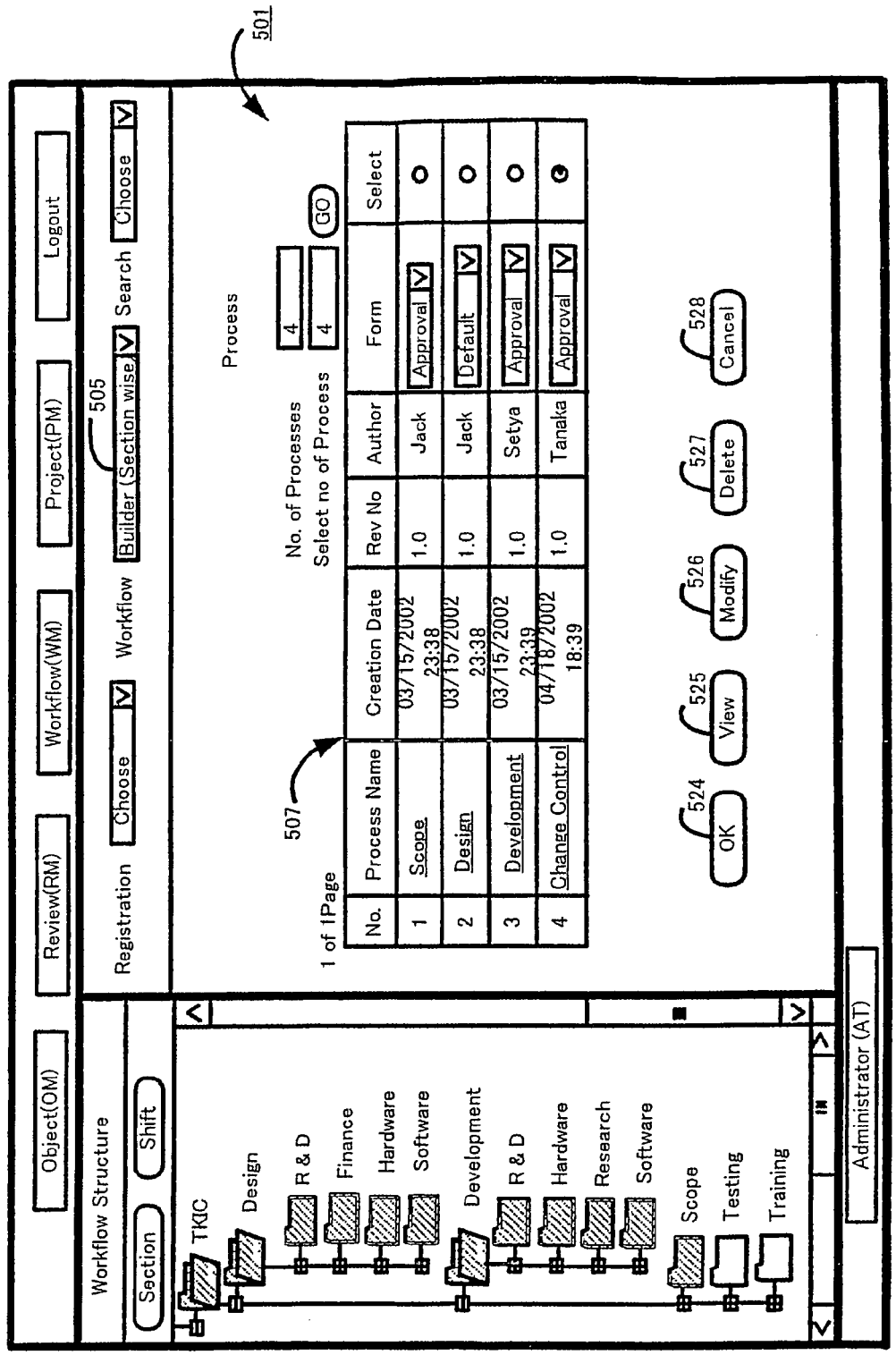
FIG. 12 is a diagram which shows an example of the GUI window provided by the workflow manager.

In cases where the user wishes to create or edit a section-wise business process workflow model, the user can select the section-wise workflow builder (builder (section-wise)). When this is done, the WM 13 selects and displays only section-wise business processes in the process list 507, and displays an OK button 524, view button 525, alter button 526, delete button 527, cancel button 528 and the like beneath this process list 507, as shown in FIG. 12. On the other hand, if the user selects the shift-wise workflow builder (builder (shift-wise)), the WM 1 selects and displays only shift-wise business processes in the process list 507, and displays similar buttons 524 through 528 beneath this process list 507, as will be described later with reference to FIG. 17. Here, it has not yet been determined whether the type of the new business process just registered (e.g., "change control") is section-wise or shift-wise; however, this is displayed in the process list 507 regardless of whether the section-wise or shift-wise workflow builder has been selected.

In cases where section-wise workflow builder (builder (section-wise)) is selected as shown in FIG. 12, if the user desires to create a new workflow model for a certain business process, the user can select this business process from the process list 107, and can then press the OK button 524. Furthermore, in cases where the user desires to alter a workflow model that has already been created for a certain existing business process, the user can select this business process from the process list 507, and can then press the alter button 526.

Figure 13:
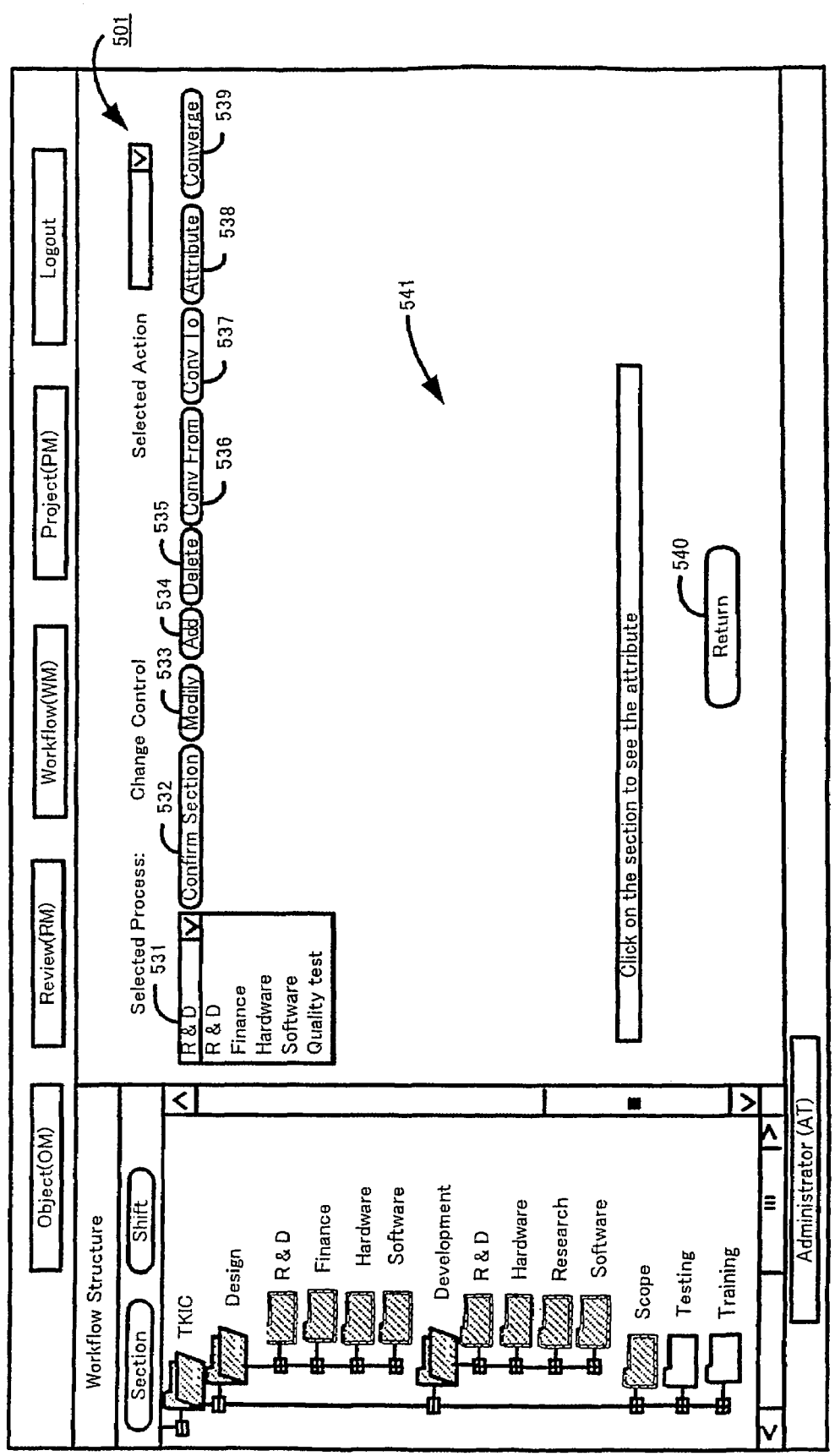
FIG. 13 is a diagram which shows an example of the GUI window provided by the workflow manager.
Figure 14:
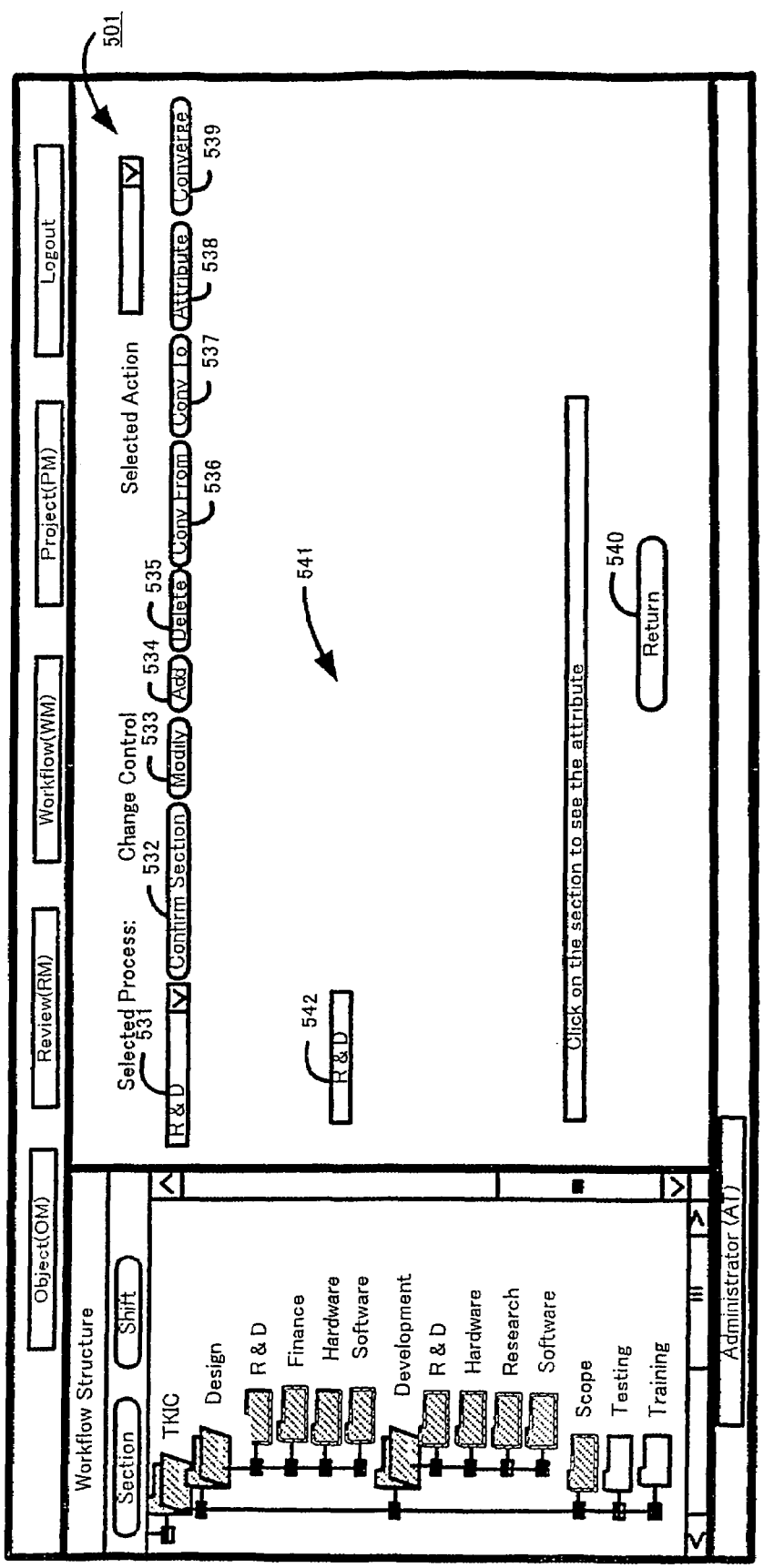
FIG. 14 is a diagram which shows an example of the GUI window provided by the workflow manager.

Here, for example, let us assume that the user has selected the business process "change control" from the process list 507, and has pressed the OK button 524. When this is done, the WM 13 displays the tools used to create and edit a section-wise workflow model for the selected business process "change control" in the main window 501 as shown in FIG. 13. The displayed workflow model creation tools include a section combo box 521, a confirm section button 532, a alter button 533, an add button 534, a delete button 535, a cony from button 536, a cony to button 537, an attribute button 538, a converge button 539, a return button 540, a workflow display area 541 and the like. One example of the procedure used to create a workflow using these tools will be described below.

As is shown in FIG. 13, the user can select the section that is to be the starting point of this business process "change control", e.g., "R & D", using the section combo box 521, and can the press the add button 534 and press the confirm section button 532. When this is done, the WM 13 displays the icon 542 of the selected section "R & D" in the workflow display area 541, and causes the section "R & D" to be confirmed as the starting point of this business process "change control", as shown in FIG. 1.

Figure 15:
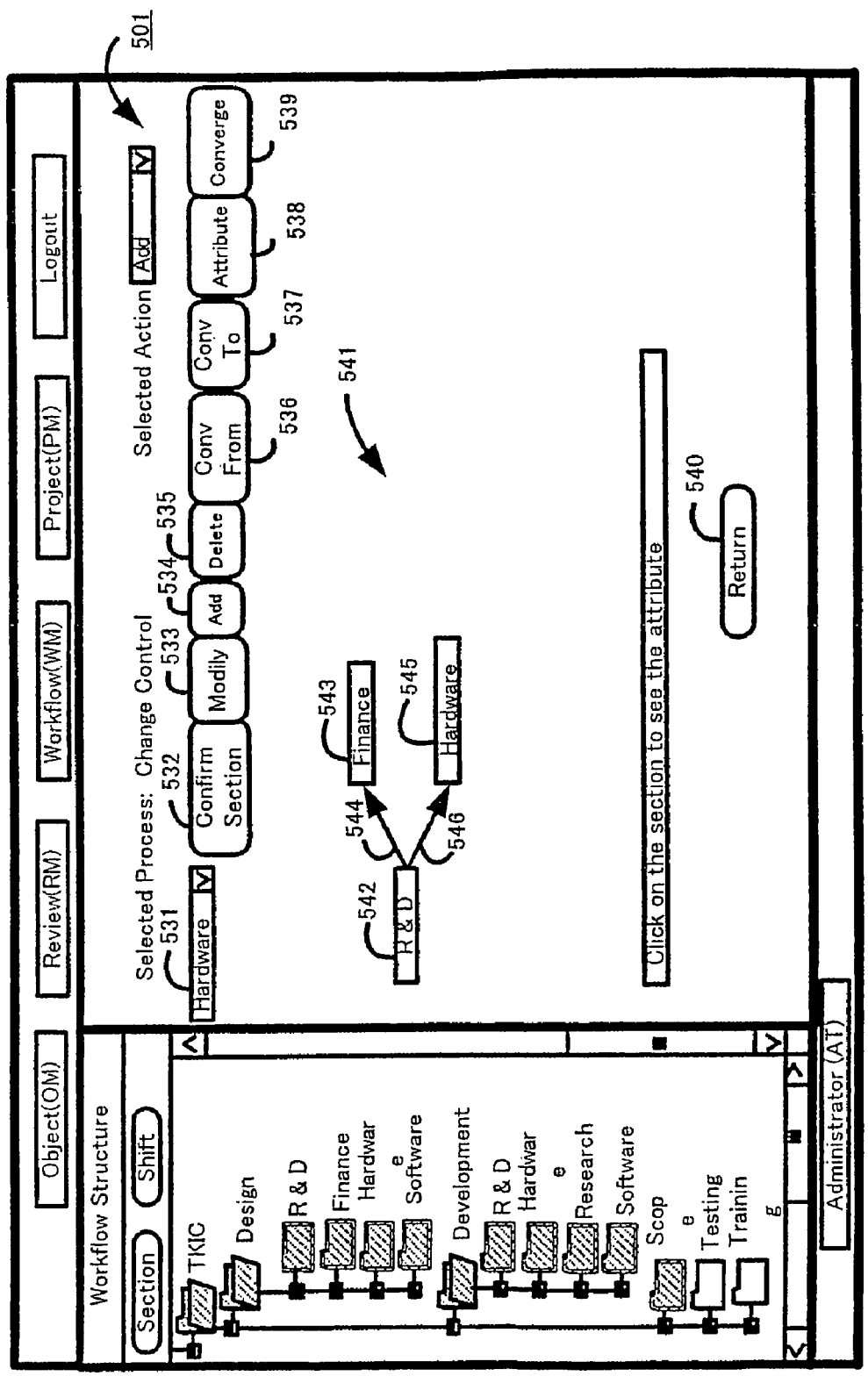
FIG. 15 is a diagram which shows an example of the GUI window provided by the workflow manager.

Subsequently, as is shown in FIG. 15, the user can select the section that is to take over the work from the starting point section "R & D", e.g. "finance", using the section combo box 521, and can then press the add button 534 and press the confirm section button 532. When this is done, the WM 13 displays the icon 543 of the "finance" section in the workflow display area 541, and displays an arrow 544 that points toward the icon 543 of the "finance" section from the icon 542 of the "R & D" section, thus confirming that the "finance" section is the section that is to take over the work from the "R & D" section. Furthermore, if there is another separate section that is to take over the work from the "R & D" section, e.g., "hardware", the user can perform an operation similar to that described above for the "hardware" section as well. When this is done, the WM 13 displays the icon 545 of the "hardware" section in the workflow display area 541 in the same manner as that described above for this "hardware" section as well, and displays an arrow that points toward to the icon 545 of the "hardware" section from the icon 542 of the "R & D" section, thus confirming the "hardware" section as another section that is to take over the work from the "R & D" section.

Figure 16:
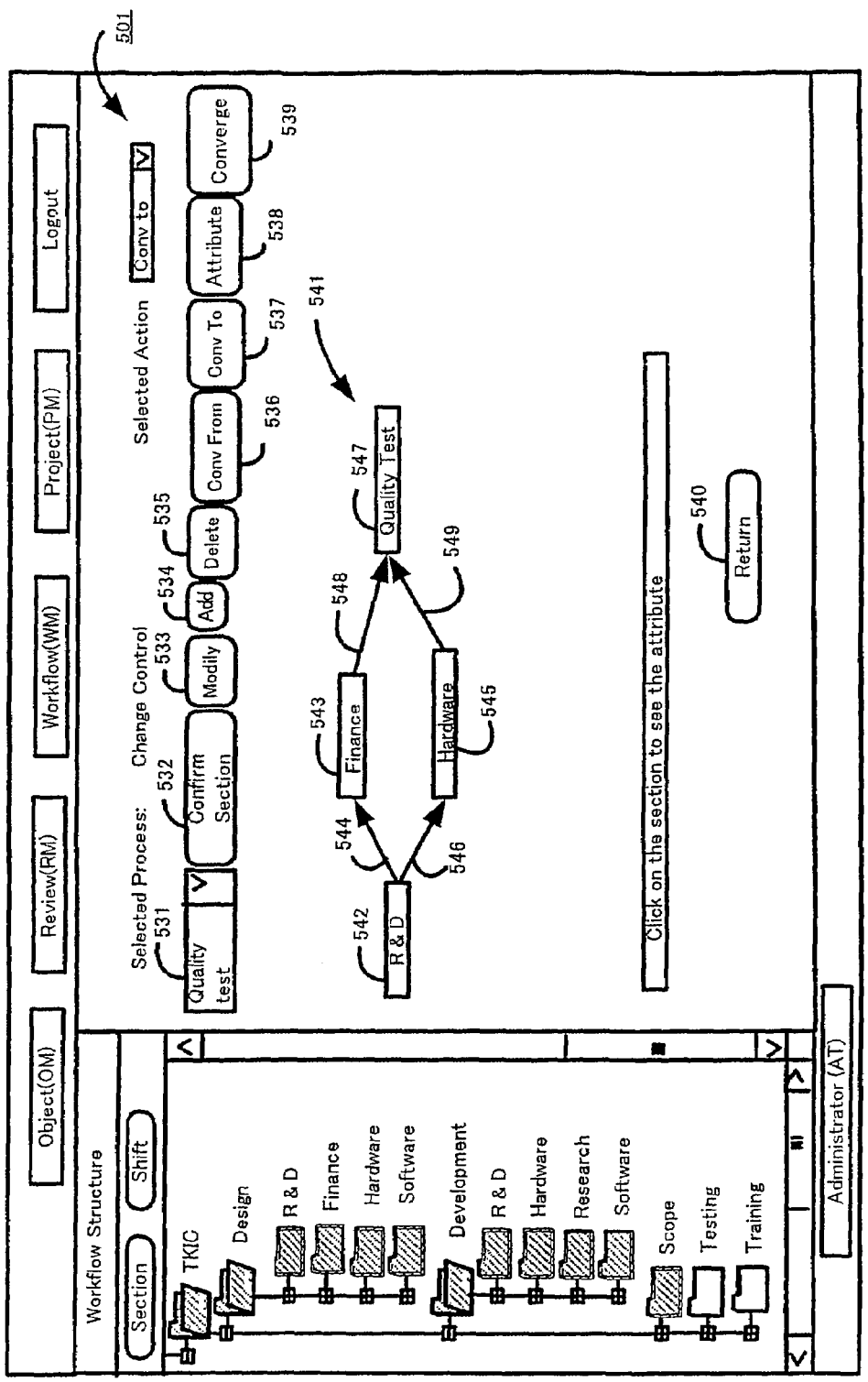
FIG. 16 is a diagram which shows an example of the GUI window provided by the workflow manager.

Subsequently, as is shown in FIG. 16, the user can select a section that is to take over the work from both the "finance" and "hardware" sections, e.g., "quality test", using the section combo box 521, and can then press the add button 534 and press the confirm section button 532. When this is done, the WM 13 displays the icon 547 of the selected "quality test" section in the workflow display area 541 as shown in FIG. 16. Furthermore, the user can press the cony from button 536 after respectively clicking on the icons 543 and 545 of the "finance" and "hardware" sections, and can further press the cony to button 537 after clicking on the icon 547 of the "quality test" section. When this is done, the WM 13 displays arrows 548 and 549 that respectively point toward the icon 547 of the "quality test" section from the icons 543 and 545 of the "finance" and "hardware" sections, thus confirming the "quality test" section as the section that is to take over the work from both the "finance" and "hardware" sections, as shown in FIG. 16.

In this way, a section-wise workflow model is created, and this model is graphically displayed in the form of a flow chart in the workflow display area 541. For example, in the flow chart of the workflow model displayed in the workflow display area 541 in FIG. 16, the section icons 542, 543, 545 and 547 express the sections that are to perform this business process "change control", and the arrow 544, 546, 548 and 549 express the flow of work and documents among these sections.

In FIG. 16, when the user presses the return button 540, the WM 13 confirms the workflow model of this business process "change control" as a model according to the flow chart shown in FIG. 16, and registers this workflow model in the data base; furthermore (although this is not shown in the figures), the WM 13 adds the folder icon of this "change control" business process to the workflow structure window 500. When this "change control" business process is actually performed within a certain project, the project manager (PM) 14 controls the order in which tasks are performed among the sections using the order of sections according to the flow chart shown in FIG. 16, as has already been described with reference to FIG. 6.

Figure 17:
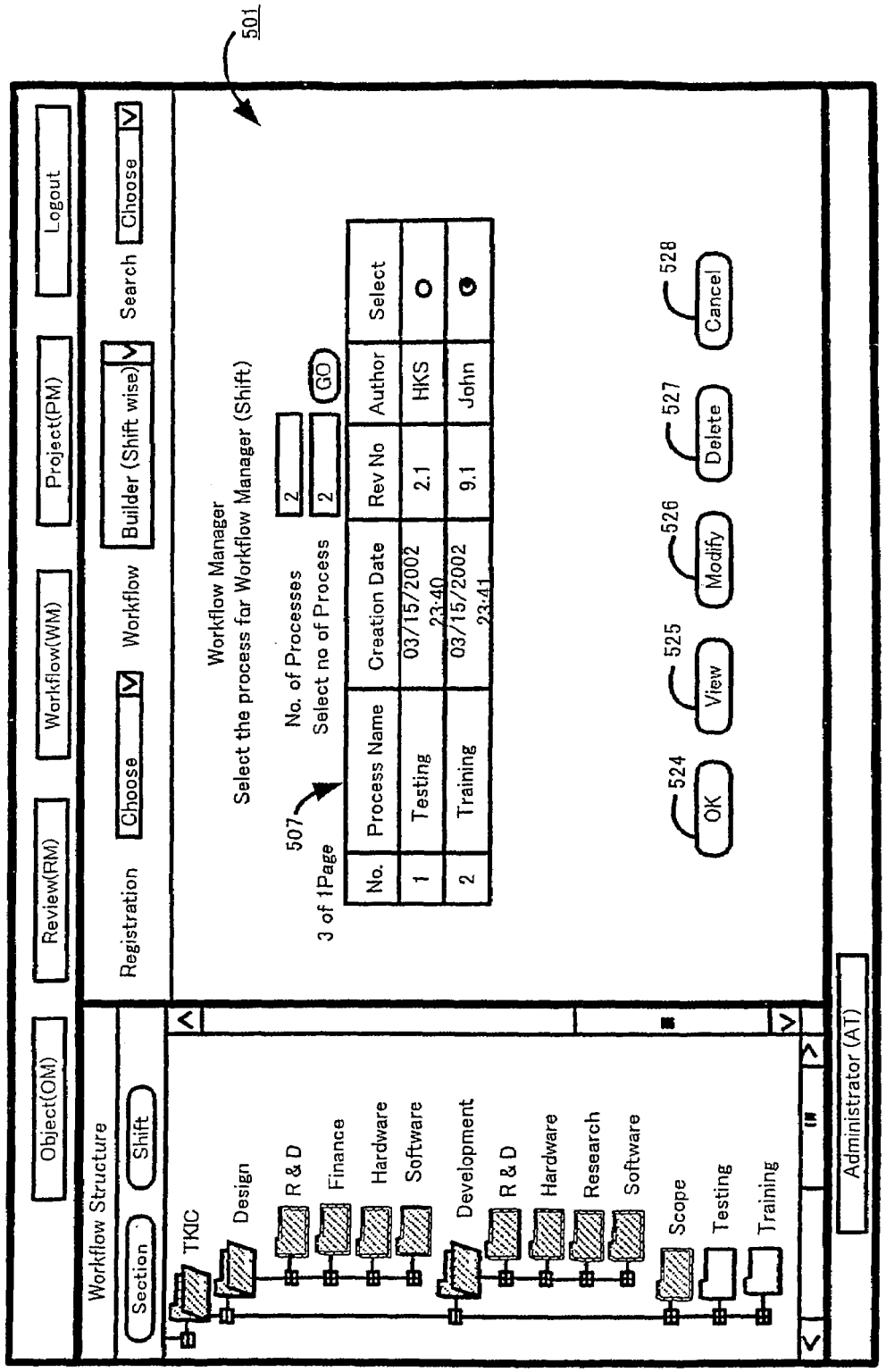
FIG. 17 is a diagram which shows an example of the GUI window provided by the workflow manager.
Figure 18:
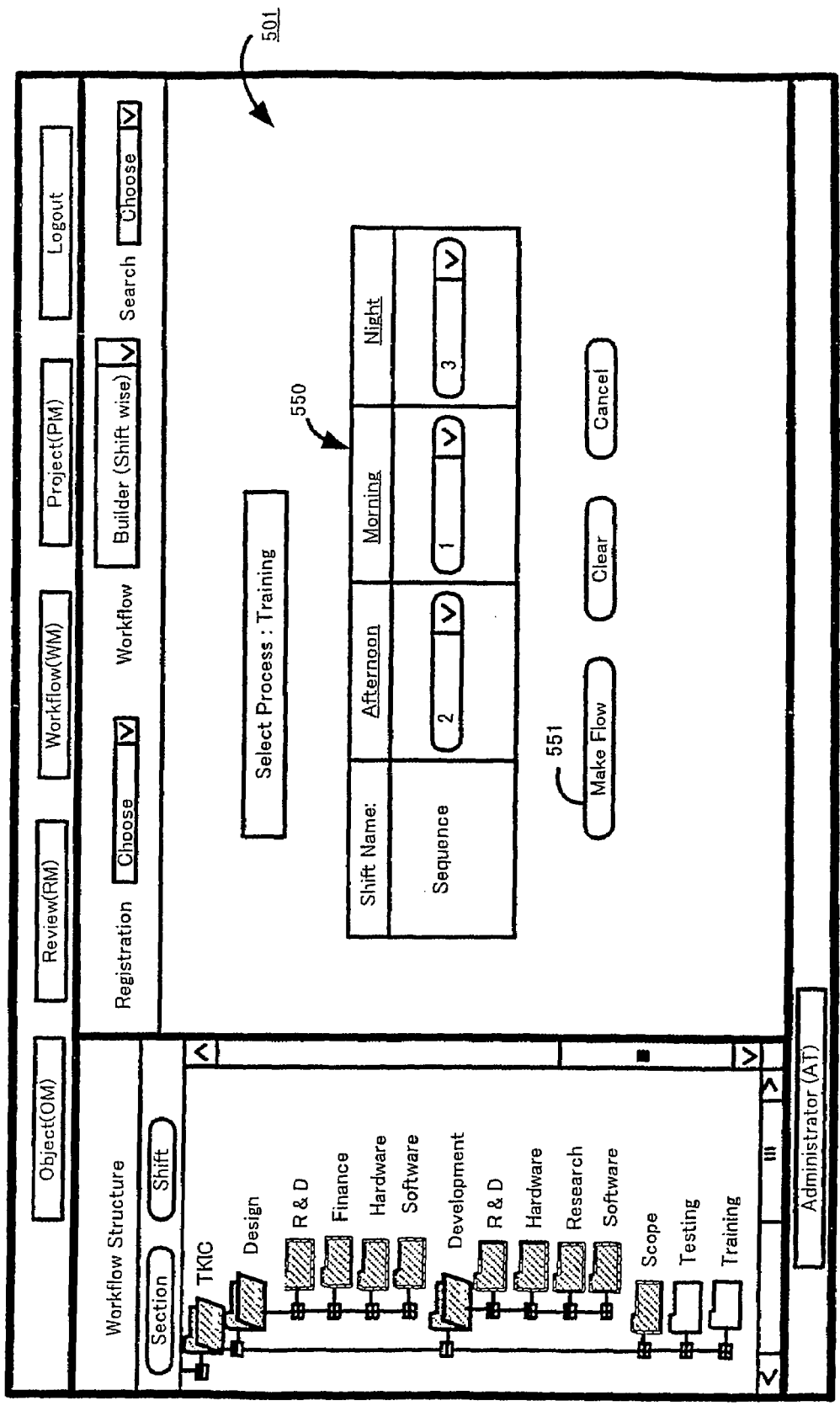
FIG. 18 is a diagram which shows an example of the GUI window provided by the workflow manager.

Referring again to FIG. 11, in cases where the user desires to create or edit a shift-wise business process workflow model, the user can select the shift-wise workflow builder (builder (shift-wise)) in the workflow combo box 505. When this is done, the WM 13 selects and displays only shift-wise business processes in the process list 507, and displays an OK button 524, view button 525, alter button 526, delete button 527, cancel button 528 and the like beneath the process list 527, as shown in FIG. 17. In cases where the user desires to create a new workflow model for a certain business process, the user can press the OK button 524 after selecting this business process from the process list 507. Furthermore, in cases where the user desires to alter a workflow model that has already been created for a certain business process, the user can press the alter button 526 after selecting this business process from the process list 507.

Here, let us assume for example that the user has selected the "training" business process from the process list 507, and has pressed the alter button 526. When this is done, as shown in FIG. 8, the WM 13 displays the tools that are used to alter and edit a shift-wise workflow model for the selected business process "training" in the main window 501. A shift sequence table 550, a make flow button 551 and the like are included in the displayed workflow model creation tools. A workflow that has already been created for the "training" business process is displayed in the shift sequence table 550. This workflow defines the sequence in which a plurality of pre-registered shifts, e.g., "afternoon", "morning" and "night", are to be alternated.

Using the shift sequence table 550, the user can freely alter the sequence of the "afternoon", "morning" and "night" shifts. Furthermore, when the user operates (e.g., double-clicks on) the arbitrary shift names "afternoon", "morning" and "night" in the shift sequence table 550, the WM 13 displays lists of the employees belonging to these shifts in the main window 501 (although this is not shown in the figures).

Figure 19:
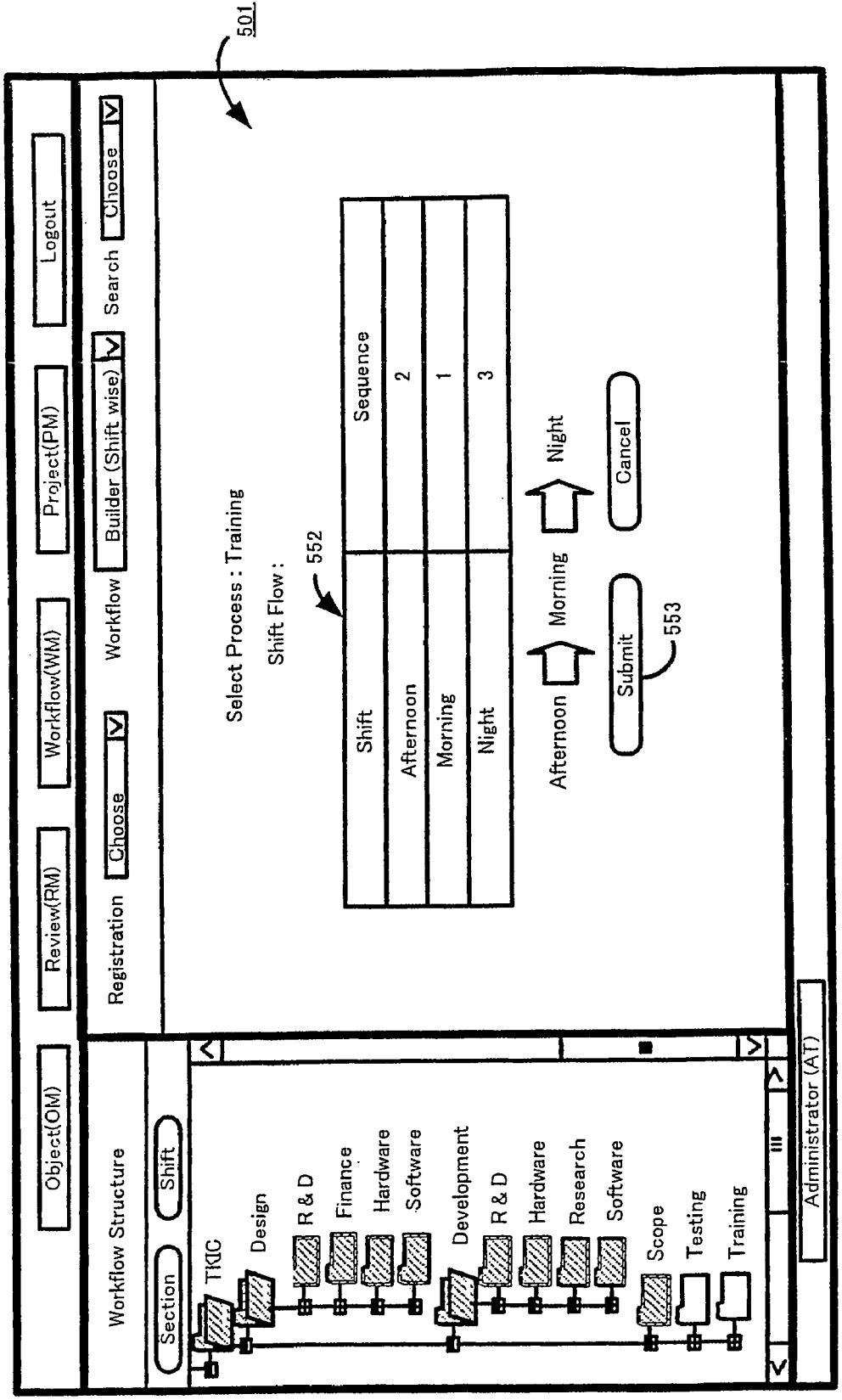
FIG. 19 is a diagram which shows an example of the GUI window provided by the workflow manager.

After altering the workflow in the shift sequence table 550, the user can press the make flow button 551. When this is done, the WM 13 displays a shift flow table 552 which expresses the workflow following modification in the main window 501 as shown in FIG. 19. When the user presses the submit button 553, the WM 13 confirms the workflow model of the "training" business process as the model shown in the shift flow table 552, and registers this workflow model in the data base.

Figure 20:
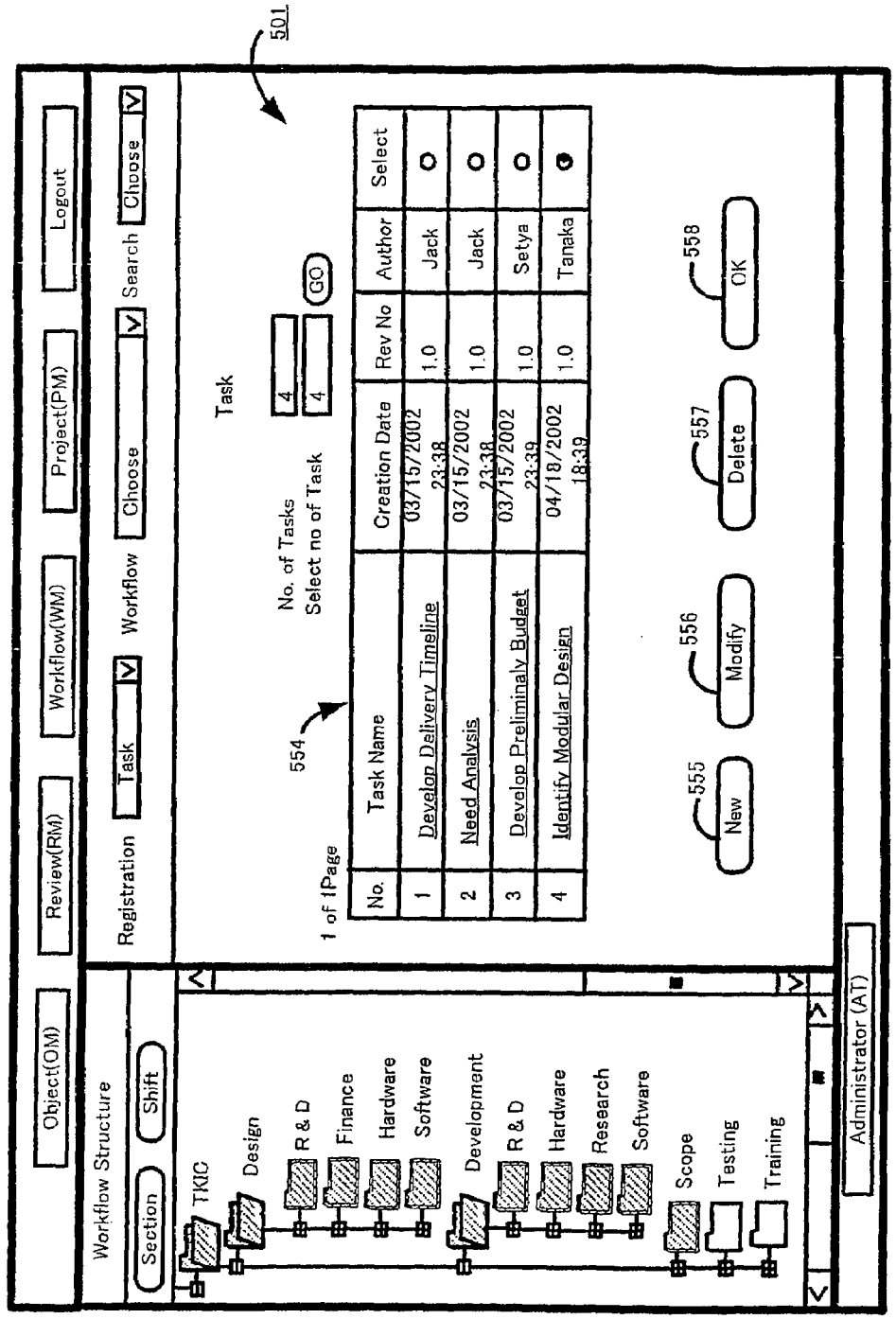
FIG. 20 is a diagram which shows an example of the GUI window provided by the workflow manager.
Figure 21:
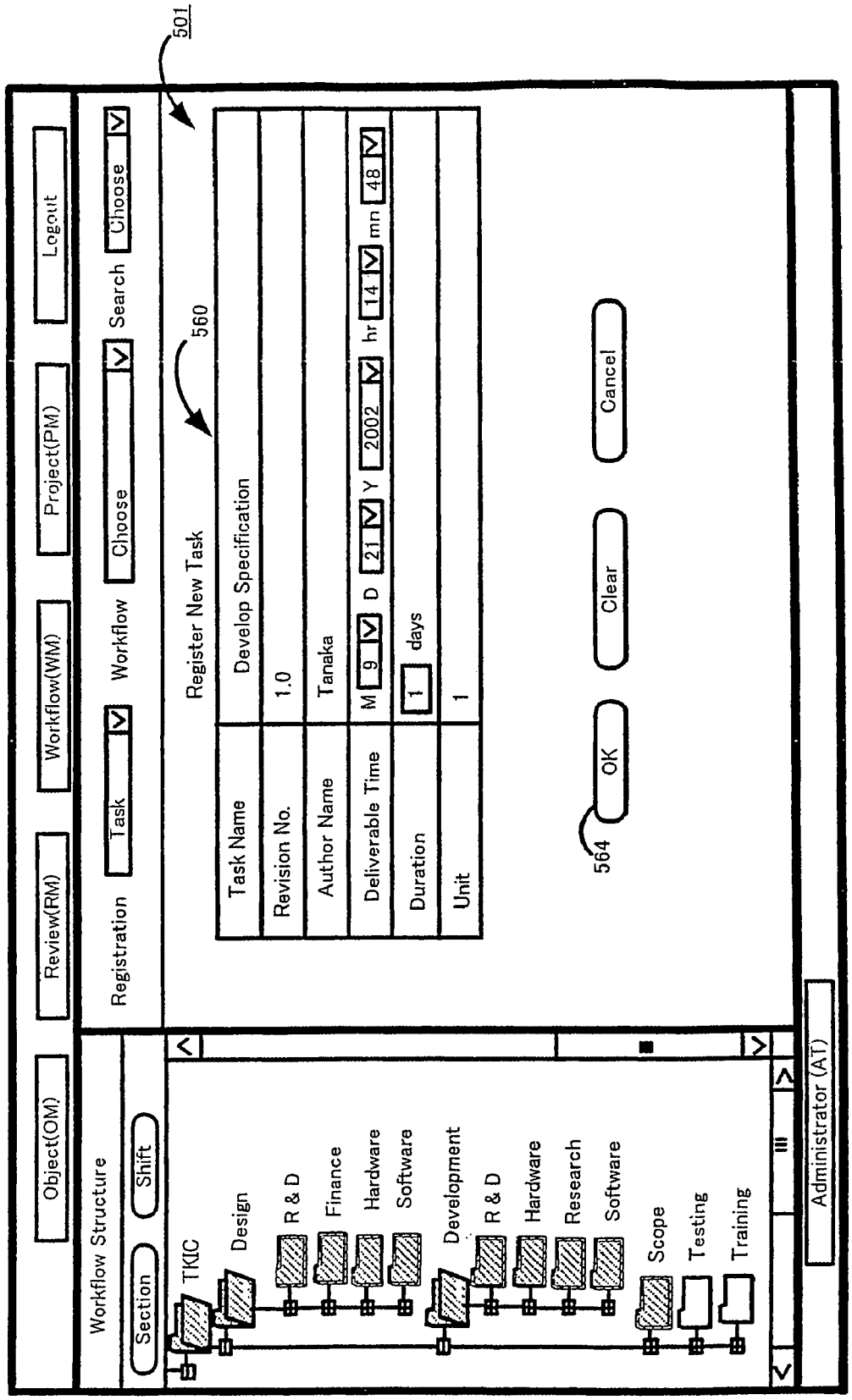
FIG. 21 is a diagram which shows an example of the GUI window provided by the workflow manager.

Referring again to FIG. 7, when the user selects a task as an item to be registered in the registration combo box 504, the WM 14 displays a task list 554 that lists the registered tasks in the main window 501, and displays a new button 555, alter button 556, delete button 557, OK button 558 and the like beneath this task list 554, as shown in FIG. 20. In cases where the user desires to create and register a new task, the user can press the new button 555. When this is done, the WM 13 displays new task registration tools in the main window 501 as shown in FIG. 21. A basic information table 560, an OK button 564 and the like are included in the new task registration tools that are displayed. The user can enter the task name, revision No., author name, deliverable time, duration, unit and the like of the new task in the basic information table. Furthermore, when the user presses the OK button 564, the WM 13 creates a new task which has the basis information entered in the basic information table 560, and registers this new task in the data base.

Figure 22:
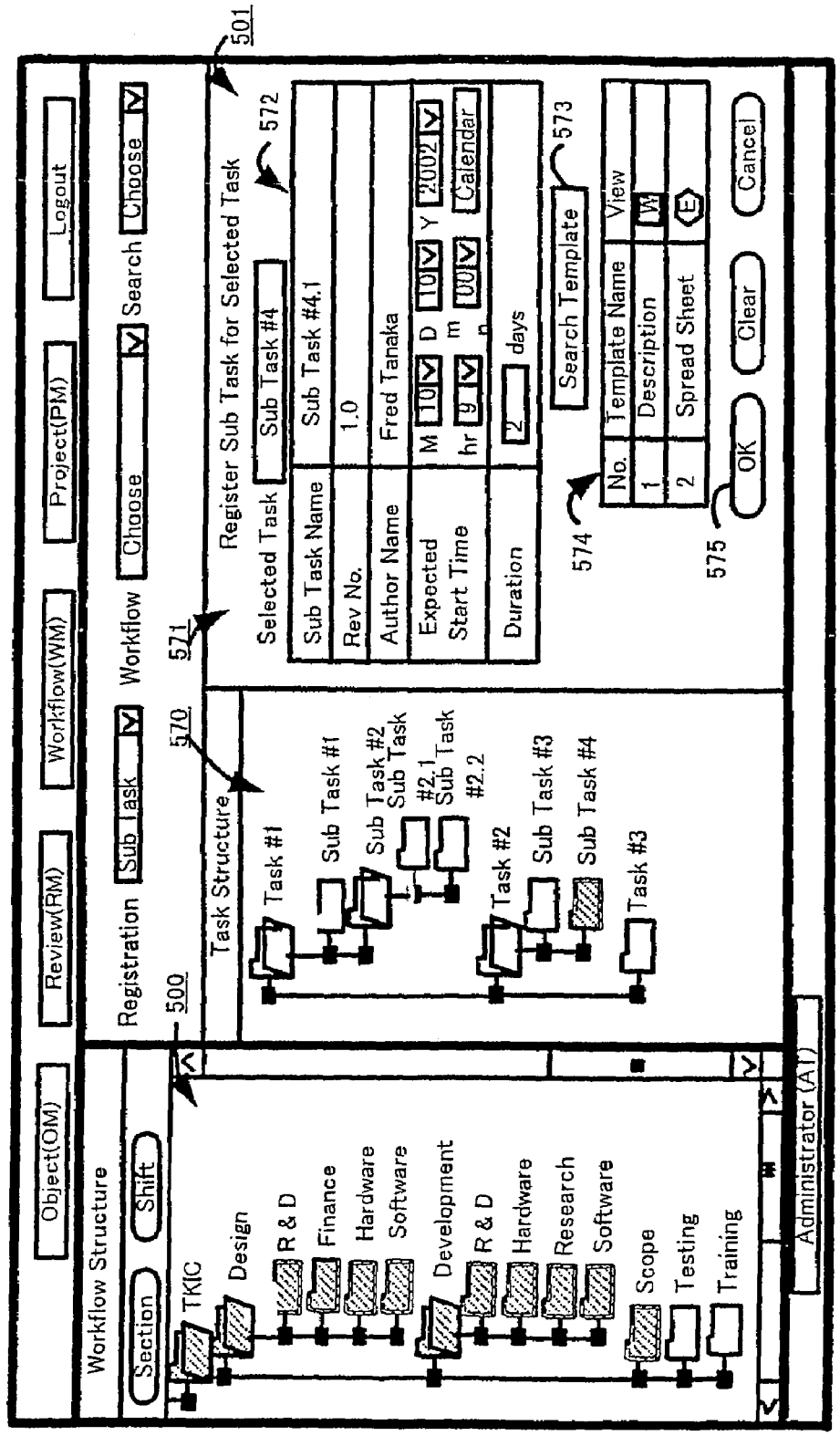
FIG. 22 is a diagram which shows an example of the GUI window provided by the workflow manager.

Referring again to FIG. 7, when the user selects a sub-task as an item that is to be registered in the registration combo box 504, the WM 14 displays a task registration GUI comprising two sub-windows 570 and 571 in the main window 501 as shown in FIG. 22. The left-side sub-window 570 of this GUI is called the "task structure window"; a tree-form hierarchical logical data structure constructed from the data for all of the tasks registered in the data base and the sub-tasks included in each of these tasks is graphically illustrated in this sub-window using folder icons that respectively express the tasks and sub-tasks. Specifically, the data of the tasks and sub-tasks that are registered in the data base are in a hierarchical structure of the type shown in the figures, a hierarchical data structure of any number of strata can be constructed, so that not only are one or more sub-tasks included in a given task, but one or more even more detailed sub-tasks are included in a given sub-task.

Figure 23:
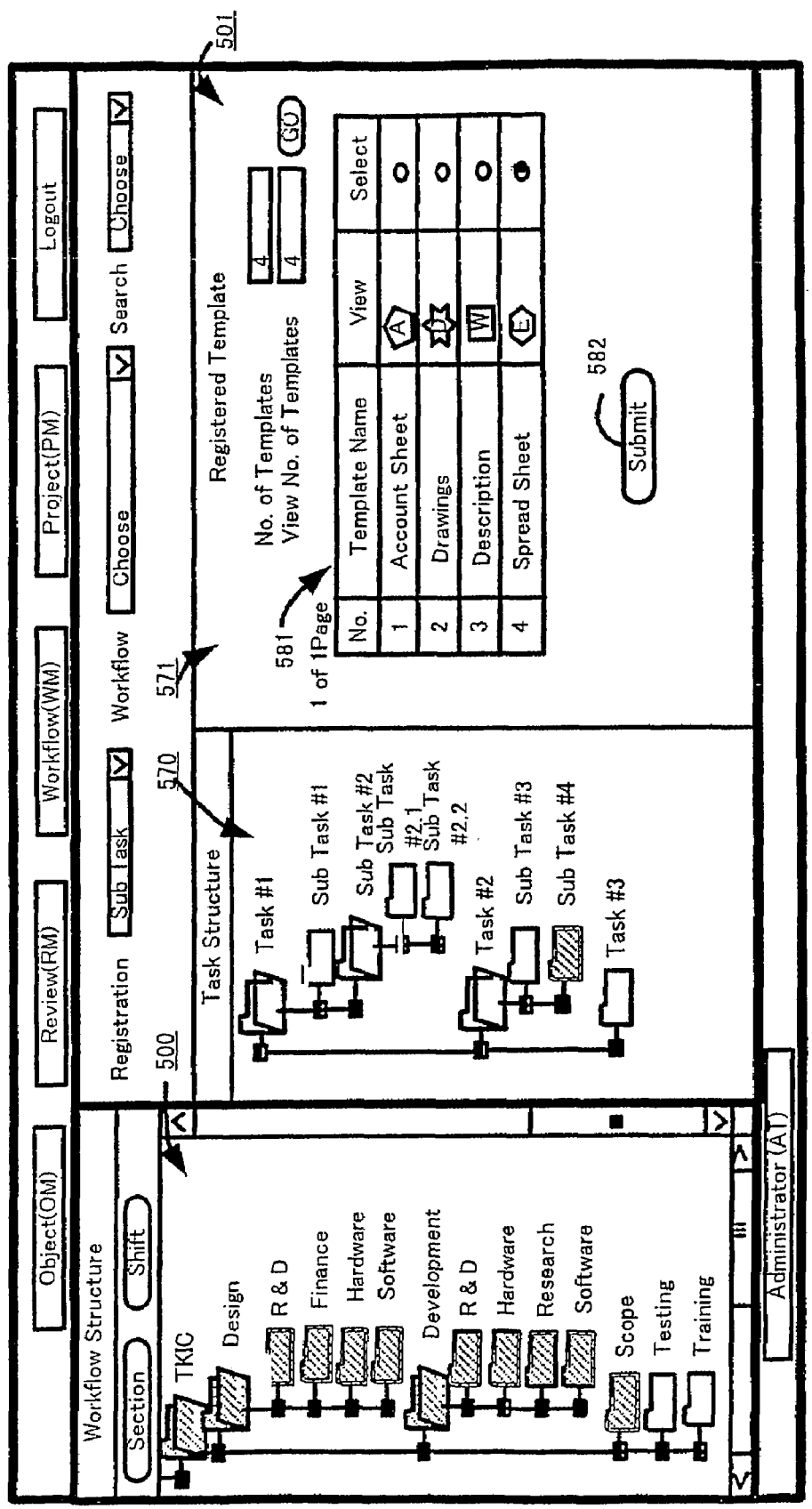
FIG. 23 is a diagram which shows an example of the GUI window provided by the workflow manager.

In cases where the user desires to register a new sub-task under a certain registered task or sub-task, the user selects the desired registered task or sub-task in the task structure window 571, enters basic attribute information such as the name of the new sub-task (sub-task name), revision No. (Rev. No.), name of the author (author name), planned starting time (expected start time), required number of days (duration) and the like in the sub-task information table 572 displayed in the right-side sub-window 571, and further enters the names of one or more types of document templates that will be used in the creation of one or more types of documents as deliverables resulting from the performance of the new task in the document template table 574 displayed in the right-side sub-window 571. When the document template names are entered, the user can press the search template button 573; when this is done, the WM 13 displays a document template list 581 that lists the names of all of the registered document templates in the sub-window 5721 as shown in FIG. 23. When the user selects one or more arbitrary document templates from the document template list 581, and presses the submit button 582, the display on the screen again returns to the display shown in FIG. 22, and the names of the one or more document templates that have now been selected are entered in the document template table 574. Furthermore, when the user operates (e.g., double-clicks on) arbitrary document template icons displayed in the view column in the document template table 574 shown in FIG. 22 or the document template list 581 shown in FIG. 23, the WM 14 opens the document templates corresponding to these icons, and displays these document templates on the screen. In FIG. 22, when the user presses the OK button 575 in the sub-window 571, the WM 14 creates new sub-task data which has the information entered in the task information table 572 and document template table 574 in the sub-window 571, and registers this new sub-task data in the data base as the data of one sub-task included in the registered task or sub-task selected in the task structure window 571. Thus, the user can register various sub-tasks in the form of tree-form hierarchical structures under arbitrary tasks.

Referring again to FIG. 7, when the user selects a section or shift as an item that is to be registered in the registration combo box 504, the WM 13 displays a list of registered sections or shifts in the main window 501, and (as in the case of the task shown in FIG. 20) displays a new button, alter button, delete button, OK button and the like beneath this list (although this is not shown in the figures). If the user presses the new button, the WM 13 displays tools used to create a new section or new shift in the main window 501 (although this is not shown in the figures); then, the user can create a new sub-task, section or shift using these tools. The WM 13 registers the new sub-task, section or shift that has thus been created in the data base.

Figure 44:
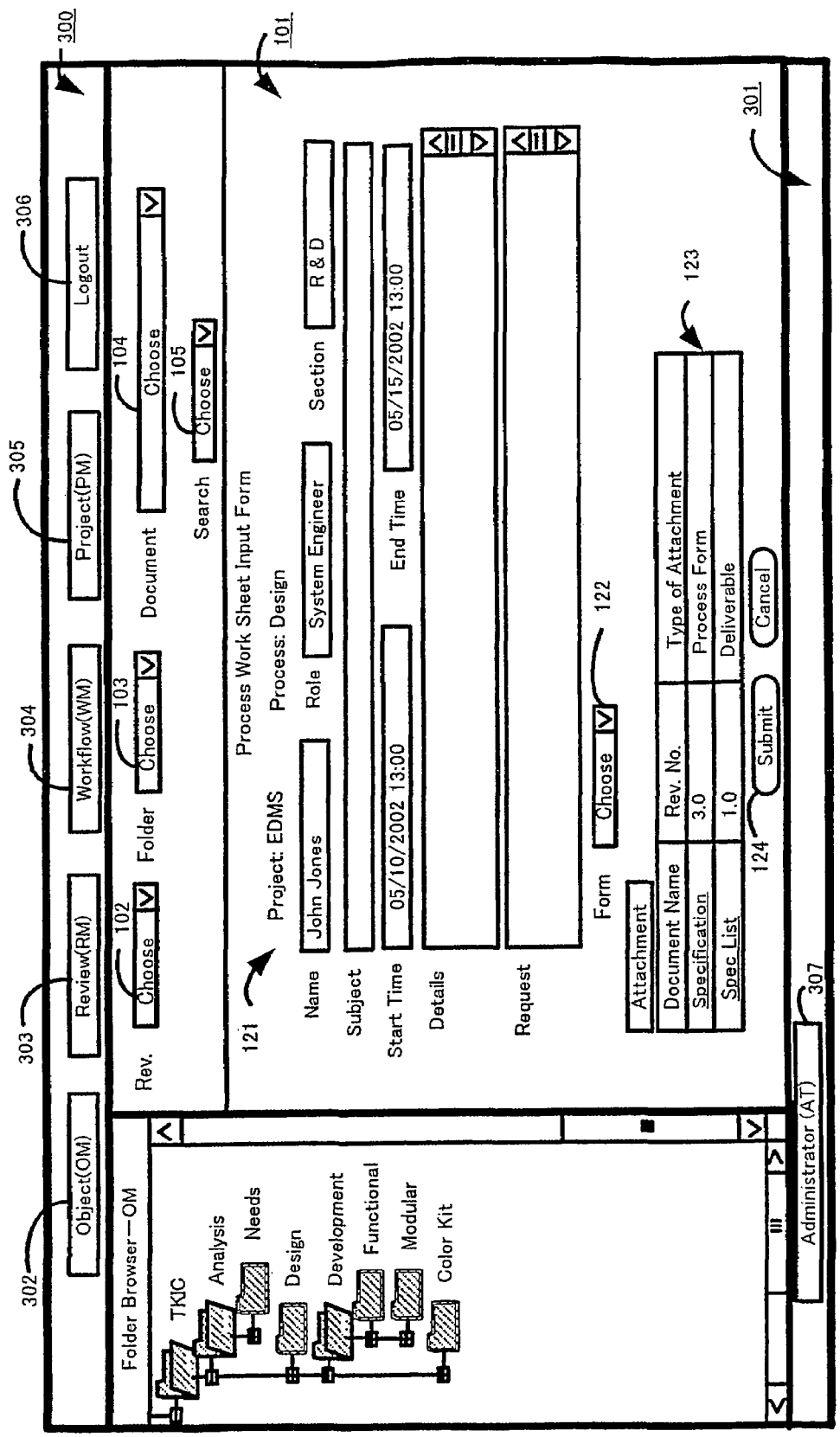
FIG. 44 is a diagram which shows an example of the GUI window provided by the object manager.
Figure 45:
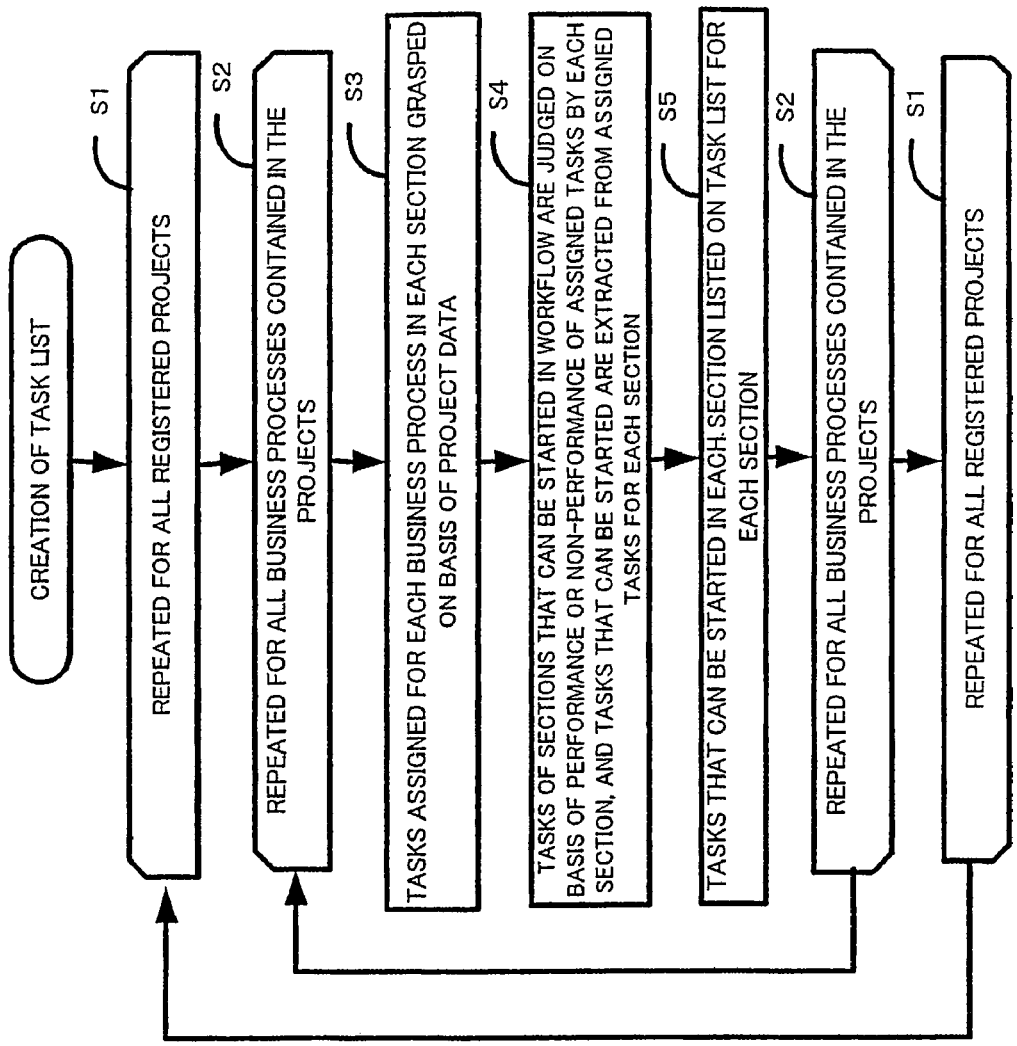
FIG. 45 is a flow chart which shows the procedure whereby the project manager prepares a task list.

FIGS. 24 through 39 and FIGS. 46 through 54 shows various GUI windows that are provided by the PM 14. FIGS. 40 through 44 show example of several GUI windows that are provided by the object manager (OM) 11 in association with the function of the PM 14. FIG. 45 is a flow chart showing the procedures for the PM 14 to prepare a task list. Below, the functions and operations of the PM 14 and the associated functions and operations of the OM 11 will be described with reference to these figures.

Figure 24:
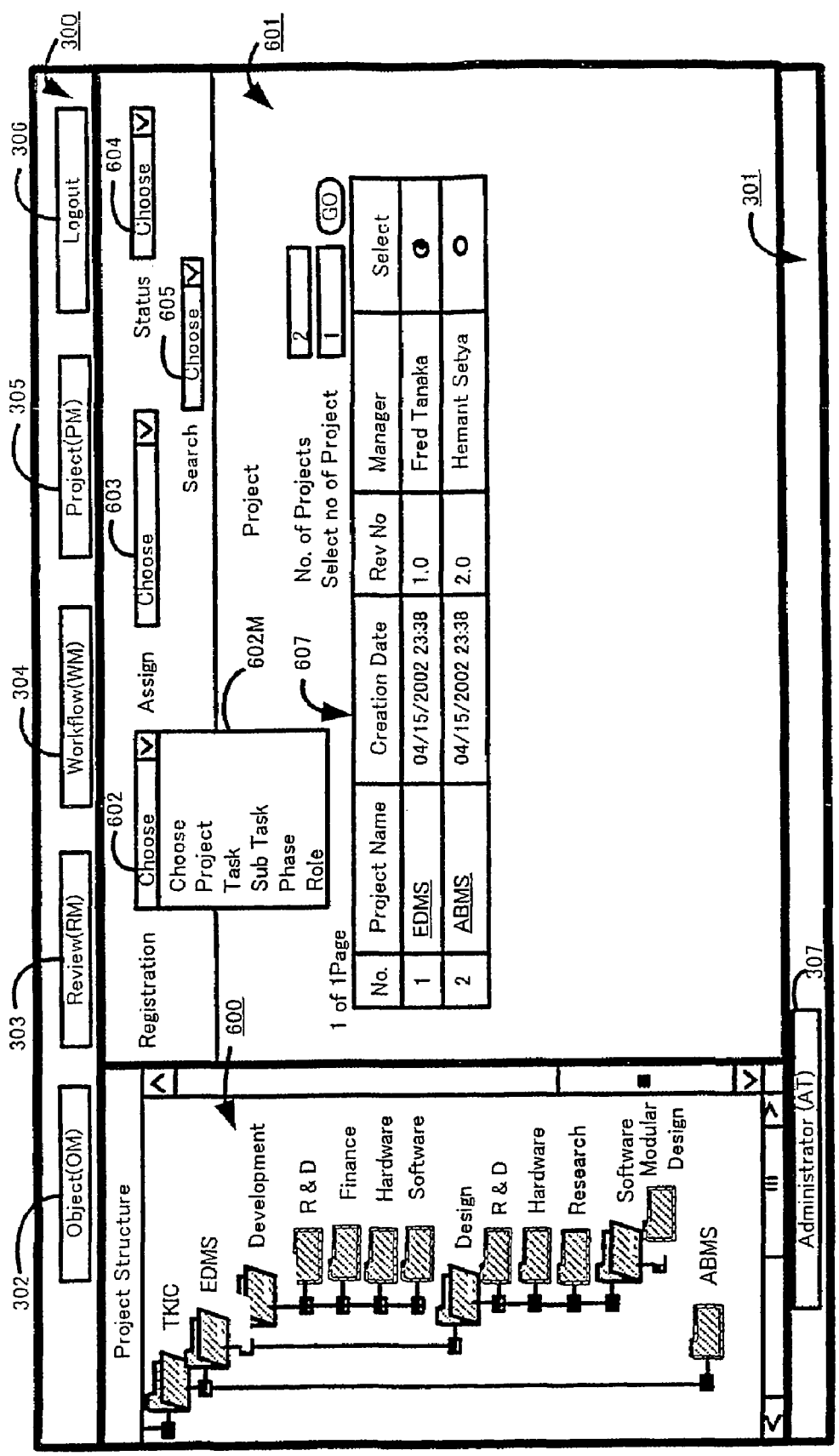
FIG. 24 is a diagram which shows an example of the GUI window provided by the project manager.

When the user opens the PM 14, a GUI window such as that shown in FIG. 24 (for example) is displayed on the display screen of the user terminal.

As has already been described, the upper and lower sub-windows 300 and 301 of the GUI window shown in FIG. 24 are common to all of the managers. The two sub-windows 600 and 601 in the center provide a GUI that is peculiar to the PM 14.

The sub-window 600 on the left side in the center is called a "project structure window". A tree-form hierarchical logical structure (project structure) of various types of project data currently registered in the data base is graphically displayed in this sub-window 600 using folder icons expressing various data items that are contained in this project data. Specifically, various types of project data created by the user are managed in the data base by the PM 14 using a logical hierarchical data structure of the type shown in the project structure window 600.

In the example shown in FIG. 24, a folder "TKIC" expressing a specified business category that has the name of "TKIC" (e.g., an individual organization such as an enterprise group, individual enterprise, working section within an enterprise, factory, supporting firm or the like, or a category such as year of work, scope of work, object of work or the like) is provided inside the project structure window 600. When this folder "TKIC" is opened, project folders respectively expressing two projects that have the names of "EDMS" and "ABMS" are displayed under this folder. This means that projects called "EDMS" and "ABMS" are registered under a business category called "TKIC" (e.g., an enterprise with the name of "TKIC").

When the project folders expressing the respective projects are opened, process folders respectively expressing one or a plurality of business processes constituting these projects are displayed under these project folders. For example, process folders respectively expressing the two business processes "development" and "design" contained in the project "EDMS" are displayed under the project folder of the project "EDMS". When the respective business process folders are opened, section folders respectively expressing one or a plurality of sections that will be responsible for these business processes are displayed under the process folders. For example, section folders respective expressing the sections "R & D", "finance", "hardware" and "software" that will be responsible for the business process "design" are displayed under the process folder for the business process "design". Furthermore, when the respective section folders are opened, task folders respectively expressing one or a plurality of tasks that are assigned to the sections with respect to the business processes of the project are displayed under these section folders. For example, a task folder expressing the task "modular design" which is assigned to the "software" section with respect to the process "design" of the project "EDMS" is displayed under the section "software" for the process "design" of the project "EDMS". When the task folders for the respective tasks are opened, for example, sub-task folders respectively expressing one or a plurality of sub-tasks contained in the tasks are displayed (although this is not shown in the figures).

Project data having such a hierarchical logical structure displayed in the project structure window 600 is created and registered in the data base by the user using the functions of the PM 14 which will be described below.

In FIG. 24, the sub-window 601 on the right side in the center is called the "project manager (PM) main window"; a project list 607 which lists all of the projects registered under the selected business category (e.g., "TKIC") is displayed in this sub-window. Information items such as the name of the project (project name), date and time of creation (creation date), revision No. (rev. No.), project manager (manager), select button an the like are displayed in this project list 607 for each project.

A registration combo box 602, assign combo box 603, status combo box 604 and search combo box 505 are provided in the upper part of the PM main window 601. The registration combo box 602 is used to select the types of items to be registered in cases where the user desires to register various types of items relating to the project. As is shown in FIG. 24, menu items for various types of items such as project, task, sub-task, phase, role and the like are provided in the pull-down menu 602M of this registration combo box 602. The assign combo box 603 is used to select items that are to be set in cases where various types of work assignments or work schedules relating to the project are set. This combo box 603 will be concretely described later. The status combo box 604 is used to select items to which reference is to be made in cases where reference is made to various types of status relating to the project. This combo box 604 will be concretely described later. The search combo box 605 is used to select types of items for which a search is to be made in cases where a search is made for various types of items relating to the project.

Figure 25:
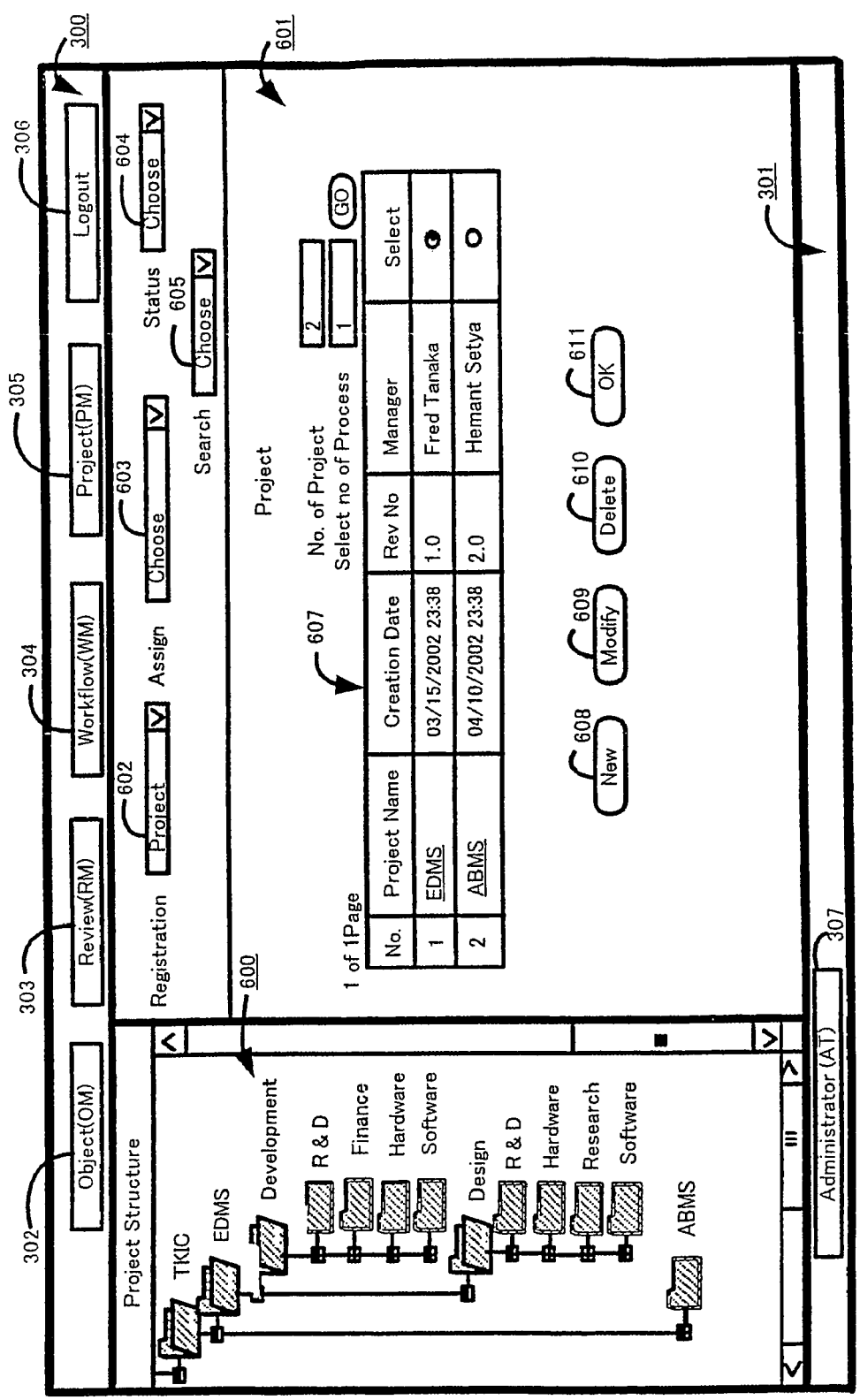
FIG. 25 is a diagram which shows an example of the GUI window provided by the project manager.

In cases where the user desires to register a new project, or in cases where the user desires to alter or delete a registered project, the user can open the pull-down menu 602M of the registration combo box 602, and can select the menu item "project" from the pull-down menu 602, as shown in FIG. 24. When this is done, the PM 14 displays a new button 608, alter button 609, delete button 610, OK button 611 and the like beneath the project list 607 inside the main window 601 as shown in FIG. 25. The new button 608 is used to register new projects. The alter button 609 and delete button 610 are respectively used to alter and delete one registered project (the project "EDMS" in the example shown in FIG. 25) that is selected by the select button within the project list 607.

Figure 26:
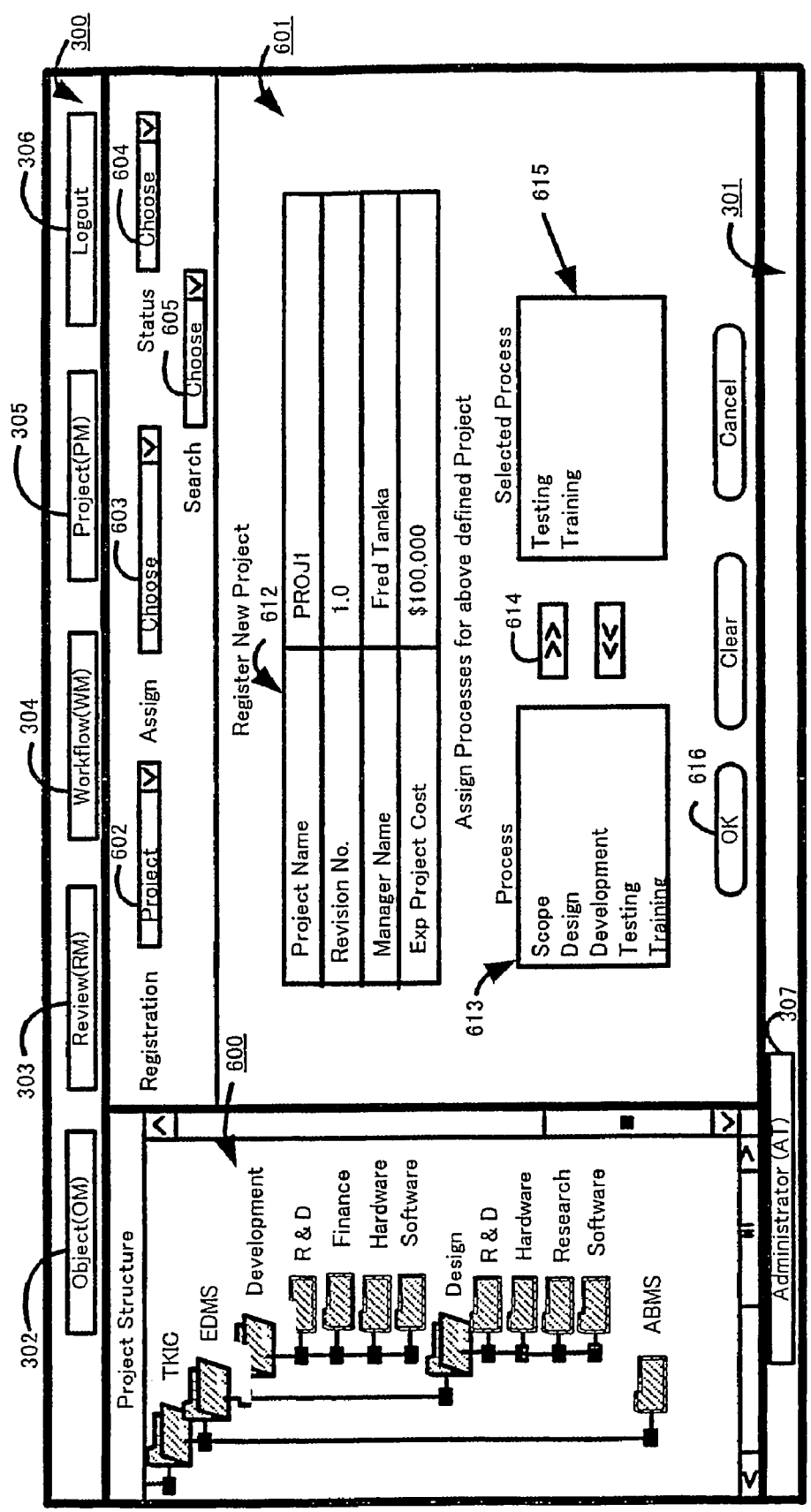
FIG. 26 is a diagram which shows an example of the GUI window provided by the project manager.

In the main window 601 shown in FIG. 25, when the user presses the new button 608, the PM 14 displays new project registration tools in the main window 601 as shown in FIG. 26. These new project registration tools include a project basic information table 612, a list of all processes 613, a process select button 614, a list of selected processes 615, an OK button 616 and the like. The user can enter the project name, revision No. and project manager name of the new business project in the project basic information table 612. The names of all of the business processes that have already been registered in the data base by the workflow manager (WM) 13 are displayed in the list of all processes 613. When the user selects an arbitrary business process from the list of all processes 613 (e.g., by clicking with the mouse) and presses the process select button 614, the PM 14 takes the selected business process as a business process that is included in this project, and adds the name of this business process to the selected process list 615. The example shown in FIG. 26 shows how a new project "PROJ1" is created. Here, two business processes "testing" and "training" are selected as business processes of this project "PROJ1".

In the new project registration tools displayed in the main window 601 shown in FIG. 26, when the OK button 616 is pressed after required items have been entered in the project basic information table 612 and one or more business processes have been entered in the selected process list 615, the PM 14 registers the project name, revision No., project manager name, names of business processes contained in the project and the like relating to the new project set by the new project registration tools in the data base as a part of the hierarchical data structure (already described) of the project data of this new project. Furthermore, the PM 14 again displays the project list 607 in the main window 601 as shown in FIG. 24; in this case, however, a display of the new project that has just been registered, e.g., "PROJ1", is added to the process list 607 (although this is not indicated in the example shown in FIG. 24).

Referring again to FIG. 24, in cases where the user desires to register a new task, or in cases where the user desires to alter or delete a registered task, the user can select the menu item "task" from the pull-down menu 602 of the registration combo box 602. When this is done, the PM 14 displays a GUI similar to the task registration GUI of the WM 13 already described with reference to FIGS. 20 and 21 in the PM main window 601, thus allowing the user to register new tasks in the data base by a procedure similar to that of task registration using the WM 13. Furthermore, in cases where the user wishes to register a new sub-task, or in cases where the user wishes to alter or delete a registered sub-task, the user can select the menu item "sub-task" from the pull-down menu 602 of the registration combo box 602. When this is done, the PM 14 displays a GUI similar to the sub-task registration GUI of the WM 13 already described with reference to FIGS. 22 and 23 in the PM main window 601, thus allowing the user to register new tasks in the data base by a procedure similar to that of sub-task registration using the WM 13.

Figure 27:
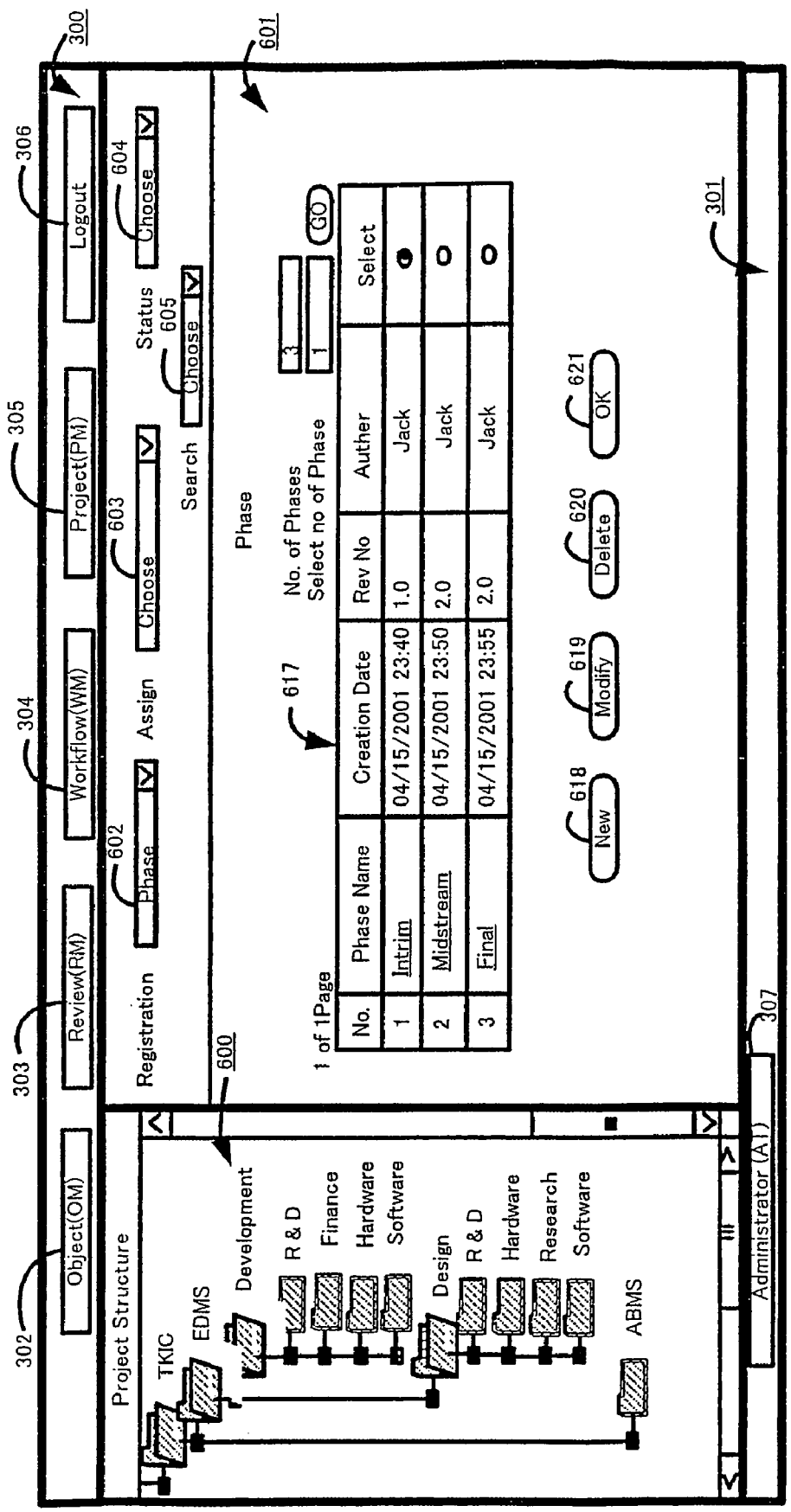
FIG. 27 is a diagram which shows an example of the GUI window provided by the project manager.
Figure 28:
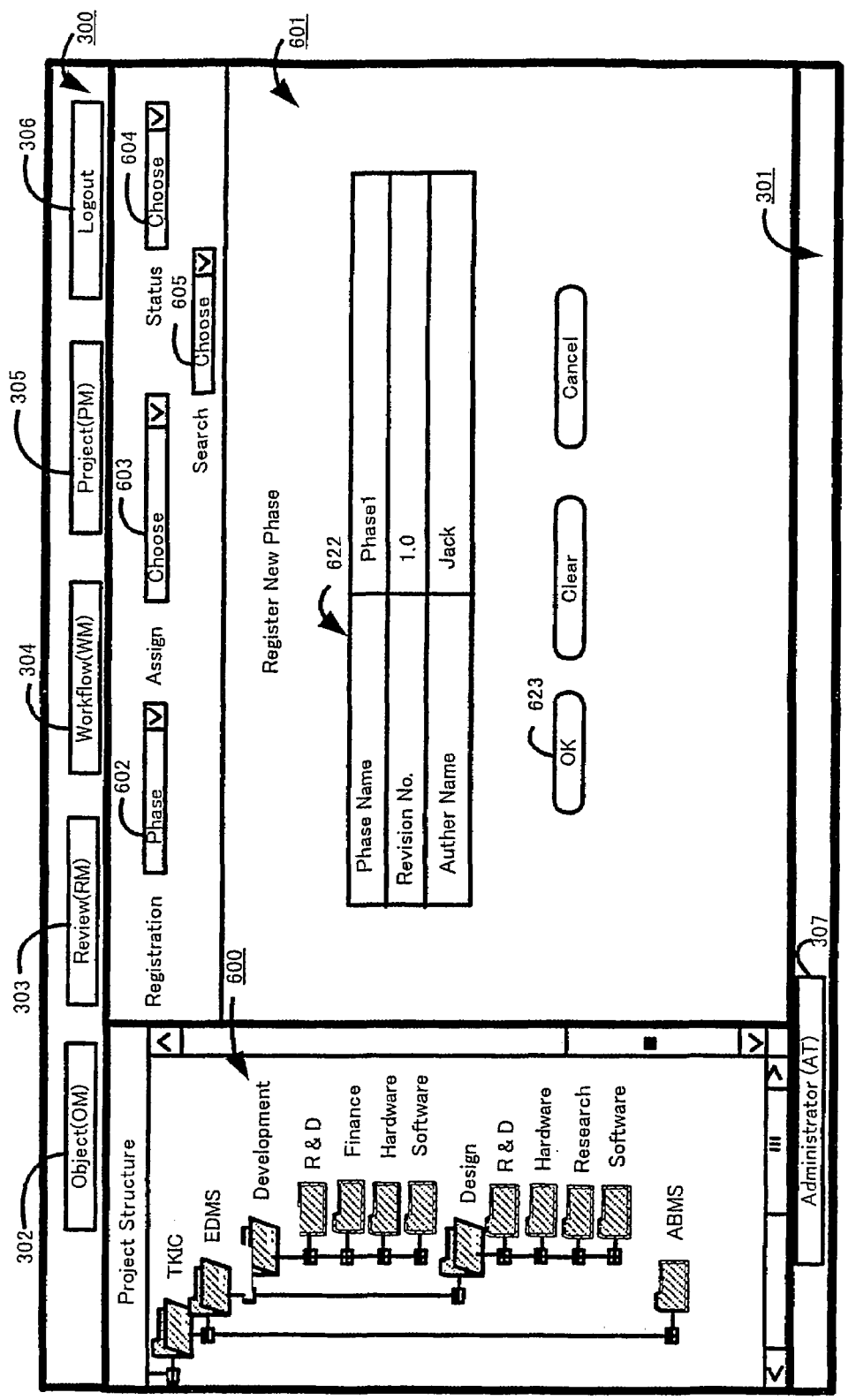
FIG. 28 is a diagram which shows an example of the GUI window provided by the project manager.

Furthermore, in cases where the user wishes to register a new work phase (phase) (here, the term "work phase" refers to several phases obtained by splitting the flow of work for management purposes in cases where (for example) the work involved in a single business process is performed by a single section), or in cases where the user wishes to alter or delete a registered work phase, the user can select the "work phase" ("phase") menu item from the pull-down menu 602 of the registration combo box 602. When this is done, the PM 14 displays a phase list 617 which lists the work phases that have been registered in the data base in the main window 601, and displays a new button 618, alter button 618, delete button 620, OK button 621 and the like beneath this phase list 617, as shown in FIG. 27. In the example shown in FIG. 27, three registered business phases, i.e., "intrim (initial stream)", "midstream" and "final", are listed in the phase list 617. In cases where the user desires to create and register a new work phase, the user can press the new button 618. When this is done, as shown in FIG. 28, the PM 14 displays new task registration tools in the main window 501. A basic information table 622, an OK button 623 and the like are included in the new task registration tools that are displayed. When the user enters the phase name, revision No., author name and the like in the basic information table 622 and then presses the OK button 623, the PM 14 creates a new work phase which has the basic information entered in the basic information table 622, and registers this new work phase in the data base.

Figure 29:
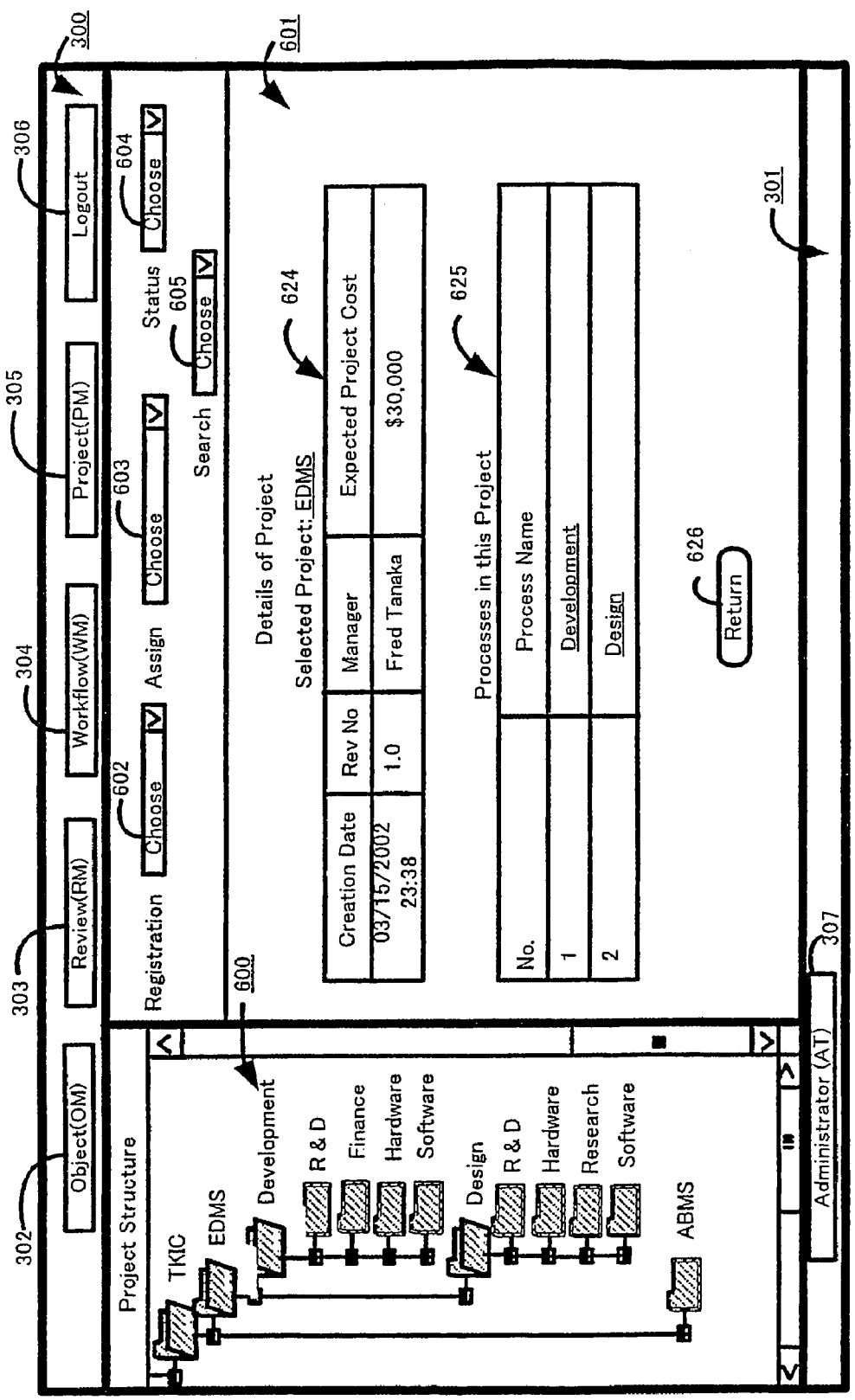
FIG. 29 is a diagram which shows an example of the GUI window provided by the project manager.

Referring again to FIG. 24, when the user opens the project names of the respective projects in the project list 607 displayed in the main window 601 (e.g., when the user double-clicks on the project names with the mouse), the PM 144 reads out the project data of these projects from the data base, and displays detailed information concerning the projects in the main window 601 as shown for example in FIG. 29. In addition to a table 624 which shows basic information for the project in question, this detailed information includes a process list 625 which lists one or a plurality of business processes constituting the project. When the user selects a process name in this process list (e.g., when the user double-clicks on such a process name with the mouse), the PM 14 reads out the data of the workflow model of this business process from the data base, and displays the details of this workflow model in the main window 601. When the return button 626 is pressed, the PM 14 returns the display in the main window 601 to the initial display shown in FIG. 24.

Figure 30:
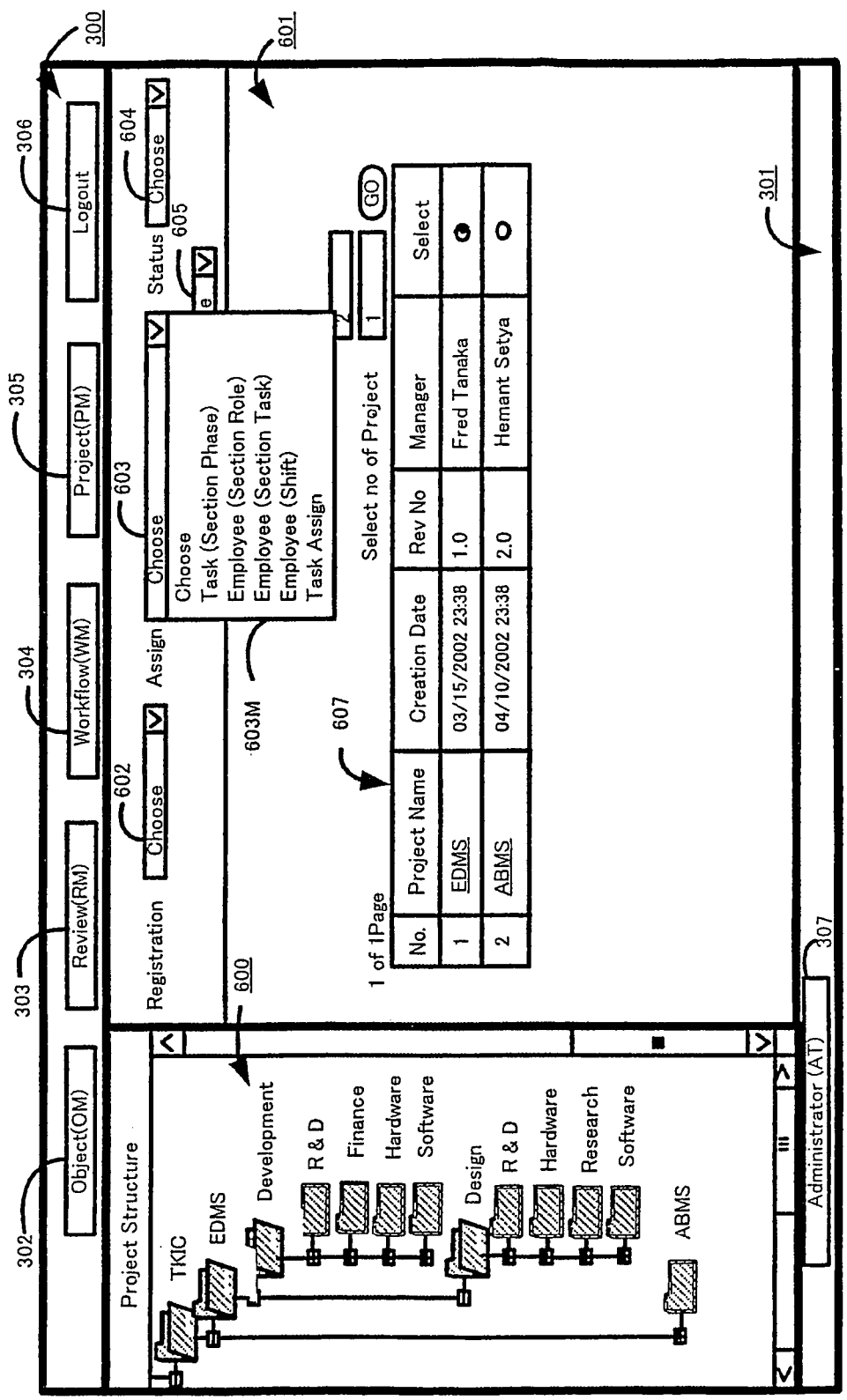
FIG. 30 is a diagram which shows an example of the GUI window provided by the project manager.

Next, reference will be made to FIG. 30. In cases where the user desires to assign tasks or set time schedules with respect to an arbitrary project among the registered projects, the user can open the pull-down menu 603M of the assign combo box 603, and select the item that is to be set from this pull-down menu 603M, as shown in FIG. 30. Menu items such as task—assignment of work phases according to section (task (section phase), employee—assignment of roles according to section (employee (section role)), employee—assignment of tasks according to section (employee (section task)), employee—assignment of shifts (employee (shift), section—assignment of tasks (task assign) and the like are provided in this pull-down menu 603M.

Figure 31:
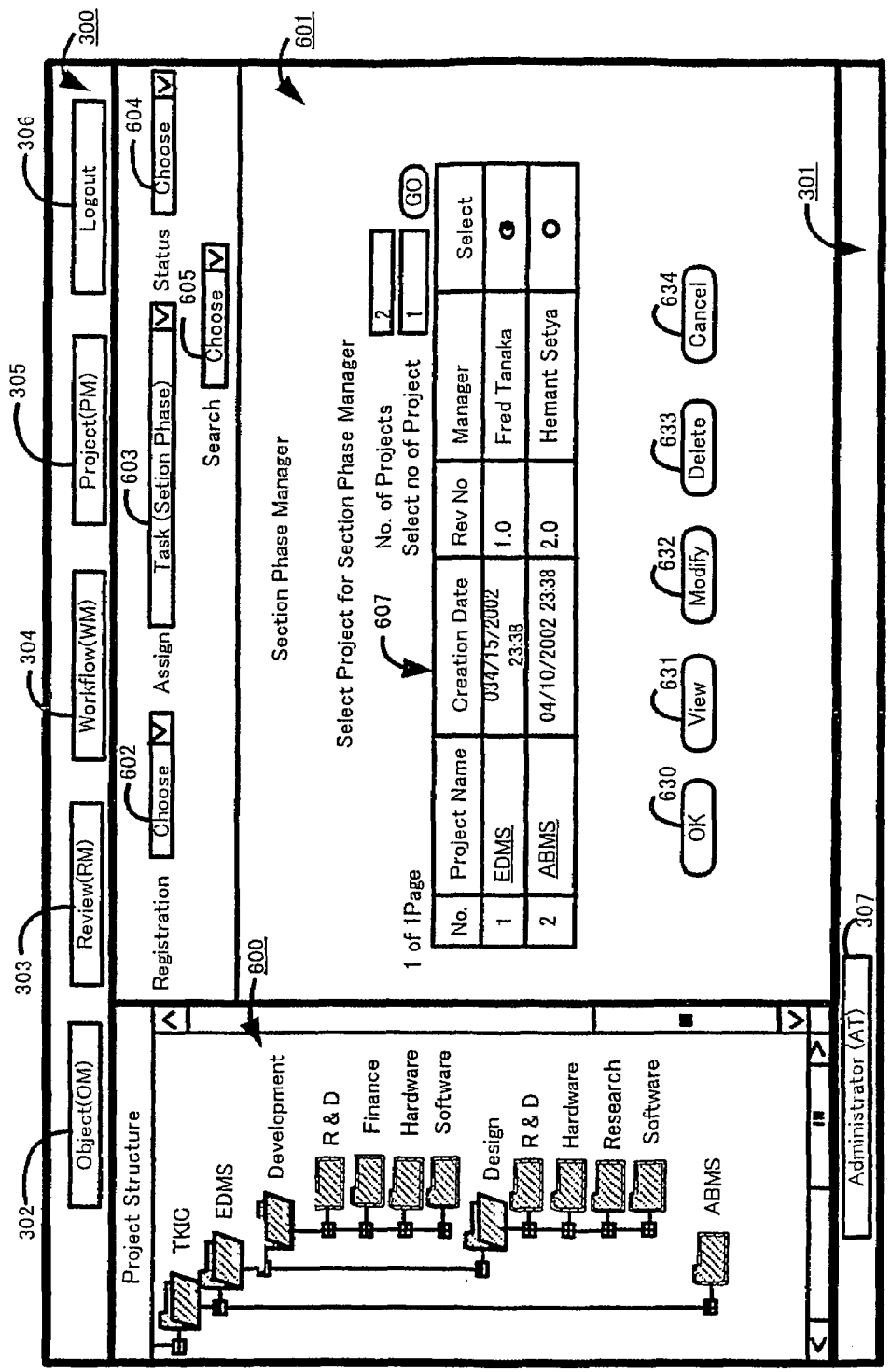
FIG. 31 is a diagram which shows an example of the GUI window provided by the project manager.

In cases where the user, with respect to an arbitrary project, desires to assign new tasks for each work phase to one or a plurality of sections that are responsible for this project, or in cases where the user desires to alter a task assignment that has already been set, as shown in FIG. 30, the user can select "task—assignment of work phases according to section" ("task (section phase)") from the pull-down menu 603M of the assign combo box 603. When this is done, the PM 14 displays an OK button 630, a view button 631, a alter button 632, a delete button 633, a cancel button 634 and the like beneath the project list 607 as shown in FIG. 31. After selecting the desired project from the project list 607, the user can press the OK button 630 if he desires to set a new task assignment for the project, or can press the alter button 632 if he desires to alter a set task assignment.

Figure 32:
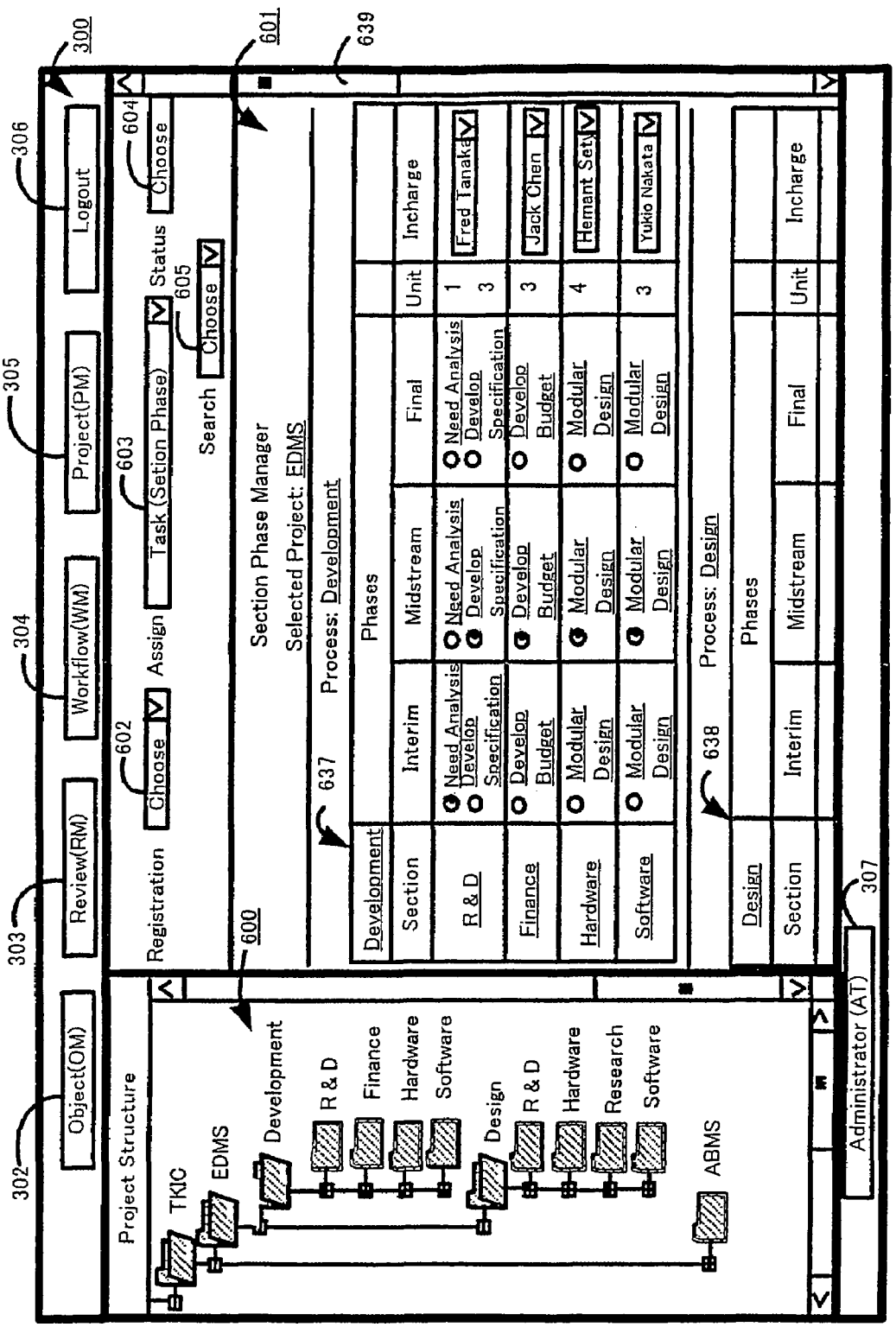
FIG. 32 is a diagram which shows an example of the GUI window provided by the project manager.

Where, let us assume for example that the user has selected the project "EDMS" from the process list 507, and has pressed the OK button 630. When this is done, as shown in FIG. 32, the PM 14 displays the GUI of the section phase manager, which is a tool that is used to assign tasks for each work phase to the sections that are responsible for the project "EDMS", in the main window 601. The section phase manager grasps all of the business processes (e.g., "development" and "design") contained in the project "EDMS" on the basis of the project data for the project "EDMS" in the data base, grasps all of the sections that are responsible for the respective business processes (e.g., the four sections "R & D", "finance", "hardware" and "software" in the case of the business process "development") on the basis of the workflow model data for these business processes in the data base, grasps all of the registered work phases (e.g., the three work phases "interim", "midstream" and "final") on the basis of the work phase data in the data base, grasps all of the employees belonging to the respective sections on the basis of the employee data for each section in the data base, and grasps all of the tasks assigned to the respective sections (e.g., the two tasks "need analysis" and "develop specifications" for the section "R & D") on the basis of the task data for each section in the data base (this will be described later with reference to FIGS. 35 and 36). Then, on the basis of the abovementioned grasped information, the section phase manager displays task—section work phase assignment tables 637 and 638 respectively corresponding to each of the business processes "development" and "design" contained in the project "EDMS" in the main window 601 as shown in FIG. 32. In the example shown in FIG. 32, the task—section work phase assignment table 637 for the first business process "development" is completely displayed in the main window 601, but the task—section work phase assignment table 638 for the second business process "design" is only partially displayed in the main window 601. However, the second task—section work phase assignment table 638 can be completely displayed by scrolling the main window 601 using the scroll bar 639 or the like.

For example, the task—section work phase assignment tables 637 and 638 for the respective business processes are constructed so that tasks can be assigned for individual work phases to all of the sections responsible for the business processes by a method such as switching radio buttons for the respective tasks ON or the like. Furthermore, in the task—section work phase assignment tables 637 and 638 for the respective business processes, required work amounts (units) can be set for the tasks assigned to the respective sections for each work phase. Furthermore, the person responsible for the business process in question (among the employees belonging to the section) can be set for each section using an "in-charge" column combo box or the like. For example, in the task—section work phase assignment table 637 for the business process "development" shown in the figures, the task "need analysis" is assigned to the section "R & D" in the work phase "interim", and the task "develop specifications" is assigned to the same section in the work phase "midstream". Furthermore, an amount of work equal to 1 unit is set for the task "need analysis", and an amount of work equal to 3 units is set for the task "develop specifications". Moreover, "Fred Tanaka" is selected as the person responsible for the business process "development" in the section "R & D". Furthermore, in the task—section work phase assignment tables 637 and 638, if the user presses (e. g., clicks on) the name of an arbitrary task, the PM 14 grasps the tree-form hierarchical structure of the task in question that is registered in the data base, and all of the sub-tasks that are positioned beneath this task, an displays this hierarchical structure on the screen. As a result, the user can easily ascertain what kinds of sub-tasks are included in each task.

When the user presses the "OK" button (not shown in FIG. 32) that is positioned beneath the task—section work phase assignment tables 637 and 638 on the GUI of the section phase manager shown in FIG. 32 after making the necessary task assignments, setting of work amounts, setting of persons in charge and the like in these tables 637 and 638, the PM 14 registers such task assignments, setting of work amounts and setting of persons in charge in the data base as a part of the project data of the selected project. When a certain task is thus assigned to a certain work phase in a certain section, all of the sub-tasks contained in this assigned task are also inevitably assigned to the work phase in question of the section in question as a result of the hierarchical logical structure among tasks and sub-tasks shown for example in the task structure window 571 in FIG. 22.

Referring again to FIG. 30, in cases where the user, with respect to an arbitrary project, desires to assign new roles to the employees of one or a plurality of sections that will be responsible for this project, or in cases where the user desires to alter role assignments that have already been set, the user can select "employee—section role assignment" ("employee (section role)") from the pull-down menu 603M of the assign combo box 603. When this is done, the PM 14 displays a GUI screen that is substantially similar to that shown in FIG. 31 (already described); accordingly, after selecting a desired project from the project list 607 on this GUI screen, the user can press the OK button 630 if he desires to set a new role assignment for the project, or can press the alter button 632 if he desires to alter a role assignment that has already been set.

Figure 33:
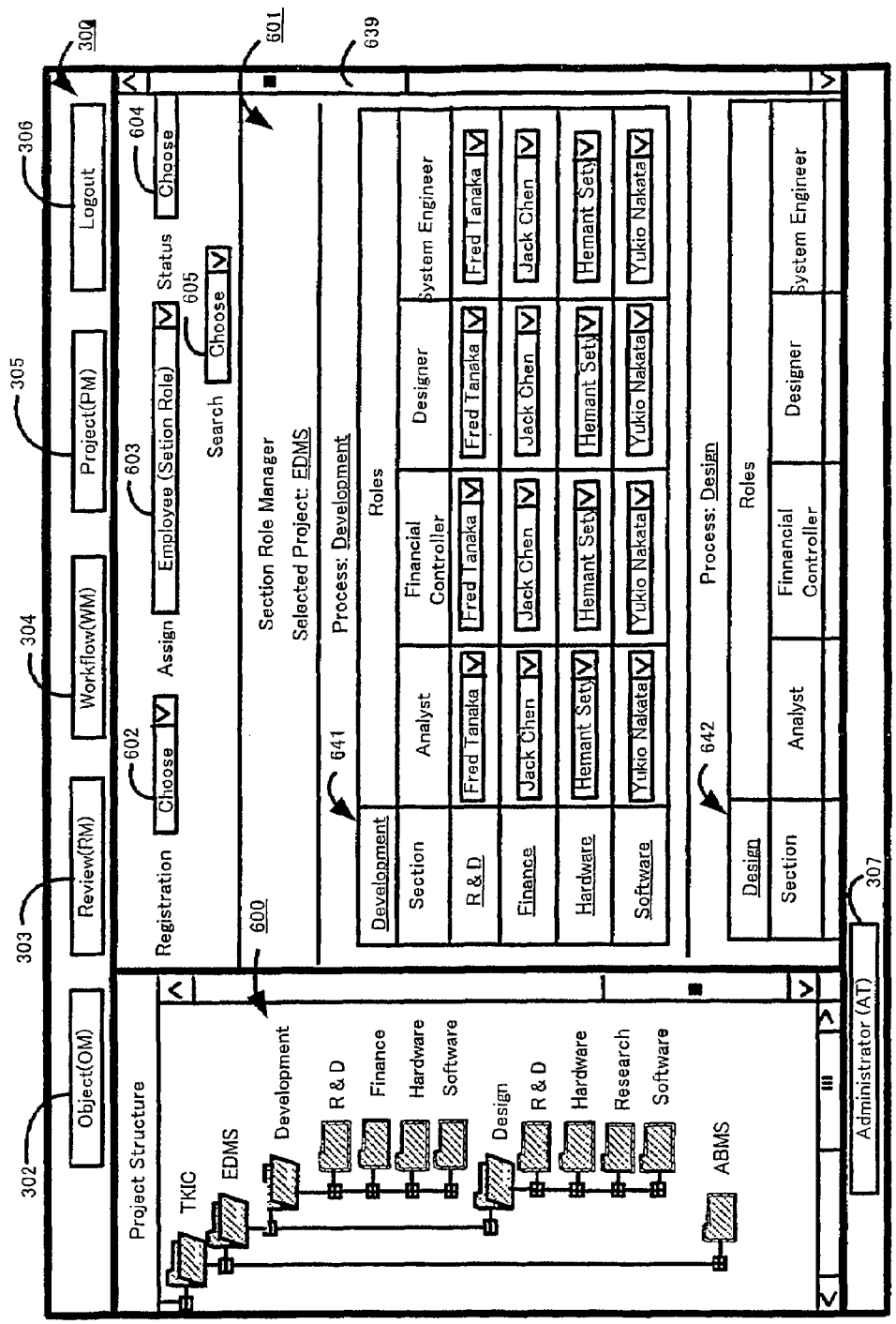
FIG. 33 is a diagram which shows an example of the GUI window provided by the project manager.

Here, for example, let us assume that the user has selected the project "EDMS" from the process list 507, and has pressed the OK button 630. When this is done, the PM 14 displays the GUI of a section role manager, which is a tool that is used to assign one or a plurality of pre-registered roles to employees of the section that is to be responsible for the project "EDMS", in the main window 601 as shown in FIG. 33. The section role manager grasps all of the business processes contained in the project "EDMS" (e.g., "development" and "design") on the basis of the project data for the project "EDMS" in the data base, grasps all of the sections that are responsible for the respective business processes (e.g., the four sections "R & D", "finance", "hardware" and "software" in the case of the business process "development") on the basis of workflow model data for these business processes in the data base, grasps all of the registered roles (e.g., the four roles "analyst", "financial controller", "designer" and "system engineer") on the basis of the role data in the data base, and grasps all of the employees belonging to the respective sections on the basis of the employee data for each section in the data base. Furthermore, on the basis of the abovementioned grasped information, the section role manager displays employee—section role assignment tables 641 and 642 respectively corresponding to the business processes "development" and "design" contained in the project "EDMS" in the main window 601 as shown in FIG. 33. Even in cases where all of the employee—section role assignment tables 641 and 642 cannot be simultaneously displayed in the main window 601 (as in the example shown in the figures), the desired employee—section role assignment tables can be displayed by scrolling the main window 601 using the scroll bar 639 or the like.

In the employee—section roll assignment tables 641 and 642 for the respective business processes, combo boxes which have pull-down menus listing (for example) the names of all of the employees in the section are provided in the cells for each role of each section. Any of the employees in each section can be assigned to the respective roles of the respective sections using the respective combo boxes. When the user presses the "OK" button (not shown in FIG. 33) disposed beneath the employee—section role assignment tables 641 and 642 on the GUI of the section role manager shown in FIG. 33 after assigning the employees that are to perform the respective roles in these tables 641 and 642, the PM 14 registers these role assignments in the data base as a part of the project data of the selected project.

Referring again to FIG. 30, in cases where the user, with respect to an arbitrary project, desires to assign new tasks to the employees of one or a plurality of sections that are to be responsible for this project, or in cases where the user desires to alter task assignments that have already been set, the user can select "employee—section task assignment" ("employee (section task)") from the pull-down menu 603M of the assign combo box 603. When this is done, the PM 14 displays a GUI screen which is substantially similar to that shown in FIG. 31 (described already); accordingly, after selecting the desired project from the project list 607 sown on this GUI screen, the user can press the OK button 630 if he desires to set a new employee—task assignment for this project, or can press the alter button 632 if he desires to alter an employee—task assignment that has already been set.

Figure 34:
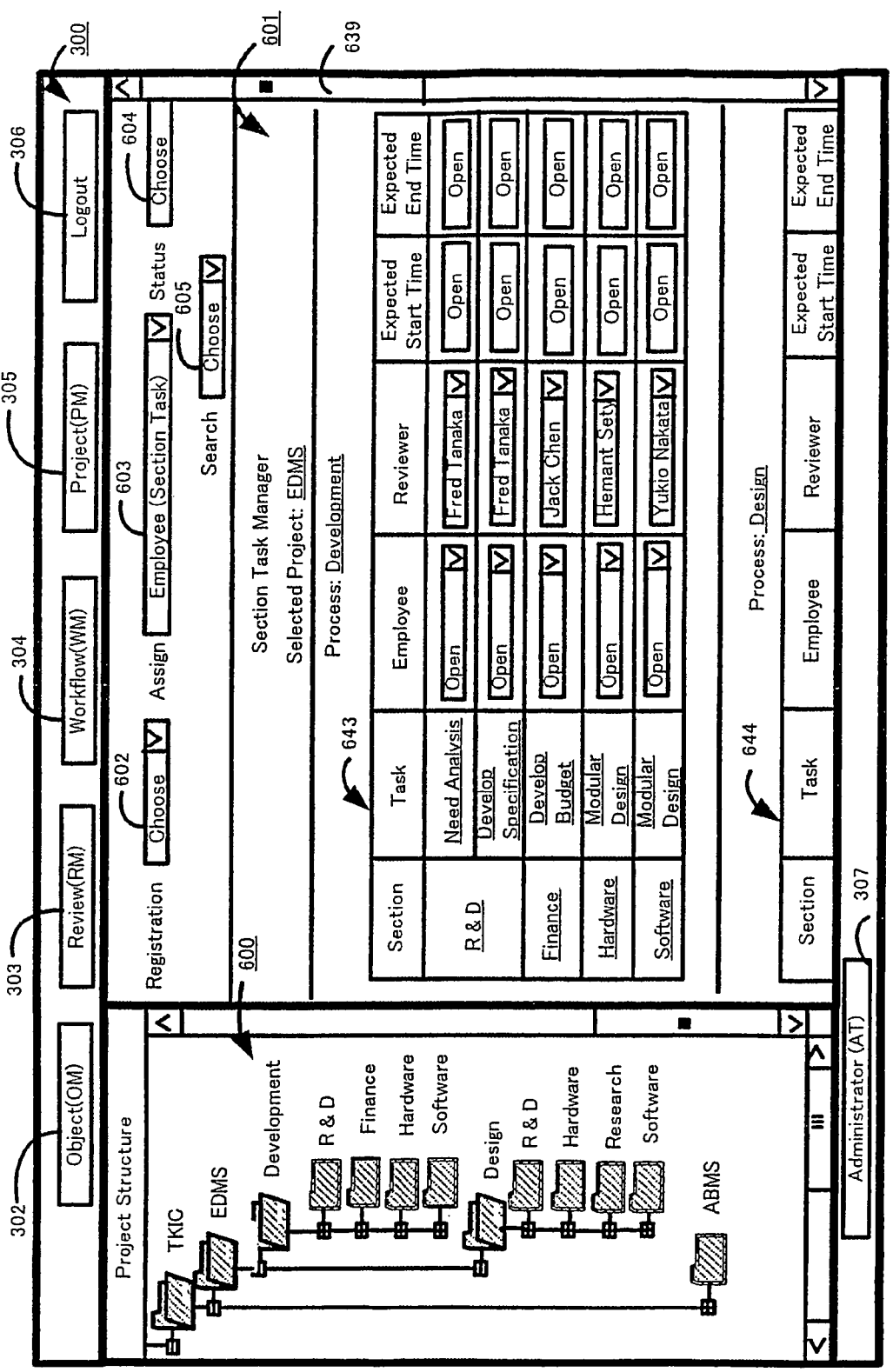
FIG. 34 is a diagram which shows an example of the GUI window provided by the project manager.

Here, for example, let us assume that the user has selected a project from the process list 507, and has pressed the OK button. When this is done, the PM 14 displays the GUI of a section task manager, which is a tool that is used to assign one or a plurality of tasks that have already been assigned to the section that is responsible for the project "EDMS" (tasks that have been assigned using the GUI shown in FIG. 32) to employees of this section, in the main window 601 as shown in FIG. 34. The section task manager grasps all of the business processes contained in the project "EDMS" (e.g., "development" and "design"), the sections that are respectively responsible for these business processes (e.g., the four sections "R & D", "finance", "hardware" and "software" in the case of the business process "development"), and the tasks that are respectively assigned to these sections (e.g., the two tasks "need analysis" and "develop specifications" in the case of the section "R & D" for the business process "development"), on the basis of the project data for the project "EDMS" in the data base, and further grasps all of the employees belonging to the respective sections on the basis of the employee data for each section in the data base. Furthermore, on the basis of the abovementioned grasped information, the section task manager displays employee—section task assignment tables 643 and 644 respectively corresponding to business processes "development" and "design" contained in the project "EDMS" in the main window 601 as shown in FIG. 34. Even in cases where all of the employee—section task assignment tables 643 and 644 cannot be simultaneously displayed in the main window 601 (as in the example shown in the figures), the desired employee—section task assignment tables can be displayed by scrolling the main window 601 using the scroll bar 639 or the like.

In the employee—section task assignment tables 643 and 644 for the respective business processes, a combo box which has a pull-down menu in which {for example) the names of all of the employees of the section in question are listed is provided in the employee cell in the row of each task of each section, and any of the employees of this section can be assigned as the person responsible for this task using this employee comb box. Furthermore, a combo box which has a pull-down menu in which (for example) the names of all of the employees of the section in question are listed is provided in the reviewer cell in the row of each task, an any of the employees of this section can be assigned as the reviewer of the results of the task performed by the person responsible for the task using this employee combo box. Furthermore, the expected start time and expected end time of the task in question can be entered in the expected start time and expected end time cells in the row of each task. Furthermore, assignments or settings in the employee—section task assignment tables 643 and 644 can also be left as "open". When the "OK" button (not shown in FIG. 34) disposed beneath the employee—section task assignment tables 643 and 644 is pressed, the PM 14 registers the assignments and settings in the employee—section task assignment tables 643 and 644 in the data base as a part of the project data for the selected project.

Figure 35:
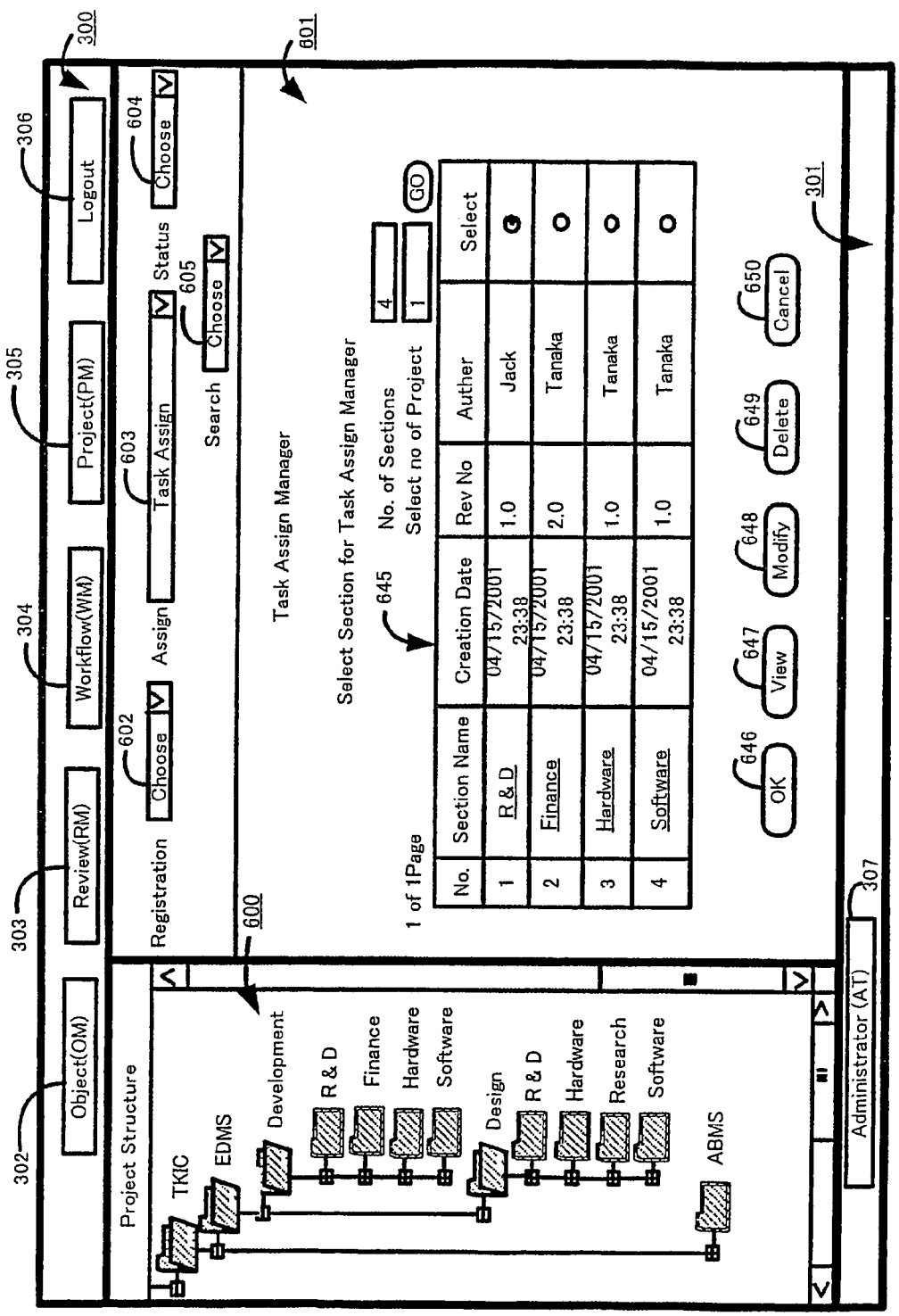
FIG. 35 is a diagram which shows an example of the GUI window provided by the project manager.

Referring again to FIG. 30, in cases where the user desires to assign in general, to an arbitrary section, one or a plurality of tasks that are to be performed by this section, or in cases where the use desires to alter a task that has already been assigned in general, the user can select "section—task assignment" ("task assign") from the pull-down menu 603M of the assign combo box 603. When this is done, the PM 14 displays a section list 645 that lists all of the sections registered in the data base, and displays an OK button 646, view button 647, alter button 648, delete button 649, cancel button 650 and the like beneath this section list 645, as shown in FIG. 35. After selecting the desired section from the section list 645, the user can press the OK button 646 if he desires to assign a new task to this section, or can press the alter button 648 if he desires to alter a task that has already been assigned.

Figure 36:
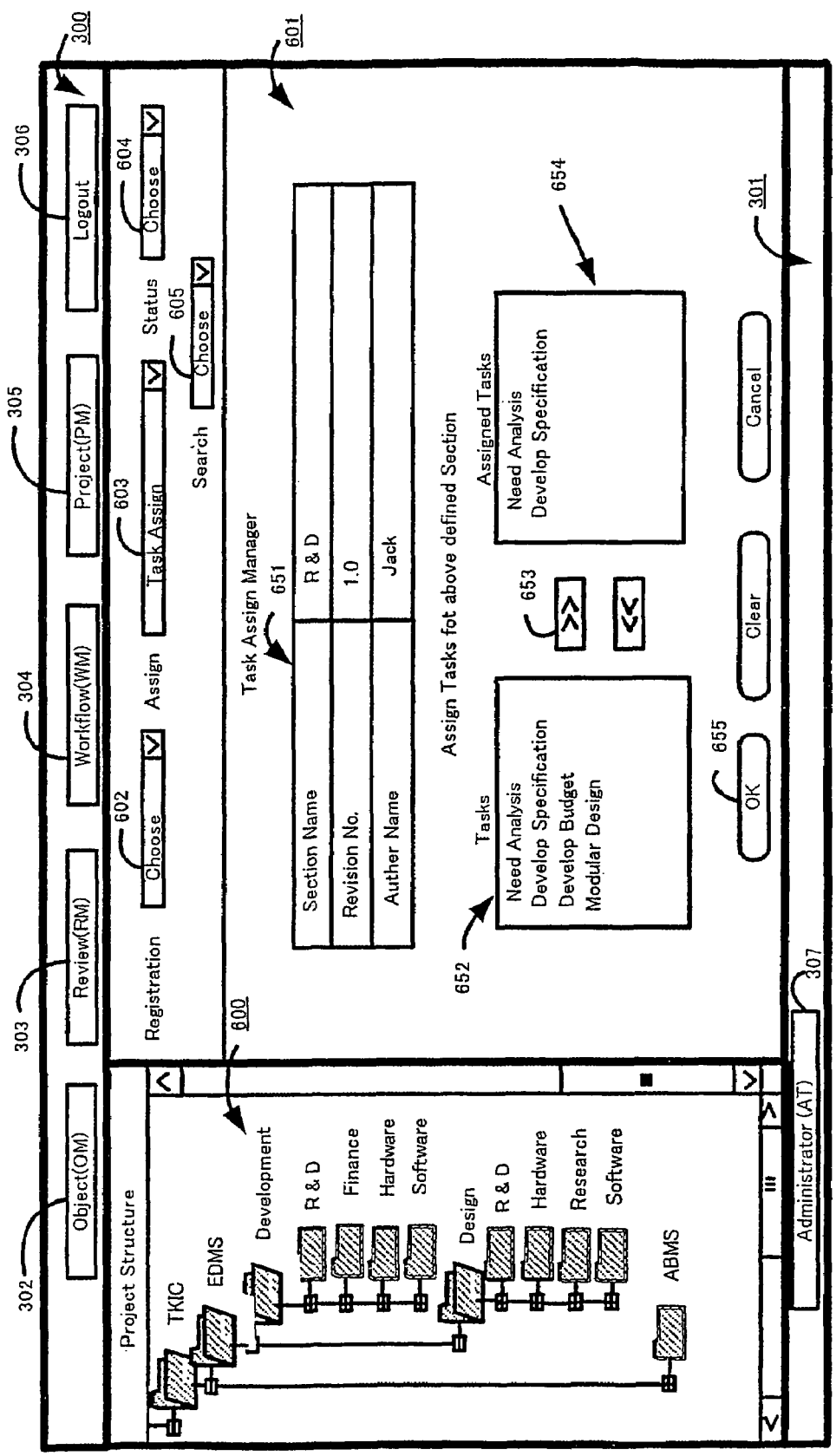
FIG. 36 is a diagram which shows an example of the GUI window provided by the project manager.

Here, let us assume for example that the user has selected the section "R & D" from the section list 645, and has pressed the OK button 646. When this is done, the PM 14 displays the GUI of a task assign manager, which is a tool that is used to assign tasks in general to the section "R & D", in the main window 601 as shown in FIG. 36. A section basic information table 651, a task list 652, an assign button 653, an assigned task list 654, an OK button 655 and the like are displayed in the GUI of the task assign manager. Basic information concerning the selected section "R & D" is displayed in the section basic information table 651. The names of all of the tasks registered in the data base are listed in the task list 652. The names of all of the tasks assigned to the selected section "R & D" are listed in the assigned task list 654. When the user selects an arbitrary task from the task list 652 and presses the assign button 653, the PM 14 adds the name of the selected task to the assigned task list 654. When the user presses the "OK" button 655, the PM assigns the tasks listed in the assigned task list to the selected section, and registers assigned task data that indicates these assigned tasks in the data base. The assigned task data (for each section) thus registered is displayed in the rows corresponding to the respective sections in the task—section work phase assignment tables 637 and 638 in the GUI of the section phase manager shown for example in FIG. 32 (already described).

Figure 37:
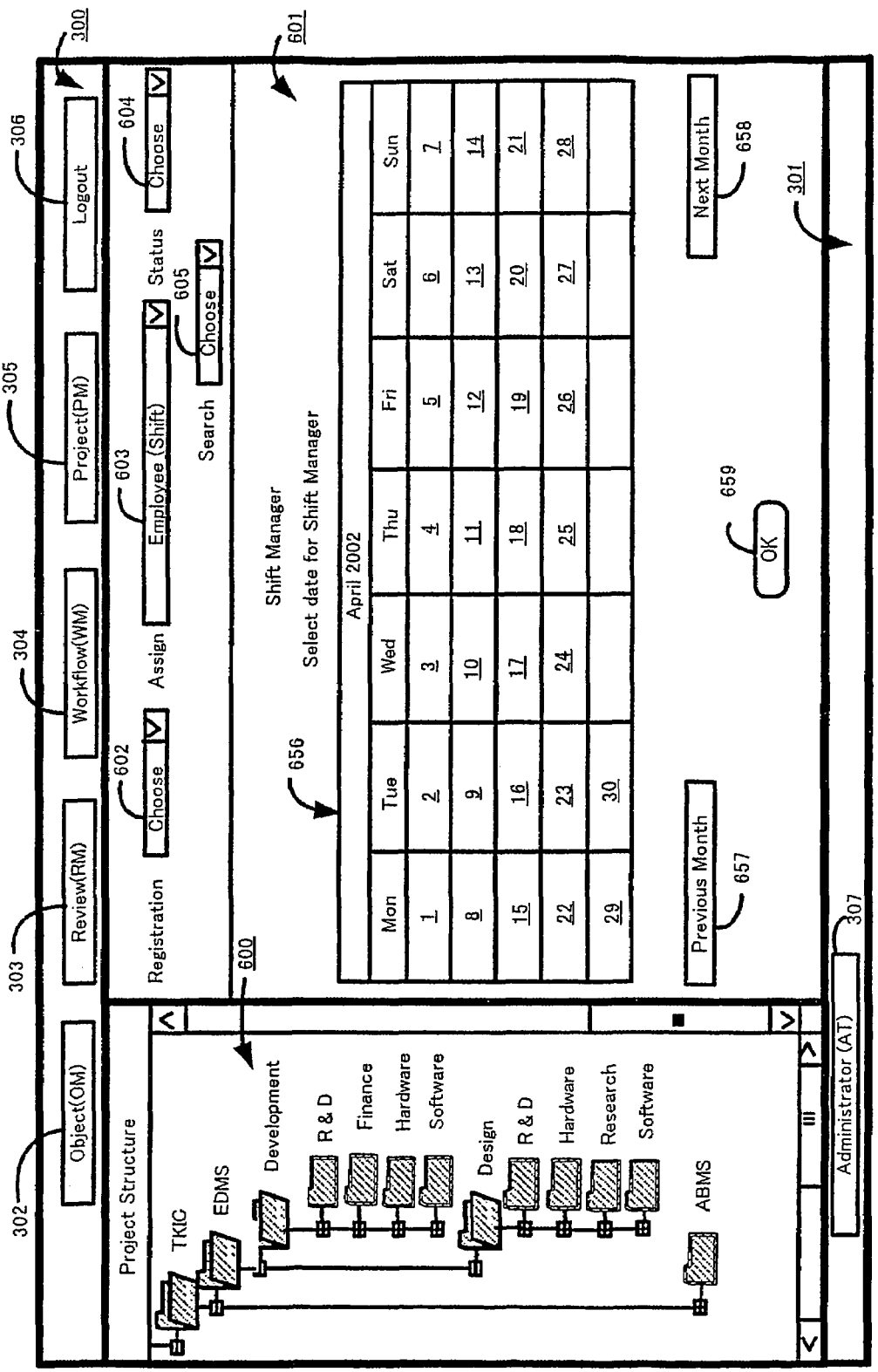
FIG. 37 is a diagram which shows an example of the GUI window provided by the project manager.
Figure 38:
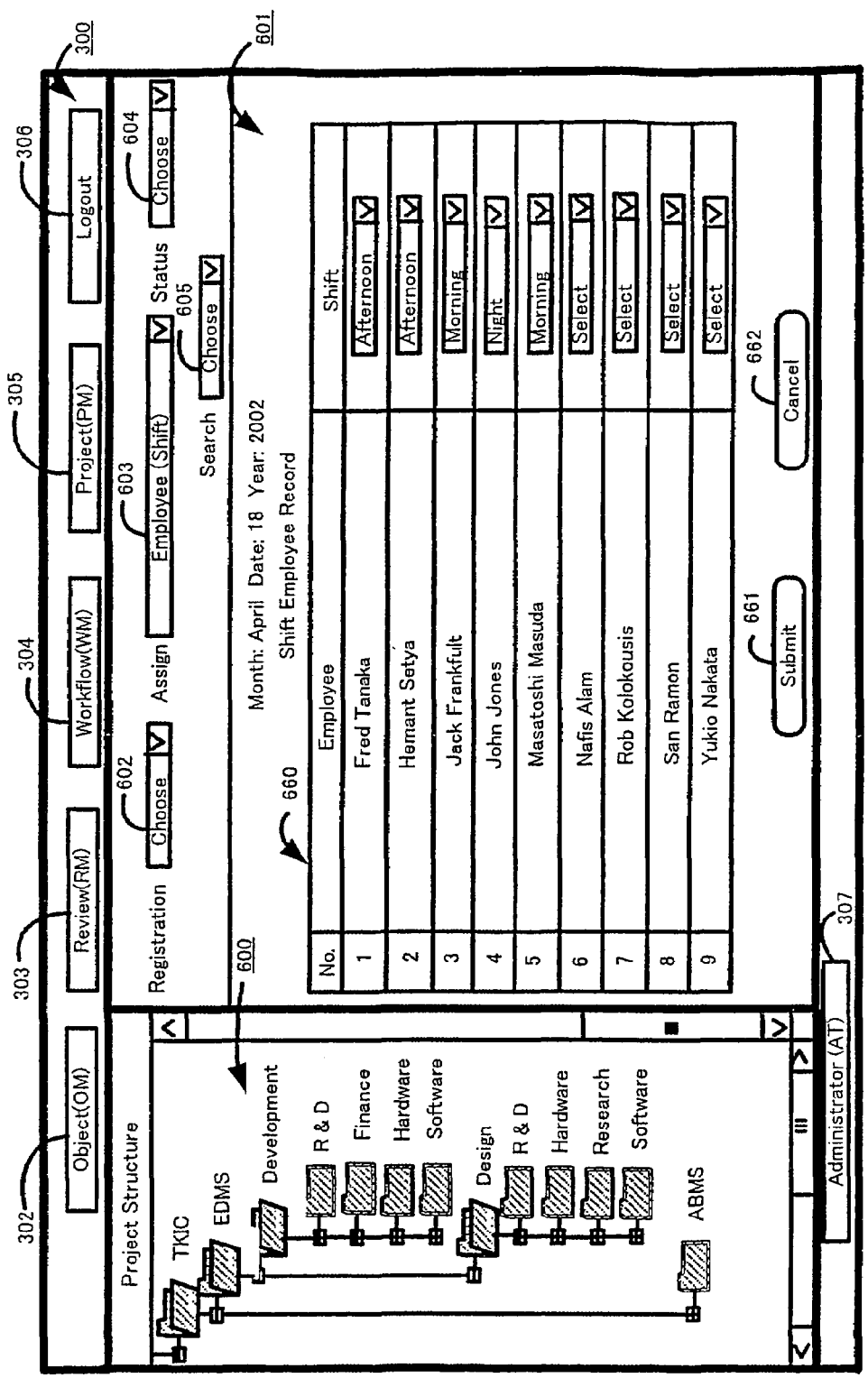
FIG. 38 is a diagram which shows an example of the GUI window provided by the project manager.
Figure 39:
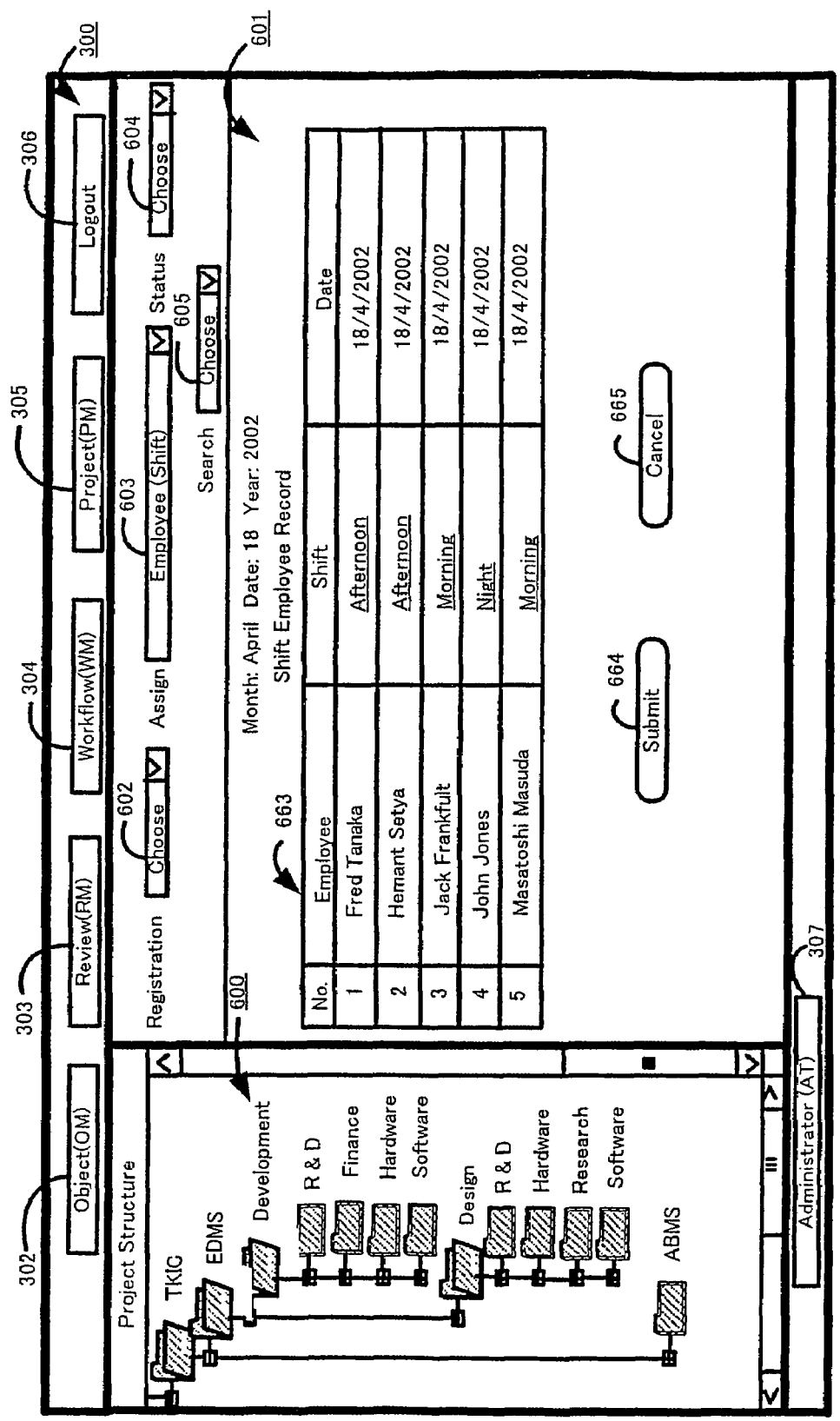
FIG. 39 is a diagram which shows an example of the GUI window provided by the project manager.

Referring again to FIG. 30, in cases where the user desires to assign an arbitrary shift to employees, or in cases where the user desires to alter a shift that has already been assigned, the user can select "employee—shift assignment" ("employee (shift)") from the pull-down menu 603M of the assign combo box 603. When this is done, the PM 14 displays the date selection GUI of a shift manager, which is a tool that is used to assign shifts to employees, in the main window 601 as shown in FIG. 37. A calendar table 656 for a selected month, a previous-month button 657, a next-month button 658, an OK button 659 and the like are displayed in this date selection GUI. When the user operates the previous-month button 657 or next-month button 658 as necessary so that the calendar table 656 for the desired month is displayed, and then presses the OK button 659, and then selects the desired data in this calendar table 656 and presses the OK button 659, the PM 14 displays a GUI that is used for employee—shift assignment on the selected date of the shift manager in the main window 601 as shown in FIG. 38. An employee—shift table 660, a submit button 661 and the like are displayed in this GUI used for shift assignment. All of the shift employees registered in the data base are listed in the employee—shift table 660, and the system is arranged so that any shift selected from a plurality of shifts registered in the data base (e.g., "morning", "afternoon" and "night" registered using the workflow manager 13) can be assigned to the respective employees using (for example) a combo box. When the user presses the submit button 661 after assigning desired shifts to desired employees using the employee—shift table 660, the PM 14 displays a GUI used for shift assignment confirmation (as shown in FIG. 39) in the main window 601. A shift assignment table 663 indicating the shift assignments determined by the employee—shift table 660 shown in FIG. 38, a submit button 664 and the like are provided in the GUI used for shift assignment confirmation. When the user presses the submit button 664, the PM 14 registers shift assignment data expressing the shift assignments in the data base.

As a result of the functions of the PM 14 described above, project data in which workflow model data for one or a plurality of business processes contained in the process (e.g., 184, 197 and the like in FIG. 6), form definition data containing one or a plurality of forms respectively used in these business processes (e.g., 185 in FIG. 6), task assignment data (for each work phase) for one or a plurality of sections that are respectively responsible for these business processes (e.g., 192 in FIG. 6), setting data for the expected start and end times of the work for these sections (e.g., 191 in FIG. 6), role assignment data for the employees of these sections (e.g., 193 in FIG. 6) and the like are associated can be registered in the data base for each project, as in the case of the project data 183 for the project "PROJ1" shown as an example in FIG. 6.

As was described with reference to FIG. 6, the PM 14 creates task lists 181 and 182 (shown for example in FIG. 6) which indicate tasks that are to be performed (or that cannot be performed) by the respective sections or employees in order to perform the projects in question on the basis of project data for all of the projects registered in the data base. These task lists 181 and 182 are provided to the user terminals of the respective sections or employees by the object manager (OM) 11. FIGS. 40 through 44 show examples of several GUI screens that are provided to the user terminals of the respective sections or employees by the OM 11 on the basis of the task lists.

Figure 40:
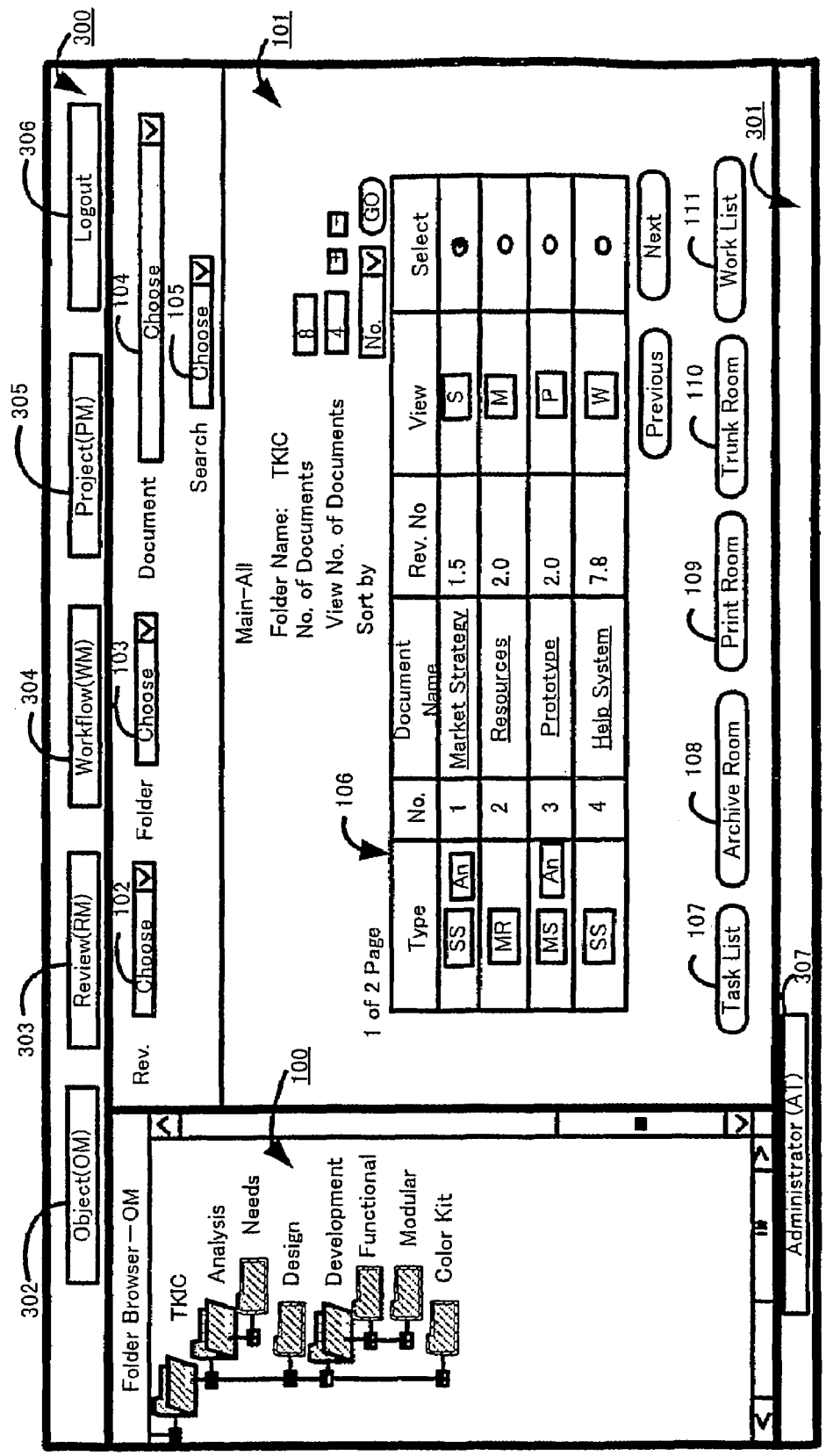
FIG. 40 is a diagram which shows an example of the GUI window provided by the object manager.
Figure 41:
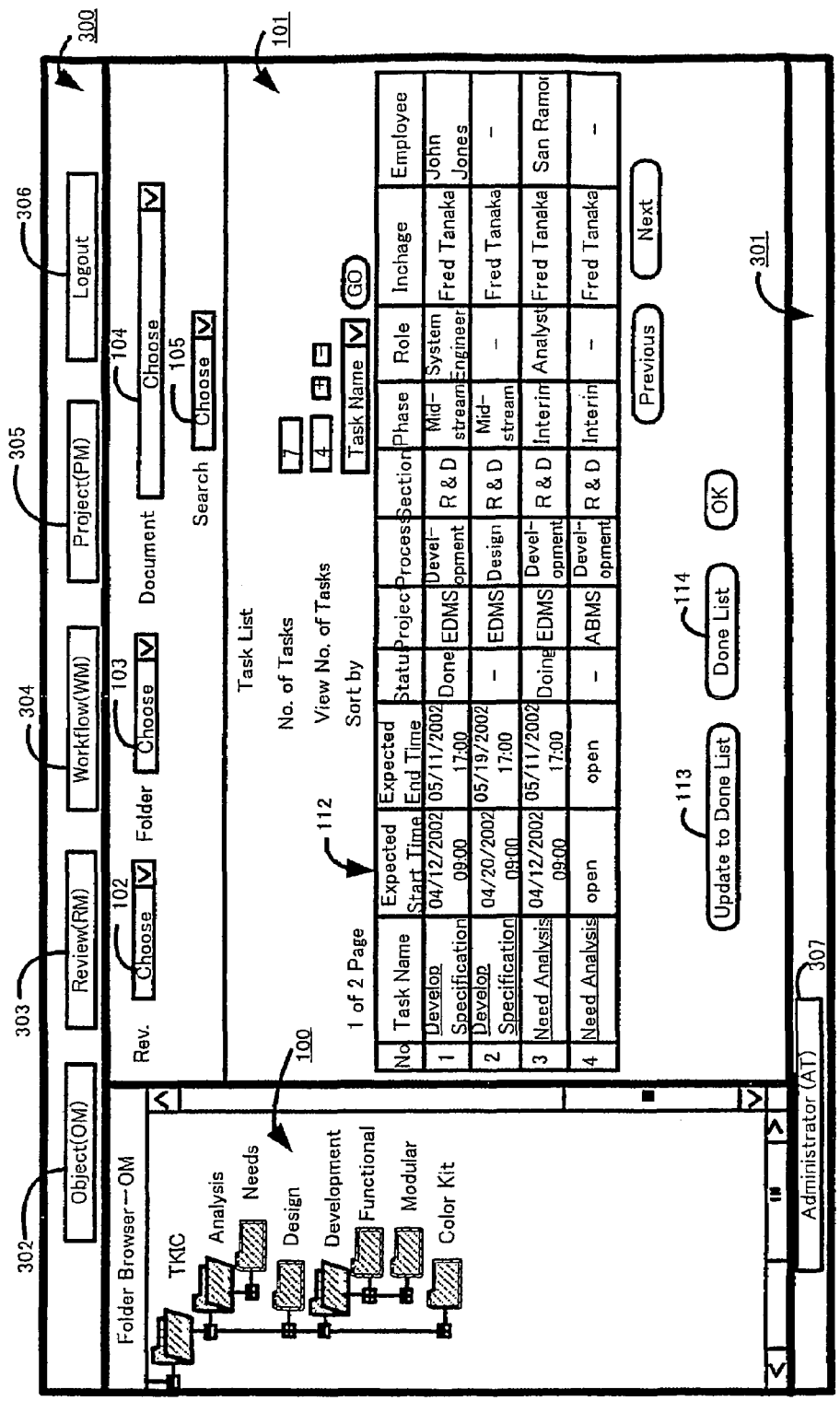
FIG. 41 is a diagram which shows an example of the GUI window provided by the object manager.

FIG. 40 shows one example of the GUI window of the OM 11 that is displayed when the user (employee) opens the OM 11.

The sub-windows that are peculiar to the OM 11 in this window are the two sub-windows 100 and 101 in the center. The sub-window 100 on the left side in the center is called a "folder browser window". A folder "TKIC" which expresses a specified business category (e.g., "TKIC") is displayed in this window, and various hierarchically associated folders which are used to manage various objects (documents) registered in the data base in connection with this business category are displayed under this folder "TKIC". The respective folders are displayed by icons which have configurations that make it possible to distinguish at a glance which folders can be accessed and which folders cannot be accessed by the employees (e.g., different colors according to this distinction) on the basis of folder security data for the employees that has been preset using the administration manager (AM) 15 (e.g., 53 or 54 in FIG. 4).

The sub-window 101 on the right side in the center is called the "object manager (OM) main window". An object list 106 which lists all of the objects present in the folder that has currently been opened by the user in the folder browser window 100 is displayed in this sub-window 101. Furthermore, a task list button 107, archive room button 108, print room button 109, trunk room button 110, work list button 111 and the like are located beneath the object list 106. When the user presses the task list button 107, the OM 11 displays the GUI shown in FIG. 41 in the main window 101; a task list 112, done task list update (update to done list) button 113, done task list (done list) button 114 and the like are displayed in this GUI.

All of the tasks that are currently to be performed or that can be performed by the user, or that are currently to be managed or that can be managed by the user, can be listed in the task list 112. For example, the task list 112 is automatically created by the PM 14 on the basis of the project data for all of the registered projects, the data for tasks assigned to each section contained in this project data, the current state of progress of all of the business projects contained in the project data, the section to which the user belongs and the like. FIG. 45 shows one example of the procedure whereby the PM 14 produces the task list.

As is shown in FIG. 45, the PM 14 repeats the processing loop of S2 for all of the registered projects. Furthermore, in the processing loop for each project, the PM 14 repeats the steps from S3 through S5 for all of the business processes contained in the project. In step S3, the PM 14 grasps the tasks that are respectively assigned to the sections responsible for the business processes (these are the tasks assigned using the section task manager shown for example in FIG. 32) on the basis of the project data. In step S4, the PM 14 judges (with respect to each business process in question) which tasks of which sections can be started at the current point in time, this judgement being made on the basis of the conditions of completion or non-completion of the assigned tasks of each section. For example, the question of whether or not the tasks of a certain section can currently be started or not can be judged from whether or not sections positioned before the section in question in the order of work in the workflow have completed their assigned tasks. To describe a concrete example, in a case where the workflow of the business process is a workflow such as that shown for example in the area 541 of FIG. 16, if no section has completed it assigned tasks, it can be judged that the tasks that can currently be started are only the assigned tasks of the starting section "R & D". Subsequently, when at least one of the tasks of the section "R & D" is completed, or when all of the tasks of the section "R & D" are completed, it can be judged that the tasks that can currently be started are the assigned tasks of the second sections "finance" and "hardware". Then, when at least one of the tasks of the sections "finance" and "hardware" is completed, or when all of the tasks of the sections "finance" and "hardware" are completed, it can be judged that the tasks that can currently be started are the assigned tasks of the final section "quality test". Here, the question of whether or not the respective tasks have been completed can be judged, in the GUI as shown in 43 to be described later, for example, according to whether or not a status of "100%" has already been set for all of the deliverables of the sub-tasks contained in the task (these deliverables are documents that are created as a result of the performance of the sub-tasks contained in the task by the person responsible for the task; these documents can be created using the document templates set in the document template table 574 in the GUI shown for example in FIG. 22). Thus, in step S4, the PM 14 extracts the tasks that can currently be started from assigned tasks of each section. In step S5, the OM 11 lists the extracted tasks that can currently be started in each section in a task list for each section. The OM 11 can provide task lists for one or a plurality of sections to which the users belong (or which are managed by the users) to the user terminals of the users.

Reference is again made to FIG. 41. The task name, expected start time, expected end time, status, project, process, section, work phase (phase), role, process manager (in-charge), responsible employee (employee) and the like are displayed in the task list 112 for each of the tasks listed in this task list 112. The expected start time and expected end time can be set in the GUI shown in FIG. 34. The status indicates whether the task has not yet been started (unmarked), is being performed (doing), or has been completed (done). The assigned employee and role indicate the name and role of the employee responsible for the task. In cases where data indicating the assignment of the task to an employee is not contained in the registered project data, nothing is initially displayed in the assigned employee and role cells. Later, however, when a certain employee starts the task (e.g., when this employee presses the OK button 119 in the GUI shown in FIG. 44, which will be described next), the OM 11 displays the name and role of this employee in the assigned employee and roll cells of the task list 112.

When the user presses the update to done list button 113 beneath the task list 112, the OM 11 deletes the tasks whose current status is "done" from the task list 112, and transfers these tasks to the done list (not shown in the figures). When the user pressed the done list button 114, the OM 11 shows the done list (not shown in the figures) in the main window 101.

Figure 42:
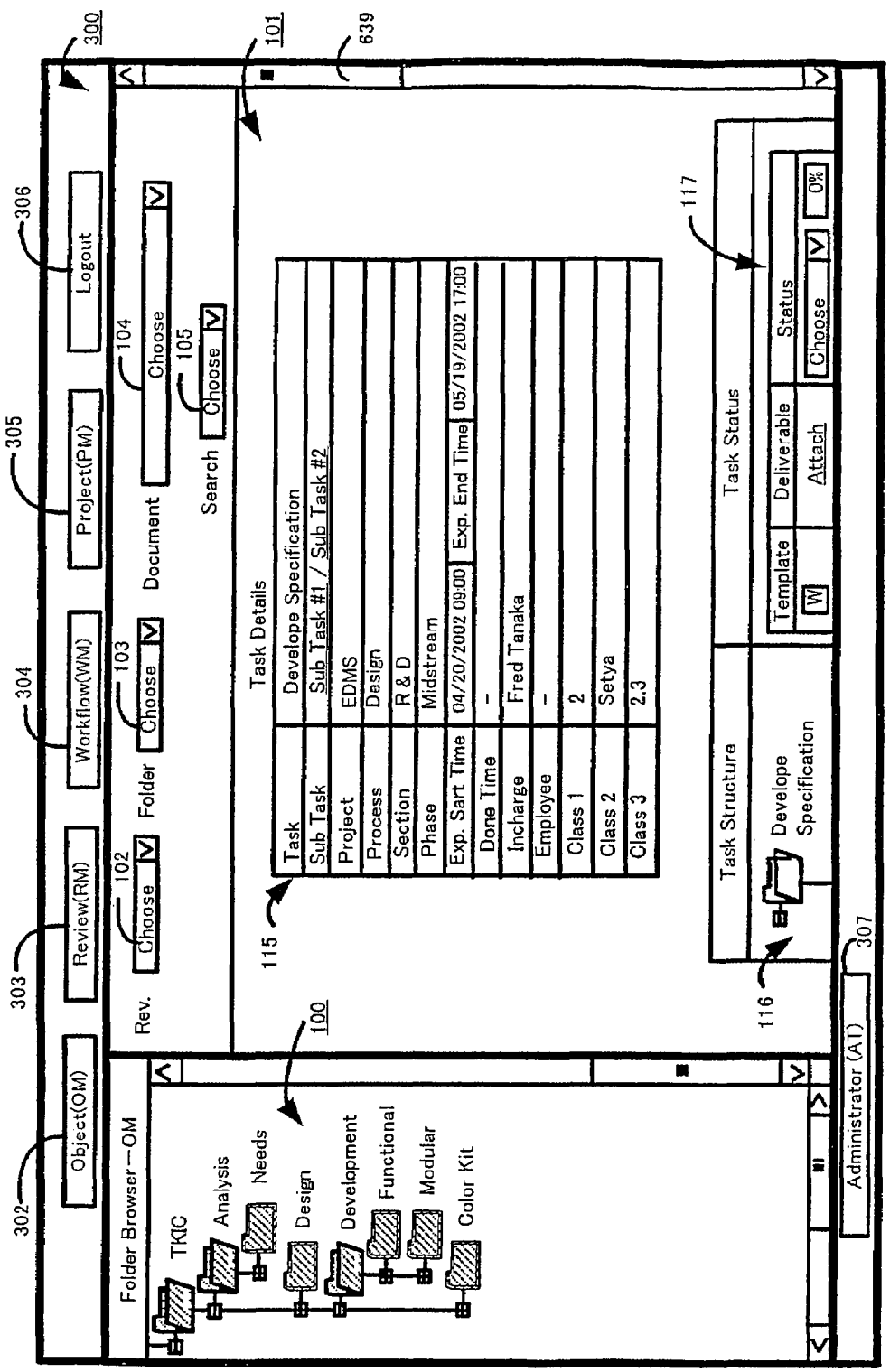
FIG. 42 is a diagram which shows an example of the GUI window provided by the object manager.
Figure 43:
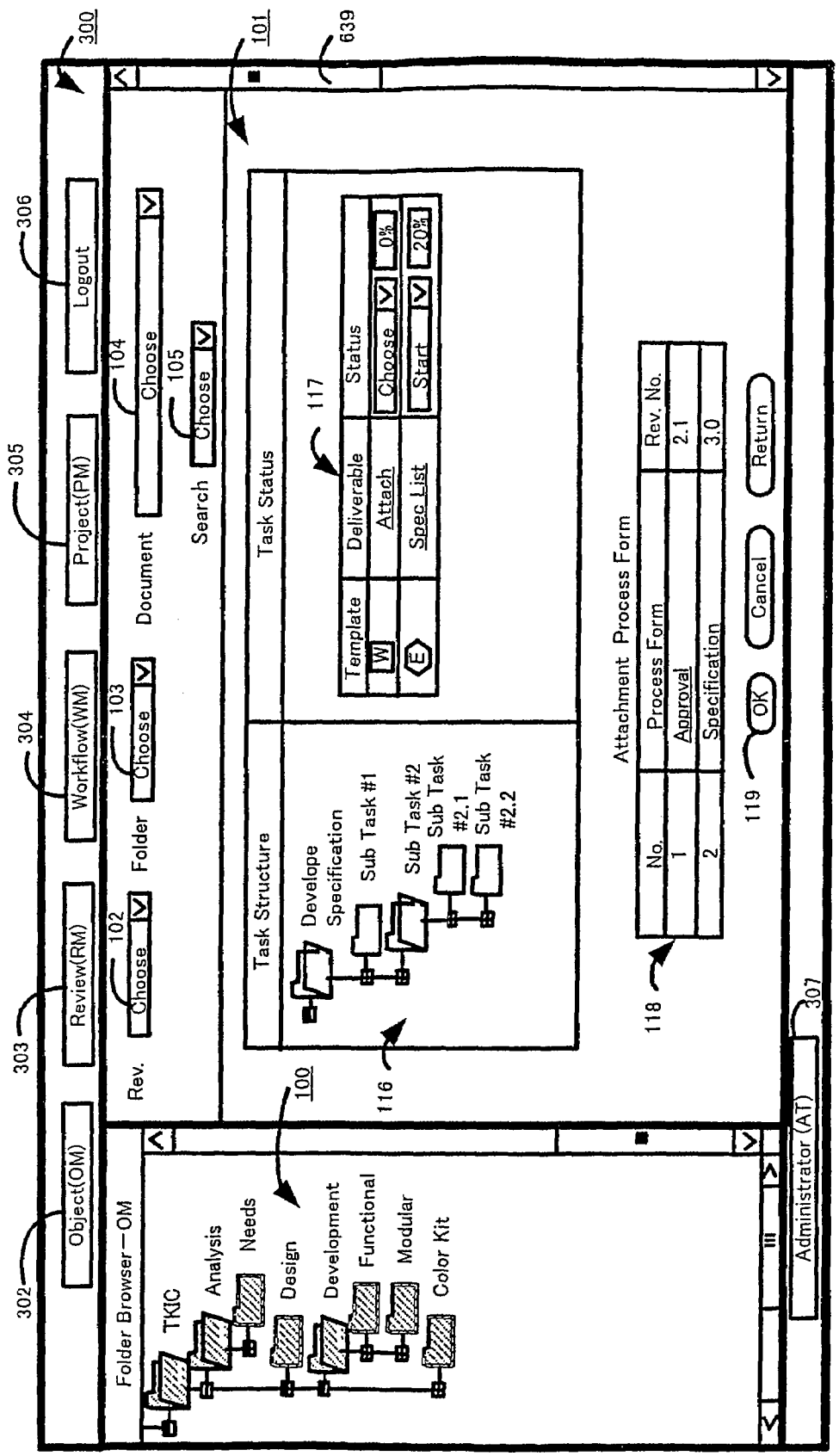
FIG. 43 is a diagram which shows an example of the GUI window provided by the object manager.

Furthermore, when the user selects an arbitrary task name from the task list 112 by a method such as (for example) double-clicking or the like, the OM 11 displays a GUI such as that shown in FIGS. 42 and 43 (FIGS. 42 and 43 show a case in which the same GUI window has been scrolled in the vertical direction) in the main window 101. A task detail table 115 is provided in this GUI shown in FIGS. 42 and 43, and detailed information concerning the selected task is displayed in this table. A task structure box 116 and a task status table 117 are displayed beneath the task detail table 115. A tree structure of the sub-tasks contained in the selected task is graphically displayed in the task structure box 116 using folder icons that respectively express the task and sub-tasks; the sub-tasks displayed here are sub-tasks that have been registered using the GUI shown in FIGS. 22 and 23. When the user selects an arbitrary sub-task from the task structure box 116, the OM 11 displays icons expressing one or more document templates used to create the deliverables of the selected sub-task (these are document templates that have been set in the document template table 574 in the GUI shown for example in FIG. 22) in the left-end portion of the task status table 117, and displays the character sequence "attach" on the right side of these icons. When the user selects an arbitrary icon in the task status table 117 by an operation such as clicking or the like, the OM 11 opens the document template corresponding to the selected icon on the screen; accordingly, the user can create documents as deliverables using this document template, and can store these document files in an arbitrary directory. When the user selects the character sequence "attach" inside the task status table 117 by an operation such as clicking or the like, the OM 11 opens a tool which is used to attach an arbitrary document file of this arbitrary directory to the selected task as a deliverable (e.g., a tool which has a function similar to the attachment tool that is used to select attached documents in a common email program). Accordingly, using this attachment tool, the user can attach document files that were just created and stored using the document template as deliverables of the selected sub-task. When a deliverable document file is thus attached, the OM 11 changes the character sequence "attach" that was just operated in the task status table 117 to the file name of the attached document file. For instance, in the example shown in FIG. 43, the document file name "spec list" is displayed in the task status table 117; this means that a document file with the name of "spec list" has been attached as a deliverable of the selected task. When the user selects an attached document file name in the task status table 117 by an operation such as (for example) clicking or the like, the OM 11 opens this document file; accordingly, the user can view the contents of this document file. Furthermore, a combo box is provided for each document constituting a deliverable at the right end of the task status table 117, and the user can enter the status or degree of completion of each of the documents using these combo boxes. The status and corresponding degrees of completion that can be selected using these combo boxes (e.g., "start", "in progress" and "done" as status, and "20%", "50%" and "100%" or the like as corresponding degrees of completion) can be set beforehand using the administration manager 15.

A process form table 118 is displayed beneath the task structure box 116 and task status table 117, and forms that are used in reports regarding the selected task (these are forms selected in the GUI shown for example in FIG. 9 when the business process to which the selected task belongs is registered) are listed in this process form table 118. When the user selects an arbitrary form in the form table 118 by an operation such as (for example) clicking or the like, the OM 11 displays a process work sheet input form such as that shown in FIG. 44 in the main window 101, and the selected form 121 is opened in this input form; accordingly, the user can input arbitrary report items in this form 121. Furthermore, a form selection combo box 122 which is used to select other report forms used in the selected sub-task, and an attached document table 123 which lists attached document files as the abovementioned other forms and deliverables, are displayed beneath this opened form 121. When the user selects an attached document file as another report form or deliverable using the form selection combo box 122 or attached document table 123, the OM 11 either displays the selected form on the process work sheet input form in the main window 101, or opens the attached document file as the selected deliverable on the screen; accordingly, the user can refer to or edit the displayed form or opened attached document file. When the user presses the submit button 124 displayed at the lower end of the process work sheet input form, the OM 11 returns the display of the main window 101 to the GUI shown for example in FIGS. 42 and 43. When the user presses the OK button displayed at the lower en of the GUI in the main window 101 shown for example in FIGS. 42 and 43, the OM 11 associates the attached (or edited) report form or attached document file (as a deliverable) with the selected sub-task of the selected task of the selected business process of the selected project, and registers this form or deliverable in the data base (or updates a form or attached document file that has already been registered in this way). In addition, the OM 11 associates the status or degree of completion of attached document files (as deliverables) that have been entered in the task status table 117 in the GUI shown in FIGS. 42 and 43 with the respective attached document files, and registers this information in the data base. Furthermore, in cases where the OM 11 registers one or more attached document files in the data base as deliverables of a certain task or sub-task, the one or more attached document files can be registered in the data base as a single object (e.g., with a plurality of document files being converted into a multi-document object).

Thus, for a certain task belonging to a certain business process of a certain project, when the employee of a certain section that performs this task temporarily registers a form as a report or an attached document file as a deliverable in the data base, the employee who takes over the following task belonging to the same business process of the same project can subsequently ascertain the report items or results of the previous task from the employee who performed the previous task by selecting the following task from the task list displayed on his own user terminal, and opening and viewing the report form or document file (provided as a deliverable), by an operation similar to that described above with reference to FIGS. 41 through 44. Furthermore, the employee who is responsible for the following task can additionally enter his own report items in the same report form, or can additionally attach document files as the deliverables of his own task. Thus, the flow of information among users or sections that perform projects in cooperation is controlled in accordance with the workflow of the respective business processes contained in the project data, and in accordance with the progress of the respective business processes.

Figure 46:
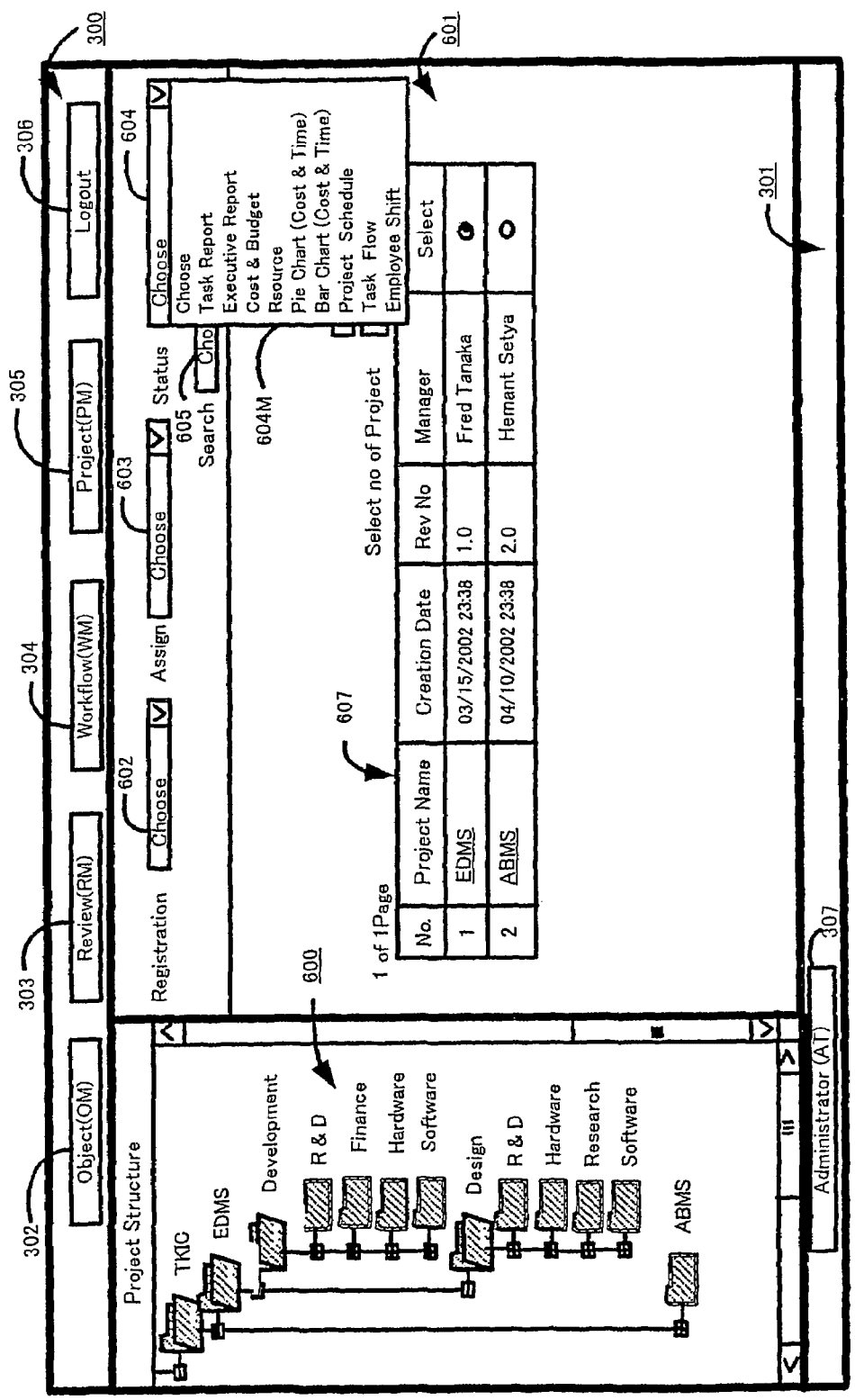
FIG. 46 is a diagram which shows an example of the GUI window provided by the project manager.

Here, the description will again return to a description of the functions of the PM 14. As is shown in FIG. 46, when the pull-down menu 604M of the status combo box 604 in the PM main window 601 is opened, menu items such as task report, executive report, cost and budget, resource, pie chart (cost and time), bar (cost and time), project schedule, task flow, employee shift and the like are provided in this pull-down menu 604M.

Figure 47:
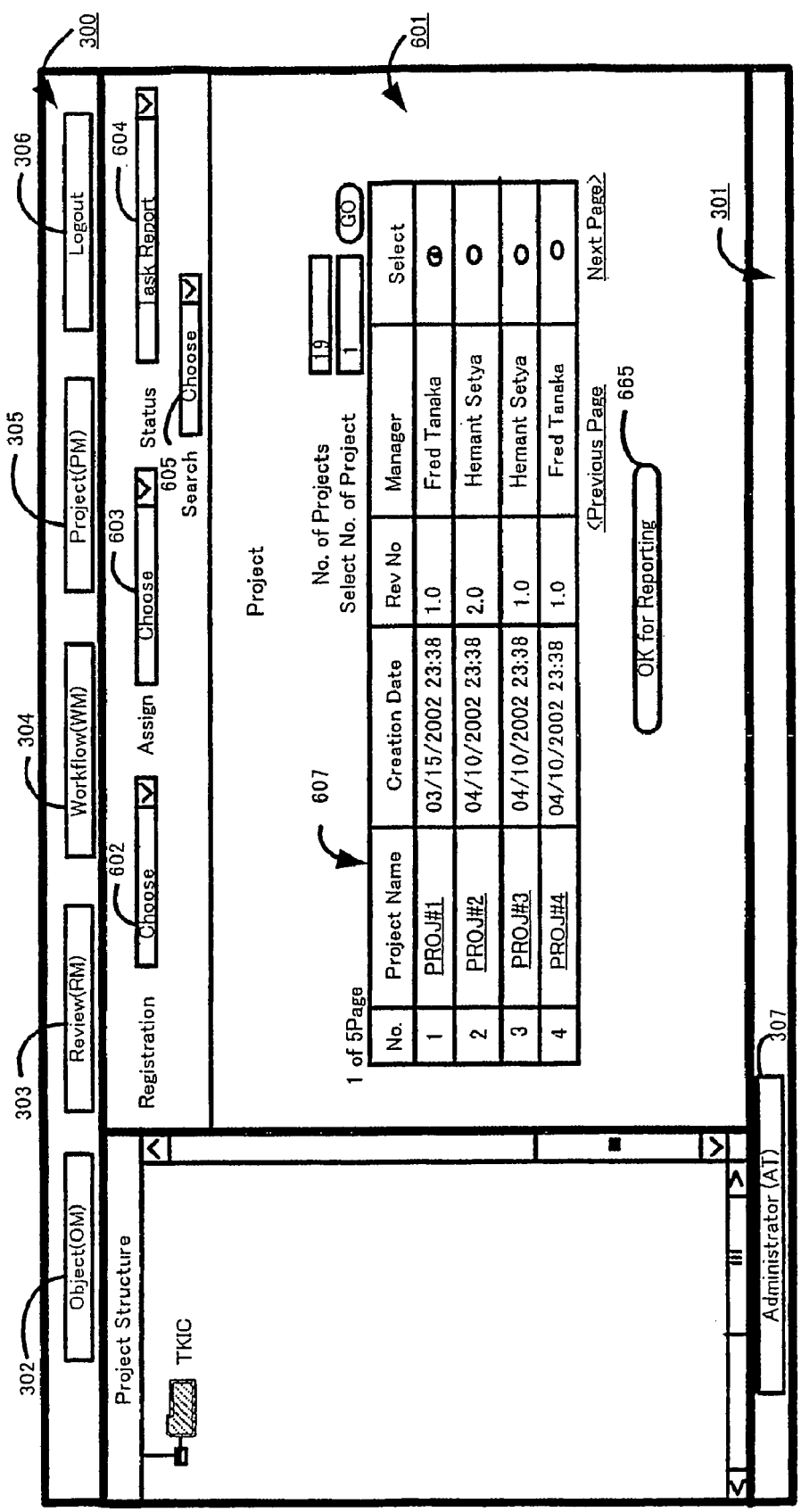
FIG. 47 is a diagram which shows an example of the GUI window provided by the project manager.

When the user selects "task report" from the pull-down menu 604M of the status combo box 604, the PM 14 displays a project table 607 that lists the currently registered projects in the main window 601, and displays a report OK (OK for reporting) button 665 beneath the project table 607, as shown in FIG. 47. Furthermore, the projects listed in the project table 607 are different in the GUI prior to task report selection shown in FIG. 46 and the GUI following task report selection shown in FIG. 47. However, this is merely shown for reasons of convenience in description in the present specification; in actuality, the projects listed in the project table 607 are the same both before and after the selection of the task report.

Figure 48:
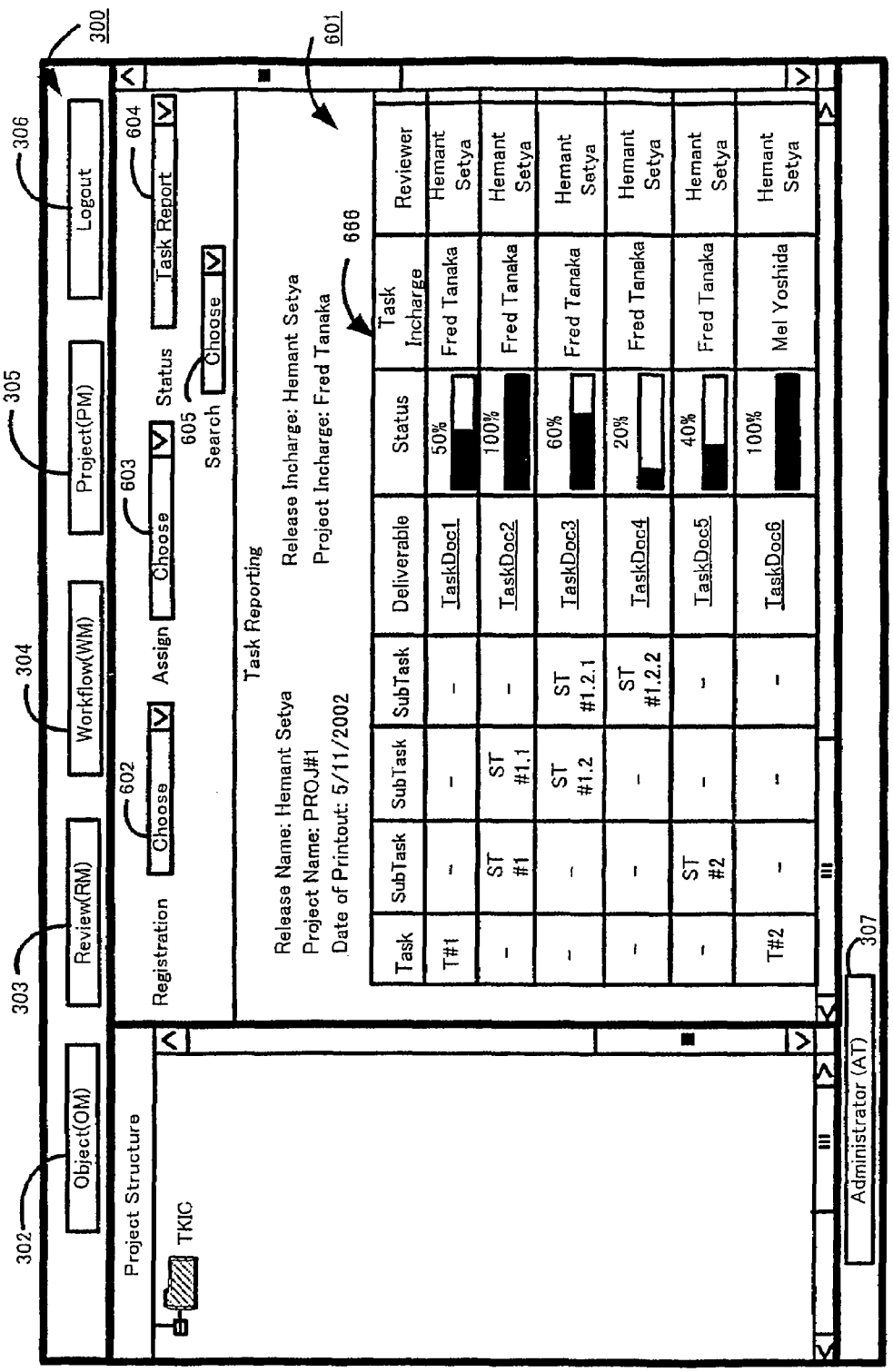
FIG. 48 is a diagram which shows an example of the GUI window provided by the project manager.
Figure 49:
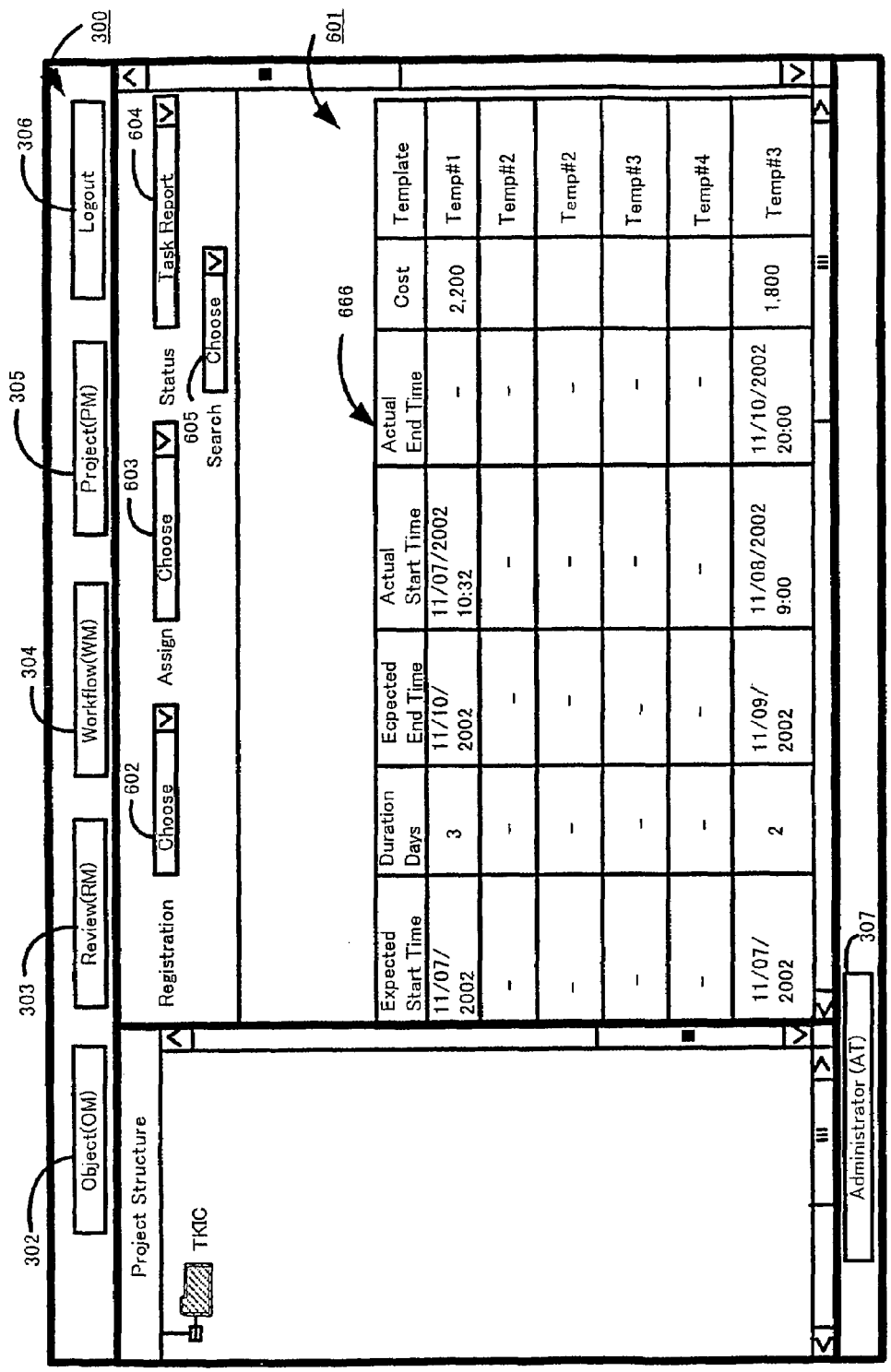
FIG. 49 is a diagram which shows an example of the GUI window provided by the project manager.

In FIG. 47, when the user selects a desired project from the project table 607 and presses the OK for reporting button 665, the PM 14 displays a GUI such as that shown in FIGS. 48 and 49 in the main window 601 (FIGS. 48 and 49 show the display obtained when the same GUI is scrolled in the left-right direction). A task reporting table 666 which expresses the state of progress and various attributes of all of the tasks and sub-tasks contained in the selected project is displayed in this GUI. On the basis of the project data of the selected project in the data base, and the data regarding deliverables of tasks or sub-tasks contained in the selected project associated with this project data, the PM 14 displays the mutual hierarchical relationship among tasks and sub-tasks, the names of objects comprised by combining one or more attached document files constituting deliverables, the status, the name of the administrator (task in charge), the name of the reviewer (reviewer), the planned date and time of starting (expected start time), the number of days required (duration days), the planned date and time of completions (expected end time), the actual date and time of starting (actual start time), the actual date and time of completion (actual end time), the cost, document templates (templates) and the like in the task reporting table 666 for all of the tasks and sub-tasks contained in the selected project.

Figure 50:
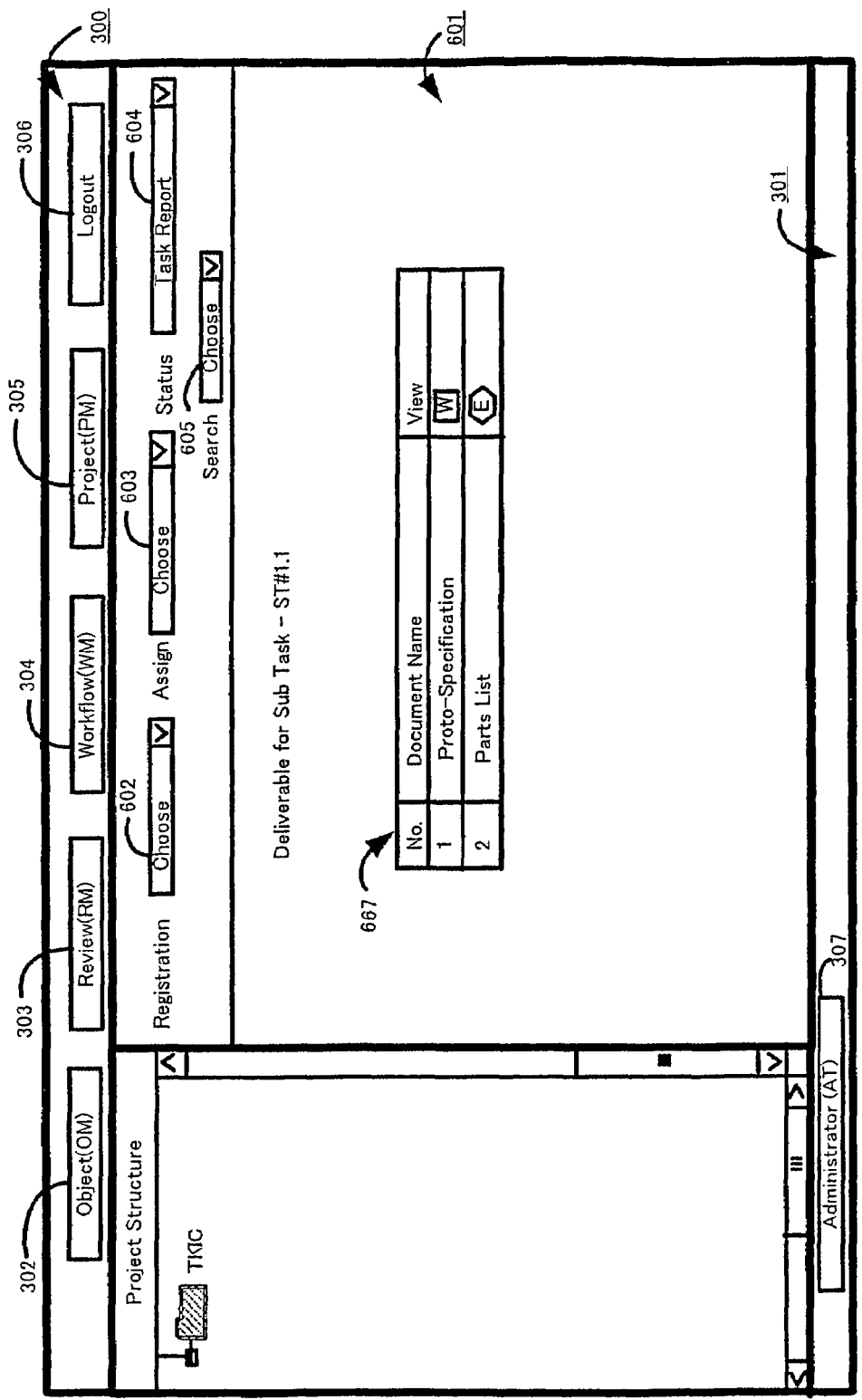
FIG. 50 is a diagram which shows an example of the GUI window provided by the object manager.

When the user selects the object name of the deliverable of an arbitrary task or sub-task displayed in the task reporting table 666 by a method such as clicking or the like, the PM 14 displays a list 667 of the names of the attached document files (i.e., deliverables of the task or sub-task) that constitute the object in the main window 601 as shown in FIG. 50. When the user selects the name of an arbitrary attached document file displayed in the list 667 shown in FIG. 50 by clicking or the like, the PM 14 opens the attached document file that has this name and displays this file on the screen.

Referring again to FIGS. 48 and 49, the expected start times and expected end times of the respective tasks or sub-tasks in the task reporting table 666 are set beforehand for these tasks or sub-tasks using the GUI of the section task manager shown for example in FIG. 34. The actual start times and actual end times are the actual start times and end times of the tasks or sub-tasks that are recognized by the PM 14. For example, when the OK button 118 is pressed after some document file is attached as a deliverable with respect to such a task or sub-task in the task status table 117 shown for example in FIG. 43 and the status of this document file is set as "start", the PM 14 can recognize that the selected task or sub-task has actually been started, and can set this date and time as the actual start time. Furthermore, for example, when the OK button 118 is pressed after the status of all of document files attached as deliverables with respect to such a task or sub-task is set as "done" in the task status table 117 shown for example in FIG. 43, the PM 14 can recognize that the selected task or sub-task has actually been completed, and can set this data and time as the actual end time.

The status of the respective tasks or sub-tasks in the task reporting table 666 shown in FIG. 48 is automatically calculated by the PM 14 on the basis of the degree of completion of the document files constituting deliverables of these tasks or sub-tasks. For example, for a selected task or sub-task, the PM 14 can calculate the mean value of the degrees of completion of all of the document files attached as deliverables in the task status table 117 shown for example in FIG. 43, and can take this mean value as the status of the selected task or sub-task. Furthermore, the cost of each task or sub-task in the task reporting table 666 shown in FIG. 49 is automatically calculated by the PM 14 on the basis of the actual start time and actual end time of the task or sub-task and the hourly compensation rate of the employees responsible for this task or sub-task (registered in the data base beforehand using the administration manager 15). For example, the PM 14 can estimate the actual working time on the basis of the actual start time and actual end time of the task or sub-task (e.g., the number of hours obtained by subtracting the actual start time from the actual end time is multiplied by a specified coefficient and taken as the estimated working time), and the value obtained by multiplying this estimated working time by the hourly compensation rate of the persons responsible for the task or sub-task can be taken as the cost of the task or sub-task.

Figure 51:
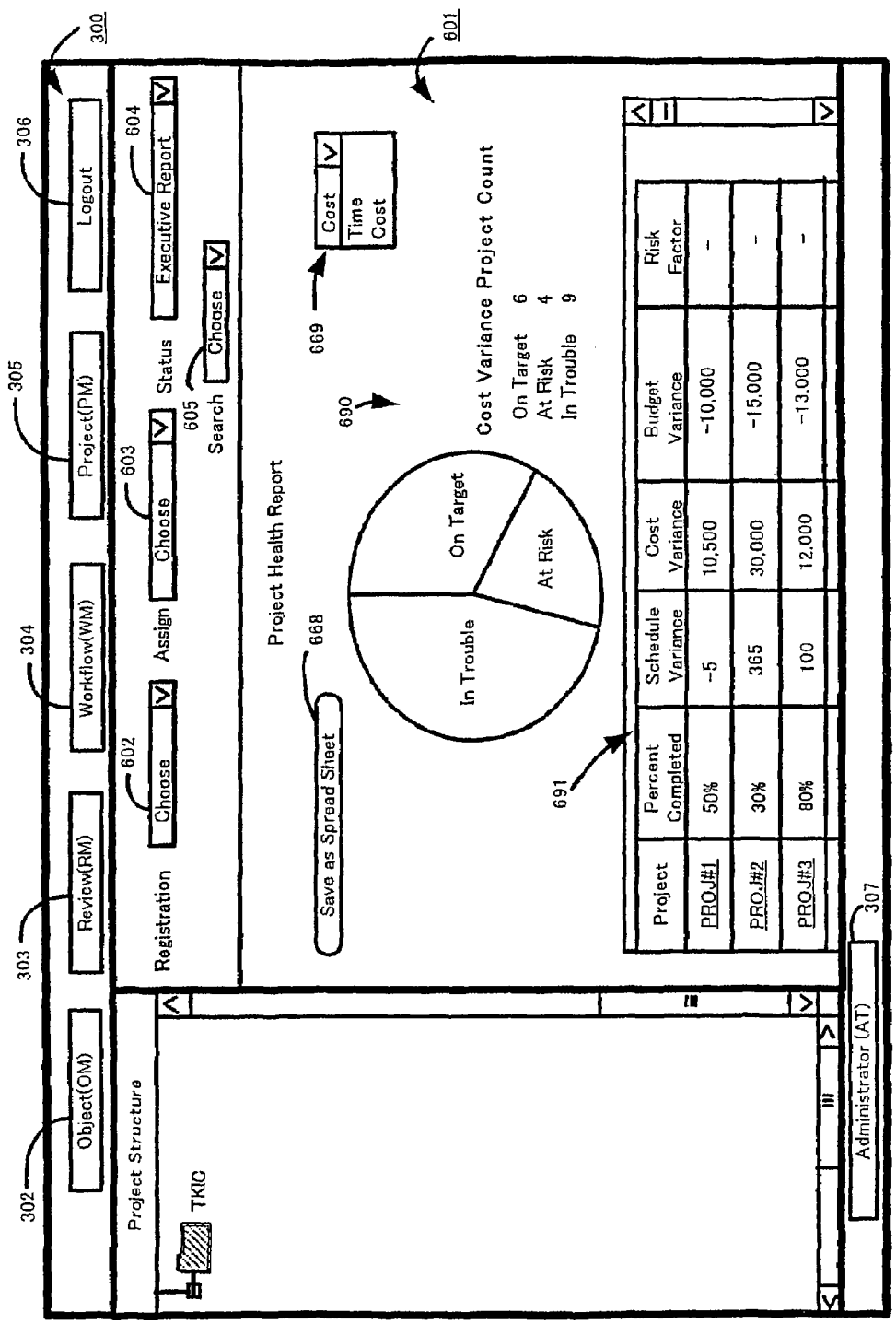
FIG. 51 is a diagram which shows an example of the GUI window provided by the object manager.

Referring again to FIG. 46, when the user selects "executive report" from the pull-down menu 604M of the status combo box 604 in the main window 601, the PM 14 displays a GUI which expresses whether or not the schedule, cost and budget of all of the projects shown in FIG. 51 are as expected in the main window 601. A combo box 669 is provided in this GUI, and the user can select either "time" or "cost" using this combo box. When "time" is selected by the combo box 669, the PM 14 displays a pie chart and table which indicate that the progress of all of the projects is on schedule, or how far the progress has deviated form the schedule (e.g., the numbers and proportions of projects respectively belonging to the three categories of "on time" ("on target"), "possibly late" ("at risk") and "late" ("in trouble")), in a region 690 within the main window 601. When "cost" is selected by the combo box 669, the PM 14 displays a pie chart and table which indicate that the costs of all of the projects are as expected, or how fat the costs have deviated from the expected costs (e.g., the numbers and proportions of projects respectively belonging to the three categories of "as expected or less" ("on target"), "possible exceeding expected cost" ("at risk") or "exceeding expected cost" ("in trouble") in a region 690 within the main window 601. Furthermore, a table 691 which expresses the respective values of the degree of completion (percent completed), schedule variances, cost variance, budget variance, risk factors and the like of all of the projects is displayed beneath the abovementioned pie chart and table. Furthermore, a "save as spread sheet" button 668 is provided in this GUI, and when the user presses this button 668, the PM 14 stores the information displayed in this GUI in the form of a tabular calculation program file.

Figure 52:
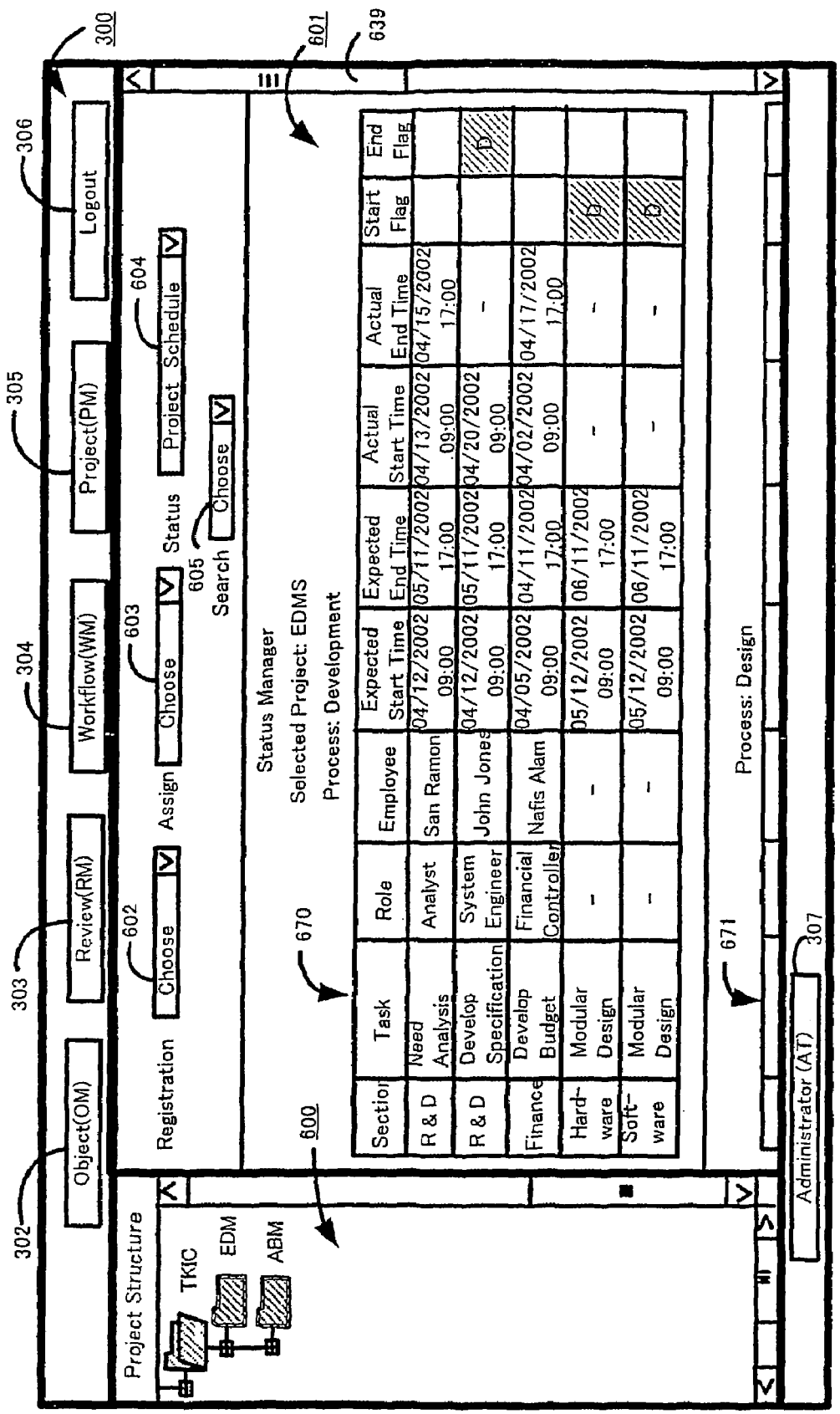
FIG. 52 is a diagram which shows an example of the GUI window provided by the project manager.

Referring again to FIG. 46, when the user selects a desired project from the project table 607 in the main window 601, and selects "project schedule" from the pull-down menu 604M of the status combo box 604, the PM 14 displays the GUI of a status manager, which is a tool that manages the progress of the project shown in FIG. 52, in the main window 601. Process schedule tables 670 and 671 which display the conditions of progress of all of the business processes contained in the selected project for each business process are displayed in this status manager GUI. The section, task name (task), responsible employee (employee), planned starting date and time (expected start time), planned completion date and time (expected end time), actual starting date and time (actual start time), actual completion date and time (actual end time), starting flag (start flag), completion flag (end flag) and the like are displayed for all of the tasks contained in the business processes in the process schedule tables 670 and 671 for the respective business processes. Here, as was already described above, the expected start time and expected end time are set beforehand for the tasks in the GUI shown for example in FIG. 34. Furthermore, as was already described above, the actual start time and actual end time are times recognized by the PM 14 as the actual start times and end times of the tasks. The start flag and end flag are flags which indicate whether or not the actual start times and actual end times of the tasks are later than the expected start times and expected end times. For example, in cases where a task has not yet been started even though the expected start time has passed, a special mark (e.g., a red mark) is displayed in the start flag, and in cases where the task has not yet been completed even though the expected end time has passed, a special mark (e.g., a red mark) is displayed in the end flag.

Figure 53:
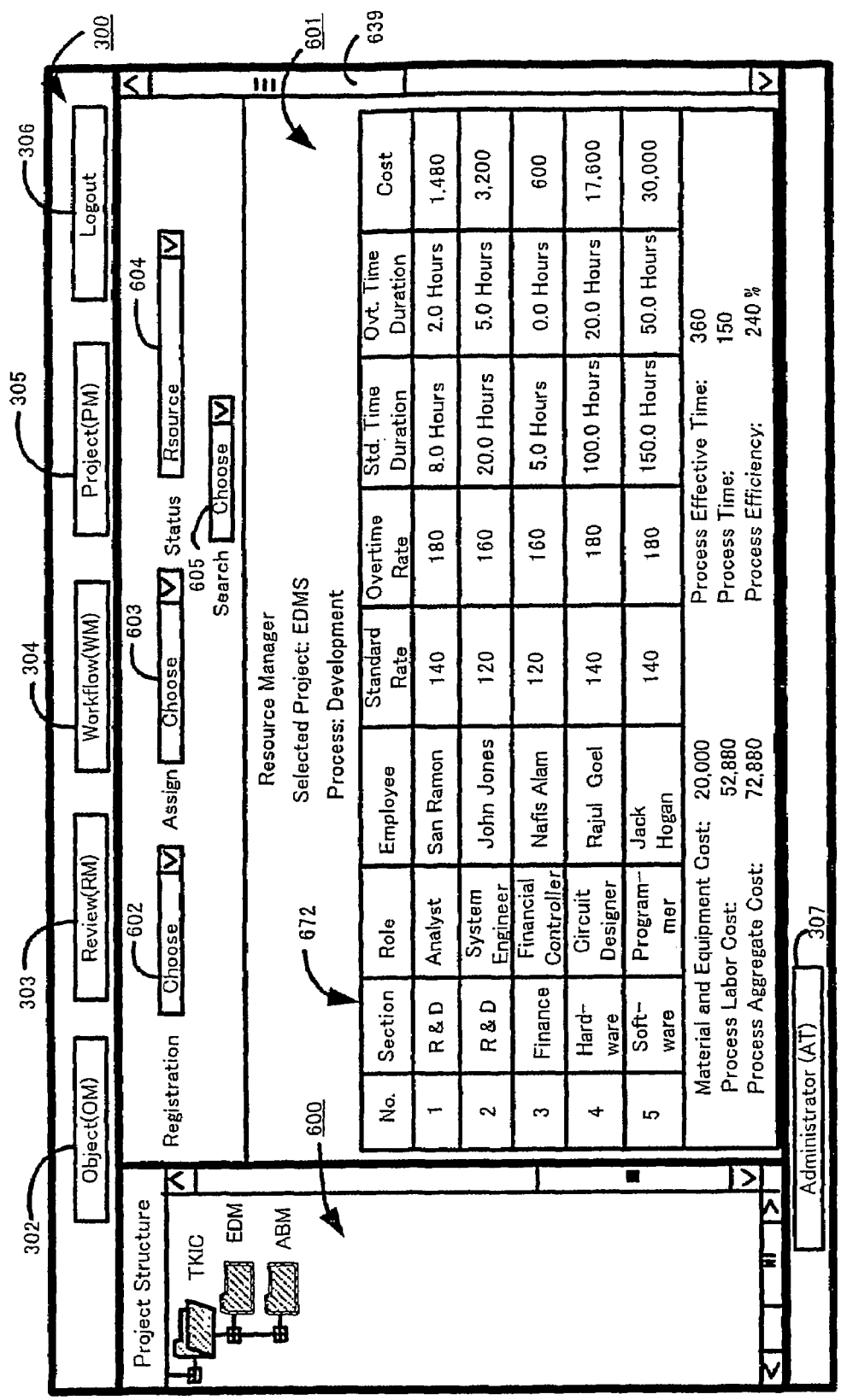
FIG. 53 is a diagram which shows an example of the GUI window provided by the project manager.

Referring again to FIG. 46, when the user selects a desired project from the project table 607, and selects "resource" form the pull-down menu 604M of the status combo box 604, the PM 14 displays the GUI of a resource manager, which is a tool that is used to manage human and physical resources that are invested in the project shown in FIG. 53, in the main window 601. Process resource tables 672 which display the amounts of resources used in all of the business processes contained in the selected project for each of these business processes is displayed in the GUI of this resource manager. In the example shown in FIG. 53, only the process resource table of the first business process, e.g., "development", among the plurality of business processes contained in the selected project, e.g., "EDMS", is displayed. However, the process resource tables of other business processes are displayed if the main window 601 is scrolled by operating the scroll bar 639 or the like. The section, role, employee names (employee), standard rate, overtime rate, standard time duration, overtime time duration, labor cost (cost) and the like for all of the employees invested in the business process in question are displayed in the process resource table 672 of each business process. Furthermore, the material and equipment cost, process labor cost, process aggregate cost, process effective time, process time, process efficiency and the like used in this business process are also automatically calculated and displayed.

Figure 54:
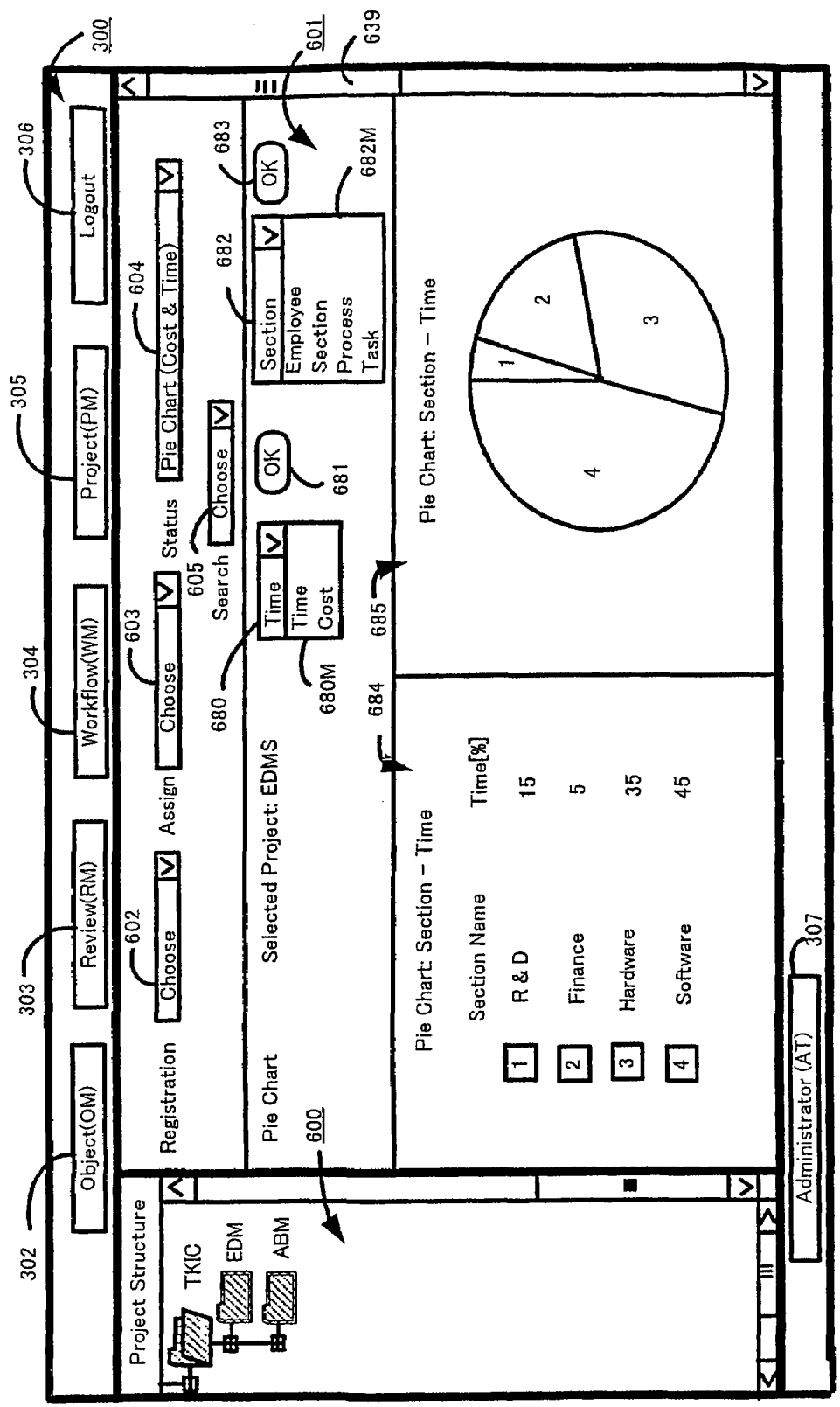
FIG. 54 is a diagram which shows an example of the GUI window provided by the project manager.

Referring again to FIG. 46, when the user selects a desired project from the project table 607, and selects "pie chart (cost and time)" from the pull-down menu 604M of the status combo box 604, the PM 14 displays a GUI which is used to compare the cost and time used in the project shown in FIG. 54 among the sections, employees, business processes or tasks in the main window 601. A combo box 680 which is used to select time or cost, a combo box 682 which is used to select sections, employees, business processes or tasks, a proportion table 684, a pie chart 685 and the like are displayed in this GUI. Proportional values of respective sections, respective employees, respective business processes or respective tasks and a pie chart expressing these proportional values (as the results of a comparison of the time or cost selected by the comb box 680 among the sections, employees, business processes or tasks selected by the combo box 682) are displayed in the proportion table 684 and pie chart 685.

Referring again to FIG. 46, when the user selects a desired project from the project table 607, and selects "bar graph (cost and time)" from the pull-down menu 604M of the status combo box 604, the PM 14 displays a GUI (not shown in the figures) in which the pie chart in the GUI shown in FIG. 54 is changed to a bar graph in the main window 601.

One concrete example of a method for controlling the flow of information that can be employed in one embodiment of the present invention will be described below.

Figure 55:
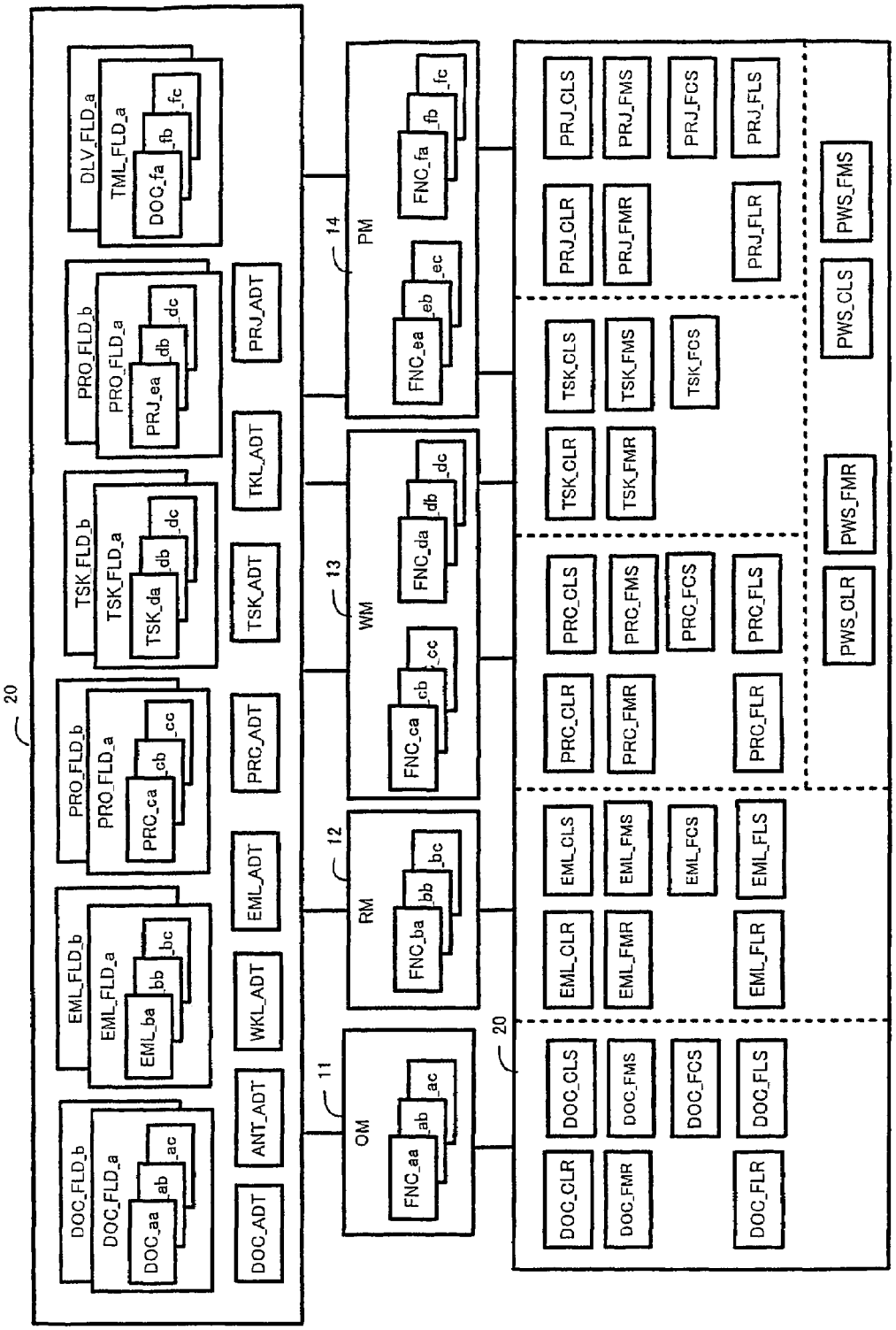
FIG. 55 is a block diagram which shows examples of various types of data inside the virtual knowledge base 20 used by the OM 11, RM 12, WM 13, PM 14 and TM 15 for information flow control.

FIG. 55 shows various types of data in the virtual knowledge base 20 that is used by the OM 11, RM 12, WM 13, PM 14 and TM 15 in order to perform this method.

As is shown in FIG. 55, numerous objects DOC_aa, DOC_ab, DOC_ac, . . . , EML_ba, EML_ba, EML_bc, . . . , PRC_ca, PRC_cb, PRC_cc, . . . , TSK_da, TSK_db, TSK_dc, . . . , PRJ_ea, PRJ_eb, PRJ_ec, . . . and DOC_fa, DOC_fb, DOC_fc, . . . are present in the virtual knowledge base 20. Here, the term "object" refers to a logical entity of data that is utilized by the user. These objects include objects of various types. For example, the objects DOC_aa, DOC_ab, DOC_ac, . . . and DOC_fa, DOC_fb, DOC_fc, . . . of one type are document objects, the objects EML_ba, EML_ba, EML_bc, . . . of another type are email messages, the objects PRC_ca, PRC_cb, PRC_cc, . . . of still another type are business processes, the objects TSK_da, TSK_db, TSK_dc, . . . of still another type are tasks, and the objects PRJ_ea, PRJ_eb, PRJ_ec, . . . of still another type are projects. The types of objects described here are merely examples; other types may also exist. For example, the work lists, task lists and process work sheets that will be described later are objects of different types from the objects described above. Furthermore, data regarding sections, employees, search queries, menus and the like may also be handled as objects.

As is shown in FIG. 55, a plurality of logical memory regions which are used to store the objects, i.e., the folders DOC_FLD_a, DOC_FLD_b, . . . , EML_FOL_a, EML_FOL_b, . . . , PRC_FOL_a, PRC_FOL_b, . . . , TSK_FOL_a, TSK_FOL_b, . . . , PRJ_FOL_a, PRJ_FOL_b, TMP_FOL_a, . . . and DLV_FOL_a, are present in the virtual knowledge base 20. These folders include folders of various types; objects of specified types are stored in the folders of these respective types. For example, document objects DOC_aa, DOC_ab, DOC_ac, . . . are stored in the document folders DOC_FLD_a, DOC_FLD_b, . . . , email messages EML_ba, EML_ba, EML_bc, . . . are stored in the email folders EML_FOL_a, EML_FOL_b, . . . , business processes PRC_ca, PRC_cb, PRC_cc, . . . are stored in the process folders PRC_FOL_a, PRC_FOL_b, . . . , and tasks TSK_da, TSK_db, TSK_dc, . . . are stored in the task folders TSK_FOL_a, TSL_FOL_b, . . . . Furthermore, document objects DOC_fa, DOC_fb, DOC_fc, . . . used as templates (pattern document objects used for reference when the user creates document objects) are stored in the template folders TMP_FOL_a, . . . , and document objects which are user work products (deliverables) are stored in the deliverable folders DLV_FOL_a, . . . . The types of folders, mutual relationships of folders (e.g., hierarchical relationships), types of objects stored in the folders and the like shown in FIG. 5 are merely simple examples used for the sake of description; various other variations can be used in regard to these points.

The abovementioned objects are logical entities; the data constructions of the respective objects are defined by a plurality of types of object administration tables DOC_ADT, ANT_ADT, WKL_ADT, EML_ADT, PRC_ADT, . . . . For example, the document administration table DOC_ADT defines the document objects DOC_aa, DOC_ab, DOC_ac, . . . and DOC_fa, DOC_fb, DOC_fc, . . . , and the annotation administration table ANT_ADT defines especially the annotation (AN) objects (see FIG. 4) among the document objects. Further, the work list administration table WKL_ADT defines the work lists (WKL) (see FIG. 4) which are each an aggregate of a plurality of document objects. Furthermore, the email administration table EML_ADT defines the email messages EML_ba, EML_ba, EML_bc, . . . , the process administration table PRC_ADT defines the business processes PRC_ca, PRC_cb, PRC_cc, . . . , and the task administration table TSK_ADT administers the tasks TSK_da, TSK_db, TSK_dc . . . . Moreover, the task list administration table TSK_ADT defines task lists (TKL) (see FIG. 41) which are each an aggregate of a plurality of tasks. Furthermore, the project administration table PRJ_ADT defines the projects PRJ_ea, PRJ_eb, PRJ_ec, . . . .

The respective managers OM 11, RM 12, WM 13 and PM 14 control the utilization, i.e., operation, of specified types of objects by the user (e.g., reference, creation, editing, deletion, transmission, reception, approval and the like). For example, the OM 11 controls mainly the operation of the document objects DOC_aa, DOC_ab, DOC_ac, . . . and DOC_fa, DOC_fb, DOC_fc, . . . and work lists (WKL). The RM 12 controls mainly the operation of the email messages EML_ba, EML_ba, EML_bc, . . . . The WM 13 administers mainly the operation (especially creation) of the business processes PRC_ca, PRC_cb, PRC_cc, . . . and tasks TSK_da, TSK_db, TSK_dc . . . . The PM 14 controls mainly the operation of the projects PRJ_ea, PRJ_eb, PRJ_ec, . . . and the business processes and tasks that constitute these projects. Furthermore, the PM 14 also controls the operation of the templates DOC_fa, DOC_fb, DOC_fc, deliverables and process sheets.

Each of the managers OM 11, RM 12, WM 13 and PM 14 has various functions that are used to perform various operations of the objects by the users (e.g., reference, creation, editing, deletion, transmission, reception, approval and the like). For example, as is shown in FIG. 5, the OM 11 has the various functions FNC_aa, FUNC_ab, FUNC_ac, . . . that are used to operate the document objects, and the RM 12 has the various functions FNC_ba, FUNC_bb, FUNC_bc, . . . that are used to operate the email. Furthermore, the WM 13 has the various functions FNC_ca, FUNC_cb, FUNC_cc, . . . that are used to operate the business processes, and the various functions FNC_da, FUNC_db, FUNC_dc, . . . that are used to operate the tasks. Moreover, the PM 14 has the various functions FNC_ea, FUNC_eb, FUNC_ec, . . . that are used to operate the projects, and the various functions FNC_fa, FUNC_fb, FUNC_fc, . . . that are used to operate the tasks. These functions can be performed by the user operating the tools corresponding to the respective functions in the GUI respectively provided by the OM 11, RM 12, WM 13 and PM 14.

Furthermore, as is shown in FIG. 55, various types of control data are present in the virtual knowledge base 20 in order to control the various operations of the objects by the OM 11, RM 12, WM 13 and PM 14 (i.e., in order to control the information flow). These types of control data include class registration data (CLR), form registration data (FMR), folder registration data (FLR), class security setting data (CLS), form security setting data (FMS), function security setting data (FCS), folder security setting data (FLS) and the like.

The class registration data (CLR) is data that defines one or more classes (ordinarily a plurality of classes) that may be possessed by the objects. Here, the term "class" refers to an object attribute item; such items can be freely set by users that have class definition authorization. For example, in the case of document objects, a plurality of classes such as "subject field", "supervising section name", "key words", "degree of importance", "degree of confidentiality", "period of validity" and the like can be set. The form registration data (FMR) is data that defines one or more forms that can be used in the objects. Here, the term "form" refers to an aggregate of two or more classes selected from the plurality of defined classes. Forms can also be free defined by users possessing form definition authorization. For example, in cases where classes such as "subject field", "supervising section name", "key words", "degree of importance", "degree of confidentiality" and "period of validity" are defined, a set of the classes "subject field", "supervising section name" and key words can be defined as "form A", and a set of the classes "subject field", "degree of importance", "degree of confidentiality" and "period of validity" can be defined as "form B". Forms are used for the selection of classes (attribute items) that are to be displayed in cases where the contents of the objects are displayed. For example, in a case where the abovementioned "form A" and "form B" are defined, if "form A" is selected, the "subject field" and "supervising section" of the document object are displayed, but the "degree of importance", "degree of confidentiality" and "period of validity" are not displayed. The folder registration data (FLR) is data that defines the hierarchical relationships among folders. This folder registration data (FLR) is automatically created and updated each time that some folder is created, altered or deleted by the user.

The class security setting data (CLS) is data that defines the access authorization of users with respect to classes, i.e., that defines which users can access (or not access) which classes. For example, it may be defined that "user A" can access "class A", but cannot access "class B". The form security setting data (FMS) is data that defines the access authorization of users with respect to forms, i.e., that defines which users can access (or not access) which forms. For example, it may be defined that "user A" can access "form A", but cannot access "form B". The function security setting data (FCS) is data that defines the access authorization of users with respect to the functions respectively possessed by the OM 11, RM 12, WM 13 and PM 14, i.e., that defines which users can access (or not access) which functions. For example, it may be defined that "user A" can access "function A", but cannot access "function B". The folder security setting data (FLS) is data that defines the access authorization of users with respect to folders, i.e., that defines which users can access (or not access) which folders. For example, it may be defined that "user A" can access "folder A", but cannot access "folder B". Such security setting data (CLS, FMS, FCS, FLS) can be freely define by users possessing security setting authorization.

Sets of the abovementioned different types of control data exist for different types of objects. For example, document class registration data DOC_CLR, document form registration data DOC_FMR, document folder registration data DOC_FLR, document security setting data DOC_CLS, document form security setting data DOC_FMS, document function security setting data DOC_FCS and document folder security setting data DOC_FLS exist for the purpose of controlling the operation of document objects.

Furthermore, email class registration data EML_CLR, email form registration data EML_FMR, email folder registration data EML_FLR, email class security setting data EML_CLS, email form security setting data EML_FMS, email function security setting data EML_FCS and email folder security setting data EML_FLS exit for the purpose of controlling the operation of email.

Furthermore, process class registration data PRC_CLR, process form registration data PRC_FMR, process folder registration data PRCC_FLR, process class security setting data PRC_CLS, process form security setting data PRC_FMS, process function security setting data PRC_FCS and process folder security setting data PRC_FLS exist for the purpose of controlling the operation of business processes.

Furthermore, task class registration data TSK_CLR, task form registration data TSK_FMR, task class security setting data TSK_CLS, task form security setting data TSK_FMS and task function security setting data TSK_FCS exist for the purpose of controlling the operation of tasks.

Furthermore, project class registration data PRJ_CLR, project form registration data PRJ_FMR, project folder registration data PRJ_FLR, project class security setting data PRJ_CLS, project form security setting data PRJ_FMS, project function security setting data PRJ_FCS and project folder security setting data PRJ_FLS exist for controlling the operation of projects.

Furthermore, process work sheet class registration data PWS_CLR, process work sheet form registration data PWS_FMR, process work sheet class security setting data PWS_CLS, process work sheet form security setting data PWS_FMS and process work sheet function security setting data PWS_FCS exist for the purpose of controlling the operation of process work sheets (reports that are transferred from user to user in the process of performing business processes within a certain project).

The OM 11, RM 12, WM 13 and PM 14 can use the abovementioned control data sets in accordance with the object types respectively handled by these managers (e.g., can refer to these data sets for new registration, modification and control of object operations). For example, the OM 11 uses a set of the control data DOC_CLR, DOC_FMR, DOC_FLR, DOC_CLS, DOC_FMS, DOC_FCS and DOC_FLS for document objects. Furthermore, the RM 12 uses a set of the control data EML_CLR, EML_FMR, EML_CLS, EML_FMS and EML_FCS for email. Furthermore, the WM 13 uses a set of the control data PRC_CLR, PRC_FMR, PRC_CLS, PRC_FMS and PRC_FCS for business processes, a set of the control data TSK_CLR, TSK_FMR, TSK_CLS, TSK_FMS and TSK_FCS for tasks, and a set of the control data PWS_CLR, PWS_FMR, PWS_CLS, PWS_FMS and PWS_FCS for process work sheet classes. Furthermore, the PW 14 uses a set of the control data PRJ_CLR, PRJ_FMR, PRJ_CLS, PRJ_FMS and PRJ_FCS for projects, a set of the control data TSK_CLR, TSK_FMR, TSK_CLS, TSK_FMS and TSK_FCS for tasks, and a set of the control data PWS_CLR, PWS_FMR, PWS_CLS, PWS_FMS and PWS_FCS for process work sheet classes.

Furthermore, the OM 11, RM 12, WM 13 and PM 14 provide the functions of newly registering or altering control data corresponding to the object types handled by these managers to users having the authorization to register such control data. Furthermore, although this is not shown in FIG. 5, the AM 15 provides the functions of newly registering or altering all of the abovementioned control data to users having the authorization to register such control data. Furthermore, the OM 11, RM 12, WM 13 and PM 14 respectively refer to the abovementioned control data and control the operations of the objects by the users (i.e., the flow of information among users).

Concrete examples of the control of object operations performed by the OM 11, RM 12, WM 13 and PM 14 on the basis of the abovementioned control data will be described below. In the first place, the control performed by the OM 11 will be described.

Figure 56:
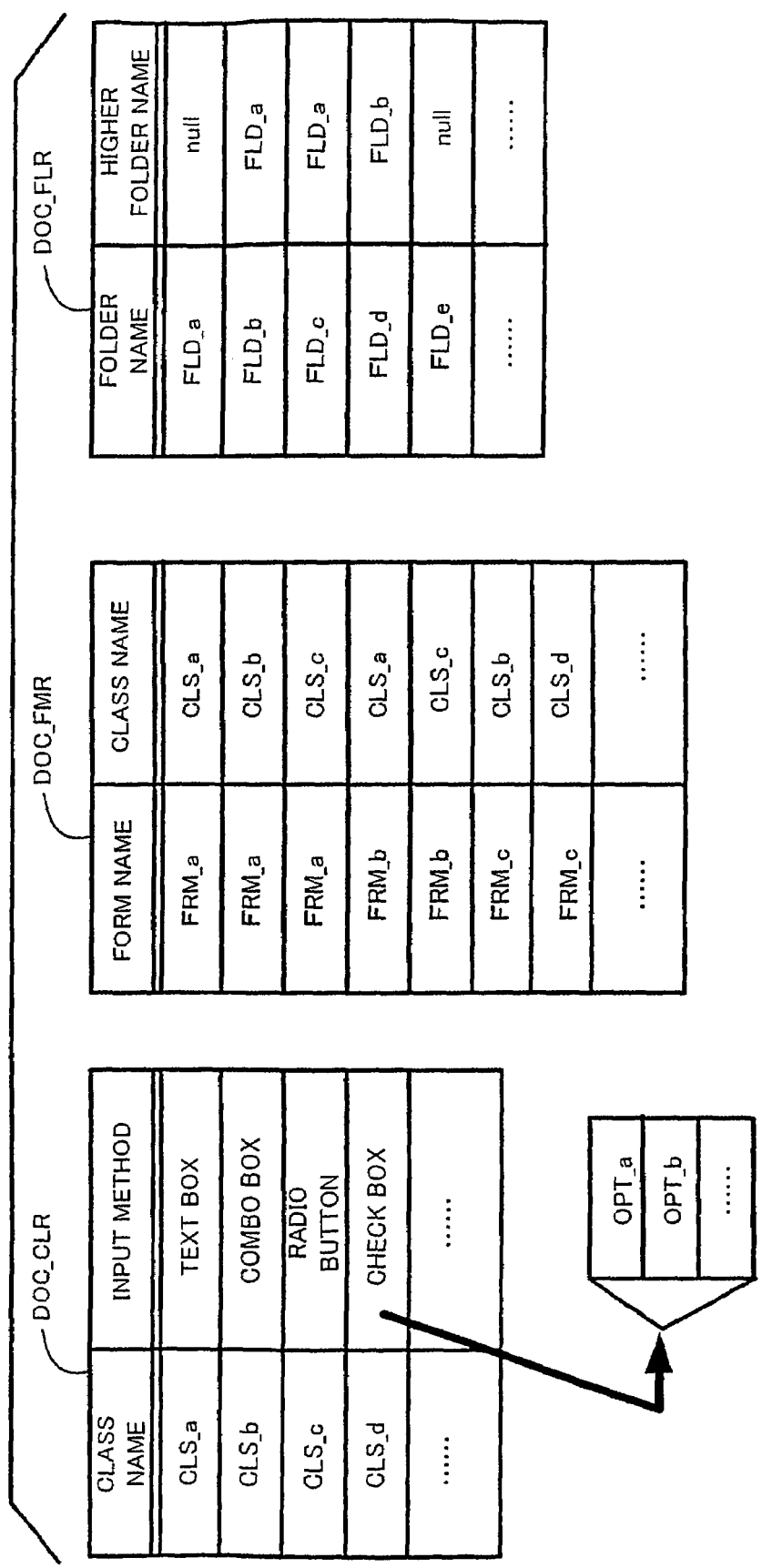
FIG. 56 is a diagram which shows examples of the structures of the document class registration data DOC_CLR, document form registration data DOC_FMR, and document folder registration data DOC_FLR.
Figure 57:
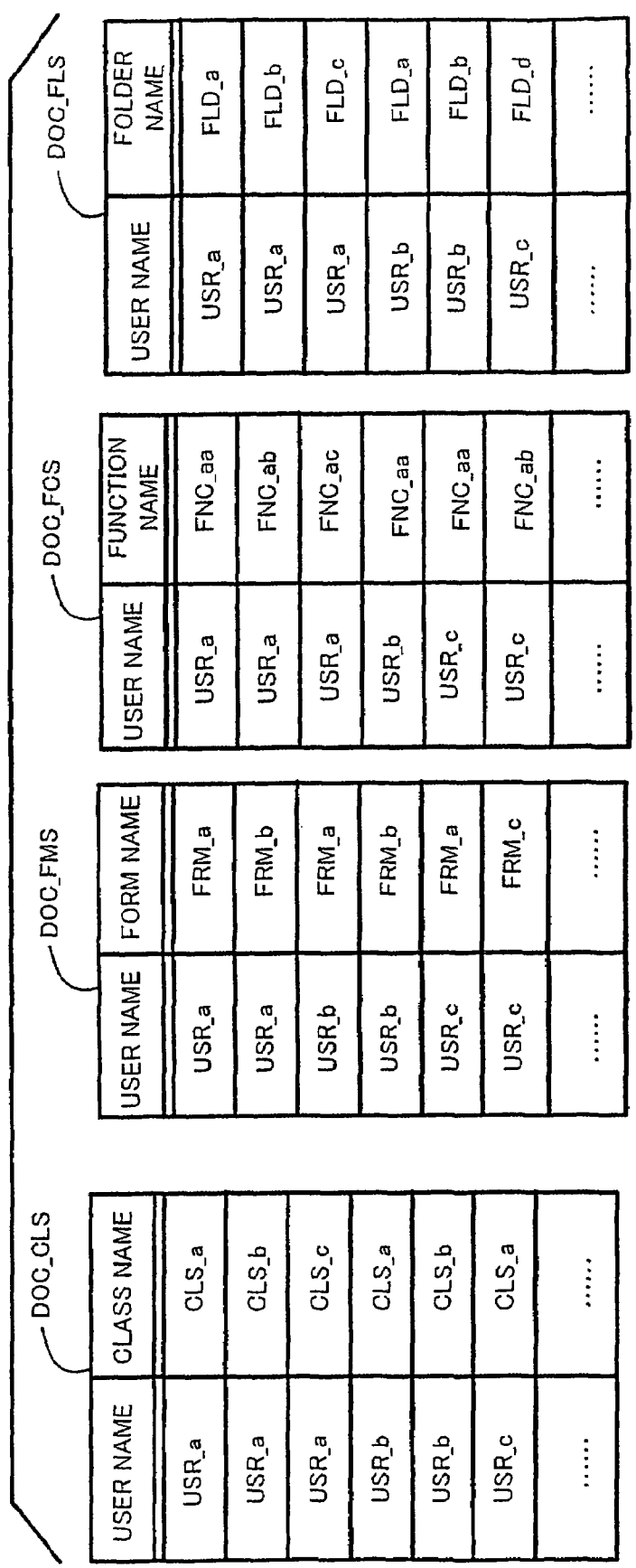
FIG. 57 is a diagram which shows examples of the structures of the document class security setting data DOC_CLS, document form security setting data DOC_FMS, document function security setting data DOC_FCS and document folder security setting data DOC_FLS.
Figure 58:
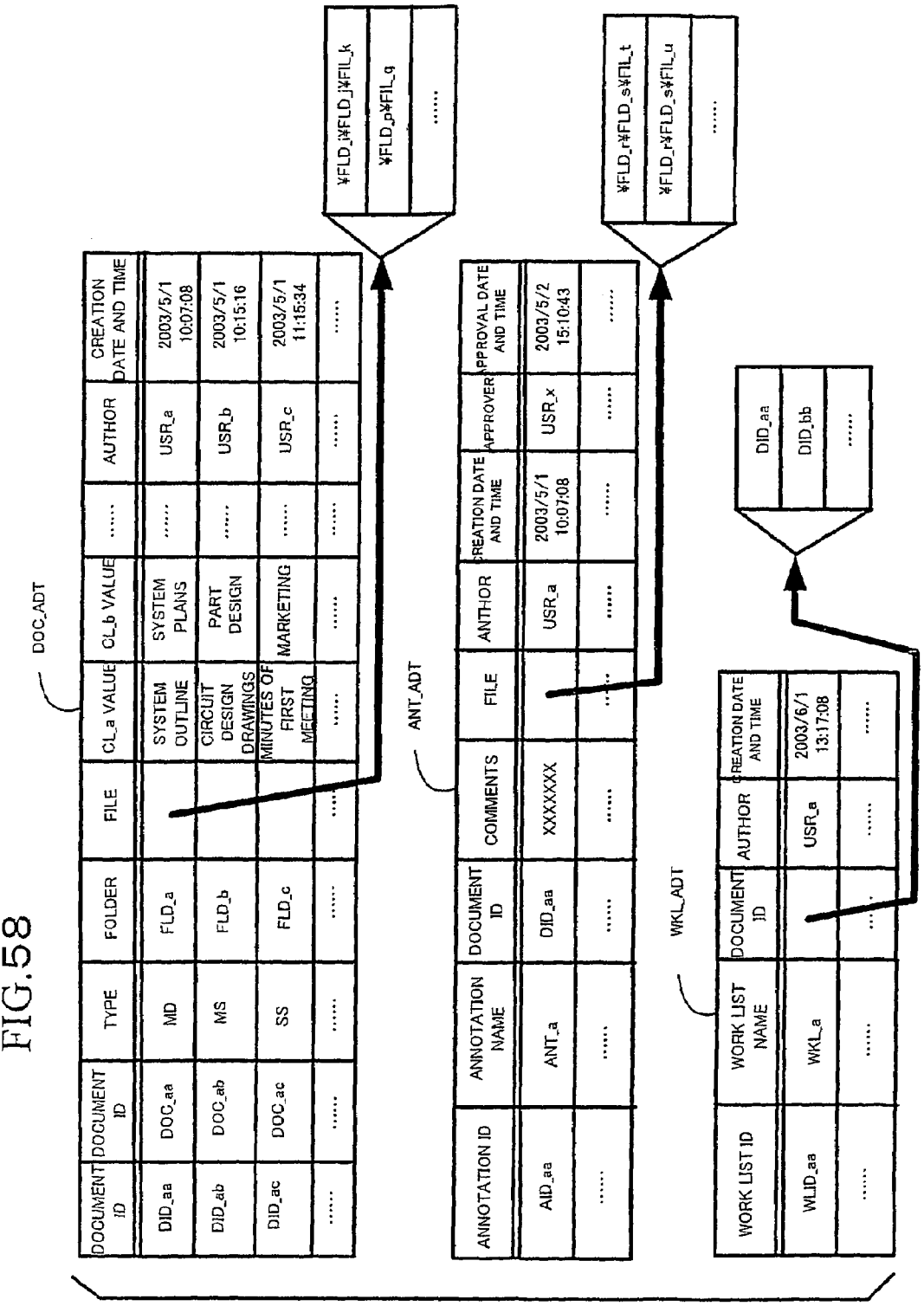
FIG. 58 is a diagram which shows examples of the structures of the document administration table DOC_ADT, annotation administration table ANT_ADT and work list administration table WKL_ADT.
Figure 59:
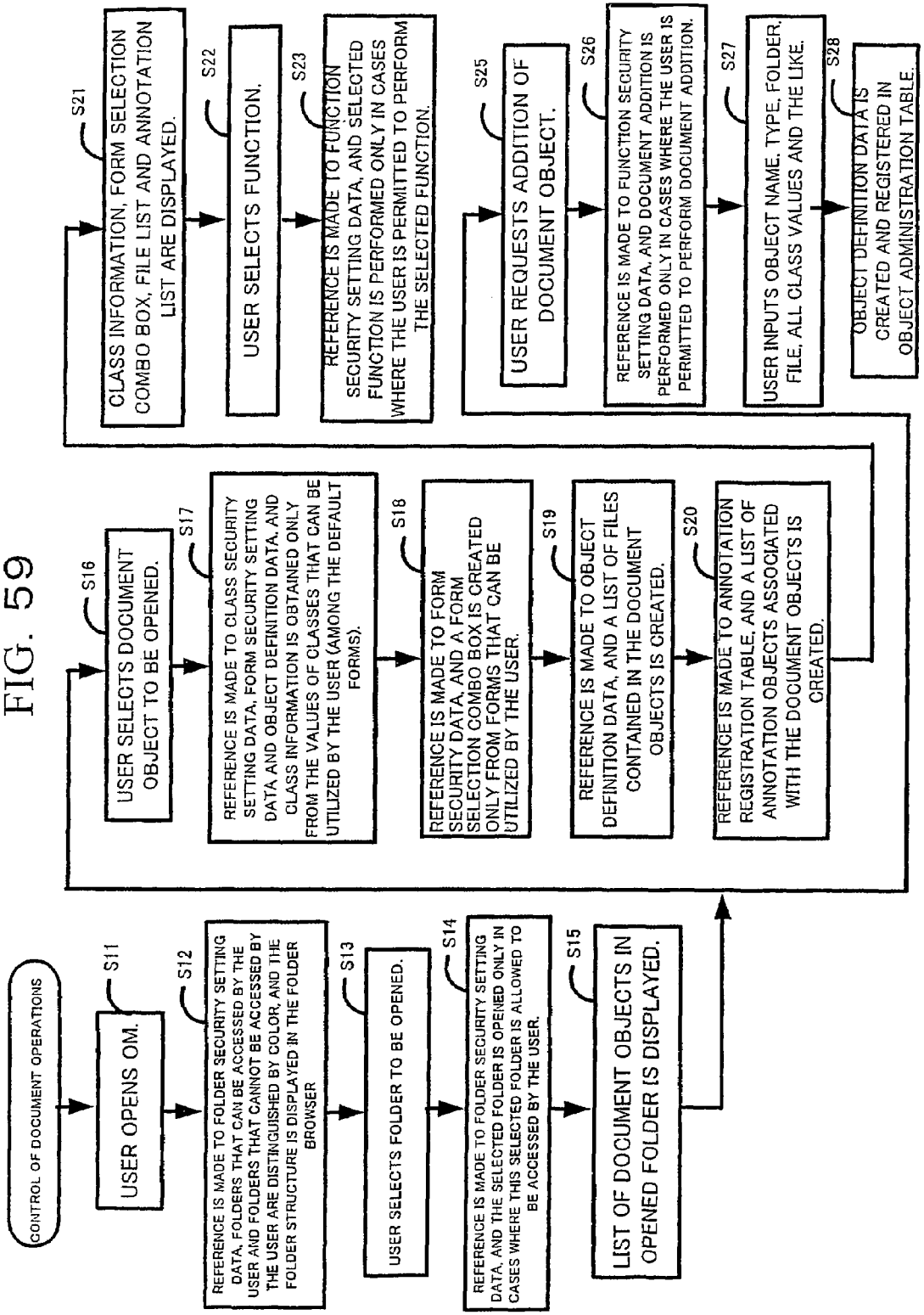
FIG. 59 is a diagram which shows the flow of an example of the control of the document object operations performed by the OM 11.
Figure 60:
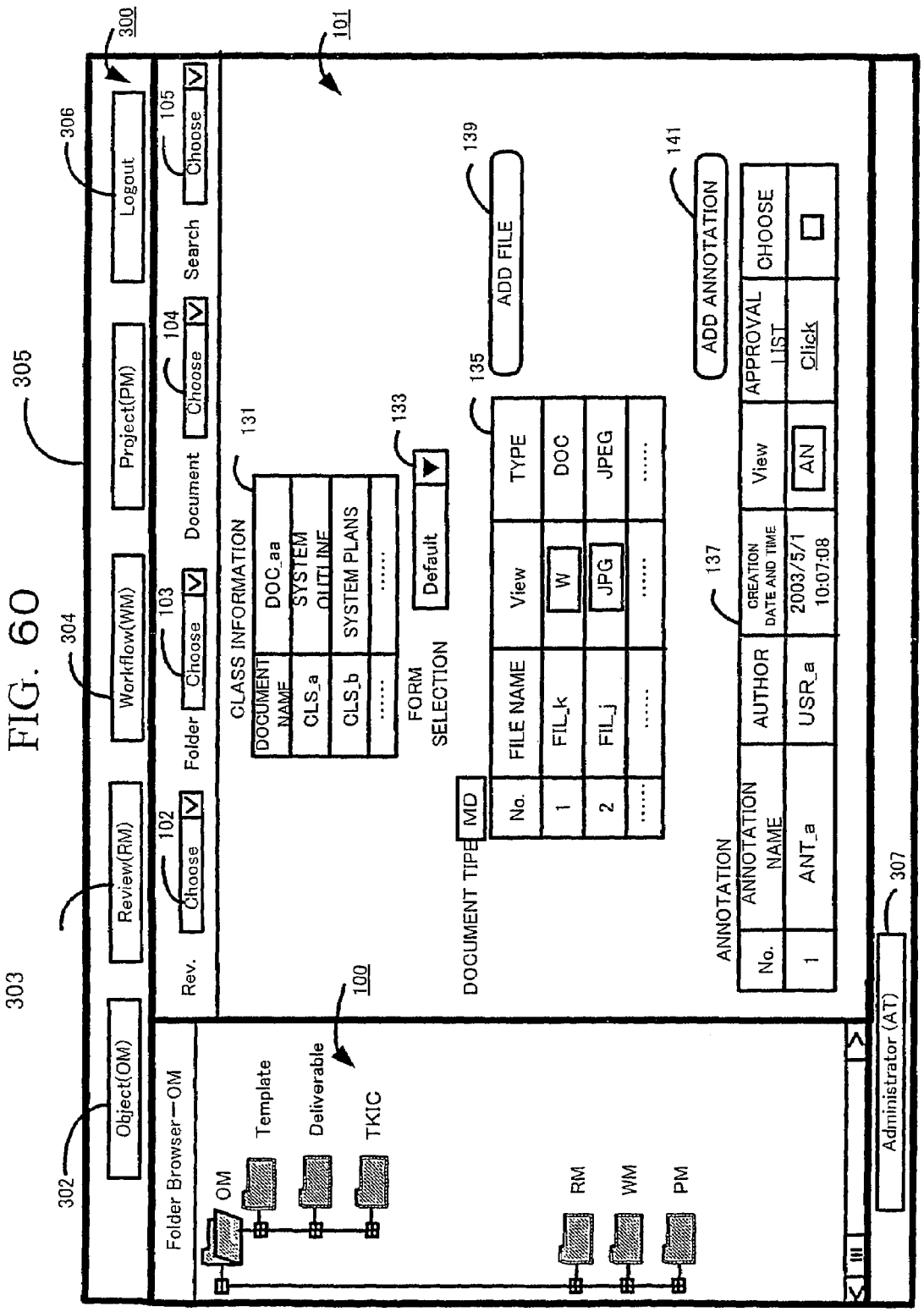
FIG. 60 is a diagram which shows an example of the GUI window provided by the OM 11 in order to display document objects.
Figure 61:
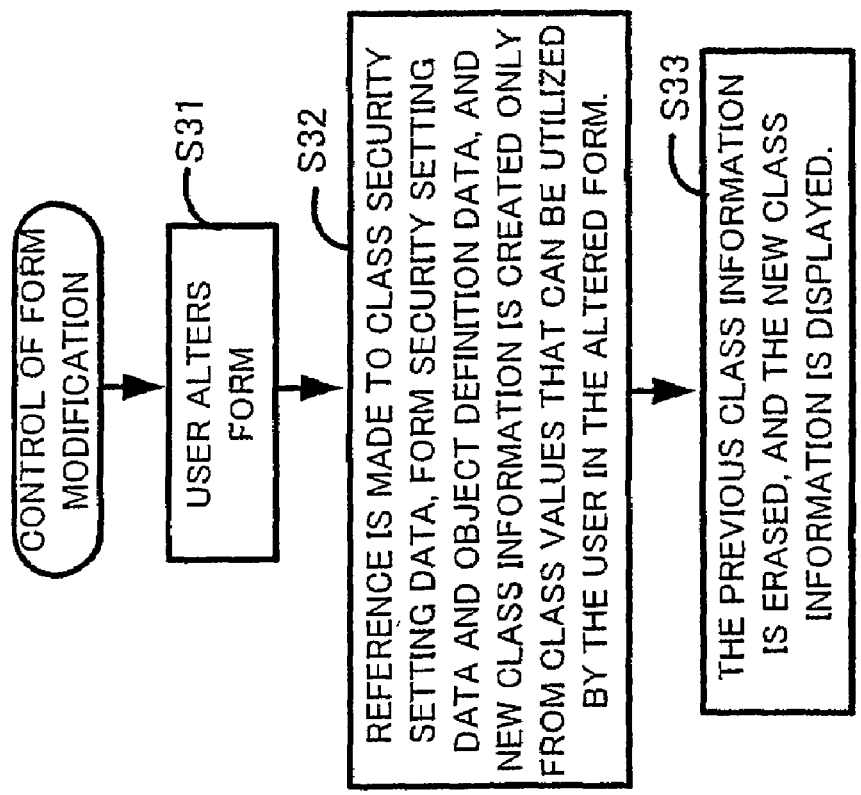
FIG. 61 is a diagram which shows the flow of an example of the control for the purpose of altering the forms of document objects that is performed by the OM 11.
Figure 62:
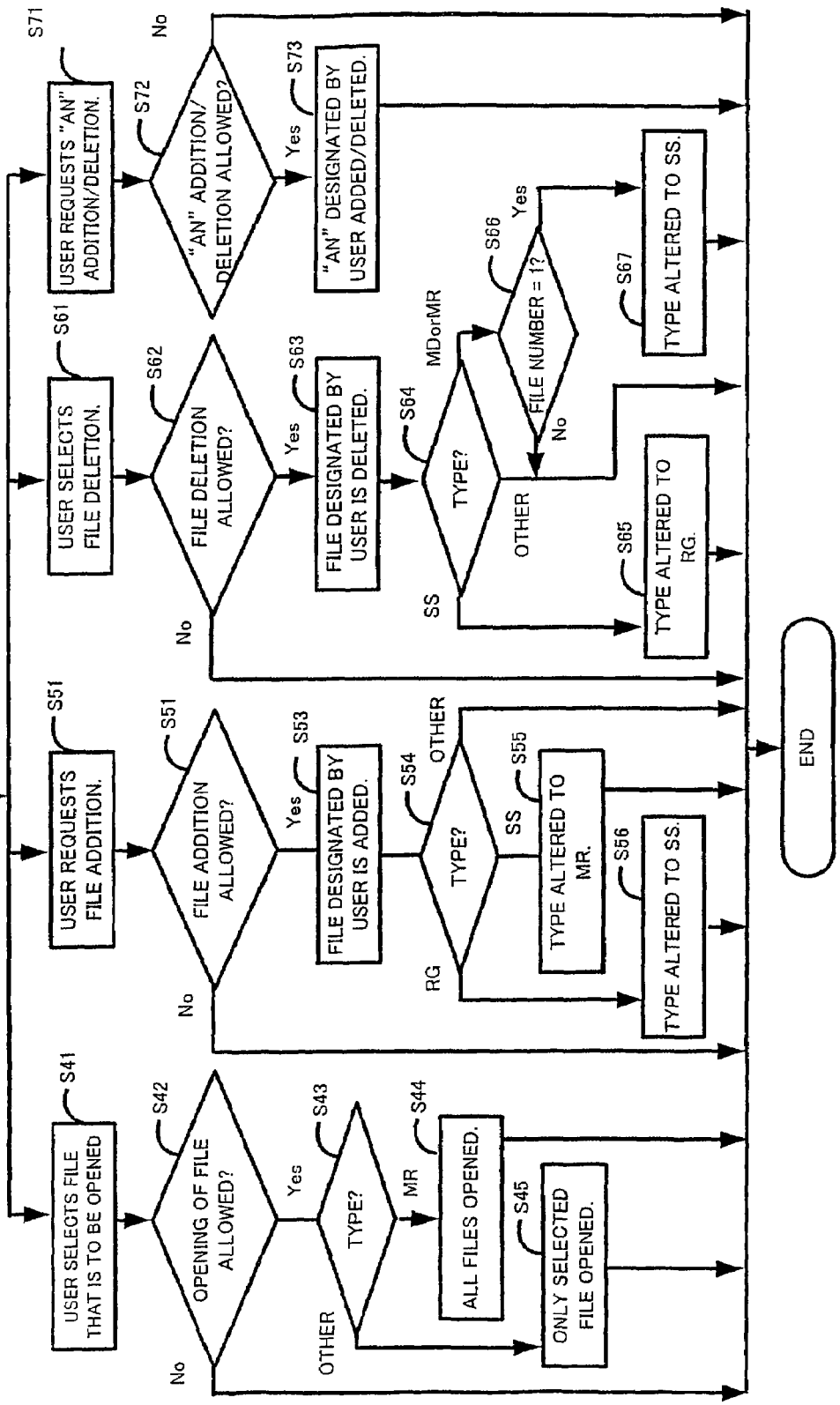
FIG. 62 is a diagram which shows the flow of an example of the control of file operations within document objects that is performed by the OM 11.

FIG. 56 shows examples of the structures of the document class registration data DOC_CLR, document form registration data DOC_FMR an document folder registration data DOC_FLR used by the OM 11 in order to control the operations of document objects. FIG. 57 shows examples of the document class security setting data DOC_CLS, document form security setting data DOC_FMS, document function security setting data DOC_FCS and document folder security setting data DOC_FLS. Furthermore, FIG. 58 shows examples of the structures of the document administration table DOC_ADT, annotation administration table ANT_ADT and work list administration table WKL_ADT. FIG. 59 shows the flow of an example of the document object operation control performed by the OM 11. FIG. 60 shows an example of the GUI window that is provided by the OM 11 in order to display document objects. FIG. 61 shows the flow of an example of the control used to alter the forms of document objects performed by the OM 11. FIG. 62 shows the flow of an example of the control of file operations within the document objects performed by the OM 11.

As is shown in FIG. 56, the names of one or more classes (names of attribute items; ordinarily a plurality of names) CLS_a, CLS_b, CLS_c, . . . possessed by the document objects are registered in the document class registration data DOC_CLR; these class names can be arbitrarily defined by users who have the authorization for this. For example, the initial class name CLS_a can be defined as "subject field", the next class name CLS_b can be defined as "supervising section name", and the third class name CLS_c can be defined as "key words". Furthermore, the input method for the respective class values (i.e., the method used by the user to input the concrete contents of the respective classes when creating concrete document objects) is also registered in this table DOC_CLR; this can also be arbitrarily defined by users who have the authorization for this. For example, the input method called "text box" refers to an input method in which the class values (contents) are input by typing an arbitrary text using a text box that is displayed to the side of the class name in the GUI window used to create document objects (for instance, several classes such as "details" and "request" using such a text box input method are shown as examples in the form 121 shown in FIG. 44). Furthermore, the input methods of "combo box", "radio button" and "check box" respectively refer to input methods in which arbitrary selection branches constituting the class values (contents) are selected using a radio button, check box or combo box used to select any of a plurality of selection branches that are displayed alongside the class name. Furthermore, in the input methods of "combo box", "radio button", "check box" and the like, data for one or more selection branches OPT_a, OPT_b, . . . is provided, and these selection branches can also be arbitrarily defined by users having the proper authorization. For example, the selection branches of "large", "intermediate" and "small" can be defined as selection branches for the "radio button" input method of the class name "degree of importance".

As is shown in FIG. 56, one or more form names (ordinarily a plurality of form names) FRM_a, FRM_b, FRM_c, . . . possessed by the document objects, and one or more class names possessed by each form name, are registered in the document form registration data DOC_FMR, and these form names and class names can be arbitrarily defined by users having the proper authorization. In the example shown in FIG. 56, the form "FRM_a" has the three classes "CLS_a", "CLS_b" and "CLS_c".

As is shown in FIG. 56, the names of all of the folders FCL_a, FLC_b, . . . in which document objects are stored, and the names of folders positioned above these respective folders, are registered in the document folder registration data DOC_FLR; in this way, the hierarchical structure of the folders is defined. Each time that the user creates, alters, deletes or moves a folder using the OM 11, the OM 11 automatically updates the document folder registration data DOC_FLR.

As is shown in FIG. 57, class names selected from the document class registration data DOC_CLR that can be accessed by each of a plurality of users USR_a, USR_b, . . . (there is also of course a table in which these users are registered; however, a description of this table is omitted) are registered beforehand in the documents class security setting data DOC_CLS; these class names can also be arbitrarily defined by users having the proper authorization. The respective users cannot access classes that are not registered in this table DOC_CLS. In the example shown in FIG. 57, the user "USR_a" can access the classes "CLS_a", "CLS_b" and "CLS_c", but cannot access the other classes.

In the example shown in FIG. 57, form names selected from the document form registration data DOC_FMR that can be accessed by each of a plurality of users USR_a, USR_b, . . . are registered in the document form security setting data DOC_FMS; these form names can also be arbitrarily defined by users having the proper authorization. The respective users cannot access forms that are not registered in this table DOC_FMS. In the example shown in FIG. 57, the user "USR_a" can access the forms "FRM_aa", "FRM_ab" and "FRM_ac", but cannot access the other forms.

As is shown in FIG. 57, the names of functions possessed by the OM 11 that can be accessed by each of a plurality of users USR_a, USR_b, . . . are registered in the document function security setting data DOC_FCS; these function names can also be arbitrarily defined by users having the proper authorization. The respective users cannot access functions that are not registered in this table DOC_FMS. In the example shown in FIG. 57, the user "USR_a" can access the functions "FNC_aa", "FNC_ab" and "FNC_ac", but cannot access the other functions.

As is shown in FIG. 57, folder names selected from the document folder data DOC_FLR that can be accessed by each of a plurality of users USR_a, USR_b, . . . are registered in the document folder security setting data DOC_FLS; these folder names can also be arbitrarily defined by users having the proper authorization. The respective users cannot access folders that are not registered in the table DOC_FMS. In the example shown in FIG. 57, the user "USR_a" can access the folders "FLD_a", "FLD_b" and "FLD_c", but cannot access the other folders.

As shown in FIG. 58, object definition data defining the document objects is registered for all of the document objects (excluding the annotation objects) in the document administration table DOC_ADT; the contents of this data can be arbitrarily defined by the users who created the document objects. In FIG. 58, each row in the document administration table DOC_ADT expresses object definition data for one of the document objects. As is shown in the figure, the object definition data for each document object is data in which set values are defined for items such as "document ID", "document name", "type", "file", "CLS_a value", "CLS_b value", "author", "creation date and time" and the like. Here, one type among the types single sheet (SS), multi-sheet (MS), multi-document (MD), multi-representation (MR) and registered (RG) described with reference to FIG. 4, which is given to the document object, is set in the item "type". In the example shown in FIG. 58, the type of the initial document object is "MD", and the type of the second document object is "MS". The name of the folder in which the document object is stored is set in the item "folder name". Reference values, e.g., full-path file names, for one or more files associated with the document object (i.e., handles as the document object) are set in the item "file". However, in cases where the "type" is RG, nothing is set in "file". In the example shown in FIG. 58, the initial document object is associated with a plurality of files "¥FLD_i¥FLD_j¥FIL_k", "¥FLD_p¥FIL_q", . . . . User input values (e.g., text, selected branches and the like) for all of the class names CLS_a, CLS_b, . . . defined in the document class registration data DOC_CLR shown in FIG. 56 are set in the items "CLS_a value" and "CLS_b value". In the Example shown in FIG. 58, the value of "system outline" is set in the initial class "CLS_a" (e.g., "subject field") in the case of the initial document object, and the value of "system plans" is set in the next class "CLS_b" (e.g., "supervising section").

As is shown in FIG. 58, object definition data defining the AN object is registered for all of the annotation (AN) objects in the annotation administration table ANT_ADT; the contents of this object definition data can be arbitrarily set by the users who created the AN objects. In FIG. 58, each row of the annotation administration table ANT_ADT expresses object definition data for one of the AN objects. As is shown in the figure, set values are defined for items such as "annotation ID", "annotation name", "document ID", "comments", "file", "author", "creation date and time", "approver", "approval date and time" and the like in the object definition data for each AN object. Here, a reference value, e.g., document ID, for other document objects to which the AN object is appended is set in the item "document ID". In the example shown in FIG. 58, the initial AN object is appended to the document object "DID_aa". Reference values, e.g., full-path file names, for one or more files associated with the AN object (i.e., handled as the AN object) are set in the item "file".

As is shown in FIG. 58, object definition data defining the WKL is registered in the work list administration table WKL_ADT for all of the work lists (WKL); the contents of this data can be arbitrarily defined by the users who created the WKL. In FIG. 58, each row in the WKL administration table ANT_ADT expresses object definition data for one of the WKL. As is shown in the figure, set values for items such as "work list ID", "work list name", "document ID", "author", "creation date and time" and the like are defined in the respective sets of WKL definition data. Here, a reference value, e.g., document ID, for all of the document objects contained in the WKL is set in the item "document ID".

FIG. 59 shows the flow of the control of document object operations performed by the OM 11.

As is shown in FIG. 59, a certain user opens the OM 11 in step S11. Consequently, in step S12, the OM 11 grasps the hierarchical structure of the folders relating to the document object by referring to the document folder registration data DOC_FLR shown in FIG. 56, grasps the folders that can be accessed and folders that cannot be accessed by the user by referring to the document folder security setting data DOC_FLS shown in FIG. 57, and displays a folder structure in which the folders that can be accessed and folders that cannot be accessed are distinguished by color in the folder browser window of a specified GUI window. FIG. 60 shows an example of this GUI window; the abovementioned folder browser window 100 is displayed on the left side.

Referring again to FIG. 59, the user selects the folder that he wishes to open from the folder browser window 100 in step S13. Consequently, in step S14, the OM 11 refers to the document folder security setting data DOC_FLS shown in FIG. 57, and opens the selected folder only in cases where the user is allowed access to the selected folder. Then, in step S15, a list of the document objects in the opened folder is displayed in the abovementioned GUI window. For example, as is shown in FIG. 40, the abovementioned document object list 106 is displayed in the main window 101 in the center.

Subsequently, in step S16, the user selects the document object that he wishes to open from displayed document list. Consequently, in step S17, the OM 11 refers to the document class security setting data DOC_CLS and document form security setting data DOC_FMS shown in FIG. 57, and grasps the classes that can be accessed by the user and that are contained in a specified default form that can be accessed by the user. Next, the OM 11 refers to the object definition data of the selected document object in the document administration table DOC_ADT shown in FIG. 58, reads the values of the abovementioned grasped classes, and crates class information (a list of the attributes of the document object) only from the read class values. Furthermore, in step S18, the OM 11 refers to the document form security setting data DOC_FMS shown in FIG. 57, and creates a form selection combo box only from the form names that can be accessed by the user. Furthermore, in step S19, the OM 11 refers to the object definition data of the selected document object in the document administration table DOC_ADT shown in FIG. 58, and creates a list of files associated with the document object (i.e., contained in the document object). Furthermore, in step S20, the OM 11 refers to the annotation registration table ANT_ADT shown in FIG. 58, and creates a list of the annotation objects associated with the document object. Then, in step S21, the OM 11 displays the created class information, form selection combo box, file list and annotation list in the abovementioned GUI window. For example, as is shown in FIG. 60, the class information 131, form selection combo box 133, file list 135 and annotation list 137 for the selected document object are displayed in the main window 101 in the center.

Furthermore, in cases where it is desired to display a work list, the user operates the work list button 111 in the GUI window shown in FIG. 40. When this is done, the OM 11 displays a list of the work lists that are currently present. When the user selects the desired work list from this list of work lists, the OM 11 displays a list of the document objects contained in the selected work list. This list of document objects has a construction similar to that of the list of document objects 106 in the selected folder shown in FIG. 40. When the user selects a document object that is to be opened from this list of document object, the OM 11 performs the processing of steps S17 through S21 shown in the abovementioned FIG. 59.

Referring again to FIG. 59, the user selects an arbitrary function of the OM 11 in step S22 (for example, modification of the class values of the document object, addition of files or annotations to the document object, opening of a file in the file list 135 shown in FIG. 60, editing or deletion of such a file, opening of an annotation in the annotation list 137, editing, deletion or approval of such an annotation, or the like). Consequently, in step S23, the OM 11 refers to the document function security setting data DOC_FCS shown in FIG. 57, and performs the selected function only in cases where the user is allowed access to this selected function.

Furthermore, in step S25 shown in FIG. 59, the user request the addition of a document object to the opened folder. Consequently, in step S26, the OM 11 refers to the function security setting data DOC_FCS shown in FIG. 57, and, only in cases where the user is allowed access to the function of document addition, performs the function of document addition and displays a document registration window used to register the new document object in (for example) the main window 101 inside the GUI window shown in FIG. 60. In step S27, the user inputs the object name, type, folder, file, class values of all of the classes (all of the classes defined in the document class registration data DOC_CLR shown in FIG. 56) and the like for the document object that is to be added into the abovementioned document registration window, and instructs the OM 11 to perform registration. Consequently, in step S28, the OM 11 creates object definition data for the new document object on the basis of the input values input into the document registration window by the user, and adds and registers this in the document administration table DOC_ADT shown in FIG. 58.

Furthermore, the OM 11 performs controls such as that shown for example in FIG. 61 in cases where the user alters a form using the form selection combo box 133 in the main window 101 displaying the contents of a certain document object as shown in FIG. 60.

In FIG. 61, the user alters the form in step S31. Consequently, in step S32, the OM 11 refers to the document class security setting data DOC_CLS and document form security setting data DOC_FMS shown in FIG. 57, and grasps classes that can be accessed by the user, and that are contained in the altered form. Next, the OM 11 refers to the object definition data for the selected document object in the document administration table DOC_ADT shown in FIG. 58, reads the values of the abovementioned grasped classes (i.e., the values of classes that can be accessed by the user in the form following modification), and creates class information suited to the altered form only from the read class values. Then, in step S33, the OM 11 updates the class information 131 displayed in the main window 101 shown in FIG. 60 to class information that is suited to the form following modification.

Furthermore, in cases where the user performed file operations (e.g., opening, addition or deletion of files, or addition or deletion of annotations) in the main window 101 displaying the contents of a certain document object as shown in FIG. 60, the OM 11 performs the control shown in FIG. 62.

In FIG. 62, the user selects a file that is to opened from the file list 135 in step S41. Consequently, in step S42, the OM 11 refers to the document function security setting data DIC_FCS shown in FIG. 57, checks whether the user is allowed to perform the function of opening files, and performs this file opening function only in cases where the user is permitted to use this function. In the case of this file opening function, the OM 11 checks the type of the document object in step S43, and in cases where this type is MR and SS, the OM 11 opens not only the selected file, but also all of the files associated with the document object, in step S44. On the other hand, in cases where the type is other than MR, the OM 11 opens only the selected file in step S45.

In step S51, the user selects file addition using the file addition button 139. Consequently, in step S51, the OM 11 refers to the document function security setting data DIC_FCS shown in FIG. 57, and checks whether or not the user is allowed to perform the function of file addition. Then, the OM 11 performs the function of file addition only in cases where this function is allowed. In the case of the file addition function, the OM 11, in step S53, additionally registers the file name of the file designated by the user in the object definition data for the document object in the document administration table DOC_ADT shown in FIG. 58, and additionally registers the file name of the file designated by the user in the file list 135 shown in FIG. 60. Furthermore, in step S54, the OM 11 checks the type of the document object, and in cases where the type is SS, the OM 11 alters the type to MR in step S55; on the other hand, in cases where the type is RG, the OM 11 alters the type to SS in step S56, and in cases where the type is some other type, the OM 11 does not alter the type.

In step S61, the user requests the deletion of a certain file in the file list 135. Consequently, in step S62, the OM 11 refers to the document function security setting data DIC_FCS shown in FIG. 57 and checks whether the user is allowed access to the function of file deletion. The OM 11 then performs the function of file deletion only in cases where access to this function is allowed. In the file deletion function, the OM 11, in step S63, deletes the full-path file name of the file designated by the user from the object definition data of the document object in the document administration table DOC_ADT shown in FIG. 58, and deletes the file name of the file designated by the user from the file list 135 shown in FIG. 60. Furthermore, in step S64, the OM 11 checks the type of the document object, and in cases where the type is SS, the OM 11 alters the type to RG MR in step S65. Furthermore, in cases where the type is MD or MR, the OM 11 checks the number of remaining files in step S66, and if the number of remaining files is 1, the OM 11 alters the type to SS in step S67. In cases where the type is some other type, the OM 11 does not alter the type.

In step S71, the user requests the addition or deletion of an annotation (AN) object. Consequently, in step S72, the OM 11 refers to the document function security setting data DIC_FCS shown in FIG. 57, and checks whether or not the user is allowed access to the function of AN object addition or deletion. Then, the OM 11 performs the function of AN object addition or deletion only in cases where access to this function is allowed. In the function of AN object addition or deletion, the OM 11, in step S73, adds or deletes the annotation definition data designated by the user in the annotation administration table ANT_ADT shown in FIG. 58, and adds or deletes the information of this annotation in the annotation list 137 shown in FIG. 60.

The principle of the method of control of operations relating to document objects performed by the OM 11 as described above can also be applied to the control of operations relating to email performed by the RM 12, the control of operations relating to business processes performed by the WM 13, and the control of operations relating to projects, tasks, process work sheets and deliverables performed by the PM 14.

Next, the control of operations relating to email performed by the RM 12 will be described with a special focus on the control that is peculiar to email.

Figure 63:
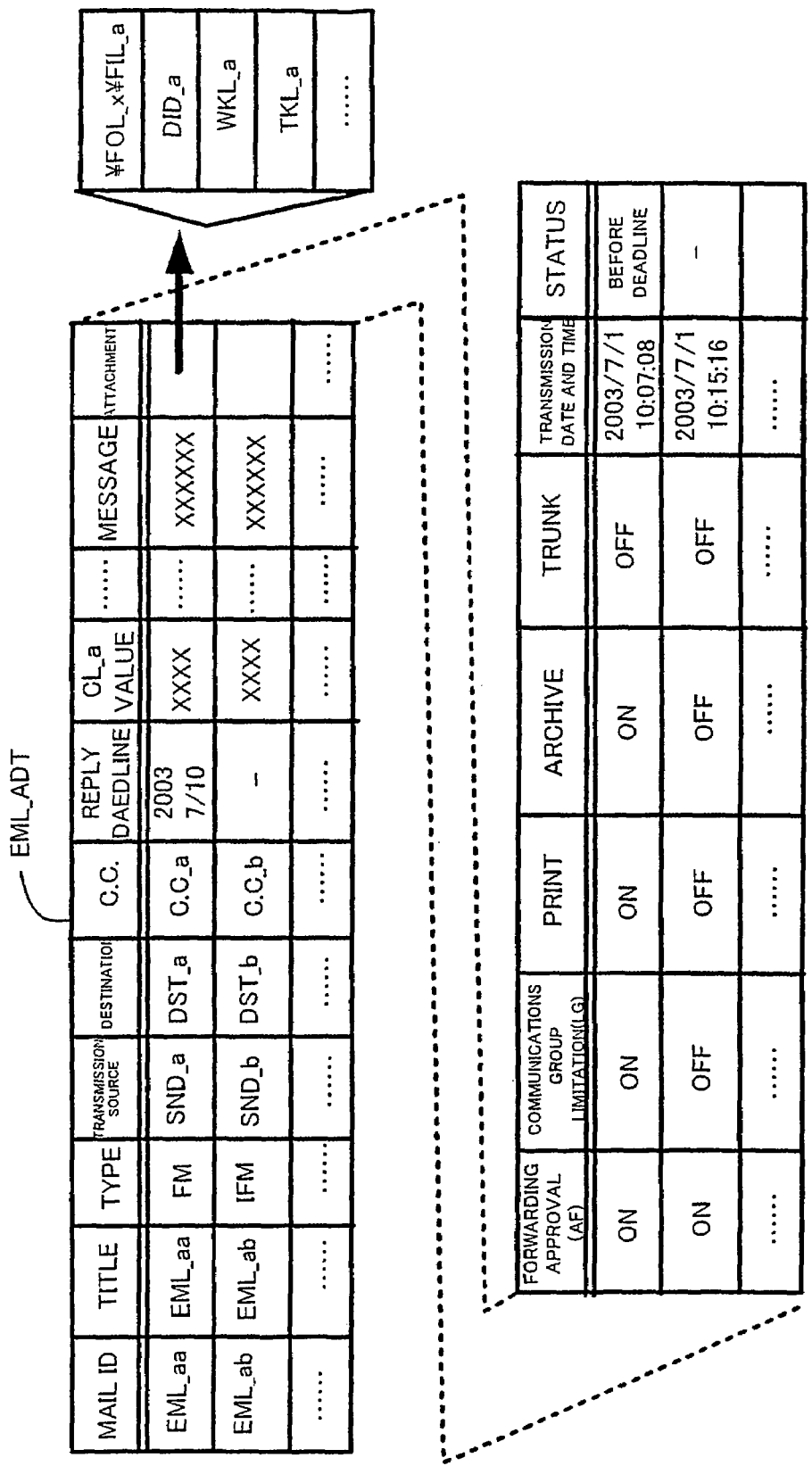
FIG. 63 is a diagram which shows an example of the structure of the email administration table EML_ADT.
Figure 64:
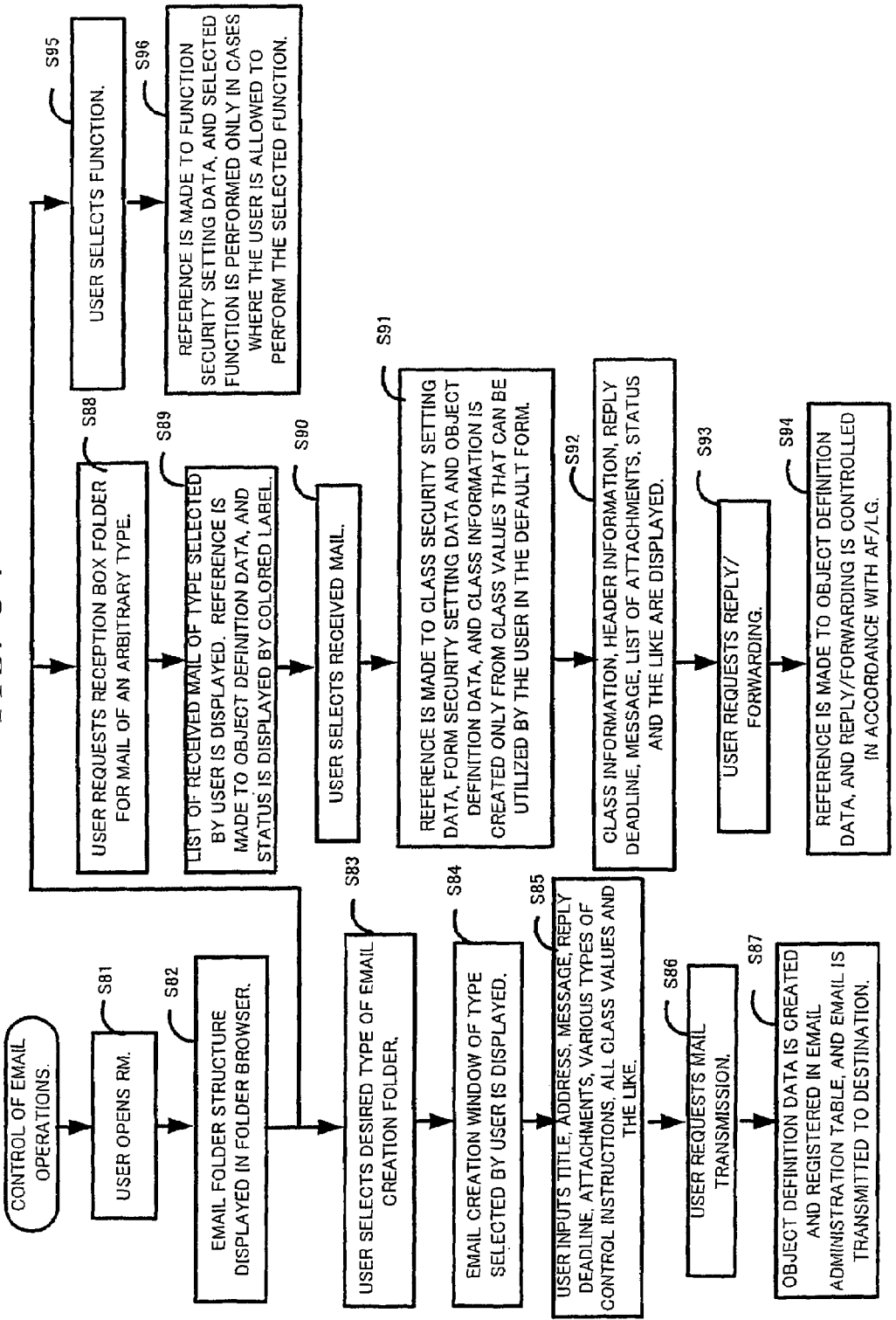
FIG. 64 is a diagram which shows the flow of an example of the control of email operations that is performed by the RM 12.
Figure 65:
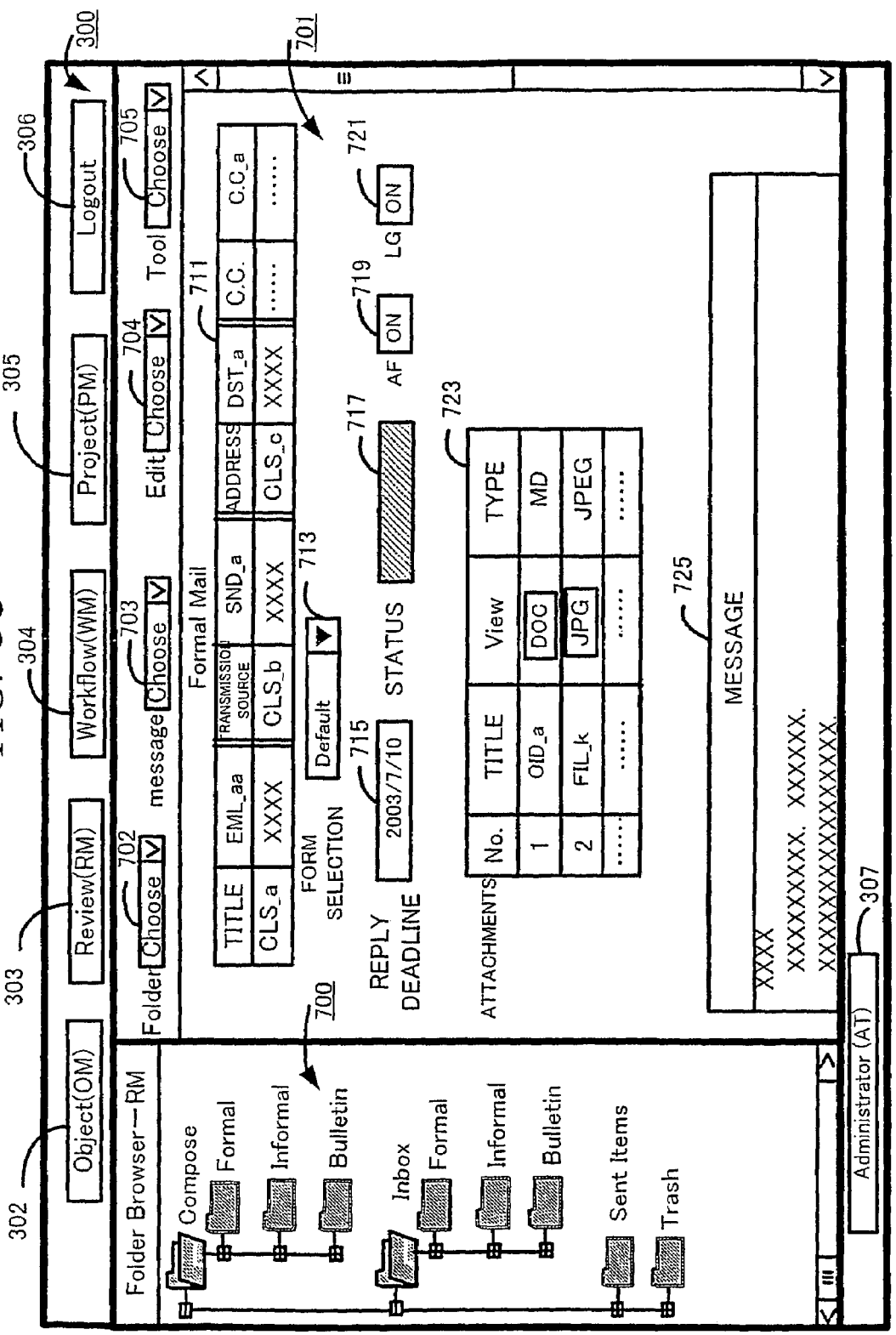
FIG. 65 is a diagram which shows an example of the GUI window that is provided by the RM 12 in order to display email messages.

FIG. 63 shows an example of the structure of the email administration table EML_ADT. FIG. 64 shows the flow of an example of the control of email operations performed by the RM 12. FIG. 65 shows an example of the GUI window that is provided by the RM 12 for the purpose of displaying email.

With regard to email, as was already described with reference to FIG. 55, control data such as email class registration data EML_CLR, email form registration data EML_FMR, email folder registration data EML_FLR, email class security setting data EML_CLS, email form security setting data EML_FMS, email function security setting data EML_FCS, email folder security setting data EML_FLS and the like is provided. These sets of control data have respective data structures that are basically similar to those of the same types of control data relating to document objects shown in FIGS. 56 and 57, i.e., document class registration data DOC_CLR, document form registration data DOC_FMR, document folder registration data DOC_FLR, document class security setting data DOC_CLS, document form security setting data DOC_FMS, document function security setting data DOC_FCS and document folder security setting data DOC_FLS.

Furthermore, as is shown in FIG. 63, object definition data defining email is registered for all of the email in the email administration table EML_ADT, and the contents of this data can be arbitrarily defined by the users who created the email. In FIG. 63, each row in the email administration table EML_ADT expresses object definition data for one of the emails. As is shown in the figure, set values for items such as "mail ID", "title", "type", "transmission source", "address", "CC", "reply deadline", "CLS_a value", . . . , "message", "attachments", "permission to send", "communications group limitation", "print instructions", "archive instructions", "trunk instructions", "transmission date and time", "status" and the like are defined in the object definition data for each email. Here, the items "mail ID", "title", "transmission source", "address" and "CC" have the same meanings as similar data contained in the headers of common universally known email. One type selected from the types of formal mail (FM), informal mail (IFM) and bulletin mail (BM) (described with reference to FIG. 5), which is given to each email, is set in the item "type". In the example shown in FIG. 58, the type of the initial email is "FM", and the type of the second email is "IFM". Furthermore, the deadline by which the receiver is supposed to reply to this email is set in the item "reply deadline". The value of "reply deadline" is set only in cases where the type of the email is "FM"; this value is not set in the case of other types. User input values (e.g., text, selected selection branch or the like) for all of the class names CLS_a, . . . defined in the email class registration data EML_CLR (which has the same structure as the document class registration data DOC_CLR shown in FIG. 56) are set in the items "CLS_a value", . . . . The main text message of the email is set in the item "message". Reference values for data attached to the email are set in the item "attachments". Data that can be attached includes files and various types of objects. In cases where files are attached, for example, the full-path file names of the files can be set as the reference values; furthermore, in cases where objects are attached, for example, the object ID of the objects can be set as the reference values. In the example shown in FIG. 63, the file "¥FOL_x¥FIL_a", the document object "DID_a", the work list "WKL_a", the task list "TKL_a" and the like are attached to the initial email. The flag values (ON or OFF) of the forwarding approval (AF) and communications group limitation (LG) described with reference to FIG. 5 are set in the items "forwarding approval" and "communications group limitation". The presence or absence (ON or OFF) of instructions for entering the email objects (or not entering the email objects) in folders that store specified objects of printing, folders for object archives and folders for object distribution are set in the items "print instructions", "archive instructions" and "trunk instructions". The status relating to the relationship between the abovementioned reply deadline and the current point in time (deadline expired, before deadline, deadline close or the like) is automatically set in the item "status".

FIG. 64 shows the flow of an example of the control of email operations performed by the RM 12.

As is shown in FIG. 64, the user opens the RM 12 in step 581. Consequently, in step S82, the RM 12 refers to the email folder registration table EML_FLR, and grasps the hierarchical structure of folders relating to the email; furthermore, the RM 12 refers to the email folder security setting table EML_FLS, and grasps the folders that can or cannot be accessed by the user. Then, the RM 12 displays an email folder structure in which folders that can be accessed by the user and folders that cannot be accessed by the user are distinguished by color in the folder browser window of a specified GUI window. FIG. 65 shows an example of this GUI window; the abovementioned email folder structure is displayed in the folder browser window 700 on the left side.

In step S83, the user selects a folder for mail creation of the desired type (FM, IFM or BM) in the folder browser window 700 shown in FIG. 65. For instance, in the example shown in FIG. 65, the folders "formal" "informal" and "bulletin" inside the folder "compose" are respectively folders that are used to create formal mail (FM), informal mail (IFM) and bulletin mail (BM). Consequently, in step S84, the RM 12 displays the mail creation window used to create mail of the type selected by the user in the main window 701 inside the GUI window shown in FIG. 65 (however, in the example shown in FIG. 65, the contents of the received mail displayed in step S92 described later are displayed in the main window 701 rather than the mail creation window). In step S85, the user inputs the title, address, message, reply deadline, attachments, various types of control instructions (forwarding approval, communications group limitation, print instructions, archive instructions, trunk instructions or the like) and all of the class values into the displayed mail creation window. In step S86, the user requests mail transmission. Consequently, in step S87, the RM 12 creates new mail object definition data on the basis of the abovementioned information input by the user, registers this data in the email administration table EML_ADT, and transmits the email to the address.

In step S88, the user selects a reception box folder for mail of an arbitrary type in the folder browser window 700 shown in FIG. 65. In the example shown in FIG. 65, the folders "formal", "informal" and "bulletin" inside the folder "inbox" are respectively reception box folders for formal mail (FM), informal mail (IFM) and bulletin mail (BM). Consequently, in step S89, the RM 12 displays a list of received mail of the type selected by the user in the main window 701 shown in FIG. 65. In this case, the RM 12 refers to the object definition data of the received mail in the email administration table EML_ADT, acquires the status of the respective received mails, and displays the acquired status in the received email list using colored labels. In step S90, the user selects an arbitrary received mail from the received mail list. Consequently, in step S91, the RM 12 refers to the email class security setting data EML_CLS and email form security setting data EML_FMS, and grasps the classes contained in the default form that can be utilized by the user, and that can be accessed by the user. Then, the RM 12 acquires object definition data for the selected received mail in the email administration table ENL_ADT, and creates class information from only the class values that can be accessed by the user on the basis of this data. Furthermore, the RM 12 refers to the email form security setting data EML_FMS, and creates a form selection combo box for the selection of accessible forms by the user. Then, in step S92, the RM 12 displays the class information, form selection combo box and information acquired from other object definition data in the main window 701 shown in FIG. 65. In the example shown in FIG. 65, a table 711 expressing header information and class information, a form selection combo box 713, a reply deadline 715, a colored label 717 indicating the status, a forwarding approval (AF) flag value 719, a communications group limitation (LG) flag value 721, an attachment list 723, a main text message 725 and the like are displayed inside the main window 701. Furthermore, the RM 12 forwards the selected received mail to the designated folder in accordance with the values of the print instructions, archive instructions and trunk instructions in the object definition data for the selected received mail.

Subsequently, in step S93, the user requests the reply to, or forwarding of, the selected received mail. Consequently, in step S94, the RM 12 controls the reply to or forwarding of the received mail on the basis of the forwarding approval (AF)

flag value 719 or communications group limitation (LG) flag value 721 in the object definition data of the selected received mail.

In step S95, the user selects an arbitrary function of the RM 12. Consequently, in step S96, the RM 12 refers to the email function security setting data EML_FCS, and performs the selected function only in cases where the user is allowed access to the selected function.

Next, the control of operations relating to business processes and tasks that is performed by the WM 13 will be described.

Figure 66:
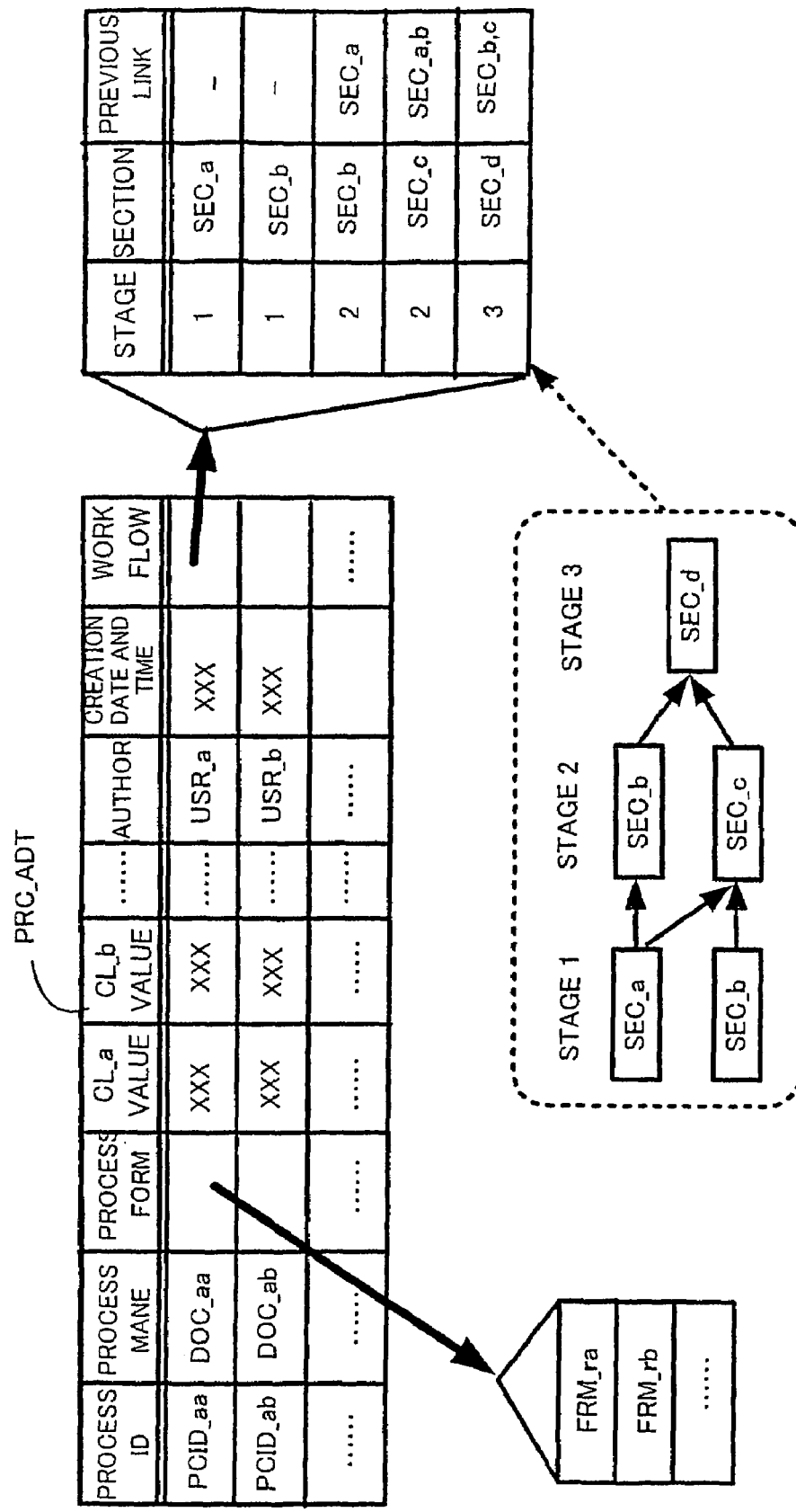
FIG. 66 is a diagram which shows an example of the structure of the process administration table PRC_ADT.
Figure 67:
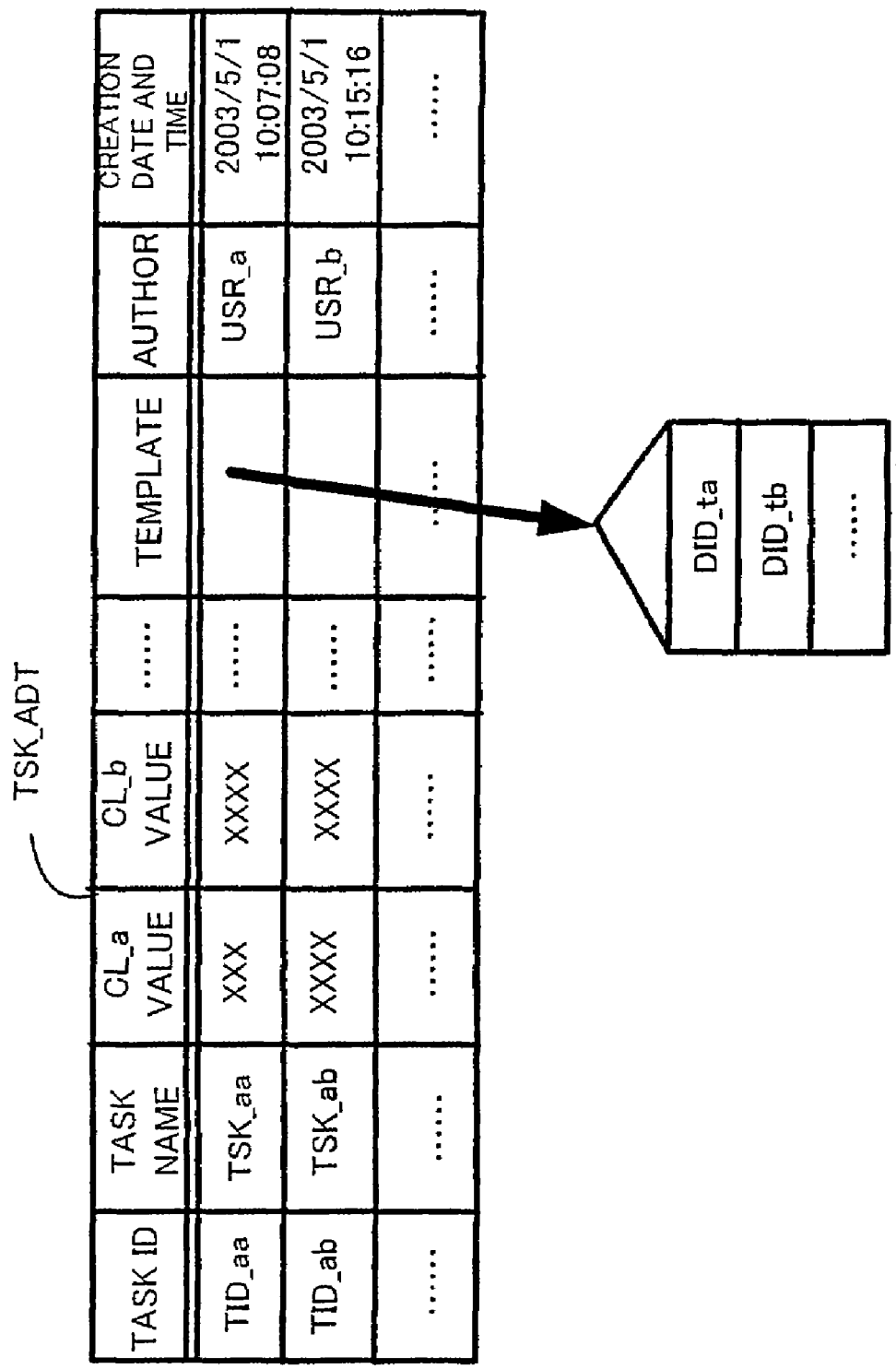
FIG. 67 is a diagram which shows an example of the structure of the task administration table TSK_ADT.

FIG. 66 shows an example of the structure of the process administration table PRC_ADT. FIG. 67 shows an example of the structure of the task administration table TSK_ADT.

With regard to business processes, as was already described with reference to FIG. 55, process class registration data PRC_CLR, process form registration data PRC_FMR, process folder registration data PRC_FLR, process class security setting data PRC_CLS, process form security setting data PRC_FMS, process function security setting data PRC_FCS and process folder security setting data PRC_FLS are provided. Furthermore, with regard to tasks, task class registration data TSK_CLR, task form registration data TSK_FMR, task class security setting data TSK_CLS, task form security setting data TSK_FMS and task function security setting data TSK_FCS are provided. The structures of these sets of control data are basically similar to the structures of control data of the same types relating to document objects shown in FIGS. 56 and 57, i.e., document class registration data DOC_CLR, document form registration data DOC_FMR, document folder registration data DOC_FLR, document class security setting data DOC_CLS, document form security setting data DOC_FMS, document function security setting data DOC_FCS and document folder security setting data DOC_FLS.

Furthermore, as is shown in FIG. 66, object definition data defining the business processes is registered in the process administration table PRC_ADT for all of the business processes; the contents of this data can be arbitrarily defined by the users who created the business processes. In FIG. 66, each line in the process administration table PRC_ADT expresses object definition data for one of the business processes. As is shown in the figure, set values for items such as "process ID", "process name", "process form", "CLS_a value", "CLS_b value", . . . , "author", "creation date and time", "workflow" and the like are defined in the object definition data for each business process. Here, the names of one or more forms (process forms) used as process work sheets (reports) in each business process are set in the item "process form"; these are forms that are selected from a plurality of process forms ("approval", "default" and "specification" in the example shown in FIG. 9) that have been prepared beforehand using the form selection tools 513, 514 and 515 in the process registration window shown in FIG. 9 by the user who created the business process. Here, the plurality of process forms (process work sheet forms) and class names (process work sheet classes) that have been prepared beforehand are defined in the process work sheet form registration data PWS_FMR and process work sheet class registration data PWS_CLR shown in FIG. 55; these can also be freely defined by users having the authorization to register process work sheets. Input values (e.g., text, selected selection branch or the like) input by the user for all of the class names CLS_a, . . . defined in the process class registration data PRC_CLR (which has the same structure as the document class registration data DOC_CLR) shown in FIG. 56) are set in the items "CLS_a value", . . . . The data of a workflow model for the business process (constructed using the GUI windows shown for example in FIGS. 13 through 16) is set in the item "workflow". For example, as is shown in FIG. 66, the data of this workflow model is constructed from data expressing all of the stages possessed by the workflow model, the names of all of the sections assigned to the respective stages, links of the respective sections of the respective stages with sections of previous stages and the like (the data example shown in FIG. 66 expresses a workflow model example indicated inside dotted-line frames).

Furthermore, as is shown in FIG. 67, object definition data defining the tasks is registered for all of the tasks in the task administration table TSK_ADT; the contents of this data can be arbitrarily defined by the users who created the tasks. In FIG. 67, each row in the task administration table TSK_ADT expresses object definition data for one of the tasks. As is shown in the figure, set values for items such as "task ID", "task name", "CLS_a value", "CLS_b value", . . . , "template", "author", "creation date and time" and the like are defined in the object definition data for each task. Here, the input values (e. g., text, selected selection branch or the like) input by the user for all of the class names CLS_a, . . . defined in the task class registration data TSK_CLR (which has the same structure as the document class registration data DOC_CLR shown in FIG. 56) are set in the items "CLS_a", "CLS_b", . . . . Furthermore, reference values, e.g., document ID, for one or more document objects (templates) used as a standard model of deliverables to which reference can be made when the user performing the task creates document objects that constitute deliverables are set in the item "template".

When operations such as the display, creation, modification, deletion of business processes and tasks (as well as various other types of operations) are performed, the WM 13 can control the operations of these business processes and tasks using data relating to the abovementioned business processes and tasks according to a principle similar to that of the control performed by the OM 11 with respect to document objects.

Next, the control of operations relating to projects that is performed by the PM 14, and especially the control of operations relating to tasks within such projects, will be described.

Figure 68:
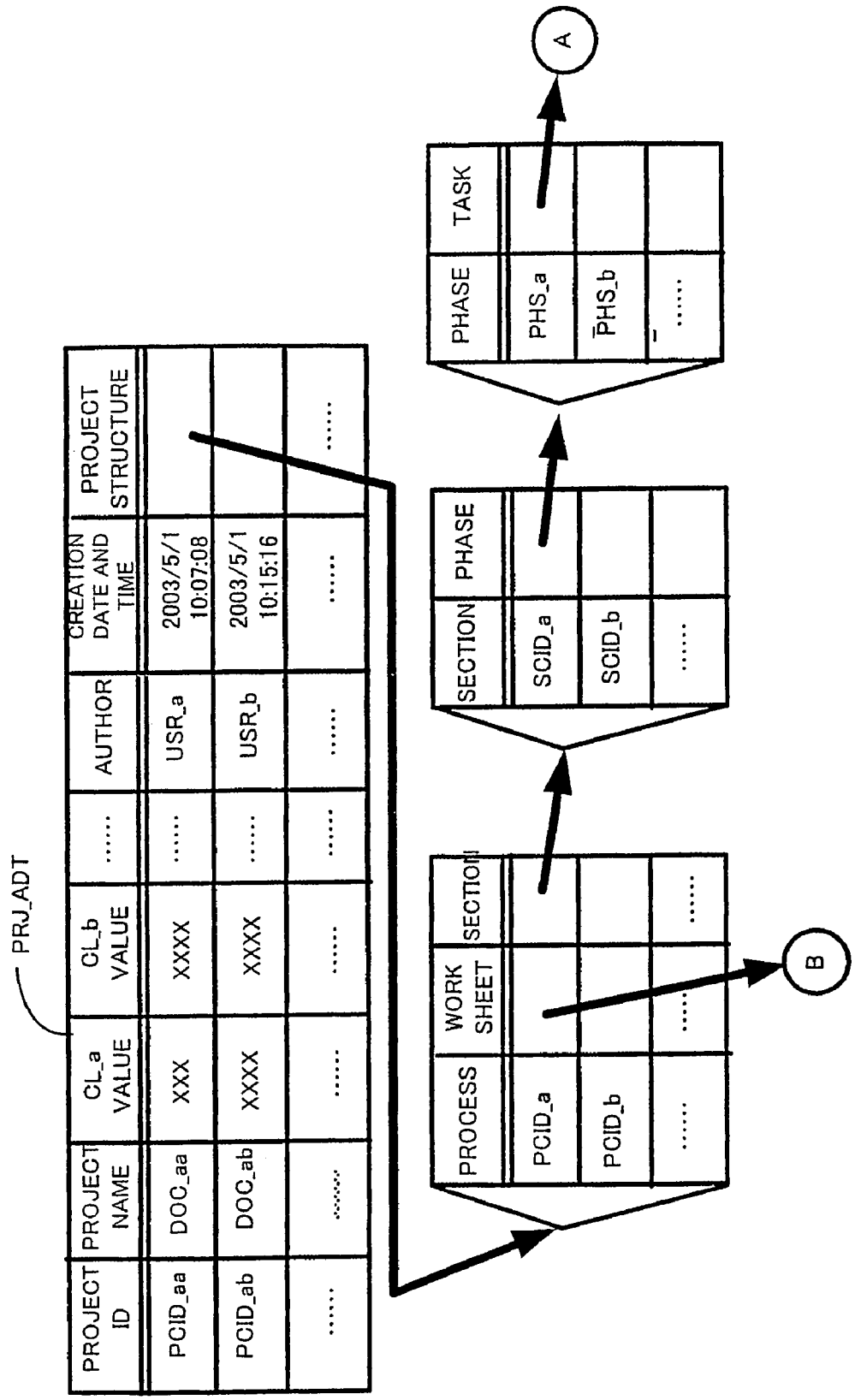
FIGS. 68 and 69 are connected diagrams which show an example of the structure of the project administration table PRC_ADT.
Figure 69:
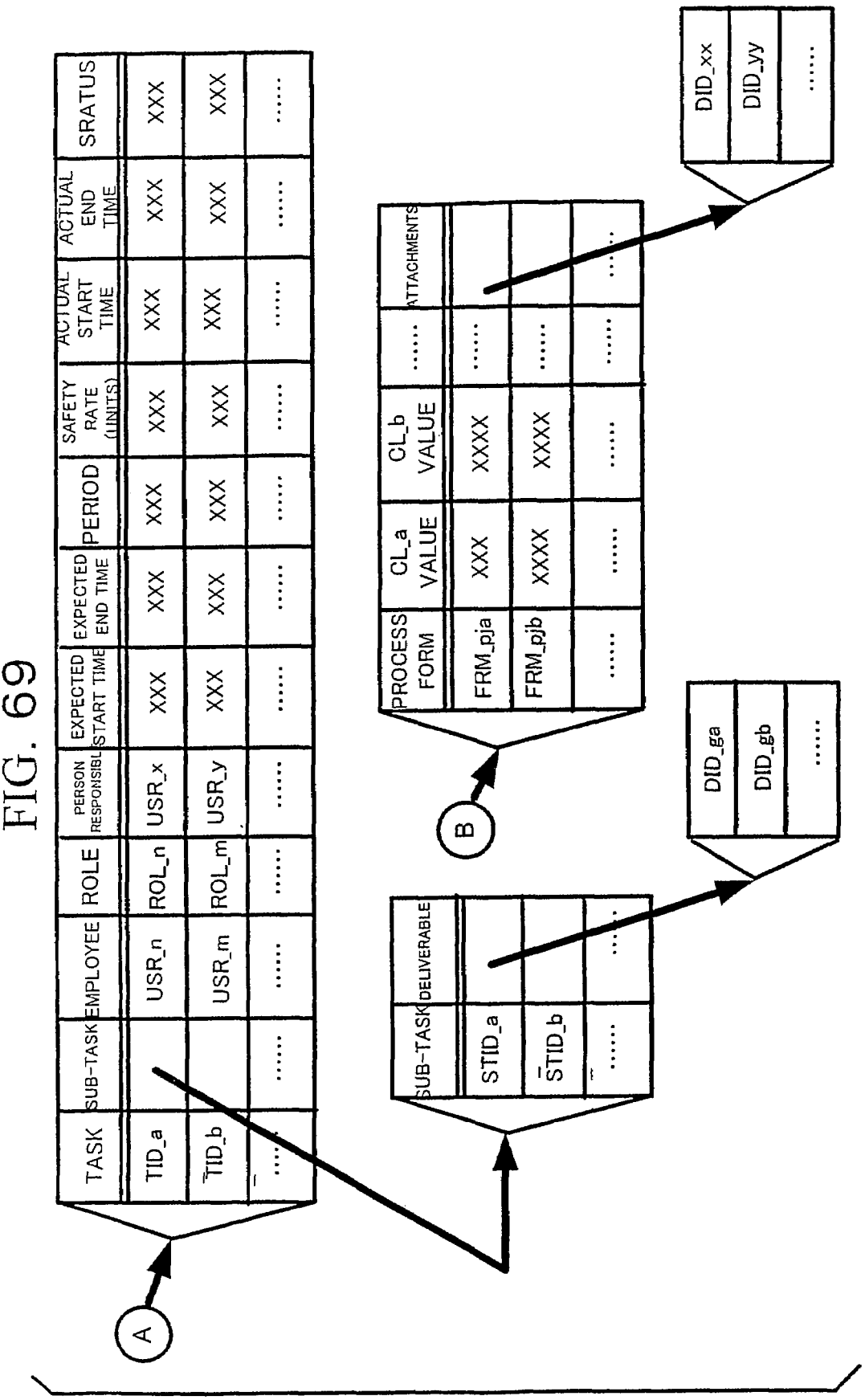
Figure 70:
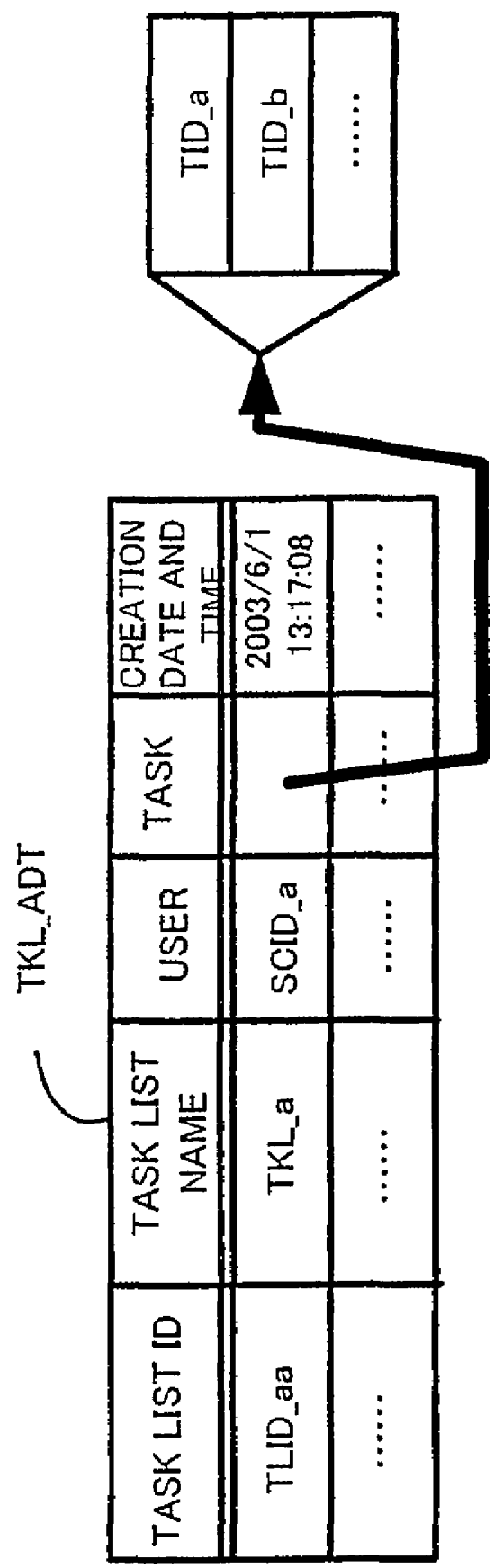
FIG. 70 is a diagram which shows an example of the structure of the task list administration table TKL_ADT.
Figure 71:
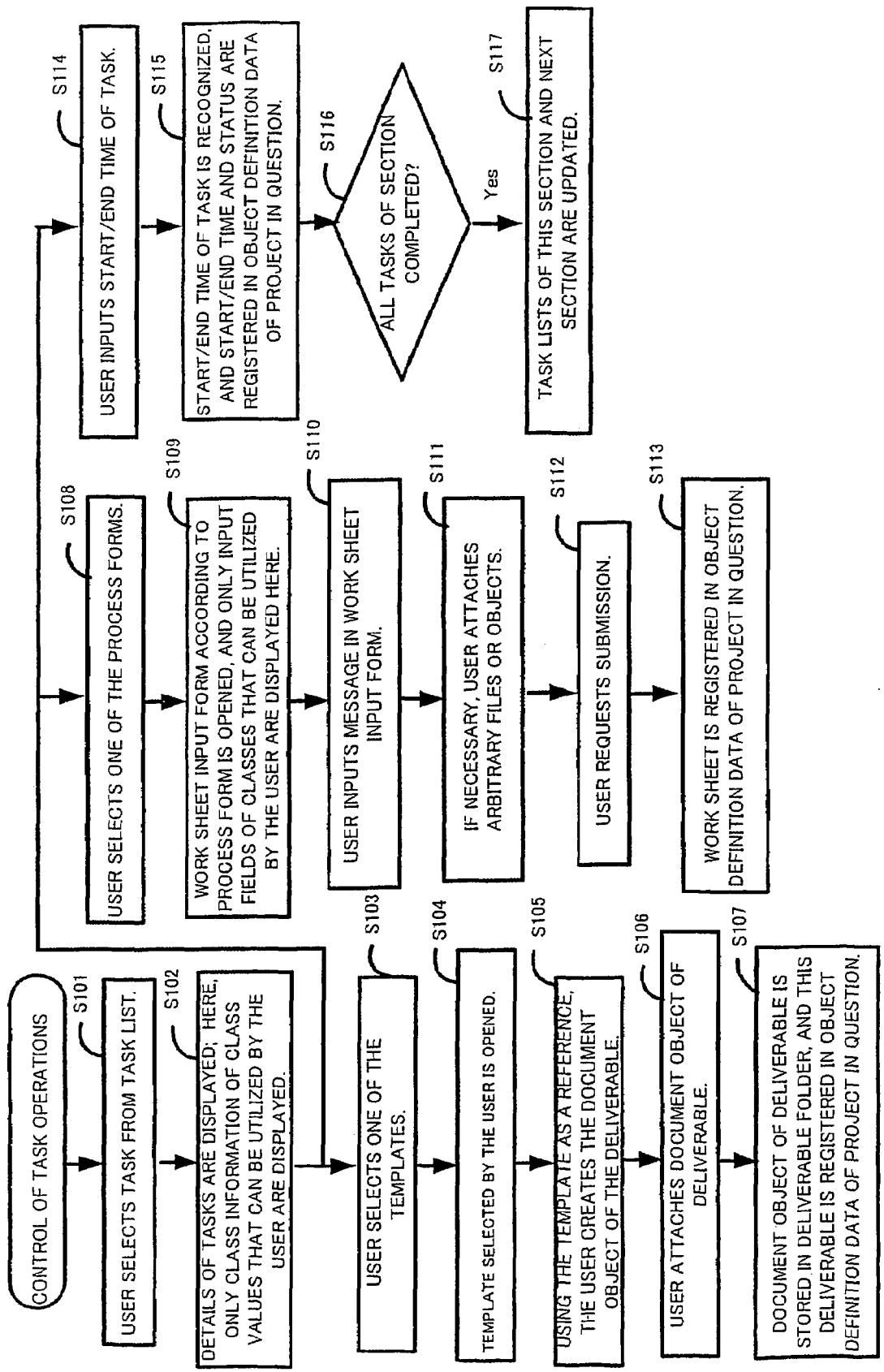
FIG. 71 is a diagram which shows the flow of an example of the control of operations relating to tasks within projects that is performed by the PM 14.

FIGS. 68 and 69 are connected, and show an example of the structure of the project administration table PRC_ADT. FIG. 70 shows an example of the structure of the task list administration table TKL_ADT. FIG. 71 shows the flow of an example of the control of operations relating to tasks within projects that is performed by the PM 14.

In regard to projects, s was already described with reference to FIG. 55, project class registration data PRJ_CLR, project form registration data PRJ_FMR, project folder registration data PRJ_FLR, project class security setting data PRJ_CLS, project form security setting data PRJ_FMS, projection function security setting data PRJ_FCS and project folder security setting data PRJ_FLS are provided. The structures of these sets of control data are basically similar to those of the control data of the same types relating to document objects shown in FIGS. 56 and 57, i.e., document class registration data DOC_CLR, document form registration data DOC_FMR, document folder registration data DOC_FLR, document class security setting data DOC_CLS, document form security setting data DOC_FMS, document function security setting data DOC_FCS and document folder security setting data DOC_FLS.

Furthermore, as was already described with reference to FIG. 55, process work sheet class registration data PWS_CLR, process work sheet form registration data PWS_FMR, process work sheet class security setting data PWS_CLS, process work sheet form security setting data PWS_FMS and process work sheet function security setting data PWS_FCS are provided for process work sheets (reports that are transferred from user to user in the process of performing business processes within a certain project). The structures of these sets of control data are also basically similar to those of the control data of the same types relating to document objects shown in FIGS. 56 and 57, i.e., document class registration data DOC_CLR, document form registration data DOC_FMR, document folder registration data DOC_FLR, document class security setting data DOC_CLS, document form security setting data DOC_FMS, document function security setting data DOC_FCS and document folder security setting data DOC_FLS.

As is shown in FIG. 68, object definition data defining the projects is registered in the project administration table PRJ_ADT for all of the projects; the contents of this data can be arbitrarily defined by the users who created the projects. In FIG. 68, each line in the project administration table PRJ_ADT expresses object definition data for one of the projects. As is shown in the figure, set values for items such as "project ID", "project name", "CLS_a value", "CLS_b value", . . . "author", "creation date and time", "project structure" and the like are defined in the object definition data for each project. Here, the input values (e.g., text, selected selection branch or the like) input by the user for all of the class names CLS_a, defined in the project class registration data PRJ_CLR (which has the same structure as the document class registration data DOC_CLR shown in FIG. 56) are set in the items "CLS_a", "CLS_b", . . . .

Data expressing the structure of the project is set in the item "project structure". As is shown in FIG. 68, set values for the items "process", "work sheet" and "section" are included in this project structure data. Reference values, e.g., process ID, for all of the business processes (workflow models) assigned to the project are set in the item "process". Data for one or more process work sheets (reports) created by the user in the respective execution of all of the business processes assigned to the project is set in the item "work sheet". The concrete construction of this process work sheet data will be described later with reference to FIG. 69. Reference values, e.g., section ID, for all of the sections included in the workflow model of the business process, and data for the item "phase" for each section, are set for all of the business processes assigned to the project in the item "section". The data for the item "phase" includes the names of all of the phases set for the business process, and data for the item "task" for each phase. As is shown in FIG. 69, the data for the item "task" includes set values for items such as reference values, e.g., task ID, for all of the tasks assigned to the phases of the business process, as well as "sub-tasks", "employees", "role", "person responsible", "expected start time", "expected end time", "period", "safety rate", "actual start time", "actual end time", "status" and the like for each task.

Reference values, e.g., task ID of sub-tasks, for all of the sub-tasks assigned to each task, and data for the item "deliverables" for each task, are set in the item "sub-tasks" for each task. Data for the item "deliverables" for each task includes reference values, e.g., document ID, for all of the document objects constituting deliverables created by the user performing the sub-task. Furthermore, employees, roles, persons responsible, expected start time, expected end time, period, safety rate, actual start time and actual end time that are assigned or set for each task of each phase of the project are set in the items "employees", "role", "person responsible", "expected start time", "expected end time", "period", "safety rate", "actual start time" and "actual end time" for each task. Furthermore, status data expressing the start, end or rate of progress of each task is automatically set by the PM 14 (as will be described later) in the item "status" for each task.

As is shown in FIG. 69, data defining all of the process work sheets created in the business process is included in the process work sheet data set in the item "work sheet" for each business process shown in FIG. 68. The definition data for each process work sheet includes set values for items such as "process form", "CLS_a value", "CLS_b value", . . . , "attachments" and the like. Here, the names of the process forms used in the creation of the process work sheet are set in the item "process form". The input values (e.g., text, selected selection branch or the like) input by the user for all of the class names CLS_a, defined in the process work sheet class registration data PWS_CLR (which has the same structure as the document class registration data DOC_CLR shown in FIG. 56) are set in the items "CLS_a", "CLS_b", . . . . Reference values, e.g., full-path file names or object ID, for files or objects that are attached to the process work sheet are set in the item "attachments".

Furthermore, as is shown in FIG. 70, object definition data defining the task lists is registered for all of the task lists in the task list administration table TKL_ADT; the contents of this data are automatically defined when the PM 14 creates the task lists as shown in FIG. 45, or when the task lists are updated in step S117 shown in FIG. 71 (described later). In FIG. 70, each row in the task list administration table TSK_ADT expresses object definition data for one of the task lists. As is shown in the figure, set values for items such as "task list ID", "task list name", "user", "task", "creation date and time" and the like are defined in the object definition data for each task list. Here, reference values to the users (sections or employees) using the task lists, e.g., user ID, are set in the item "user". Reference values for all of the tasks included in the task list, e.g., task ID, are set in the item "task".

FIG. 71 shows the flow of an example of the control of task operations within the project that is performed by the PM 14.

In FIG. 71, the user selects a desired task belonging to a desired business process of a desired project from the GUI window of the OM 11 (shown in FIG. 41) in step S101. Consequently, in step S102, the PM 14 displays details of the selected task in the GUI window of the OM 11 as shown in FIGS. 42 and 43. In this case, the PM 14 refers to the task class security setting data TSK_CLS shown in FIG. 55, and grasps the classes that can be accessed by the user. Furthermore, the PM 14 acquires the class values of the abovementioned accessible classes for the abovementioned selected task from the object definition data for the abovementioned desired project in the project administration data PRJ_ADT shown in FIGS. 68 and 69, and displays class information comprising these class values in the class detail table 115 of the GUI window shown in FIG. 42. Furthermore, the PM 14 displays the templates used in the task defined in the task administration table TSK_ADT shown in FIG. 67 in the task status table 117 inside the GUI window shown in FIG. 43. Furthermore, the PM 14 displays a list 118 of the process forms used in the business process defined in the process administration table PRC_ADT shown in FIG. 66 in the GUI window shown in FIG. 43.

Referring again to FIG. 71, the user selects one of the templates in the task status table 117 shown in FIG. 43 in step S103. Consequently, in step S104, the PM 14 opens the template selected by the user. In step S105, the user refers to the opened template, and creates the document object constituting the deliverable of the task. In step S106, the user attaches the document object of the created deliverable to the project by operating the task status table 117 shown in FIG. 43. Consequently, in step S107, the PM 14 stores the document object of the deliverable in the deliverable folder DLV_FLD_a shown in FIG. 55; furthermore, the PM 14 registers the document object of the deliverable in the object definition data of the project in the project administration table PRJ_ADT shown in FIGS. 68 and 69.

In step S108, the user selects one of the process forms from the process form list 118 shown in FIG. 43. Consequently, in step A109, the PM 14 opens the work sheet input form 121 according to the selected process form in the GUI window as shown in FIG. 44. In this case, the PM 14 refers to the process work sheet class registration data PWS_CLR, process work sheet form registration data PWS_FMR, process work sheet class security setting data PWS_CLS and process work sheet form security setting data PWS_FMS shown in FIG. 55, and grasps the classes that belong to a specified default class that can be accessed by the user, and that are classes that can be accessed by the user; the PM 14 then displays tools (text box, radio button, check box, combo box or the like) used to input these accessible class values in the work sheet input form 121 shown in FIG. 44. Further, the PM 14 prepares a combo box 123 for selecting a process work sheet form accessible by the user, and displays the same also in the work sheet input form 121 as shown in FIG. 44. Furthermore, the PM 14 also displays a list 123 of attachments to the process work sheet in the work sheet input form 121.

In step S110, the user inputs a report message into the work sheet input form 121 shown in FIG. 44, and creates a process work sheet. In step S111, the user (if necessary) attaches arbitrary files or objects to the process work sheet using the attachment list 123 shown in FIG. 44. In step S112, user operates the submit button 124 shown in FIG. 44, and requests submission of this process work sheet. Consequently, in step S113, the PM 14 registers the process work sheet in the object definition data of the project in the project administration table PRJ_ADT shown in FIGS. 68 and 69.

In step S114, the user inputs the actual start time and actual end time for the task displayed in FIG. 42. Consequently, in step S114, the PM recognizes that the task has actually been started or completed, and registers the actual start time or actual end time and status (start or end) of the task in the object definition data of the project in the project administration table PRJ_ADT shown in FIGS. 68 and 69. Then, in step S116, the PM 14 refers to the object definition data of the project in the project administration table PRJ_ADT shown in FIGS. 68 and 69, and checks whether or not all of the tasks of the section of the project have actually been completed. As a result, if all of the tasks of the section of the projects have actually been completed, the task list of this section and the task list of the next section (which section is the next section is understood from the workflow of the project in question in the process administration table PRC_ADT shown in FIG. 66) are updated in step S117 as shown in FIG. 45.

An embodiment of the present invention was described above. However, this embodiment is merely an example used to illustrate the present invention; the scope of the present invention is not limited to this embodiment alone. Accordingly, the present invention can be worked in various other aspects that involve no departure from the gist of the invention.

The invention claimed is:

1. A virtual knowledge management system using a computer, comprising:
   a virtual knowledge base which stores a plurality of objects that are data entities for respective utilization by a plurality of users, and that belong to different object types, and control data that is provided corresponding to each of said object types, and that relates to the control of object operations performed by said users; and
   a manager which has a plurality of types of functions for respectively performing a plurality of types of object operations including the display and preparation of said objects belonging to each object type in accordance with requests from said users;
   wherein the respective functions of said manager control the respective operations for said objects belonging to the respective object types in accordance with the control data of the corresponding object types;
   wherein said objects belonging to one of said object types are email messages;
   the respective email messages have type data which indicates one type selected from a plurality of specified types differing in whether or not replay deadline is set, and when said replay deadline is set, also have deadline data indicating the replay deadline and status data which indicates whether not the reply deadline has expired;
   the function for displaying said email messages inside said manager displays the type data of the respective email messages and, when said email messages have the replay deadline data and status data, also displays the replay deadline and status of the respective email messages.

2. The virtual knowledge management system according to claim 1, wherein said objects belonging to one of said object types are email messages;
   the respective email messages have reply/forwarding control data which relates to the reply to, or forwarding of, the respective email messages;
   said manager has a reply/forwarding function for replying to or forwarding said email messages in accordance with requests from said users, and said reply/forwarding function is arranged so that this function controls the reply to or forwarding of the respective email messages on the basis of said reply/forwarding control data possessed by the respective email messages.

3. A virtual knowledge management system comprising:
   intensive data administration means for the intensive administration of various types of documents or data that exist in an enterprise;
   a control data editing part which prepares and alters information flow control data involved in the control of the information flow among a plurality of users, and which registers said prepared or altered information flow control data in a memory device; and
   an information flow control part which uses said information flow control data registered in said memory device to control the flow of said various types of documents or data among a plurality of user terminals used by said plurality of users, wherein said control data editing part has a mail communications control data editing part which prepares and alters mail communications control data that indicates desired limitations regarding the forwarding of, or reply to, email messages transmitted from the respective users as one type of said information flow control data, and associates the prepared or altered mail communications control data with email messages transmitted from the respective users, in response to requests from respective users; and said information flow control part has a mail communications control part which controls the forwarding or reply operations of receivers of the respective email messages on the basis of the mail communications control data associated with the email messages transmitted from said respective users.

4. A virtual knowledge management system using a computer, comprising:

a virtual knowledge base which stores a plurality of objects that are data entities for respective utilization by a plurality of users, and that belong to different object types, and control data that is provided corresponding to each of said object types, and that relates to the control of object operations performed by said users; and a manager which has a plurality of types of functions for respectively performing a plurality of types of object operations including the display and preparation of said objects belonging to each object type in accordance with requests from said users;

wherein the respective functions of said manager control the respective operations for said objects belonging to the respective object types in accordance with the control data of the corresponding object types, wherein said control data corresponding to the respective object types includes:

class definition data which defines one or more classes which correspond to one or more attribute items possessed by said objects belonging to the respective object types; and class security setting data which defines the classes that can be accessed or that cannot be accessed by the respective users among said one or more classes;

said objects belonging to the respective object types have values of said one or more classes defined by said class definition data corresponding to the respective object types; and said function used to display said objects inside said manager is arranged so that the values of classes that can be accessed by the respective users are selected from the values of said one or more classes possessed by said objects belonging to the respective object types, and are displayed to the respective users, on the basis of said class security setting data corresponding to the respective object types.

5. The virtual knowledge management system according to claim 4, wherein said control data corresponding to the respective object types includes:

folder definition data which defines one or more folders in which said objects belonging to the respective object types are stored; and folder security setting data which defines the folders that can be accessed or that cannot be accessed by the respective users among said one or more folders;

said manager further has a folder operating function for operating said one or more folders defined by said folder definition data corresponding to the respective object types in accordance with requests from the respective users; and said folder operating function is arranged so that folders are displayed with a distinction being made between folders that can be accessed and folders that cannot be accessed by the respective users on the basis of said folder security setting data corresponding to the respective object types, and so that only folders that can be accessed by the respective users among said one or more folders that are displayed are opened in accordance with requests from the respective users.

6. The virtual knowledge management system according to claim 4, wherein:

said control data corresponding to the respective object types includes function security setting data which defines functions that can be accessed or that cannot be accessed by the respective users among said plurality of types of functions inside said manager; and said manager is arranged so that only the functions that are defined by said function security setting data corresponding to the respective object types as being accessible by the respective users, among said plurality of types of functions for the respective object types inside said manager, can be operated in accordance with requests from the respective users.

7. A virtual knowledge management system according to claim 4, wherein: said control data corresponding to the respective object types includes:

form definition data which defines one or more forms each of which corresponds to an aggregates of one or more selected classes selected from said classes defined by said class definition data; and form security setting data which defines a form or forms that can be accessed or that cannot be accessed by the respective users among said one or more forms defined by said form definition data; and said function used to display said objects inside said manager is arranged so that the forms that can be accessed by the respective users according to said form security setting data are selected from the one or more forms defined by said form definition data, and are displayed to the respective users, said respective forms displayed to the respective users display the values of the selected classes of said objects, said selected classes being included in the displayed form and can be accessed by the respective users according to said class security setting data.

8. The virtual knowledge management system according to claim 4, wherein:

said objects belonging to one of said object types are document objects which can be associated with document files;

the respective document objects have type data which indicates one type selected from a plurality of specified types differing in the numbers or types of associated document files, and also have association data which indicates the association with one or more document files in cases where the document objects are associated with said one or more document files;

the function for displaying said document objects inside said manager displays the types of the respective document objects on the basis of said type data of the respective document objects, and displays the document files associated with the respective document objects on the basis of said association data of the respective document objects, and opens said associated document files in accordance with requests from said users.

9. The virtual knowledge management system according to claim 8, wherein: said plurality of specified types include a single sheet object that is associated with a document file having a single sheet, a multi sheet object that is associated with a document file having a plurality of sheets, a multi document object that is associated with a plurality of document files of which information is different, a multi representation object that is associated with a plurality of document files if which formats are different an annotation object that is associated with a document file or a set of document files which expresses an annotation or annotations accompanying another document object, and a registered object that is not yet associated with an actual document file.

10. A virtual knowledge management system according to claim 9, wherein:

when a user who is allowed to perform a function of opening files, selects a document file to be opened from said document files associated with a displayed document object which is of type of said multi representation object, the function for displaying said document objects inside said manager opens all of the document files associated with said displayed document object.

11. The virtual knowledge management system according to claim 4, wherein:

said objects belonging to one of said object types are business processes which respectively have one or more sets of workflow model data that respectively define the flow of work among a plurality of users;

said objects belonging to another one of said object types are tasks which have task data that defines the work that can be performed by said users said objects belonging to another one of said object types are projects, these respective projects are associated with one or more of said business processes, and with one or more of said tasks respectively assigned to one or more of said users as defined by the workflow data of the respective business processes;

said manager further has a project control function for controlling the progress of the respective projects in accordance with requests from said users; and said project control function is arranged so that this function prepares and displays a task list that lists the tasks assigned to each of the users on the basis of said one or more business processes and said one or more tasks associated with the respective projects, and so that this function updates said task list for the respective users in accordance with input indicating the initiation or completion of tasks from the respective users, said knowledge data base further stores a project administration table which includes a plurality of users who execute one or more projects, a plurality of tasks which must be executed by the plurality of users, an execution sequence for execution of the tasks by said plurality of users, and status of said plurality of tasks;

said project control function comprises, means for displaying said task list of tasks which each of said users can execute upon a user terminal of said user, based upon said project administration table;

means for receiving input from each said user which indicates that said task has ended, and setting the status of said task in said project administration table to ended;

means for checking, based upon said project administration table, whether or not all of tasks for each of said users have ended; and means for, if some user exists for whom all of the tasks have ended, based upon said project administration table, specifying a user for execution next in sequence, and updating said task list which is displayed upon said user terminal of said specified user to a task list which includes a task which said user can newly start.

12. The virtual knowledge management system according to claim 11, wherein:

said project administration table further stores a reference value or values to one or more deliverable document objects which are deliverables of a certain task, said project control function further comprises, means for storing said one or more deliverable document objects in said knowledge data base; and means for storing said reference value or values to said one or more deliverable document object associated with said certain task in said project administration table.

13. The virtual knowledge management system according to claim 8, wherein: said plurality of specified types include a single sheet object that is associated with a document file having a single sheet, a multi sheet object that is associated with a document file having a plurality of sheets, a multi document object that is associated with a plurality of document files of which information is different, a multi representation object that is associated with a plurality of document files if which formats are different, an annotation object that is associated with a document file or a set of document files which expresses an annotation or annotations accompanying another document object, and a registered object that is not yet associated with an actual document file.

14. A virtual knowledge management system according to claim 13, wherein:

when a user who is allowed to perform a function of opening files, selects a document file to be opened from said document files associated with a displayed document object which is of type of said multi representation (MR) object, the function (S17-S21 in FIG. 59) for displaying said document objects inside said manager (4 (particularly 11)) opens all of the document files associated with said displayed document object.

15. A virtual knowledge management system using a computer, comprising:

a virtual knowledge base which stores a plurality of objects that are data entities for respective utilization by a plurality of users, and that belong to different object types, and control data that is provided corresponding to each of said object types, and that relates to the control of object operations performed by said users; and a manager which has a plurality of types of functions for respectively performing a plurality of types of object operations including the display and preparation of said objects belonging to each object type in accordance with requests from said users;

wherein the respective functions of said manager control the respective operations for said objects belonging to the respective object types in accordance with the control data of the corresponding object types, wherein:

said objects belonging to one of said object types are document objects which can be associated with document files;

the respective document objects have type data which indicates one type selected from a plurality of specified types differing in the numbers or types of associated document files, and also have association data which indicates the association with one or more document files in cases where the document objects are associated with said one or more document files;

the function for displaying said document objects inside said manager displays the types of the respective document objects on the basis of said type data of the respective document objects, and displays the document files associated with the respective document objects on the basis of said association data of the respective document objects, and opens said associated document files in accordance with requests from said users.

16. The virtual knowledge management system according to claim 15, wherein:
said objects belonging to one of said object types are business processes which respectively have one or more sets of workflow model data that respectively define the flow of work among a plurality of users;
said objects belonging to another one of said object types are tasks which have task data that defines the work that can be performed by said users
said objects belonging to another one of said object types are projects, these respective projects are associated with one or more of said business processes, and with one or more of said tasks respectively assigned to one or more of said users as defined by the workflow data of the respective business processes;
said manager further has a project control function for controlling the progress of the respective projects in accordance with requests from said users; and
said project control function is arranged so that this function prepares and displays a task list that lists the tasks assigned to each of the users on the basis of said one or more business processes and said one or more tasks associated with the respective projects, and so that this function updates said task list for the respective users in accordance with input indicating the initiation or completion of tasks from the respective users,
said knowledge data base further stores a project administration table which includes a plurality of users who execute one or more projects, a plurality of tasks which must be executed by the plurality of users, an execution sequence for execution of the tasks by said plurality of users, and status of said plurality of tasks;
said project control function comprises,
  means for displaying said task list of tasks which each of said users can execute upon a user terminal of said user, based upon said project administration table;
  means for receiving input from each said user which indicates that said task has ended, and setting the status of said task in said project administration table to ended;
  means for checking, based upon said project administration table, whether or not all of tasks for each of said users have ended; and
  means for, if some user exists for whom all of the tasks have ended, based upon said project administration table, specifying a user for execution next in sequence, and updating said task list which is displayed upon said user terminal of said specified user to a task list which includes a task which said user can newly start.

17. A virtual knowledge management system using a computer, comprising:
a virtual knowledge base which stores a plurality of objects that are data entities for respective utilization by a plurality of users, and that belong to different object types, and control data that is provided corresponding to each of said object types, and that relates to the control of object operations performed by said users; and
a manager which has a plurality of types of functions for respectively performing a plurality of types of object operations including the display and preparation of said objects belonging to each object type in accordance with requests from said users;
wherein the respective functions of said manager control the respective operations for said objects belonging to the respective object types in accordance with the control data of the corresponding object types,
wherein:
said objects belonging to one of said object types are business processes which respectively have one or more sets of workflow model data that respectively define the flow of work among a plurality of users;
said objects belonging to another one of said object types are tasks which have task data that defines the work that can be performed by said users
said objects belonging to another one of said object types are projects, these respective projects are associated with one or more of said business processes, and with one or more of said tasks respectively assigned to one or more of said users as defined by the workflow data of the respective business processes;
said manager further has a project control function for controlling the progress of the respective projects in accordance with requests from said users; and
said project control function is arranged so that this function prepares and displays a task list that lists the tasks assigned to each of the users on the basis of said one or more business processes and said one or more tasks associated with the respective projects, and so that this function updates said task list for the respective users in accordance with input indicating the initiation or completion of tasks from the respective users,
said knowledge data base further stores a project administration table which includes a plurality of users who execute one or more projects, a plurality of tasks which must be executed by the plurality of users, an execution sequence for execution of the tasks by said plurality of users, and status of said plurality of tasks;
said project control function comprises,
  means for displaying said task list of tasks which each of said users can execute upon a user terminal of said user, based upon said project administration table;
  means for receiving input from each said user which indicates that said task has ended, and setting the status of said task in said project administration table to ended;
  means for checking, based upon said project administration table, whether or not all of tasks for each of said users have ended; and
  means for, if some user exists for whom all of the tasks have ended, based upon said project administration table, specifying a user for execution next in sequence, and updating said task list which is displayed upon said user terminal of said specified user to a task list which includes a task which said user can newly start.

18. The virtual knowledge management system according to claim 17, wherein:
said project administration table further stores a reference value or values to one or more deliverable document objects which are deliverables of a certain task,
said project control function further comprises,
means for storing said one or more deliverable document objects in said knowledge data base; and
means for storing said reference value or values to said one or more deliverable document object associated with said certain task in said project administration table.

* * * * *